(12) United States Patent
Hoffberg

(10) Patent No.: US 10,118,696 B1
(45) Date of Patent: Nov. 6, 2018

(54) STEERABLE ROTATING PROJECTILE

(71) Applicant: Steven M. Hoffberg, West Harrison, NY (US)

(72) Inventor: Steven M. Hoffberg, West Harrison, NY (US)

(*) Notice: Subject to any disclaimer, the term of this patent is extended or adjusted under 35 U.S.C. 154(b) by 28 days.

(21) Appl. No.: 15/476,275

(22) Filed: Mar. 31, 2017

Related U.S. Application Data

(60) Provisional application No. 62/316,117, filed on Mar. 31, 2016.

(51) Int. Cl.
| | |
|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| B64C 39/00 | (2006.01) |
| B64C 17/02 | (2006.01) |
| B64C 21/00 | (2006.01) |
| B64C 23/00 | (2006.01) |
| B64C 23/08 | (2006.01) |
| F42B 10/62 | (2006.01) |
| F42B 10/02 | (2006.01) |

(52) U.S. Cl.
CPC ............ *B64C 39/001* (2013.01); *B64C 17/02* (2013.01); *B64C 21/00* (2013.01); *B64C 23/005* (2013.01); *B64C 23/08* (2013.01); *B64C 2230/02* (2013.01); *F42B 10/02* (2013.01); *F42B 10/025* (2013.01); *F42B 10/62* (2013.01)

(58) Field of Classification Search
CPC ....... B64C 17/02; B64C 21/00; B64C 23/005; B64C 23/08

USPC ........................................................... 701/3
See application file for complete search history.

(56) References Cited

U.S. PATENT DOCUMENTS

| | | |
|---|---|---|
| 3,359,678 A | 12/1967 | Headrick et al. |
| 3,960,379 A | 6/1976 | Maloney et al. |
| 3,976,265 A | 8/1976 | Doolittle |
| 3,982,126 A | 9/1976 | Von Alfthan |
| 4,047,832 A | 9/1977 | Sforza |
| 4,048,947 A | 9/1977 | Sicard |
| 4,052,927 A | 10/1977 | Flatau |
| 4,072,049 A | 2/1978 | Miller |
| 4,111,594 A | 9/1978 | Sforza |
| 4,112,612 A | 9/1978 | Woods |
| 4,145,839 A | 3/1979 | Sampietro |

(Continued)

FOREIGN PATENT DOCUMENTS

DE  10 2012 002 825 A1  8/2013

*Primary Examiner* — Maceeh Anwari
(74) *Attorney, Agent, or Firm* — Tully Rinckey PLLC; Steven M. Hoffberg

(57) ABSTRACT

A method for controlling a flying projectile which rotates during flight, comprising: determining an angle of rotation of an inertial mass spinning about an axis during flight; and controlling at least one actuator for altering at least a portion of an aerodynamic structure, selectively in dependence on the determined angle of rotation and a control input, to control aerodynamic forces during flight. An aerodynamic surface may rotate and interact with surrounding air during flight, to produce aerodynamic forces. A sensor determines an angular rotation of the spin during flight. A control system, responsive to the sensor, produces a control signal in dependence on the determined angular rotation. An actuator selectively alters an aerodynamic characteristic of the aerodynamic surface in response to the control signal.

20 Claims, 3 Drawing Sheets

(56) References Cited

U.S. PATENT DOCUMENTS

| | | |
|---|---|---|
| 4,166,618 A | 9/1979 | Sheem |
| 4,222,242 A | 9/1980 | Moseley |
| 4,222,361 A | 9/1980 | Jackson et al. |
| 4,223,473 A | 9/1980 | Brown |
| 4,225,286 A | 9/1980 | Fork |
| 4,243,190 A | 1/1981 | Sams |
| 4,253,673 A | 3/1981 | Bailey |
| 4,262,911 A | 4/1981 | Opresik et al. |
| 4,266,773 A | 5/1981 | Treadwell |
| 4,274,639 A | 6/1981 | Flanders |
| 4,301,616 A | 11/1981 | Gudgel |
| 4,311,342 A | 1/1982 | Latimer |
| 4,315,629 A | 2/1982 | English |
| 4,330,130 A | 5/1982 | Carr |
| 4,334,385 A | 6/1982 | Melin et al. |
| 4,355,813 A | 10/1982 | Rathjen |
| 4,366,386 A | 12/1982 | Hanson |
| 4,366,936 A | 1/1983 | Ferguson |
| 4,373,734 A | 2/1983 | Frank |
| 4,378,944 A | 4/1983 | Johnston |
| 4,386,779 A | 6/1983 | Whitlock |
| 4,398,895 A | 8/1983 | Asker |
| 4,401,284 A | 8/1983 | Austin |
| 4,403,565 A | 9/1983 | Bleiweiss et al. |
| 4,438,924 A | 3/1984 | Carr |
| 4,446,379 A | 5/1984 | Borg et al. |
| 4,452,007 A | 6/1984 | Martin |
| 4,456,265 A | 6/1984 | Adler |
| 4,461,485 A | 7/1984 | Horvath et al. |
| 4,502,724 A | 3/1985 | Grenadier |
| 4,516,776 A | 5/1985 | Nicholas |
| 4,529,390 A | 7/1985 | Levy et al. |
| 4,576,581 A | 3/1986 | Borg |
| 4,600,398 A | 7/1986 | Fraga |
| 4,602,584 A | 7/1986 | North et al. |
| 4,630,997 A | 12/1986 | Cousteau et al. |
| 4,635,474 A | 1/1987 | Blackwood |
| 4,635,943 A | 1/1987 | Lumpkin |
| 4,661,052 A | 4/1987 | Ruhle |
| 4,709,928 A | 12/1987 | Willingham |
| 4,718,677 A | 1/1988 | Barnes |
| 4,732,384 A | 3/1988 | Seymour |
| 4,741,109 A | 5/1988 | McCurdy et al. |
| 4,748,366 A | 5/1988 | Taylor |
| 4,759,146 A | 7/1988 | Le Beon et al. |
| 4,805,583 A | 2/1989 | Mosser |
| 4,809,988 A | 3/1989 | Hunter |
| 4,819,947 A | 4/1989 | Mackey |
| 4,832,569 A | 5/1989 | Samuelsen et al. |
| 4,850,939 A | 7/1989 | Chilcote et al. |
| 4,852,543 A | 8/1989 | Mosser |
| 4,863,317 A | 9/1989 | Boyle |
| 4,867,727 A | 9/1989 | Lanius |
| 4,869,699 A | 9/1989 | Plambeck et al. |
| 4,894,038 A | 1/1990 | Giese |
| 4,903,917 A | 2/1990 | Peller et al. |
| 4,911,020 A | 3/1990 | Thompson |
| 4,919,083 A | 4/1990 | Axelrod |
| 4,919,637 A | 4/1990 | Fleischmann |
| 4,952,196 A | 8/1990 | Chilcote et al. |
| 4,955,620 A | 9/1990 | Reinke |
| 4,964,837 A | 10/1990 | Collier |
| 4,974,633 A | 12/1990 | Hickey |
| 4,976,155 A | 12/1990 | Challandes |
| 4,979,746 A | 12/1990 | Gentiluomo |
| 5,014,990 A | 5/1991 | Kaser et al. |
| 5,026,067 A | 6/1991 | Gentiluomo |
| 5,032,098 A | 7/1991 | Balogh et al. |
| 5,033,750 A | 7/1991 | Yamagishi et al. |
| 5,050,439 A | 9/1991 | Thompson |
| 5,050,575 A | 9/1991 | Killion |
| 5,078,637 A | 1/1992 | McFarland |
| 5,082,205 A | 1/1992 | Caufman |
| 5,083,799 A | 1/1992 | Thill |
| 5,092,608 A | 3/1992 | Snipes |
| 5,103,646 A | 4/1992 | Fini |
| 5,104,126 A | 4/1992 | Gentiluomo |
| 5,108,108 A | 4/1992 | Norman et al. |
| 5,125,862 A | 6/1992 | Paranto |
| 5,133,637 A | 7/1992 | Wadsworth |
| 5,145,444 A | 9/1992 | VanKuiken |
| 5,159,407 A | 10/1992 | Churnside et al. |
| 5,180,119 A | 1/1993 | Picard |
| 5,181,724 A | 1/1993 | Spadoni |
| 5,195,745 A | 3/1993 | Rudell et al. |
| 5,195,920 A | 3/1993 | Collier |
| 5,209,490 A | 5/1993 | Dallavecchia |
| 5,232,226 A | 8/1993 | Glickson |
| 5,234,367 A | 8/1993 | DeCesare |
| 5,256,099 A | 10/1993 | Rudell et al. |
| 5,263,819 A | 11/1993 | O'Leary et al. |
| 5,287,004 A | 2/1994 | Finley |
| 5,303,931 A | 4/1994 | Brown |
| 5,366,219 A | 11/1994 | Salcer et al. |
| 5,367,503 A | 11/1994 | Lowrance |
| 5,395,071 A | 3/1995 | Felix |
| 5,397,130 A | 3/1995 | Brown |
| 5,404,868 A | 4/1995 | Sankrithi |
| 5,411,265 A | 5/1995 | Falco |
| 5,446,599 A | 8/1995 | Lemelson |
| 5,480,334 A | 1/1996 | Wilson et al. |
| 5,531,624 A | 7/1996 | Dunipace |
| 5,569,131 A | 10/1996 | Giulianelli |
| 5,584,901 A | 12/1996 | Bakharev et al. |
| 5,620,351 A | 4/1997 | Ho |
| 5,634,839 A | 6/1997 | Dixon |
| 5,636,844 A | 6/1997 | de Buys |
| 5,645,248 A | 7/1997 | Campbell |
| 5,655,777 A | 8/1997 | Neading et al. |
| 5,660,542 A | 8/1997 | Rinker et al. |
| 5,672,086 A | 9/1997 | Dixon |
| 5,687,387 A | 11/1997 | Endejan et al. |
| 5,695,420 A | 12/1997 | Bellehumeur |
| 5,697,617 A | 12/1997 | Egging |
| 5,757,181 A | 5/1998 | Wolf et al. |
| 5,776,021 A | 7/1998 | Rakonjac |
| 5,781,399 A | 7/1998 | Lanigan et al. |
| 5,786,984 A | 7/1998 | Bonardi et al. |
| 5,788,178 A | 8/1998 | Barrett, Jr. |
| 5,793,606 A | 8/1998 | Cubbage et al. |
| 5,799,616 A | 9/1998 | McClung, III |
| 5,854,736 A | 12/1998 | Fuhs et al. |
| 5,865,690 A | 2/1999 | Giannoutsos |
| 5,871,397 A | 2/1999 | Nelson et al. |
| 5,872,205 A | 2/1999 | Balke et al. |
| 5,873,570 A | 2/1999 | Jones |
| 5,875,627 A | 3/1999 | Jeswine |
| 5,882,107 A | 3/1999 | Bornhorst et al. |
| 5,893,790 A | 4/1999 | Montgomery |
| 5,895,308 A | 4/1999 | Spector |
| 5,899,288 A | 5/1999 | Schubert et al. |
| 5,901,633 A | 5/1999 | Chan et al. |
| 5,902,166 A | 5/1999 | Robb |
| 5,909,859 A | 6/1999 | Janicki |
| 5,916,179 A | 6/1999 | Sharrock |
| 5,920,995 A | 7/1999 | Sammut |
| 5,934,966 A | 8/1999 | Ward |
| 5,934,997 A | 8/1999 | Nelson et al. |
| 5,935,023 A | 8/1999 | Maehara et al. |
| 5,941,920 A | 8/1999 | Schubert |
| 5,951,353 A | 9/1999 | Moore |
| 5,975,982 A | 11/1999 | Spector |
| 5,977,778 A | 11/1999 | Chan et al. |
| 5,977,913 A | 11/1999 | Christ |
| 5,984,753 A | 11/1999 | Perez |
| 5,996,933 A | 12/1999 | Schier |
| 6,000,703 A | 12/1999 | Schubert et al. |
| 6,005,395 A | 12/1999 | Chan et al. |
| 6,029,764 A | 2/2000 | Schubert |
| 6,032,374 A | 3/2000 | Sammut |
| 6,045,095 A | 4/2000 | Parrish, IV |
| 6,049,448 A | 4/2000 | Lanigan et al. |
| 6,083,128 A | 7/2000 | Young et al. |
| 6,097,104 A | 8/2000 | Russell |

(56) References Cited

U.S. PATENT DOCUMENTS

| | | |
|---|---|---|
| 6,106,355 A | 8/2000 | Hoerner |
| 6,126,332 A | 10/2000 | Cubbage et al. |
| 6,135,455 A | 10/2000 | McNally |
| 6,142,059 A | 11/2000 | Chan et al. |
| 6,148,271 A | 11/2000 | Marinelli |
| 6,151,563 A | 11/2000 | Marinelli |
| 6,157,898 A | 12/2000 | Marinelli |
| 6,172,429 B1 | 1/2001 | Russell |
| 6,186,902 B1 | 2/2001 | Briggs |
| 6,193,620 B1 | 2/2001 | Tarng |
| 6,198,275 B1 | 3/2001 | Wolf et al. |
| 6,202,198 B1 | 3/2001 | Bibyk |
| 6,206,537 B1 | 3/2001 | Hauck |
| 6,208,247 B1 | 3/2001 | Agre et al. |
| 6,227,992 B1 | 5/2001 | Brasier |
| 6,231,414 B1 | 5/2001 | Ho |
| 6,234,102 B1 | 5/2001 | Russell et al. |
| 6,241,362 B1 | 6/2001 | Morrison |
| 6,247,989 B1 | 6/2001 | Neff |
| 6,254,832 B1 | 7/2001 | Rainin et al. |
| 6,261,142 B1 | 7/2001 | Fiotakis |
| 6,265,984 B1 | 7/2001 | Molinaroli |
| 6,267,070 B1 | 7/2001 | Russell et al. |
| 6,270,391 B1 | 8/2001 | Emilsson |
| 6,287,193 B1 | 9/2001 | Rehkemper et al. |
| 6,288,633 B1 | 9/2001 | Volpe et al. |
| 6,292,213 B1 | 9/2001 | Jones |
| 6,293,680 B1 | 9/2001 | Bruns |
| 6,304,665 B1 | 10/2001 | Cavallaro et al. |
| 6,308,787 B1 | 10/2001 | Alft |
| 6,312,349 B1 | 11/2001 | Roberts |
| 6,315,062 B1 | 11/2001 | Alft et al. |
| 6,317,049 B1 | 11/2001 | Toubia et al. |
| 6,338,391 B1 | 1/2002 | Severinsky et al. |
| 6,340,884 B1 | 1/2002 | Wolf et al. |
| 6,346,025 B1 | 2/2002 | Tachau et al. |
| 6,348,010 B1 | 2/2002 | Doolen |
| 6,357,158 B1 | 3/2002 | Smith, III |
| 6,364,614 B1 | 4/2002 | Mnatsakanian |
| 6,375,424 B1 | 4/2002 | Scarpa |
| 6,386,997 B1 | 5/2002 | Brown |
| 6,395,955 B1 | 5/2002 | Roe et al. |
| 6,402,090 B1 | 6/2002 | Aaron |
| 6,402,342 B1 | 6/2002 | Chiang |
| 6,402,584 B1 | 6/2002 | Dear |
| 6,404,409 B1 | 6/2002 | Solomon |
| 6,405,132 B1 | 6/2002 | Breed et al. |
| 6,414,955 B1 | 7/2002 | Clare et al. |
| 6,442,336 B1 | 8/2002 | Lemelson |
| 6,453,595 B1 | 9/2002 | Sammut |
| 6,464,167 B2 | 10/2002 | Hayes |
| 6,470,976 B2 | 10/2002 | Alft et al. |
| 6,474,593 B1 | 11/2002 | Lipeles et al. |
| 6,484,818 B2 | 11/2002 | Alft et al. |
| 6,484,971 B2 | 11/2002 | Layukallo |
| 6,503,085 B1 | 1/2003 | Elkind |
| 6,513,345 B1 | 2/2003 | Betting et al. |
| 6,516,699 B2 | 2/2003 | Sammut et al. |
| 6,524,073 B2 | 2/2003 | Mnatsakanian |
| 6,524,368 B2 | 2/2003 | Betting et al. |
| 6,526,352 B1 | 2/2003 | Breed et al. |
| 6,527,223 B1 | 3/2003 | Mondale |
| 6,554,088 B2 | 4/2003 | Severinsky et al. |
| 6,554,285 B2 | 4/2003 | Chittenden |
| 6,563,130 B2 | 5/2003 | Dworkowski et al. |
| 6,565,243 B1 | 5/2003 | Cheung |
| 6,570,487 B1 | 5/2003 | Steeves |
| 6,591,537 B2 | 7/2003 | Smith |
| 6,602,045 B2 | 8/2003 | Hickey |
| 6,604,742 B2 | 8/2003 | El Sabbagh |
| 6,608,464 B1 | 8/2003 | Lew et al. |
| 6,622,973 B2 | 9/2003 | Al-Gami et al. |
| 6,647,328 B2 | 11/2003 | Walker |
| 6,651,511 B1 | 11/2003 | Young |
| 6,659,466 B2 | 12/2003 | Searles et al. |
| 6,666,650 B1 | 12/2003 | Themel |
| 6,677,257 B2 | 1/2004 | Brasier |
| 6,681,512 B2 | 1/2004 | Sammut |
| 6,703,827 B1 | 3/2004 | Wolf et al. |
| 6,705,654 B2 | 3/2004 | Slauf |
| 6,719,069 B2 | 4/2004 | Alft et al. |
| 6,719,653 B2 | 4/2004 | Nesbitt |
| 6,720,920 B2 | 4/2004 | Breed et al. |
| 6,723,013 B2 | 4/2004 | Ilcisin et al. |
| 6,726,265 B2 | 4/2004 | Miller |
| 6,735,630 B1 | 5/2004 | Gelvin et al. |
| 6,749,218 B2 | 6/2004 | Breed |
| 6,755,263 B2 | 6/2004 | Alft et al. |
| 6,755,273 B2 | 6/2004 | Breed |
| 6,768,944 B2 | 7/2004 | Breed et al. |
| 6,776,825 B2 | 8/2004 | Betting et al. |
| 6,826,607 B1 | 11/2004 | Gelvin et al. |
| 6,832,251 B1 | 12/2004 | Gelvin et al. |
| 6,833,795 B1 | 12/2004 | Johnson et al. |
| 6,857,079 B2 | 2/2005 | Chen |
| 6,857,770 B2 | 2/2005 | Moore |
| 6,859,831 B1 | 2/2005 | Gelvin et al. |
| 6,868,314 B1 | 3/2005 | Frink |
| 6,872,105 B2 | 3/2005 | Dusablon et al. |
| 6,880,722 B2 | 4/2005 | Anderson et al. |
| 6,885,968 B2 | 4/2005 | Breed et al. |
| 6,887,119 B2 | 5/2005 | Bloeme et al. |
| 6,892,666 B1 | 5/2005 | Plante et al. |
| 6,898,501 B2 | 5/2005 | Schubert |
| 6,910,977 B2 | 6/2005 | Baquero |
| 6,918,459 B2 | 7/2005 | Breed |
| 6,922,632 B2 | 7/2005 | Foxlin |
| 6,972,659 B2 | 12/2005 | von Behrens et al. |
| 6,978,728 B2 | 12/2005 | Koop et al. |
| 6,981,499 B2 | 1/2006 | Anderson et al. |
| 6,982,697 B2 | 1/2006 | Wilson et al. |
| 6,988,026 B2 | 1/2006 | Breed et al. |
| 6,990,639 B2 | 1/2006 | Wilson |
| 6,991,565 B2 | 1/2006 | Kasashima |
| 7,018,308 B2 | 3/2006 | Kasashima |
| 7,020,701 B1 | 3/2006 | Gelvin et al. |
| 7,029,406 B2 | 4/2006 | Kasashima et al. |
| 7,032,861 B2 | 4/2006 | Sanders, Jr. et al. |
| 7,034,660 B2 | 4/2006 | Watters et al. |
| 7,064,472 B2 | 6/2006 | Pelrine et al. |
| 7,069,684 B2 | 7/2006 | Smith, III |
| 7,081,693 B2 | 7/2006 | Hamel et al. |
| 7,082,890 B2 | 8/2006 | MacGregor et al. |
| 7,083,533 B2 | 8/2006 | Kasashima et al. |
| 7,085,637 B2 | 8/2006 | Breed et al. |
| 7,089,099 B2 | 8/2006 | Shostak et al. |
| 7,090,596 B2 | 8/2006 | David |
| 7,096,727 B2 | 8/2006 | Adamson et al. |
| 7,101,293 B2 | 9/2006 | Tarng et al. |
| 7,103,460 B1 | 9/2006 | Breed |
| 7,104,347 B2 | 9/2006 | Severinsky et al. |
| 7,108,576 B2 | 9/2006 | LaPointe |
| 7,108,615 B2 | 9/2006 | Kasashima et al. |
| 7,110,880 B2 | 9/2006 | Breed et al. |
| 7,143,844 B2 | 12/2006 | Alft et al. |
| 7,147,246 B2 | 12/2006 | Breed et al. |
| 7,164,117 B2 | 1/2007 | Breed et al. |
| 7,170,201 B2 | 1/2007 | Hamel et al. |
| 7,175,542 B2 | 2/2007 | Watanabe et al. |
| 7,187,295 B2 | 3/2007 | Saltzek |
| 7,194,838 B2 | 3/2007 | Smith, III |
| 7,201,671 B2 | 4/2007 | Watanabe et al. |
| 7,202,776 B2 | 4/2007 | Breed |
| 7,204,453 B2 | 4/2007 | Muren |
| 7,204,455 B2 | 4/2007 | Sinclair |
| 7,207,701 B2 | 4/2007 | Kennedy et al. |
| 7,209,221 B2 | 4/2007 | Breed et al. |
| 7,213,786 B1 | 5/2007 | McKinney |
| 7,219,033 B2 | 5/2007 | Kolen |
| 7,222,452 B2 | 5/2007 | Smith, III |
| 7,231,920 B2 | 6/2007 | Harvey et al. |
| 7,237,355 B2 | 7/2007 | Smith, III |
| 7,237,634 B2 | 7/2007 | Severinsky et al. |
| 7,238,121 B2 | 7/2007 | Watanabe et al. |

(56) References Cited

U.S. PATENT DOCUMENTS

| | | |
|---|---|---|
| 7,243,945 B2 | 7/2007 | Breed et al. |
| 7,249,732 B2 | 7/2007 | Sanders, Jr. et al. |
| 7,250,936 B2 | 7/2007 | Wilson et al. |
| 7,255,304 B2 | 8/2007 | Ericson et al. |
| 7,259,357 B2 | 8/2007 | Walker |
| 7,264,534 B2 | 9/2007 | Stubenfoll |
| 7,270,614 B2 | 9/2007 | Watanabe et al. |
| 7,285,032 B2 | 10/2007 | Cha |
| 7,295,925 B2 | 11/2007 | Breed et al. |
| 7,300,363 B2 | 11/2007 | Kasashima |
| 7,300,584 B2 | 11/2007 | Langhans et al. |
| 7,307,617 B2 | 12/2007 | Wilson et al. |
| 7,309,967 B2 | 12/2007 | Moser et al. |
| 7,313,467 B2 | 12/2007 | Breed et al. |
| 7,322,355 B2 | 1/2008 | Jones et al. |
| 7,329,099 B2 | 2/2008 | Hartman |
| 7,330,784 B2 | 2/2008 | Johnson et al. |
| 7,331,838 B2 | 2/2008 | Shantz |
| 7,335,000 B2 | 2/2008 | Ferguson |
| 7,340,765 B2 | 3/2008 | Feldmeier |
| 7,343,707 B2 | 3/2008 | Smith, III |
| 7,347,200 B2 | 3/2008 | Jones et al. |
| 7,347,758 B2 | 3/2008 | Moore |
| 7,352,339 B2 | 4/2008 | Morgan et al. |
| 7,354,017 B2 | 4/2008 | Morris et al. |
| 7,357,732 B2 | 4/2008 | Watanabe et al. |
| 7,359,527 B2 | 4/2008 | Breed et al. |
| 7,359,782 B2 | 4/2008 | Breed |
| 7,362,032 B2 | 4/2008 | Pelrine et al. |
| 7,365,455 B2 | 4/2008 | Hamel et al. |
| 7,367,901 B2 | 5/2008 | Watanabe et al. |
| 7,379,800 B2 | 5/2008 | Breed |
| 7,385,443 B1 | 6/2008 | Denison |
| 7,386,372 B2 | 6/2008 | Breed et al. |
| 7,391,257 B1 | 6/2008 | Denison et al. |
| 7,392,871 B2 | 7/2008 | Severinsky et al. |
| 7,394,182 B2 | 7/2008 | Pelrine et al. |
| 7,407,029 B2 | 8/2008 | Breed et al. |
| 7,412,930 B2 | 8/2008 | Smith et al. |
| 7,418,346 B2 | 8/2008 | Breed et al. |
| 7,421,321 B2 | 9/2008 | Breed et al. |
| 7,426,437 B2 | 9/2008 | Breed et al. |
| 7,427,047 B2 | 9/2008 | Saeed Tehrani |
| 7,429,801 B2 | 9/2008 | Adamson et al. |
| 7,435,089 B2 | 10/2008 | Sato et al. |
| 7,444,210 B2 | 10/2008 | Breed et al. |
| 7,455,134 B2 | 11/2008 | Severinsky et al. |
| 7,467,629 B2 | 12/2008 | Rand |
| 7,476,865 B2 | 1/2009 | Lal et al. |
| 7,504,740 B2 | 3/2009 | Murakami et al. |
| 7,520,353 B2 | 4/2009 | Severinsky et al. |
| 7,523,803 B2 | 4/2009 | Breed |
| 7,527,288 B2 | 5/2009 | Breed |
| 7,538,473 B2 | 5/2009 | Blandino et al. |
| 7,540,814 B2 | 6/2009 | Dilling |
| 7,541,995 B1 | 6/2009 | Murphy, Jr. |
| 7,545,994 B2 | 6/2009 | Reid |
| 7,552,403 B2 | 6/2009 | Wilson |
| 7,555,370 B2 | 6/2009 | Breed et al. |
| 7,557,433 B2 | 7/2009 | McCain |
| 7,559,388 B2 | 7/2009 | Severinsky et al. |
| 7,563,180 B2 | 7/2009 | Watanabe et al. |
| 7,568,986 B2 | 8/2009 | Watanabe et al. |
| 7,570,785 B2 | 8/2009 | Breed |
| 7,575,248 B2 | 8/2009 | Breed |
| 7,582,981 B1 | 9/2009 | Meller |
| 7,584,570 B2 | 9/2009 | Smith |
| 7,590,589 B2 | 9/2009 | Hoffberg |
| 7,596,242 B2 | 9/2009 | Breed et al. |
| 7,596,767 B2 | 9/2009 | Wilson |
| 7,597,099 B2 | 10/2009 | Jones et al. |
| 7,597,164 B2 | 10/2009 | Severinsky et al. |
| 7,602,077 B2 | 10/2009 | Ferguson |
| 7,603,998 B2 | 10/2009 | Finstad |
| 7,606,570 B2 | 10/2009 | Karaoguz et al. |
| 7,607,494 B2 | 10/2009 | Alft et al. |
| 7,607,610 B1 | 10/2009 | Sterchak |
| 7,610,146 B2 | 10/2009 | Breed |
| 7,620,521 B2 | 11/2009 | Breed et al. |
| 7,621,484 B2 | 11/2009 | Wingert |
| 7,622,988 B2 | 11/2009 | Denison et al. |
| 7,623,053 B2 | 11/2009 | Terry et al. |
| 7,629,899 B2 | 12/2009 | Breed |
| 7,630,806 B2 | 12/2009 | Breed |
| 7,641,528 B2 | 1/2010 | Stolper |
| 7,647,180 B2 | 1/2010 | Breed |
| 7,650,212 B2 | 1/2010 | Breed et al. |
| 7,662,012 B2 | 2/2010 | Wright |
| 7,662,013 B2 | 2/2010 | Van de Rostyne et al. |
| 7,663,502 B2 | 2/2010 | Breed |
| 7,663,629 B2 | 2/2010 | Ajioka et al. |
| 7,665,453 B1 | 2/2010 | D'Agostino |
| 7,665,454 B1 | 2/2010 | D'Agostino |
| 7,670,204 B2 | 3/2010 | Huber |
| 7,672,756 B2 | 3/2010 | Breed |
| 7,672,781 B2 | 3/2010 | Churchill et al. |
| 7,676,062 B2 | 3/2010 | Breed et al. |
| 7,682,214 B2 | 3/2010 | Bamiak, Jr. |
| 7,689,378 B2 | 3/2010 | Kolen |
| 7,692,127 B1 | 4/2010 | Linn et al. |
| 7,708,658 B2 | 5/2010 | McInerney |
| 7,709,973 B2 | 5/2010 | Meller |
| 7,712,225 B2 | 5/2010 | Sammut |
| 7,712,777 B2 | 5/2010 | Breed |
| 7,714,757 B2 | 5/2010 | Denison et al. |
| 7,716,008 B2 | 5/2010 | Ohta |
| 7,716,013 B2 | 5/2010 | Orth et al. |
| 7,719,416 B2 | 5/2010 | Arms et al. |
| 7,721,231 B2 | 5/2010 | Wilson |
| 7,723,861 B2 | 5/2010 | Meller |
| 7,725,253 B2 | 5/2010 | Foxlin |
| 7,734,061 B2 | 6/2010 | Breed et al. |
| 7,738,678 B2 | 6/2010 | Breed et al. |
| 7,746,620 B2 | 6/2010 | Bedingfield |
| 7,762,582 B2 | 7/2010 | Breed |
| 7,766,274 B1 | 8/2010 | Jameson et al. |
| 7,766,383 B2 | 8/2010 | Breed et al. |
| 7,769,513 B2 | 8/2010 | Breed et al. |
| 7,770,920 B2 | 8/2010 | Breed et al. |
| 7,772,960 B2 | 8/2010 | Baker |
| 7,774,155 B2 | 8/2010 | Sato et al. |
| 7,775,761 B2 | 8/2010 | Ferguson |
| 7,775,910 B2 | 8/2010 | Lessack |
| 7,779,956 B2 | 8/2010 | Breed et al. |
| 7,781,709 B1 | 8/2010 | Jones et al. |
| 7,782,590 B2 | 8/2010 | Bedingfield et al. |
| 7,783,277 B2 | 8/2010 | Walker et al. |
| 7,783,403 B2 | 8/2010 | Breed |
| 7,785,098 B1 | 8/2010 | Appleby et al. |
| 7,788,008 B2 | 8/2010 | Breed |
| 7,789,520 B2 | 9/2010 | Konig et al. |
| 7,791,503 B2 | 9/2010 | Breed et al. |
| 7,794,341 B2 | 9/2010 | Tarng et al. |
| 7,796,081 B2 | 9/2010 | Breed |
| 7,797,367 B1 | 9/2010 | Gelvin et al. |
| 7,798,875 B1 | 9/2010 | Angel et al. |
| 7,819,003 B2 | 10/2010 | Breed et al. |
| 7,821,149 B2 | 10/2010 | Meller |
| 7,823,089 B2 | 10/2010 | Wilson |
| 7,830,033 B2 | 11/2010 | Meller |
| 7,832,137 B2 | 11/2010 | Sammut et al. |
| 7,834,301 B2 | 11/2010 | Clingman |
| 7,837,648 B2 | 11/2010 | Blair et al. |
| 7,840,342 B1 | 11/2010 | Breed |
| 7,840,355 B2 | 11/2010 | Breed et al. |
| 7,844,687 B1 | 11/2010 | Gelvin et al. |
| 7,845,508 B2 | 12/2010 | Rothschild et al. |
| 7,847,628 B2 | 12/2010 | Denison |
| 7,848,905 B2 | 12/2010 | Troxler et al. |
| 7,850,551 B2 | 12/2010 | Barber |
| 7,852,462 B2 | 12/2010 | Breed et al. |
| 7,854,087 B1 | 12/2010 | Pervez |
| 7,856,750 B2 | 12/2010 | Sammut et al. |
| 7,857,718 B2 | 12/2010 | Tarng et al. |

(56) References Cited

U.S. PATENT DOCUMENTS

| | | |
|---|---|---|
| 7,859,126 B2 | 12/2010 | Ferguson |
| 7,860,481 B2 | 12/2010 | Walker et al. |
| 7,866,717 B2 | 1/2011 | Martinez |
| 7,873,841 B2 | 1/2011 | Mullis, II et al. |
| 7,876,010 B2 | 1/2011 | Post |
| 7,877,224 B2 | 1/2011 | Ohta |
| 7,878,929 B2 | 2/2011 | Perry-Smith |
| 7,887,089 B2 | 2/2011 | Breed et al. |
| 7,891,298 B2 | 2/2011 | Minick et al. |
| 7,893,413 B1 | 2/2011 | Appleby et al. |
| 7,896,609 B2 | 3/2011 | Mitchell et al. |
| 7,899,616 B2 | 3/2011 | Breed |
| 7,899,621 B2 | 3/2011 | Breed et al. |
| 7,900,736 B2 | 3/2011 | Breed |
| 7,907,838 B2 | 3/2011 | Nasiri et al. |
| 7,912,645 B2 | 3/2011 | Breed et al. |
| 7,918,605 B2 | 4/2011 | Brown |
| 7,920,102 B2 | 4/2011 | Breed |
| 7,927,216 B2 | 4/2011 | Ikeda et al. |
| 7,931,535 B2 | 4/2011 | Ikeda et al. |
| 7,935,013 B2 | 5/2011 | Pacheco |
| 7,937,878 B2 | 5/2011 | Sammut et al. |
| 7,942,745 B2 | 5/2011 | Ikeda et al. |
| 7,946,048 B1 | 5/2011 | Sammut |
| 7,946,526 B2 | 5/2011 | Zimet |
| 7,947,937 B1 | 5/2011 | Langner |
| 7,962,164 B2 | 6/2011 | Karaoguz et al. |
| 7,962,285 B2 | 6/2011 | Breed |
| 7,963,442 B2 | 6/2011 | Jenkins et al. |
| 7,971,823 B2 | 7/2011 | Martin |
| 7,971,824 B2 | 7/2011 | Van de Rostyne |
| 7,976,060 B2 | 7/2011 | Breed |
| 7,979,172 B2 | 7/2011 | Breed |
| 7,979,173 B2 | 7/2011 | Breed |
| 7,983,802 B2 | 7/2011 | Breed |
| 7,983,836 B2 | 7/2011 | Breed |
| 7,986,054 B2 | 7/2011 | Douglas |
| 7,986,218 B2 | 7/2011 | Watters et al. |
| 7,988,190 B2 | 8/2011 | Breed |
| 7,989,973 B2 | 8/2011 | Birkestrand |
| 7,990,283 B2 | 8/2011 | Breed |
| 7,997,595 B1 | 8/2011 | Pope |
| 7,999,212 B1 | 8/2011 | Thiesen et al. |
| 8,000,314 B2 | 8/2011 | Brownrigg et al. |
| 8,000,897 B2 | 8/2011 | Breed et al. |
| 8,002,604 B2 | 8/2011 | Van de Rostyne et al. |
| 8,002,652 B2 | 8/2011 | Wong |
| 8,009,608 B2 | 8/2011 | Karaoguz et al. |
| 8,013,569 B2 | 9/2011 | Hartman |
| 8,018,933 B2 | 9/2011 | Dickens et al. |
| 8,027,572 B2 | 9/2011 | Bedingfield et al. |
| 8,032,324 B1 | 10/2011 | Bryant et al. |
| 8,033,253 B2 | 10/2011 | Ritchey et al. |
| 8,041,483 B2 | 10/2011 | Breed |
| 8,041,536 B2 | 10/2011 | Ohta |
| 8,049,193 B1 | 11/2011 | Appleby et al. |
| 8,051,079 B2 | 11/2011 | Cheng et al. |
| 8,052,500 B2 | 11/2011 | Van de Rostyne et al. |
| 8,054,203 B2 | 11/2011 | Breed et al. |
| 8,060,308 B2 | 11/2011 | Breed |
| 8,062,087 B1 | 11/2011 | Davis et al. |
| 8,068,979 B2 | 11/2011 | Breed |
| 8,086,318 B2 | 12/2011 | Strother et al. |
| 8,089,458 B2 | 1/2012 | Barney et al. |
| 8,099,375 B2 | 1/2012 | Driessen |
| 8,109,029 B1 | 2/2012 | Sammut et al. |
| 8,119,958 B2 | 2/2012 | Adams et al. |
| 8,124,921 B2 | 2/2012 | Geswender et al. |
| 8,126,680 B2 | 2/2012 | Troxler et al. |
| 8,132,126 B2 | 3/2012 | Wilson |
| 8,135,413 B2 | 3/2012 | Dupray |
| 8,140,259 B2 | 3/2012 | Hall et al. |
| 8,140,658 B1 | 3/2012 | Gelvin et al. |
| 8,144,619 B2 | 3/2012 | Hoffberg |
| 8,148,838 B2 | 4/2012 | Ferguson |
| 8,152,198 B2 | 4/2012 | Breed et al. |
| 8,157,651 B2 | 4/2012 | Ohta et al. |
| 8,160,433 B2 | 4/2012 | Bedingfield et al. |
| 8,161,968 B2 | 4/2012 | Augustyn et al. |
| 8,164,567 B1 | 4/2012 | Barney et al. |
| 8,167,344 B2 | 5/2012 | Martinez |
| 8,169,406 B2 | 5/2012 | Barney et al. |
| 8,171,849 B2 | 5/2012 | Amick |
| 8,174,135 B1 | 5/2012 | Roe et al. |
| 8,177,260 B2 | 5/2012 | Tropper et al. |
| 8,182,231 B2 | 5/2012 | Corten |
| 8,184,097 B1 | 5/2012 | Barney et al. |
| 8,185,119 B2 | 5/2012 | Karaoguz et al. |
| 8,186,784 B2 | 5/2012 | Clarke et al. |
| 8,196,540 B2 | 6/2012 | Palladino |
| 8,202,180 B2 | 6/2012 | Perry-Smith |
| 8,205,578 B2 | 6/2012 | Curry et al. |
| 8,205,822 B1 | 6/2012 | Jameson et al. |
| 8,209,120 B2 | 6/2012 | Breed |
| 8,209,147 B2 | 6/2012 | Solinsky |
| 8,214,097 B2 | 7/2012 | Severinsky et al. |
| 8,215,255 B2 | 7/2012 | Wobben et al. |
| 8,225,458 B1 | 7/2012 | Hoffberg |
| 8,226,493 B2 | 7/2012 | Briggs et al. |
| 8,230,635 B2 | 7/2012 | Sammut et al. |
| 8,231,506 B2 | 7/2012 | Molyneux et al. |
| 8,233,471 B2 | 7/2012 | Brownrigg et al. |
| 8,235,416 B2 | 8/2012 | Breed et al. |
| 8,240,508 B2 | 8/2012 | Wegelin et al. |
| 8,247,912 B2 | 8/2012 | Da Costa Duarte Pardal et al. |
| 8,248,367 B1 | 8/2012 | Barney et al. |
| 8,250,921 B2 | 8/2012 | Nasiri et al. |
| 8,253,264 B2 | 8/2012 | Becker |
| 8,255,144 B2 | 8/2012 | Breed et al. |
| 8,256,826 B2 | 9/2012 | Fioravanti |
| 8,257,157 B2 | 9/2012 | Polchin |
| 8,260,537 B2 | 9/2012 | Breed |
| 8,260,883 B2 | 9/2012 | Mooring et al. |
| 8,261,681 B2 | 9/2012 | Wobben |
| 8,265,769 B2 | 9/2012 | Denison |
| 8,267,693 B1 | 9/2012 | Moss |
| 8,267,786 B2 | 9/2012 | Ikeda |
| 8,282,498 B2 | 10/2012 | Publicover et al. |
| 8,286,265 B2 | 10/2012 | Karwan |
| 8,287,406 B2 | 10/2012 | Biederman et al. |
| 8,288,698 B2 | 10/2012 | Seidensticker |
| 8,289,162 B2 | 10/2012 | Mooring et al. |
| 8,308,563 B2 | 11/2012 | Ikeda et al. |
| 8,310,368 B2 | 11/2012 | Hoover et al. |
| 8,313,379 B2 | 11/2012 | Ikeda et al. |
| 8,315,326 B2 | 11/2012 | Agee et al. |
| 8,315,327 B2 | 11/2012 | Agee et al. |
| 8,319,162 B2 | 11/2012 | Mccool |
| 8,322,308 B2 | 12/2012 | Curry et al. |
| 8,322,649 B2 | 12/2012 | Martin |
| 8,325,030 B2 | 12/2012 | Townsend et al. |
| 8,327,803 B2 | 12/2012 | Tamaru et al. |
| 8,335,304 B2 | 12/2012 | Petite |
| 8,341,289 B2 | 12/2012 | Hellhake et al. |
| 8,344,998 B2 | 1/2013 | Fitzgerald et al. |
| 8,348,618 B2 | 1/2013 | Hartman |
| 8,351,773 B2 | 1/2013 | Nasiri et al. |
| 8,353,454 B2 | 1/2013 | Sammut et al. |
| 8,354,881 B2 | 1/2013 | Denison |
| 8,355,410 B2 | 1/2013 | Hall |
| 8,357,023 B2 | 1/2013 | Van de Rostyne et al. |
| 8,362,408 B2 | 1/2013 | Carlson |
| 8,362,631 B2 | 1/2013 | Roe et al. |
| 8,363,744 B2 | 1/2013 | Agee et al. |
| 8,368,648 B2 | 2/2013 | Barney et al. |
| 8,373,659 B2 | 2/2013 | Barney et al. |
| 8,384,538 B2 | 2/2013 | Breed |
| 8,384,668 B2 | 2/2013 | Barney et al. |
| 8,398,449 B2 | 3/2013 | Forti |
| 8,406,906 B2 | 3/2013 | Connelly |
| 8,409,003 B2 | 4/2013 | Ikeda |
| 8,417,481 B2 | 4/2013 | Cook et al. |
| 8,428,913 B2 | 4/2013 | Troxler |
| 8,430,753 B2 | 4/2013 | Ikeda et al. |

(56) References Cited

U.S. PATENT DOCUMENTS

| | | |
|---|---|---|
| 8,432,084 B2 | 4/2013 | Roberts et al. |
| 8,444,513 B2 | 5/2013 | Cournoyer |
| 8,447,474 B2 | 5/2013 | Breed |
| 8,451,928 B2 | 5/2013 | Agee et al. |
| 8,451,929 B2 | 5/2013 | Agee et al. |
| 8,452,575 B2 | 5/2013 | Sato |
| 8,452,577 B2 | 5/2013 | Sato |
| 8,454,459 B1 | 6/2013 | Reed |
| 8,456,159 B2 | 6/2013 | Polzer et al. |
| 8,456,419 B2 | 6/2013 | Wilson |
| 8,462,109 B2 | 6/2013 | Nasiri et al. |
| 8,467,133 B2 | 6/2013 | Miller |
| 8,469,815 B2 | 6/2013 | Hovseth |
| 8,472,120 B2 | 6/2013 | Border et al. |
| 8,472,986 B2 | 6/2013 | Karmarkar et al. |
| 8,473,245 B2 | 6/2013 | Ohta |
| 8,475,275 B2 | 7/2013 | Weston et al. |
| 8,477,425 B2 | 7/2013 | Border et al. |
| 8,482,859 B2 | 7/2013 | Border et al. |
| 8,488,246 B2 | 7/2013 | Border et al. |
| 8,491,389 B2 | 7/2013 | Weston et al. |
| 8,494,530 B2 | 7/2013 | Karaoguz et al. |
| 8,495,879 B2 | 7/2013 | Grace |
| 8,500,604 B2 | 8/2013 | Srinivasan et al. |
| 8,504,008 B1 | 8/2013 | Gossweiler, III et al. |
| 8,509,827 B2 | 8/2013 | Karmarkar |
| 8,511,304 B2 | 8/2013 | Anderson et al. |
| 8,514,825 B1 | 8/2013 | Addepalli et al. |
| 8,516,886 B2 | 8/2013 | Acar et al. |
| 8,516,887 B2 | 8/2013 | Acar et al. |
| 8,528,855 B2 | 9/2013 | Seifert |
| 8,539,894 B2 | 9/2013 | Levander |
| 8,541,745 B2 | 9/2013 | Dickinson et al. |
| 8,554,325 B2 | 10/2013 | Molnar et al. |
| 8,562,487 B2 | 10/2013 | Berggren et al. |
| 8,565,747 B2 | 10/2013 | Karaoguz et al. |
| 8,569,090 B2 | 10/2013 | Taheri |
| 8,571,781 B2 | 10/2013 | Bernstein et al. |
| 8,574,146 B2 | 11/2013 | Gillespie, Jr. et al. |
| 8,576,073 B2 | 11/2013 | Mooring et al. |
| 8,578,646 B2 | 11/2013 | Joannes |
| 8,579,671 B2 | 11/2013 | DeRennaux et al. |
| 8,579,734 B2 | 11/2013 | Stemle |
| 8,583,329 B2 | 11/2013 | Breed |
| 8,584,522 B2 | 11/2013 | Acar et al. |
| 8,584,944 B2 | 11/2013 | White et al. |
| 8,585,476 B2 | 11/2013 | Mullen |
| 8,593,331 B2 | 11/2013 | Tsai et al. |
| 8,594,779 B2 | 11/2013 | Denison et al. |
| 8,600,830 B2 | 12/2013 | Hoffberg |
| 8,601,964 B2 | 12/2013 | Rohden |
| 8,602,718 B2 | 12/2013 | Rokeby-Thomas |
| 8,608,167 B2 | 12/2013 | Raymond |
| 8,608,535 B2 | 12/2013 | Weston et al. |
| 8,612,617 B2 | 12/2013 | Yaqoob et al. |
| 8,618,690 B2 | 12/2013 | Seifert |
| 8,620,239 B2 | 12/2013 | Harrat et al. |
| 8,625,496 B2 | 1/2014 | Brownrigg et al. |
| 8,626,472 B2 | 1/2014 | Solinsky |
| 8,628,333 B2 | 1/2014 | Prinzel, III et al. |
| 8,628,453 B2 | 1/2014 | Balakrishnan et al. |
| 8,629,836 B2 | 1/2014 | Liberty |
| 8,630,761 B2 | 1/2014 | Severinsky et al. |
| 8,630,795 B2 | 1/2014 | Breed et al. |
| 8,638,217 B2 | 1/2014 | Arms et al. |
| 8,644,165 B2 | 2/2014 | Saarimaki et al. |
| 8,644,692 B2 | 2/2014 | Bedingfield et al. |
| 8,655,307 B1 | 2/2014 | Walker et al. |
| 8,656,630 B2 | 2/2014 | Sammut |
| 8,657,351 B2 | 2/2014 | Johnson |
| 8,661,500 B2 | 2/2014 | Boldyrev et al. |
| 8,668,604 B2 | 3/2014 | Stemle |
| 8,678,873 B2 | 3/2014 | Lang et al. |
| 8,683,065 B2 | 3/2014 | Dickens et al. |
| 8,686,579 B2 | 4/2014 | Barney et al. |
| 8,688,403 B2 | 4/2014 | Oka et al. |
| 8,689,426 B2 | 4/2014 | Thalmayr et al. |
| 8,693,653 B1 | 4/2014 | Mullen |
| 8,702,515 B2 | 4/2014 | Weston et al. |
| 8,707,216 B2 | 4/2014 | Wilson |
| 8,707,608 B2 | 4/2014 | Sammut et al. |
| 8,708,821 B2 | 4/2014 | Barney et al. |
| 8,708,824 B2 | 4/2014 | Ohta et al. |
| 8,711,094 B2 | 4/2014 | Barney et al. |
| 8,714,389 B2 | 5/2014 | Rothschild et al. |
| 8,718,837 B2 | 5/2014 | Wang et al. |
| 8,721,520 B2 | 5/2014 | Caira et al. |
| 8,727,265 B2 | 5/2014 | Altmikus et al. |
| 8,738,944 B2 | 5/2014 | Addepalli et al. |
| 8,746,162 B2 | 6/2014 | Holohan et al. |
| 8,747,241 B2 | 6/2014 | Molinari |
| 8,750,897 B2 | 6/2014 | Czompo |
| 8,751,063 B2 | 6/2014 | Bernstein et al. |
| 8,756,010 B2 | 6/2014 | Gupta et al. |
| 8,756,173 B2 | 6/2014 | Hunzinger et al. |
| 8,758,136 B2 | 6/2014 | Briggs et al. |
| 8,768,865 B2 | 7/2014 | Narayanan et al. |
| 8,770,586 B2 | 7/2014 | Kody et al. |
| 8,771,148 B2 | 7/2014 | Balakrishnan et al. |
| 8,776,705 B2 | 7/2014 | Poulsen |
| 8,781,595 B2 | 7/2014 | Grevious et al. |
| 8,781,669 B1 | 7/2014 | Teller et al. |
| 8,784,268 B2 | 7/2014 | Molyneux et al. |
| 8,787,246 B2 | 7/2014 | Brownrigg |
| 8,790,180 B2 | 7/2014 | Barney et al. |
| 8,795,022 B2 | 8/2014 | Lipman et al. |
| 8,797,167 B2 | 8/2014 | Bangera et al. |
| 8,801,359 B2 | 8/2014 | Sherrer |
| 8,803,089 B2 | 8/2014 | Walerow et al. |
| 8,808,100 B2 | 8/2014 | Publicover et al. |
| 8,808,119 B1 | 8/2014 | Dubuisson |
| 8,812,654 B2 | 8/2014 | Gelvin et al. |
| 8,814,688 B2 | 8/2014 | Barney et al. |
| 8,814,691 B2 | 8/2014 | Haddick et al. |
| 8,816,536 B2 | 8/2014 | Borke et al. |
| 8,820,782 B2 | 9/2014 | Breed et al. |
| 8,821,293 B2 | 9/2014 | Hall |
| 8,822,924 B2 | 9/2014 | Valentino et al. |
| 8,827,761 B2 | 9/2014 | Lipman et al. |
| 8,827,810 B2 | 9/2014 | Weston et al. |
| 8,827,845 B1 | 9/2014 | Griffin |
| 8,832,244 B2 | 9/2014 | Gelvin et al. |
| 8,833,607 B2 | 9/2014 | Wegelin et al. |
| 8,834,271 B2 | 9/2014 | Ikeda |
| 8,836,503 B2 | 9/2014 | Gelvin et al. |
| 8,843,279 B2 | 9/2014 | Tafazoli Bilandi et al. |
| 8,845,557 B1 | 9/2014 | Giuffrida et al. |
| 8,847,137 B2 | 9/2014 | Kennedy |
| 8,849,697 B2 | 9/2014 | Tropper et al. |
| 8,855,838 B2 | 10/2014 | Berthier |
| 8,860,409 B2 | 10/2014 | Seeger et al. |
| 8,870,655 B2 | 10/2014 | Ikeda |
| 8,874,129 B2 | 10/2014 | Forutanpour et al. |
| 8,874,477 B2 | 10/2014 | Hoffberg |
| 8,874,747 B2 | 10/2014 | Boldyrev et al. |
| 8,875,643 B2 | 11/2014 | Rohden |
| 8,878,528 B2 | 11/2014 | Quevy |
| 8,878,673 B2 | 11/2014 | Grant et al. |
| 8,880,296 B2 | 11/2014 | Breed |
| 8,880,378 B2 | 11/2014 | Cook et al. |
| 8,884,455 B2 | 11/2014 | Reimer et al. |
| 8,885,979 B2 | 11/2014 | Machitani et al. |
| 8,888,576 B2 | 11/2014 | Briggs et al. |
| 8,892,185 B2 | 11/2014 | Chi Sing et al. |
| 8,892,271 B2 | 11/2014 | Breed |
| 8,893,785 B2 | 11/2014 | Skinner et al. |
| 8,893,971 B1 | 11/2014 | Sammut et al. |
| 8,896,301 B2 | 11/2014 | Oka et al. |
| 8,899,513 B1 | 12/2014 | Jameson et al. |
| 8,905,307 B2 | 12/2014 | Sammut et al. |
| 8,905,800 B2 | 12/2014 | Dusablon |
| 8,908,922 B2 | 12/2014 | Marty et al. |
| 8,909,543 B2 | 12/2014 | Tropper et al. |
| 8,912,892 B2 | 12/2014 | Davoodi et al. |

(56) References Cited

U.S. PATENT DOCUMENTS

| | | |
|---|---|---|
| 8,913,011 B2 | 12/2014 | Barney et al. |
| 8,915,785 B2 | 12/2014 | Barney et al. |
| 8,920,287 B2 | 12/2014 | Doshi et al. |
| 8,923,186 B1 | 12/2014 | dacosta |
| 8,924,248 B2 | 12/2014 | Tropper et al. |
| 8,924,249 B2 | 12/2014 | Tropper et al. |
| 8,924,587 B2 | 12/2014 | Petite |
| 8,924,588 B2 | 12/2014 | Petite |
| 8,930,300 B2 | 1/2015 | Grokop et al. |
| 8,930,571 B2 | 1/2015 | Petite |
| 8,931,144 B2 | 1/2015 | Freeman et al. |
| 8,932,092 B1 | 1/2015 | Sadowski |
| 8,938,612 B1 | 1/2015 | Mittal |
| 8,939,708 B2 | 1/2015 | Gorlov |
| 8,942,301 B2 | 1/2015 | Hui et al. |
| 8,946,923 B2 | 2/2015 | Steel |
| 8,947,081 B2 | 2/2015 | Seeger et al. |
| 8,948,442 B2 | 2/2015 | Breed et al. |
| 8,948,457 B2 | 2/2015 | Marty et al. |
| 8,951,123 B2 | 2/2015 | Waugaman et al. |
| 8,954,290 B2 | 2/2015 | Yuen et al. |
| 8,954,292 B2 | 2/2015 | Troxler |
| 8,957,783 B2 | 2/2015 | Aguilar et al. |
| 8,959,824 B2 | 2/2015 | Sammut et al. |
| 8,960,113 B2 | 2/2015 | Levander et al. |
| 8,961,260 B2 | 2/2015 | Weston |
| 8,961,312 B2 | 2/2015 | Barney et al. |
| 8,962,308 B2 | 2/2015 | Wilson et al. |
| 8,963,845 B2 | 2/2015 | Alameh et al. |
| 8,964,298 B2 | 2/2015 | Haddick et al. |
| 8,965,579 B2 | 2/2015 | Wang et al. |
| 8,965,587 B2 | 2/2015 | Modi et al. |
| 8,965,677 B2 | 2/2015 | Breed et al. |
| 8,966,377 B2 | 2/2015 | Tarkoma |
| 8,966,806 B2 | 3/2015 | Sammut et al. |
| 8,968,195 B2 | 3/2015 | Tran |
| 8,969,101 B1 | 3/2015 | Wan et al. |
| 8,971,274 B1 | 3/2015 | Teller et al. |
| 8,972,053 B2 | 3/2015 | Bruemmer et al. |
| 8,974,386 B2 | 3/2015 | Peyser et al. |
| 8,977,494 B2 | 3/2015 | Gupta et al. |
| 8,980,198 B2 | 3/2015 | Srinivasan et al. |
| 8,982,105 B2 | 3/2015 | Frisbee |
| 8,982,856 B2 | 3/2015 | Brownrigg |
| 8,991,702 B1 | 3/2015 | Sammut et al. |
| 8,996,320 B2 | 3/2015 | Gwynn et al. |
| 8,997,564 B2 | 4/2015 | Nasiri et al. |
| 8,997,725 B2 | 4/2015 | McAlister |
| 8,998,894 B2 | 4/2015 | Mauch et al. |
| 9,002,583 B2 | 4/2015 | Gruener et al. |
| 9,003,000 B2 | 4/2015 | Currid et al. |
| 9,004,973 B2 | 4/2015 | Condon et al. |
| 9,005,055 B2 | 4/2015 | Gonzalez |
| 9,007,178 B2 | 4/2015 | Nikitin et al. |
| 9,009,810 B2 | 4/2015 | Grigoriev et al. |
| 9,010,002 B2 | 4/2015 | Popa-Simil |
| 9,011,248 B2 | 4/2015 | Ikeda et al. |
| 9,011,329 B2 | 4/2015 | Ferren et al. |
| 9,011,331 B2 | 4/2015 | Say et al. |
| 9,011,332 B2 | 4/2015 | Heller et al. |
| 9,013,144 B2 | 4/2015 | Cooley et al. |
| 9,014,773 B2 | 4/2015 | Say et al. |
| 9,020,191 B2 | 4/2015 | Gupta et al. |
| 9,021,880 B2 | 5/2015 | Stephanou et al. |
| 9,027,490 B2 | 5/2015 | Winkler |
| 9,028,405 B2 | 5/2015 | Tran |
| 9,030,321 B2 | 5/2015 | Breed |
| 9,030,437 B2 | 5/2015 | Uzelac et al. |
| 9,031,568 B2 | 5/2015 | Karaoguz et al. |
| 9,031,573 B2 | 5/2015 | Khorashadi et al. |
| 9,032,796 B2 | 5/2015 | Stephanou et al. |
| 9,032,890 B2 | 5/2015 | Winkler |
| 9,033,116 B2 | 5/2015 | Breed |
| 9,035,777 B2 | 5/2015 | Bangera et al. |
| 9,037,087 B2 | 5/2015 | Holman et al. |
| 9,037,455 B1 | 5/2015 | Faaborg et al. |
| 9,037,578 B2 | 5/2015 | Brust et al. |
| 9,037,600 B1 | 5/2015 | Garrigues et al. |
| 9,038,197 B2 | 5/2015 | Boldyrev et al. |
| 9,039,533 B2 | 5/2015 | Barney et al. |
| 9,042,953 B2 | 5/2015 | Say et al. |
| 9,044,209 B2 | 6/2015 | Dayton et al. |
| 9,044,671 B2 | 6/2015 | Ikeda |
| 9,045,927 B1 | 6/2015 | Hoffberg |
| 9,046,455 B2 | 6/2015 | Wilson et al. |
| 9,050,972 B2 | 6/2015 | Severinsky et al. |
| 9,052,276 B2 | 6/2015 | Matsiev et al. |
| 9,053,516 B2 | 6/2015 | Stempora |
| 9,056,676 B1 | 6/2015 | Wang |
| 9,057,361 B2 | 6/2015 | Donelan et al. |
| 9,060,683 B2 | 6/2015 | Tran |
| 9,063,165 B2 | 6/2015 | Valentino et al. |
| 9,066,694 B2 | 6/2015 | Say et al. |
| 9,066,695 B2 | 6/2015 | Say et al. |
| 9,066,697 B2 | 6/2015 | Peyser et al. |
| 9,068,794 B1 | 6/2015 | Sammut |
| 9,069,067 B2 | 6/2015 | Bangera et al. |
| 9,070,101 B2 | 6/2015 | Abhyanker |
| 9,072,477 B2 | 7/2015 | Say et al. |
| 9,075,146 B1 | 7/2015 | Valentino et al. |
| 9,078,607 B2 | 7/2015 | Heller et al. |
| 9,079,311 B2 | 7/2015 | Wang et al. |
| 9,081,885 B2 | 7/2015 | Bangera et al. |
| 9,086,782 B2 | 7/2015 | Sasaki et al. |
| 9,089,760 B2 | 7/2015 | Tropper et al. |
| 9,090,339 B2 | 7/2015 | Arms et al. |
| 9,095,072 B2 | 7/2015 | Bryzek et al. |
| 9,097,662 B2 | 8/2015 | Pollack et al. |
| 9,097,890 B2 | 8/2015 | Miller et al. |
| 9,097,891 B2 | 8/2015 | Border et al. |
| 9,102,220 B2 | 8/2015 | Breed |
| 9,102,407 B2 | 8/2015 | Greenyer |
| 9,103,920 B2 | 8/2015 | Valentino et al. |
| 9,105,025 B2 | 8/2015 | Poole et al. |
| 9,105,281 B2 | 8/2015 | Kadlec |
| 9,106,286 B2 | 8/2015 | Agee et al. |
| 9,107,586 B2 | 8/2015 | Tran |
| 9,108,060 B2 | 8/2015 | Kilgore et al. |
| 9,114,838 B2 | 8/2015 | Bernstein et al. |
| 9,115,989 B2 | 8/2015 | Valentino et al. |
| 9,117,318 B2 | 8/2015 | Ricci |
| 9,117,447 B2 | 8/2015 | Gruber et al. |
| 9,121,217 B1 | 9/2015 | Hoffberg |
| 9,122,307 B2 | 9/2015 | Jacobsen et al. |
| 9,122,966 B2 | 9/2015 | Glaser |
| 9,127,908 B2 | 9/2015 | Miralles |
| 9,127,910 B2 | 9/2015 | Volfson |
| 9,128,281 B2 | 9/2015 | Osterhout et al. |
| 9,129,295 B2 | 9/2015 | Border et al. |
| 9,130,651 B2 | 9/2015 | Tabe |
| 9,134,464 B2 | 9/2015 | Feng et al. |
| 9,134,534 B2 | 9/2015 | Border et al. |
| 9,134,552 B2 | 9/2015 | Ni Chleirigh et al. |
| 9,137,397 B2 | 9/2015 | Silverbrook |
| 9,139,865 B2 | 9/2015 | Pollack et al. |
| 9,140,444 B2 | 9/2015 | Connor |
| 9,140,715 B2 | 9/2015 | Wilson et al. |
| 9,143,392 B2 | 9/2015 | Duchesneau |
| 9,146,147 B1 | 9/2015 | Bakhsh |
| 9,148,530 B2 | 9/2015 | Silverbrook |
| RE45,775 E | 10/2015 | Agee et al. |
| 9,149,695 B2 | 10/2015 | Evans |
| 9,149,717 B2 | 10/2015 | Barney et al. |
| 9,150,263 B2 | 10/2015 | Bernstein et al. |
| 9,155,168 B2 | 10/2015 | Araujo et al. |
| 9,157,736 B2 | 10/2015 | Oka et al. |
| 9,161,303 B2 | 10/2015 | Maguire |
| 9,162,027 B2 | 10/2015 | Kamen et al. |
| 9,162,120 B2 | 10/2015 | Jertson et al. |
| 9,162,148 B2 | 10/2015 | Barney et al. |
| 9,166,845 B2 | 10/2015 | Hui et al. |
| 9,166,953 B2 | 10/2015 | Luukkala et al. |
| 9,168,656 B1 | 10/2015 | Wang et al. |
| 9,170,070 B2 | 10/2015 | Sharpin et al. |

(56) References Cited

U.S. PATENT DOCUMENTS

| | | |
|---|---|---|
| 9,170,074 B2 | 10/2015 | Beckman |
| 9,170,288 B2 | 10/2015 | O'Brien et al. |
| 9,172,551 B2 | 10/2015 | Dickens et al. |
| RE45,807 E | 11/2015 | Agee et al. |
| 9,173,600 B2 | 11/2015 | Matsiev et al. |
| 9,173,837 B2 | 11/2015 | Hillis et al. |
| 9,174,508 B2 | 11/2015 | Anderson et al. |
| 9,174,733 B1 | 11/2015 | Burgess et al. |
| 9,176,500 B1 | 11/2015 | Teller et al. |
| 9,176,924 B2 | 11/2015 | Ricci |
| 9,177,476 B2 | 11/2015 | Breed |
| 9,179,020 B2 | 11/2015 | Silverbrook |
| 9,182,596 B2 | 11/2015 | Border et al. |
| 9,185,246 B2 | 11/2015 | Silverbrook |
| 9,186,096 B2 | 11/2015 | Solinsky |
| 9,186,098 B2 | 11/2015 | Lee et al. |
| 9,186,567 B2 | 11/2015 | Molyneux et al. |
| 9,186,585 B2 | 11/2015 | Briggs et al. |
| 9,187,099 B2 | 11/2015 | Powers et al. |
| 9,187,173 B2 | 11/2015 | Morris et al. |
| 9,192,815 B2 | 11/2015 | Molyneux et al. |
| 9,193,404 B2 | 11/2015 | Bernstein et al. |
| 9,197,173 B2 | 11/2015 | Denison et al. |
| 9,197,297 B2 | 11/2015 | Agee et al. |
| 9,197,736 B2 | 11/2015 | Davis et al. |
| 9,198,563 B2 | 12/2015 | Ferren et al. |
| 9,199,734 B2 | 12/2015 | Campolo et al. |
| 9,204,796 B2 | 12/2015 | Tran |
| 9,205,921 B1 | 12/2015 | Chubb |
| 9,206,309 B2 | 12/2015 | Appleby et al. |
| 9,208,676 B2 | 12/2015 | Fadell et al. |
| 9,209,871 B2 | 12/2015 | Agee et al. |
| 9,209,888 B2 | 12/2015 | Smith |
| 9,211,201 B2 | 12/2015 | Herr et al. |
| 9,211,811 B2 | 12/2015 | Breed |
| 9,211,947 B2 | 12/2015 | Miralles |
| 9,215,980 B2 | 12/2015 | Tran et al. |
| 9,215,992 B2 | 12/2015 | Donnay et al. |
| 9,216,249 B2 | 12/2015 | Smith et al. |
| 9,217,376 B2 | 12/2015 | Sweet et al. |
| 9,218,364 B1 | 12/2015 | Garrigues et al. |
| 9,218,698 B2 | 12/2015 | Ricci |
| 9,219,832 B2 | 12/2015 | Silverbrook |
| 9,221,356 B2 | 12/2015 | Fernandez |
| 9,223,134 B2 | 12/2015 | Miller et al. |
| 9,225,782 B2 | 12/2015 | Addepalli et al. |
| 9,227,122 B2 | 1/2016 | Jakubowski |
| 9,227,138 B2 | 1/2016 | Ikeda |
| 9,229,227 B2 | 1/2016 | Border et al. |
| 9,233,623 B2 | 1/2016 | Fernandez |
| 9,233,645 B2 | 1/2016 | Schofield et al. |
| 9,235,241 B2 | 1/2016 | Newham et al. |
| 9,237,211 B2 | 1/2016 | Tabe |
| 9,237,244 B2 | 1/2016 | Silverbrook |
| 9,237,297 B1 | 1/2016 | Waddell et al. |
| 9,237,411 B2 | 1/2016 | Holman et al. |
| 9,238,142 B2 | 1/2016 | Heldman et al. |
| 9,240,018 B2 | 1/2016 | Ricci |
| 9,240,913 B2 | 1/2016 | Hui et al. |
| 9,242,572 B2 | 1/2016 | Fernandez |
| 9,243,282 B2 | 1/2016 | Pollack et al. |
| 9,245,569 B1 | 1/2016 | Kadlec |
| 9,246,554 B2 | 1/2016 | Maguire |
| 9,248,288 B2 | 2/2016 | Panken et al. |
| 9,248,343 B2 | 2/2016 | Molyneux et al. |
| 9,250,038 B2 | 2/2016 | Sammut et al. |
| 9,254,759 B1 | 2/2016 | Henderson et al. |
| 9,255,771 B2 | 2/2016 | Sammut et al. |
| 9,257,054 B2 | 2/2016 | Coza et al. |
| 9,261,289 B2 | 2/2016 | Ruff et al. |
| 9,261,978 B2 | 2/2016 | Liberty et al. |
| 9,264,552 B2 | 2/2016 | Kahn |
| 9,265,453 B2 | 2/2016 | Curry et al. |
| 9,265,991 B2 | 2/2016 | Hohteri |
| 9,266,178 B2 | 2/2016 | Eshleman et al. |
| 9,266,233 B2 | 2/2016 | Kornbluh et al. |
| 9,268,344 B2 | 2/2016 | Warren et al. |
| 9,269,022 B2 | 2/2016 | Rhoads et al. |
| RE45,905 E | 3/2016 | Ikeda et al. |
| 9,271,851 B2 | 3/2016 | Clausen et al. |
| 9,272,206 B2 | 3/2016 | Weston et al. |
| 9,272,782 B1 | 3/2016 | Freeman et al. |
| 9,273,666 B2 | 3/2016 | Kheirandish |
| 9,273,981 B1 | 3/2016 | Downey et al. |
| 9,274,132 B2 | 3/2016 | Wilson et al. |
| 9,280,205 B2 | 3/2016 | Rosenberg et al. |
| 9,283,468 B2 | 3/2016 | Prinzel, III et al. |
| 9,284,062 B2 | 3/2016 | Wang |
| 9,285,241 B2 | 3/2016 | Rogel et al. |
| 9,285,382 B2 | 3/2016 | Wilson et al. |
| 9,285,589 B2 | 3/2016 | Osterhout et al. |
| 9,286,726 B2 | 3/2016 | Balram et al. |
| 9,290,146 B2 | 3/2016 | Breed |
| 9,290,220 B2 | 3/2016 | Bernstein et al. |
| 9,292,102 B2 | 3/2016 | Nasiri et al. |
| 9,297,358 B2 | 3/2016 | Rohden et al. |
| 9,298,282 B2 | 3/2016 | Liberty |
| 9,300,481 B2 | 3/2016 | Teller et al. |
| 9,301,085 B2 | 3/2016 | Parkinson et al. |
| 9,302,783 B2 | 4/2016 | Wang |
| 9,309,861 B1 | 4/2016 | Gaul et al. |
| 9,329,597 B2 | 5/2016 | Stoschek et al. |
| 9,329,689 B2 | 5/2016 | Osterhout et al. |
| 9,335,123 B2 | 5/2016 | Sammut |
| 9,341,843 B2 | 5/2016 | Border et al. |
| 9,346,527 B2 | 5/2016 | Holohan et al. |
| 9,351,060 B2 | 5/2016 | Wilker et al. |
| 9,352,209 B2 | 5/2016 | Tropper et al. |
| 9,352,216 B2 | 5/2016 | Mullen |
| 9,366,862 B2 | 6/2016 | Haddick et al. |
| 9,371,661 B2 | 6/2016 | Grace |
| 9,373,149 B2 | 6/2016 | Abhyanker |
| 9,376,168 B2 | 6/2016 | Rohden |
| 9,383,208 B2 | 7/2016 | Mohanty |
| 9,384,668 B2 | 7/2016 | Raptopoulos et al. |
| 9,394,043 B2 | 7/2016 | Riski et al. |
| 9,403,060 B2 | 8/2016 | Molyneux et al. |
| 9,403,272 B2 | 8/2016 | Kornbluh et al. |
| 9,408,143 B2 | 8/2016 | Walker et al. |
| 9,408,477 B1 | 8/2016 | Robinson et al. |
| 9,409,643 B2 | 8/2016 | Mores et al. |
| 9,415,263 B2 | 8/2016 | DeCarlo |
| 9,421,448 B2 | 8/2016 | Tropper et al. |
| 9,426,430 B2 | 8/2016 | Aguilar et al. |
| 9,427,624 B2 | 8/2016 | Molyneux et al. |
| 9,427,864 B2 | 8/2016 | Kornbluh et al. |
| 9,429,653 B2 | 8/2016 | Volfson |
| 9,437,088 B2 | 9/2016 | Phillips et al. |
| 9,448,043 B2 | 9/2016 | Roberts |
| 9,451,020 B2 | 9/2016 | Liu et al. |
| 9,452,287 B2 | 9/2016 | Rosenbluth et al. |
| 9,452,319 B2 | 9/2016 | Molyneux et al. |
| 9,452,685 B2 | 9/2016 | Hyde et al. |
| 9,457,915 B2 | 10/2016 | Wang |
| 9,459,077 B2 | 10/2016 | Sammut et al. |
| 9,464,873 B2 | 10/2016 | Orlev et al. |
| 9,468,272 B1 | 10/2016 | Hyde et al. |
| 9,478,063 B2 | 10/2016 | Rhoads et al. |
| 9,479,697 B2 | 10/2016 | Aguilar et al. |
| 9,498,689 B2 | 11/2016 | Publicover et al. |
| 9,500,444 B2 | 11/2016 | Sammut et al. |
| 9,511,260 B2 | 12/2016 | Molyneux et al. |
| 9,512,816 B2 | 12/2016 | Ferguson |
| 9,514,604 B1 | 12/2016 | Cioe |
| 9,519,750 B2 | 12/2016 | Balakrishnan et al. |
| 9,525,438 B2 | 12/2016 | Smith |
| 9,527,557 B2 | 12/2016 | Koop et al. |
| 9,540,087 B2 | 1/2017 | Winkler |
| 9,550,582 B2 | 1/2017 | Wang |
| 9,552,708 B2 | 1/2017 | Grant et al. |
| 9,560,725 B2 | 1/2017 | Wilson |
| 9,573,035 B2 | 2/2017 | DeCarlo |
| 9,574,850 B2 | 2/2017 | Sammut et al. |
| 9,576,475 B2 | 2/2017 | Bardin et al. |

(56) References Cited

U.S. PATENT DOCUMENTS

| | | |
|---|---|---|
| 9,579,552 B2 | 2/2017 | Martin et al. |
| 9,582,034 B2 | 2/2017 | von Badinski et al. |
| 9,582,072 B2 | 2/2017 | Connor |
| 9,589,446 B1 | 3/2017 | Dey et al. |
| 9,591,902 B1 | 3/2017 | Hyde et al. |
| 9,600,645 B2 | 3/2017 | Fadell et al. |
| 2001/0000170 A1 | 4/2001 | Doolen |
| 2001/0020665 A1 | 9/2001 | Hayes |
| 2001/0021617 A1 | 9/2001 | Brasier |
| 2001/0033057 A1 | 10/2001 | Chittenden |
| 2001/0033790 A1 | 10/2001 | Hickey |
| 2001/0039230 A1 | 11/2001 | Severinsky et al. |
| 2001/0044685 A1 | 11/2001 | Schubert |
| 2001/0049249 A1 | 12/2001 | Tachau et al. |
| 2001/0051488 A1 | 12/2001 | Tachau et al. |
| 2001/0056544 A1 | 12/2001 | Walker |
| 2002/0005297 A1 | 1/2002 | Alft et al. |
| 2002/0005614 A1 | 1/2002 | Krull et al. |
| 2002/0017759 A1 | 2/2002 | McClung, III et al. |
| 2002/0020561 A1 | 2/2002 | Alft et al. |
| 2002/0049096 A1 | 4/2002 | Doolen |
| 2002/0067990 A1 | 6/2002 | Mnatsakanian |
| 2002/0077906 A1 | 6/2002 | Remler |
| 2002/0079405 A1 | 6/2002 | Layukallo |
| 2002/0092693 A1 | 7/2002 | Breed |
| 2002/0093180 A1 | 7/2002 | Breed |
| 2002/0100040 A1 | 7/2002 | Bull |
| 2002/0115508 A1 | 8/2002 | Bourdages |
| 2002/0116652 A1 | 8/2002 | Chen |
| 2002/0118147 A1 | 8/2002 | Solomon |
| 2002/0124452 A1 | 9/2002 | Sammut |
| 2002/0139030 A1 | 10/2002 | Smith |
| 2002/0154029 A1 | 10/2002 | Watters et al. |
| 2002/0163132 A1 | 11/2002 | Searles et al. |
| 2002/0166710 A1 | 11/2002 | Breed |
| 2002/0179777 A1 | 12/2002 | Al-Garni et al. |
| 2002/0180154 A1 | 12/2002 | Sabbagh |
| 2002/0189612 A1 | 12/2002 | Rand |
| 2002/0190230 A1 | 12/2002 | Dworkowski et al. |
| 2002/0194988 A1 | 12/2002 | Betting et al. |
| 2002/0198632 A1 | 12/2002 | Breed et al. |
| 2003/0000524 A1 | 1/2003 | Anderson et al. |
| 2003/0005926 A1 | 1/2003 | Jones et al. |
| 2003/0010190 A1 | 1/2003 | Sammut et al. |
| 2003/0045200 A1 | 3/2003 | Tarng et al. |
| 2003/0056983 A1 | 3/2003 | Alft et al. |
| 2003/0079744 A1 | 5/2003 | Bonney et al. |
| 2003/0096554 A1 | 5/2003 | Persall |
| 2003/0096663 A1 | 5/2003 | Kasashima et al. |
| 2003/0111268 A1 | 6/2003 | Alft et al. |
| 2003/0122390 A1 | 7/2003 | Slauf |
| 2003/0145724 A1 | 8/2003 | Betting et al. |
| 2003/0149803 A1 | 8/2003 | Wilson |
| 2003/0184013 A1 | 10/2003 | Chodosh |
| 2003/0190968 A1 | 10/2003 | Kasashima |
| 2003/0191568 A1 | 10/2003 | Breed |
| 2003/0193572 A1 | 10/2003 | Wilson et al. |
| 2003/0194924 A1 | 10/2003 | Dusablon et al. |
| 2003/0199343 A1 | 10/2003 | Ilcisin et al. |
| 2003/0217876 A1 | 11/2003 | Severinsky et al. |
| 2003/0234914 A1 | 12/2003 | Solomon |
| 2004/0007818 A1 | 1/2004 | Newman |
| 2004/0008853 A1 | 1/2004 | Pelrine et al. |
| 2004/0009063 A1 | 1/2004 | Polacsek |
| 2004/0022070 A1 | 2/2004 | Moore |
| 2004/0025871 A1 | 2/2004 | Davies |
| 2004/0049324 A1 | 3/2004 | Walker |
| 2004/0061347 A1 | 4/2004 | Miller |
| 2004/0073360 A1 | 4/2004 | Foxlin |
| 2004/0077255 A1 | 4/2004 | Tarng et al. |
| 2004/0077975 A1 | 4/2004 | Zimmerman |
| 2004/0078662 A1 | 4/2004 | Hamel et al. |
| 2004/0094152 A1 | 5/2004 | Harvey et al. |
| 2004/0094662 A1 | 5/2004 | Sanders, Jr. et al. |
| 2004/0099676 A1 | 5/2004 | Anderson et al. |
| 2004/0113431 A1 | 6/2004 | Huang |
| 2004/0129478 A1 | 7/2004 | Breed et al. |
| 2004/0130442 A1 | 7/2004 | Breed et al. |
| 2004/0148057 A1 | 7/2004 | Breed et al. |
| 2004/0157687 A1 | 8/2004 | Bourdages |
| 2004/0163289 A1 | 8/2004 | Pearson |
| 2004/0185972 A1 | 9/2004 | Baquero |
| 2004/0190374 A1 | 9/2004 | Alft et al. |
| 2004/0192473 A1 | 9/2004 | Kasashima et al. |
| 2004/0195436 A1 | 10/2004 | Sinclair |
| 2004/0209712 A1 | 10/2004 | Tarng et al. |
| 2004/0211250 A1 | 10/2004 | Adamson et al. |
| 2004/0214666 A1 | 10/2004 | Dilling |
| 2004/0220001 A1 | 11/2004 | Oister et al. |
| 2004/0231667 A1 | 11/2004 | Horton et al. |
| 2004/0235388 A1 | 11/2004 | Padilla |
| 2004/0244034 A1 | 12/2004 | Saltzek |
| 2004/0245376 A1 | 12/2004 | Muren |
| 2004/0256159 A1 | 12/2004 | Alft et al. |
| 2005/0005495 A1 | 1/2005 | Smith |
| 2005/0005934 A1 | 1/2005 | Harvey |
| 2005/0017488 A1 | 1/2005 | Breed et al. |
| 2005/0021282 A1 | 1/2005 | Sammut et al. |
| 2005/0022806 A1 | 2/2005 | Beaumont et al. |
| 2005/0043674 A1 | 2/2005 | Blair et al. |
| 2005/0046584 A1 | 3/2005 | Breed |
| 2005/0048918 A1 | 3/2005 | Frost et al. |
| 2005/0049055 A1 | 3/2005 | Publicover et al. |
| 2005/0060069 A1 | 3/2005 | Breed et al. |
| 2005/0061707 A1 | 3/2005 | Naelitz-Thomas |
| 2005/0066961 A1 | 3/2005 | Rand |
| 2005/0076387 A1 | 4/2005 | Feldmeier |
| 2005/0076904 A1 | 4/2005 | Jones et al. |
| 2005/0082762 A1 | 4/2005 | David |
| 2005/0090177 A1 | 4/2005 | Moore |
| 2005/0091903 A1 | 5/2005 | Smith |
| 2005/0110277 A1 | 5/2005 | Adamson et al. |
| 2005/0110751 A1 | 5/2005 | Wilson et al. |
| 2005/0126997 A1 | 6/2005 | Langhans et al. |
| 2005/0134440 A1 | 6/2005 | Breed |
| 2005/0137786 A1 | 6/2005 | Breed et al. |
| 2005/0140212 A1 | 6/2005 | Hamel et al. |
| 2005/0145151 A1 | 7/2005 | Koop et al. |
| 2005/0151941 A1 | 7/2005 | Solomon |
| 2005/0154491 A1 | 7/2005 | Anderson et al. |
| 2005/0156883 A1 | 7/2005 | Wilson et al. |
| 2005/0161467 A1 | 7/2005 | Jones |
| 2005/0173153 A1 | 8/2005 | Alft et al. |
| 2005/0192727 A1 | 9/2005 | Shostak et al. |
| 2005/0192852 A1 | 9/2005 | Sorensen |
| 2005/0195383 A1 | 9/2005 | Breed et al. |
| 2005/0200079 A1 | 9/2005 | Barber |
| 2005/0210727 A1 | 9/2005 | Smith |
| 2005/0210728 A1 | 9/2005 | Smith |
| 2005/0215210 A1 | 9/2005 | Walker et al. |
| 2005/0215764 A1 | 9/2005 | Tuszynski et al. |
| 2005/0232186 A1 | 10/2005 | Karaoguz et al. |
| 2005/0233672 A1 | 10/2005 | Shantz |
| 2005/0233749 A1 | 10/2005 | Karaoguz et al. |
| 2005/0247312 A1 | 11/2005 | Davies |
| 2005/0248136 A1 | 11/2005 | Breed et al. |
| 2005/0249667 A1 | 11/2005 | Tuszynski et al. |
| 2005/0251289 A1 | 11/2005 | Bonney et al. |
| 2005/0257173 A1 | 11/2005 | Wilson |
| 2005/0257174 A1 | 11/2005 | Wilson |
| 2005/0260548 A1 | 11/2005 | Nava |
| 2005/0260918 A1 | 11/2005 | LaPointe |
| 2005/0273218 A1 | 12/2005 | Breed et al. |
| 2005/0274378 A1 | 12/2005 | Bonney et al. |
| 2005/0278098 A1 | 12/2005 | Breed |
| 2006/0005449 A1 | 1/2006 | Smith |
| 2006/0010757 A1 | 1/2006 | Smith |
| 2006/0022083 A1 | 2/2006 | Sumpter et al. |
| 2006/0023117 A1 | 2/2006 | Feldmeier |
| 2006/0025149 A1 | 2/2006 | Karaoguz et al. |
| 2006/0025897 A1 | 2/2006 | Shostak et al. |
| 2006/0027404 A1 | 2/2006 | Foxlin |
| 2006/0027482 A1 | 2/2006 | Pearson |
| 2006/0035726 A1 | 2/2006 | Kasashima et al. |

(56) References Cited

U.S. PATENT DOCUMENTS

| | | |
|---|---|---|
| 2006/0049304 A1 | 3/2006 | Sanders et al. |
| 2006/0057549 A1 | 3/2006 | Prinzel et al. |
| 2006/0073758 A1 | 4/2006 | Goodwin et al. |
| 2006/0092630 A1 | 5/2006 | Kennedy et al. |
| 2006/0100057 A1 | 5/2006 | Severinsky et al. |
| 2006/0105838 A1 | 5/2006 | Mullen |
| 2006/0105865 A1 | 5/2006 | Bourdages |
| 2006/0116221 A1 | 6/2006 | Watanabe et al. |
| 2006/0124800 A1 | 6/2006 | Tehrani |
| 2006/0128504 A1 | 6/2006 | Watanabe et al. |
| 2006/0136498 A1 | 6/2006 | Insley |
| 2006/0144211 A1 | 7/2006 | Yoshimoto |
| 2006/0147371 A1 | 7/2006 | Tuszynski et al. |
| 2006/0148377 A1 | 7/2006 | Stubenfoll |
| 2006/0158065 A1 | 7/2006 | Pelrine et al. |
| 2006/0160457 A1 | 7/2006 | Moore |
| 2006/0166589 A1 | 7/2006 | Moore |
| 2006/0167595 A1 | 7/2006 | Breed et al. |
| 2006/0167784 A1 | 7/2006 | Hoffberg |
| 2006/0169691 A1 | 8/2006 | Rothschild et al. |
| 2006/0170535 A1 | 8/2006 | Watters et al. |
| 2006/0178231 A1 | 8/2006 | Kasashima |
| 2006/0180371 A1 | 8/2006 | Breed et al. |
| 2006/0184336 A1 | 8/2006 | Kolen |
| 2006/0185899 A1 | 8/2006 | Alft et al. |
| 2006/0196504 A1 | 9/2006 | Augustyn et al. |
| 2006/0199682 A1 | 9/2006 | Holms |
| 2006/0200314 A1 | 9/2006 | Ajioka et al. |
| 2006/0208169 A1 | 9/2006 | Breed et al. |
| 2006/0212193 A1 | 9/2006 | Breed |
| 2006/0212194 A1 | 9/2006 | Breed |
| 2006/0217864 A1 | 9/2006 | Johnson et al. |
| 2006/0229143 A1 | 10/2006 | Watanabe et al. |
| 2006/0231304 A1 | 10/2006 | Severinsky et al. |
| 2006/0231305 A1 | 10/2006 | Severinsky et al. |
| 2006/0231306 A1 | 10/2006 | Severinsky et al. |
| 2006/0231677 A1 | 10/2006 | Zimet et al. |
| 2006/0234596 A1 | 10/2006 | Arredondo |
| 2006/0237246 A1 | 10/2006 | Severinsky et al. |
| 2006/0251247 A1 | 10/2006 | Severinsky et al. |
| 2006/0251505 A1 | 11/2006 | Ferguson |
| 2006/0255281 A1 | 11/2006 | Lal et al. |
| 2006/0262120 A1 | 11/2006 | Rosenberg |
| 2006/0277466 A1 | 12/2006 | Anderson |
| 2006/0284839 A1 | 12/2006 | Breed |
| 2006/0287137 A1 | 12/2006 | Chu |
| 2007/0005609 A1 | 1/2007 | Breed |
| 2007/0010342 A1 | 1/2007 | Sato et al. |
| 2007/0017498 A1 | 1/2007 | Finstad |
| 2007/0021915 A1 | 1/2007 | Breed et al. |
| 2007/0027129 A1 | 2/2007 | Tuszynski et al. |
| 2007/0029272 A1 | 2/2007 | Wroten |
| 2007/0032318 A1 | 2/2007 | Nishimura et al. |
| 2007/0034738 A1 | 2/2007 | Sanders et al. |
| 2007/0035059 A1 | 2/2007 | Ruuttu |
| 2007/0038743 A1 | 2/2007 | Hellhake et al. |
| 2007/0044364 A1 | 3/2007 | Sammut et al. |
| 2007/0046029 A1 | 3/2007 | Murakami et al. |
| 2007/0046143 A1 | 3/2007 | Blandino et al. |
| 2007/0048137 A1 | 3/2007 | Hartman |
| 2007/0057781 A1 | 3/2007 | Breed |
| 2007/0060416 A1 | 3/2007 | Watanabe et al. |
| 2007/0069064 A1 | 3/2007 | Mott |
| 2007/0073482 A1 | 3/2007 | Churchill et al. |
| 2007/0075919 A1 | 4/2007 | Breed |
| 2007/0077857 A1 | 4/2007 | Wright |
| 2007/0085697 A1 | 4/2007 | Breed |
| 2007/0086624 A1 | 4/2007 | Breed et al. |
| 2007/0087756 A1 | 4/2007 | Hoffberg |
| 2007/0092549 A1 | 4/2007 | Tuszynski et al. |
| 2007/0096445 A1 | 5/2007 | Breed |
| 2007/0096446 A1 | 5/2007 | Breed |
| 2007/0100666 A1 | 5/2007 | Stivoric et al. |
| 2007/0109111 A1 | 5/2007 | Breed et al. |
| 2007/0116327 A1 | 5/2007 | Breed et al. |
| 2007/0120347 A1 | 5/2007 | Breed et al. |
| 2007/0123952 A1 | 5/2007 | Strother et al. |
| 2007/0125351 A1 | 6/2007 | Campo et al. |
| 2007/0132219 A1 | 6/2007 | Breed |
| 2007/0132220 A1 | 6/2007 | Breed et al. |
| 2007/0135247 A1 | 6/2007 | Huber |
| 2007/0135982 A1 | 6/2007 | Breed et al. |
| 2007/0144052 A1 | 6/2007 | Smith |
| 2007/0146325 A1 | 6/2007 | Poston et al. |
| 2007/0149496 A1 | 6/2007 | Tuszynski et al. |
| 2007/0152804 A1 | 7/2007 | Breed et al. |
| 2007/0154063 A1 | 7/2007 | Breed |
| 2007/0155263 A1 | 7/2007 | Cha |
| 2007/0155541 A1 | 7/2007 | Watanabe et al. |
| 2007/0155549 A1 | 7/2007 | Keker |
| 2007/0160472 A1 | 7/2007 | Jobmann et al. |
| 2007/0164150 A1 | 7/2007 | Van de Rostyne et al. |
| 2007/0164641 A1 | 7/2007 | Pelrine et al. |
| 2007/0174163 A1 | 7/2007 | Griffin |
| 2007/0180751 A1 | 8/2007 | Joannes |
| 2007/0182528 A1 | 8/2007 | Breed et al. |
| 2007/0187897 A1 | 8/2007 | Dilling |
| 2007/0193811 A1 | 8/2007 | Breed et al. |
| 2007/0197318 A1 | 8/2007 | Serrano |
| 2007/0205553 A1 | 9/2007 | Turley |
| 2007/0212973 A1 | 9/2007 | Brookes et al. |
| 2007/0213126 A1 | 9/2007 | Deutsch et al. |
| 2007/0218988 A1 | 9/2007 | Lucich |
| 2007/0219426 A1 | 9/2007 | Moore |
| 2007/0219744 A1 | 9/2007 | Kolen |
| 2007/0232412 A1 | 10/2007 | Watanabe et al. |
| 2007/0240903 A1 | 10/2007 | Alft et al. |
| 2007/0251749 A1 | 11/2007 | Breed et al. |
| 2007/0262574 A1 | 11/2007 | Breed et al. |
| 2007/0280505 A1 | 12/2007 | Breed |
| 2007/0282506 A1 | 12/2007 | Breed et al. |
| 2007/0296571 A1 | 12/2007 | Kolen |
| 2007/0298913 A1 | 12/2007 | Winn et al. |
| 2008/0004798 A1 | 1/2008 | Troxler et al. |
| 2008/0008588 A1 | 1/2008 | Hartman |
| 2008/0015771 A1 | 1/2008 | Breed et al. |
| 2008/0017193 A1 | 1/2008 | Jones et al. |
| 2008/0033581 A1 | 2/2008 | Doshi et al. |
| 2008/0036185 A1 | 2/2008 | Breed |
| 2008/0036252 A1 | 2/2008 | Breed |
| 2008/0036580 A1 | 2/2008 | Breed |
| 2008/0036617 A1 | 2/2008 | Arms et al. |
| 2008/0040004 A1 | 2/2008 | Breed |
| 2008/0040023 A1 | 2/2008 | Breed et al. |
| 2008/0040029 A1 | 2/2008 | Breed |
| 2008/0042408 A1 | 2/2008 | Breed et al. |
| 2008/0042409 A1 | 2/2008 | Breed |
| 2008/0042815 A1 | 2/2008 | Breed et al. |
| 2008/0046150 A1 | 2/2008 | Breed |
| 2008/0046200 A1 | 2/2008 | Breed et al. |
| 2008/0047329 A1 | 2/2008 | Breed |
| 2008/0047770 A1 | 2/2008 | Breed et al. |
| 2008/0051957 A1 | 2/2008 | Breed et al. |
| 2008/0062677 A1 | 3/2008 | Konig et al. |
| 2008/0065182 A1 | 3/2008 | Strother et al. |
| 2008/0069403 A1 | 3/2008 | Breed |
| 2008/0086240 A1 | 4/2008 | Breed |
| 2008/0091309 A1 | 4/2008 | Walker |
| 2008/0093838 A1 | 4/2008 | Tropper et al. |
| 2008/0096654 A1 | 4/2008 | Mondesir et al. |
| 2008/0096657 A1 | 4/2008 | Benoist |
| 2008/0098640 A1 | 5/2008 | Sammut et al. |
| 2008/0104422 A1 | 5/2008 | Mullis et al. |
| 2008/0106436 A1 | 5/2008 | Breed |
| 2008/0110388 A1 | 5/2008 | Palladino |
| 2008/0111312 A1 | 5/2008 | Longo et al. |
| 2008/0114502 A1 | 5/2008 | Breed et al. |
| 2008/0116644 A1 | 5/2008 | Knoemschild |
| 2008/0116692 A1 | 5/2008 | Lagstrom et al. |
| 2008/0119421 A1 | 5/2008 | Tuszynski et al. |
| 2008/0119993 A1 | 5/2008 | Breed |
| 2008/0125001 A1 | 5/2008 | Bamiak |
| 2008/0125002 A1 | 5/2008 | Goitein |
| 2008/0129475 A1 | 6/2008 | Breed et al. |

(56) References Cited

U.S. PATENT DOCUMENTS

| | | |
|---|---|---|
| 2008/0132361 A1 | 6/2008 | Barber |
| 2008/0133136 A1 | 6/2008 | Breed et al. |
| 2008/0140318 A1 | 6/2008 | Breed |
| 2008/0142060 A1 | 6/2008 | Orth et al. |
| 2008/0143085 A1 | 6/2008 | Breed et al. |
| 2008/0145224 A1 | 6/2008 | Mitchell et al. |
| 2008/0147253 A1 | 6/2008 | Breed |
| 2008/0148723 A1 | 6/2008 | Birkestrand |
| 2008/0150786 A1 | 6/2008 | Breed |
| 2008/0154495 A1 | 6/2008 | Breed |
| 2008/0154629 A1 | 6/2008 | Breed et al. |
| 2008/0154898 A1 | 6/2008 | Cheng et al. |
| 2008/0157940 A1 | 7/2008 | Breed et al. |
| 2008/0161986 A1 | 7/2008 | Breed |
| 2008/0161987 A1 | 7/2008 | Breed |
| 2008/0162036 A1 | 7/2008 | Breed |
| 2008/0165018 A1 | 7/2008 | Breed |
| 2008/0167535 A1 | 7/2008 | Stivoric et al. |
| 2008/0167819 A1 | 7/2008 | Breed |
| 2008/0167821 A1 | 7/2008 | Breed |
| 2008/0174281 A1 | 7/2008 | Shau |
| 2008/0176676 A1 | 7/2008 | Watanabe et al. |
| 2008/0181773 A1 | 7/2008 | Ferguson |
| 2008/0185785 A1 | 8/2008 | Sullivan |
| 2008/0189053 A1 | 8/2008 | Breed et al. |
| 2008/0192007 A1 | 8/2008 | Wilson |
| 2008/0192070 A1 | 8/2008 | Wilson |
| 2008/0195261 A1 | 8/2008 | Breed |
| 2008/0204410 A1 | 8/2008 | Wilson |
| 2008/0204411 A1 | 8/2008 | Wilson |
| 2008/0214068 A1 | 9/2008 | Stolper |
| 2008/0215202 A1 | 9/2008 | Breed |
| 2008/0215231 A1 | 9/2008 | Breed |
| 2008/0234899 A1 | 9/2008 | Breed et al. |
| 2008/0236275 A1 | 10/2008 | Breed et al. |
| 2008/0242415 A1 | 10/2008 | Ahmed |
| 2008/0248449 A1 | 10/2008 | Sammut |
| 2008/0250869 A1 | 10/2008 | Breed et al. |
| 2008/0252162 A1 | 10/2008 | Post |
| 2008/0259055 A1 | 10/2008 | Wilson |
| 2008/0262893 A1 | 10/2008 | Hoffberg |
| 2008/0274844 A1 | 11/2008 | Ward |
| 2008/0282817 A1 | 11/2008 | Breed |
| 2008/0290650 A1 | 11/2008 | Valkov |
| 2008/0293523 A1 | 11/2008 | Perry-Smith |
| 2008/0296157 A1 | 12/2008 | Bauer et al. |
| 2008/0296905 A1 | 12/2008 | Ferguson |
| 2008/0313575 A1 | 12/2008 | Wilson |
| 2009/0004628 A1 | 1/2009 | Knutson |
| 2009/0007661 A1 | 1/2009 | Nasiri et al. |
| 2009/0012741 A1 | 1/2009 | Hall et al. |
| 2009/0013983 A1 | 1/2009 | Polk et al. |
| 2009/0017714 A1 | 1/2009 | DeRennaux et al. |
| 2009/0020649 A1 | 1/2009 | Wingert |
| 2009/0029754 A1 | 1/2009 | Slocum et al. |
| 2009/0030605 A1 | 1/2009 | Breed |
| 2009/0031438 A1 | 1/2009 | Kennard et al. |
| 2009/0033034 A1 | 2/2009 | Jakubowski |
| 2009/0033540 A1 | 2/2009 | Breed et al. |
| 2009/0036235 A1 | 2/2009 | Watanabe et al. |
| 2009/0039207 A1 | 2/2009 | Van De Rostyne |
| 2009/0043506 A1 | 2/2009 | Breed |
| 2009/0047861 A1 | 2/2009 | Van de Rostyne et al. |
| 2009/0048750 A1 | 2/2009 | Breed |
| 2009/0058091 A1 | 3/2009 | Douglas |
| 2009/0061727 A1 | 3/2009 | Styles |
| 2009/0066065 A1 | 3/2009 | Breed et al. |
| 2009/0068018 A1 | 3/2009 | Corten |
| 2009/0082144 A1 | 3/2009 | Pacheco |
| 2009/0082691 A1 | 3/2009 | Denison et al. |
| 2009/0088266 A1 | 4/2009 | McInerney |
| 2009/0092284 A1 | 4/2009 | Breed et al. |
| 2009/0104836 A1 | 4/2009 | Van de Rostyne et al. |
| 2009/0115211 A1 | 5/2009 | Johnson |
| 2009/0119543 A1 | 5/2009 | Driessen |
| 2009/0121484 A1 | 5/2009 | Newman |
| 2009/0134580 A1 | 5/2009 | Lessack |
| 2009/0134966 A1 | 5/2009 | Baker |
| 2009/0140887 A1 | 6/2009 | Breed et al. |
| 2009/0143175 A1 | 6/2009 | Tarng et al. |
| 2009/0143923 A1 | 6/2009 | Breed |
| 2009/0163110 A1 | 6/2009 | Van de Rostyne et al. |
| 2009/0164952 A1 | 6/2009 | Wilson |
| 2009/0169388 A1 | 7/2009 | Klimov et al. |
| 2009/0170639 A1 | 7/2009 | Wong |
| 2009/0171788 A1 | 7/2009 | Tropper et al. |
| 2009/0174192 A1 | 7/2009 | Newman |
| 2009/0177345 A1 | 7/2009 | Severinsky et al. |
| 2009/0183417 A1 | 7/2009 | Smith |
| 2009/0195497 A1 | 8/2009 | Fitzgerald et al. |
| 2009/0197658 A1 | 8/2009 | Polchin |
| 2009/0198354 A1 | 8/2009 | Wilson |
| 2009/0213519 A1 | 8/2009 | Bedingfield |
| 2009/0213520 A1 | 8/2009 | Bedingfield et al. |
| 2009/0213521 A1 | 8/2009 | Bedingfield |
| 2009/0217851 A1 | 9/2009 | Kind |
| 2009/0228157 A1 | 9/2009 | Breed |
| 2009/0235570 A1 | 9/2009 | Sammut et al. |
| 2009/0262074 A1 | 10/2009 | Nasiri et al. |
| 2009/0265974 A1 | 10/2009 | Joannes |
| 2009/0275262 A1 | 11/2009 | Wright |
| 2009/0278317 A1 | 11/2009 | Lima |
| 2009/0278353 A1 | 11/2009 | Da Costa Duarte Pardal et al. |
| 2009/0280931 A1 | 11/2009 | Barber |
| 2009/0291614 A1 | 11/2009 | Tu |
| 2009/0300551 A1 | 12/2009 | French et al. |
| 2009/0303204 A1 | 12/2009 | Nasiri et al. |
| 2009/0311924 A1 | 12/2009 | Wobben |
| 2010/0013160 A1 | 1/2010 | Tarng et al. |
| 2010/0013238 A1 | 1/2010 | Jessie et al. |
| 2010/0022157 A1 | 1/2010 | Van de Rostyne et al. |
| 2010/0032963 A1 | 2/2010 | Ferguson |
| 2010/0033142 A1 | 2/2010 | Roberts et al. |
| 2010/0034466 A1 | 2/2010 | Jing et al. |
| 2010/0038915 A1 | 2/2010 | Murakami |
| 2010/0040025 A1 | 2/2010 | Karaoguz et al. |
| 2010/0052945 A1 | 3/2010 | Breed |
| 2010/0057305 A1 | 3/2010 | Breed |
| 2010/0062847 A1 | 3/2010 | Moore et al. |
| 2010/0063774 A1 | 3/2010 | Cook et al. |
| 2010/0064983 A1 | 3/2010 | Ritchey et al. |
| 2010/0066093 A1 | 3/2010 | Meller |
| 2010/0066095 A1 | 3/2010 | Meller |
| 2010/0072190 A1 | 3/2010 | Crucs |
| 2010/0088532 A1 | 4/2010 | Pollock et al. |
| 2010/0117363 A1 | 5/2010 | Meller |
| 2010/0123605 A1 | 5/2010 | Wilson |
| 2010/0129193 A1 | 5/2010 | Sherrer |
| 2010/0130093 A1 | 5/2010 | Van de Rostyne et al. |
| 2010/0139738 A1 | 6/2010 | Lee et al. |
| 2010/0140873 A1 | 6/2010 | Britton et al. |
| 2010/0141609 A1 | 6/2010 | Frisbee |
| 2010/0142447 A1 | 6/2010 | Schlicht et al. |
| 2010/0142868 A1 | 6/2010 | Brown |
| 2010/0148940 A1 | 6/2010 | Gelvin et al. |
| 2010/0153175 A1 | 6/2010 | Pearson et al. |
| 2010/0153215 A1 | 6/2010 | Abraham |
| 2010/0156676 A1 | 6/2010 | Mooring et al. |
| 2010/0163573 A1 | 7/2010 | Wegelin et al. |
| 2010/0164711 A1 | 7/2010 | Arms et al. |
| 2010/0169009 A1 | 7/2010 | Breed et al. |
| 2010/0175575 A1 | 7/2010 | Amick |
| 2010/0186648 A1 | 7/2010 | Wobben et al. |
| 2010/0187829 A1 | 7/2010 | Douglas |
| 2010/0194573 A1 | 8/2010 | Hoover et al. |
| 2010/0198514 A1 | 8/2010 | Miralles |
| 2010/0201516 A1 | 8/2010 | Gelvin et al. |
| 2010/0204615 A1 | 8/2010 | Kyle et al. |
| 2010/0214216 A1 | 8/2010 | Nasiri et al. |
| 2010/0222802 A1 | 9/2010 | Gillespie, Jr. et al. |
| 2010/0225266 A1 | 9/2010 | Hartman |
| 2010/0226775 A1 | 9/2010 | Hartman |
| 2010/0235285 A1 | 9/2010 | Hoffberg |
| 2010/0253624 A1 | 10/2010 | Wilson |

(56) References Cited

U.S. PATENT DOCUMENTS

| | | |
|---|---|---|
| 2010/0254312 A1 | 10/2010 | Kennedy |
| 2010/0257251 A1 | 10/2010 | Mooring et al. |
| 2010/0259050 A1 | 10/2010 | Meller |
| 2010/0261526 A1 | 10/2010 | Anderson et al. |
| 2010/0267492 A1 | 10/2010 | McCracken |
| 2010/0269069 A1 | 10/2010 | Paila et al. |
| 2010/0279639 A1 | 11/2010 | Walker et al. |
| 2010/0279776 A1 | 11/2010 | Hall |
| 2010/0280751 A1 | 11/2010 | Breed |
| 2010/0281874 A1 | 11/2010 | Rice |
| 2010/0282918 A1 | 11/2010 | Martin |
| 2010/0283273 A1 | 11/2010 | Martinez |
| 2010/0298958 A1 | 11/2010 | Connelly |
| 2010/0299102 A1 | 11/2010 | Hall et al. |
| 2010/0299738 A1 | 11/2010 | Wahl |
| 2010/0315516 A1 | 12/2010 | Silverbrook et al. |
| 2010/0317420 A1 | 12/2010 | Hoffberg |
| 2010/0320333 A1 | 12/2010 | Martin |
| 2010/0321449 A1 | 12/2010 | Clarke et al. |
| 2010/0323730 A1 | 12/2010 | Karmarkar |
| 2011/0001696 A1 | 1/2011 | Wilson |
| 2011/0003653 A1 | 1/2011 | Stemle |
| 2011/0004329 A1 | 1/2011 | Wilson |
| 2011/0004363 A1 | 1/2011 | Severinsky et al. |
| 2011/0004513 A1 | 1/2011 | Hoffberg |
| 2011/0004851 A1 | 1/2011 | Nurmi et al. |
| 2011/0004975 A1 | 1/2011 | Karwan |
| 2011/0011856 A1 | 1/2011 | Rothschild et al. |
| 2011/0014933 A1 | 1/2011 | Karmarkar et al. |
| 2011/0017114 A1 | 1/2011 | Koop et al. |
| 2011/0027087 A1 | 2/2011 | Rokeby-Thomas |
| 2011/0035491 A1 | 2/2011 | Gelvin et al. |
| 2011/0040535 A1 | 2/2011 | Sato |
| 2011/0040879 A1 | 2/2011 | Konig et al. |
| 2011/0042476 A1 | 2/2011 | McAlister |
| 2011/0042901 A1 | 2/2011 | Raymond |
| 2011/0048374 A1 | 3/2011 | McAlister |
| 2011/0053440 A1 | 3/2011 | Dusablon |
| 2011/0053716 A1 | 3/2011 | Lewis |
| 2011/0063114 A1 | 3/2011 | Ikoyan |
| 2011/0066398 A1 | 3/2011 | Troxler et al. |
| 2011/0074109 A1 | 3/2011 | Werth |
| 2011/0074850 A1 | 3/2011 | Walmsley et al. |
| 2011/0077758 A1 | 3/2011 | Tran et al. |
| 2011/0078461 A1 | 3/2011 | Hellhake et al. |
| 2011/0079453 A1 | 4/2011 | Wanger et al. |
| 2011/0085530 A1 | 4/2011 | Hellhake et al. |
| 2011/0087431 A1 | 4/2011 | Gupta et al. |
| 2011/0089238 A1 | 4/2011 | Sammut et al. |
| 2011/0090338 A1 | 4/2011 | DeLine et al. |
| 2011/0092319 A1 | 4/2011 | Gurgul et al. |
| 2011/0092337 A1 | 4/2011 | Srinivasan et al. |
| 2011/0100823 A1 | 5/2011 | Pollack et al. |
| 2011/0101692 A1 | 5/2011 | Bilaniuk |
| 2011/0109097 A1 | 5/2011 | Ferguson |
| 2011/0115624 A1 | 5/2011 | Tran |
| 2011/0121578 A1 | 5/2011 | Ferguson |
| 2011/0122261 A1 | 5/2011 | Silverbrook |
| 2011/0124442 A1 | 5/2011 | Erme |
| 2011/0125063 A1 | 5/2011 | Shalon et al. |
| 2011/0130114 A1 | 6/2011 | Boudville |
| 2011/0132983 A1 | 6/2011 | Sammut et al. |
| 2011/0142025 A1 | 6/2011 | Agee et al. |
| 2011/0142108 A1 | 6/2011 | Agee et al. |
| 2011/0143631 A1 | 6/2011 | Lipman et al. |
| 2011/0144574 A1 | 6/2011 | Kamen et al. |
| 2011/0161076 A1 | 6/2011 | Davis et al. |
| 2011/0161254 A1 | 6/2011 | Van Den Bogart |
| 2011/0163955 A1 | 7/2011 | Nasiri et al. |
| 2011/0173988 A1 | 7/2011 | Sweet et al. |
| 2011/0180654 A1 | 7/2011 | Thiesen et al. |
| 2011/0181422 A1 | 7/2011 | Tran |
| 2011/0184602 A1 | 7/2011 | Severinsky et al. |
| 2011/0186177 A1 | 8/2011 | Lanier, Jr. et al. |
| 2011/0187136 A1 | 8/2011 | Martinez |
| 2011/0188597 A1 | 8/2011 | Agee et al. |
| 2011/0189440 A1 | 8/2011 | Appleby et al. |
| 2011/0190056 A1 | 8/2011 | Ku et al. |
| 2011/0190694 A1 | 8/2011 | Lanier, Jr. et al. |
| 2011/0190971 A1 | 8/2011 | Severinsky et al. |
| 2011/0194591 A1 | 8/2011 | Agee et al. |
| 2011/0198857 A1 | 8/2011 | Becker |
| 2011/0208444 A1 | 8/2011 | Solinsky |
| 2011/0211080 A1 | 9/2011 | Silverbrook |
| 2011/0213664 A1 | 9/2011 | Osterhout et al. |
| 2011/0214044 A1 | 9/2011 | Davis et al. |
| 2011/0214082 A1 | 9/2011 | Osterhout et al. |
| 2011/0215586 A1 | 9/2011 | Grace |
| 2011/0219634 A1 | 9/2011 | Sammut |
| 2011/0221219 A1 | 9/2011 | Heaton |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King et al. |
| 2011/0221668 A1 | 9/2011 | Haddick et al. |
| 2011/0221669 A1 | 9/2011 | Shams et al. |
| 2011/0221670 A1 | 9/2011 | King et al. |
| 2011/0221671 A1 | 9/2011 | King et al. |
| 2011/0221672 A1 | 9/2011 | Osterhout et al. |
| 2011/0221793 A1 | 9/2011 | King et al. |
| 2011/0221896 A1 | 9/2011 | Haddick et al. |
| 2011/0221897 A1 | 9/2011 | Haddick et al. |
| 2011/0222745 A1 | 9/2011 | Osterhout et al. |
| 2011/0224498 A1 | 9/2011 | Banet et al. |
| 2011/0224499 A1 | 9/2011 | Banet et al. |
| 2011/0224500 A1 | 9/2011 | Banet et al. |
| 2011/0224506 A1 | 9/2011 | Moon et al. |
| 2011/0224507 A1 | 9/2011 | Banet et al. |
| 2011/0224508 A1 | 9/2011 | Moon |
| 2011/0224556 A1 | 9/2011 | Moon et al. |
| 2011/0224557 A1 | 9/2011 | Banet et al. |
| 2011/0224564 A1 | 9/2011 | Moon et al. |
| 2011/0225536 A1 | 9/2011 | Shams et al. |
| 2011/0226191 A1 | 9/2011 | Curry et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0231757 A1 | 9/2011 | Haddick et al. |
| 2011/0232555 A1 | 9/2011 | Levander |
| 2011/0236207 A1 | 9/2011 | Klimov et al. |
| 2011/0250819 A1 | 10/2011 | Tashman |
| 2011/0255513 A1 | 10/2011 | Karaoguz et al. |
| 2011/0255577 A1 | 10/2011 | Agee et al. |
| 2011/0256944 A1 | 10/2011 | Sato |
| 2011/0257701 A1 | 10/2011 | Strother et al. |
| 2011/0257945 A1 | 10/2011 | Sato |
| 2011/0264230 A1 | 10/2011 | Herr et al. |
| 2011/0265564 A1 | 11/2011 | Acar et al. |
| 2011/0265565 A1 | 11/2011 | Acar et al. |
| 2011/0265566 A1 | 11/2011 | Acar et al. |
| 2011/0265568 A1 | 11/2011 | Stephanou et al. |
| 2011/0265958 A1 | 11/2011 | Skinner et al. |
| 2011/0270569 A1 | 11/2011 | Stephanou et al. |
| 2011/0273061 A1 | 11/2011 | Thalmayr et al. |
| 2011/0273378 A1 | 11/2011 | Alameh et al. |
| 2011/0276123 A1 | 11/2011 | Davies et al. |
| 2011/0278355 A1 | 11/2011 | Silverbrook et al. |
| 2011/0283438 A1 | 11/2011 | Davis et al. |
| 2011/0285527 A1 | 11/2011 | Arms et al. |
| 2011/0288480 A1 | 11/2011 | Bedingfield et al. |
| 2011/0296006 A1 | 12/2011 | Krishnaswamy et al. |
| 2011/0296517 A1 | 12/2011 | Grigoriev et al. |
| 2011/0300001 A1 | 12/2011 | Murphy et al. |
| 2011/0304497 A1 | 12/2011 | Molyneux et al. |
| 2011/0306304 A1 | 12/2011 | Forutanpour et al. |
| 2011/0309624 A1 | 12/2011 | Ettanoor Thuppale et al. |
| 2011/0310209 A1 | 12/2011 | Silverbrook |
| 2011/0312279 A1 | 12/2011 | Tsai et al. |
| 2012/0000408 A1 | 1/2012 | Levander et al. |
| 2012/0001463 A1 | 1/2012 | Breed et al. |
| 2012/0006282 A1 | 1/2012 | Kates |
| 2012/0011853 A1 | 1/2012 | Grace |
| 2012/0015734 A1 | 1/2012 | Lipman et al. |
| 2012/0015766 A1 | 1/2012 | Yap |

(56) References Cited

U.S. PATENT DOCUMENTS

| | | |
|---|---|---|
| 2012/0016492 A1 | 1/2012 | Clausen |
| 2012/0018567 A1 | 1/2012 | Geswender et al. |
| 2012/0028680 A1 | 2/2012 | Breed |
| 2012/0032876 A1 | 2/2012 | Tabe |
| 2012/0034954 A1 | 2/2012 | Tabe |
| 2012/0038185 A1 | 2/2012 | Fioravanti |
| 2012/0040758 A1 | 2/2012 | Hovseth |
| 2012/0042835 A1 | 2/2012 | Curry et al. |
| 2012/0047443 A1 | 2/2012 | Tarkoma |
| 2012/0056799 A1 | 3/2012 | Solomon |
| 2012/0062445 A1 | 3/2012 | Haddick et al. |
| 2012/0062744 A1 | 3/2012 | Schofield et al. |
| 2012/0066883 A1 | 3/2012 | Forti |
| 2012/0067294 A1 | 3/2012 | Curry et al. |
| 2012/0068927 A1 | 3/2012 | Poston et al. |
| 2012/0069799 A1 | 3/2012 | Karaoguz et al. |
| 2012/0070294 A1 | 3/2012 | Gorlov |
| 2012/0075168 A1 | 3/2012 | Osterhout et al. |
| 2012/0078170 A1 | 3/2012 | Smith et al. |
| 2012/0078181 A1 | 3/2012 | Smith et al. |
| 2012/0078182 A1 | 3/2012 | Smith et al. |
| 2012/0078183 A1 | 3/2012 | Smith et al. |
| 2012/0078184 A1 | 3/2012 | Smith et al. |
| 2012/0078185 A1 | 3/2012 | Smith et al. |
| 2012/0078216 A1 | 3/2012 | Smith et al. |
| 2012/0078217 A1 | 3/2012 | Smith et al. |
| 2012/0078222 A1 | 3/2012 | Smith et al. |
| 2012/0091158 A1 | 4/2012 | Polack et al. |
| 2012/0091259 A1 | 4/2012 | Morris et al. |
| 2012/0091717 A1 | 4/2012 | Roe et al. |
| 2012/0092156 A1 | 4/2012 | Tran |
| 2012/0092157 A1 | 4/2012 | Tran |
| 2012/0095352 A1 | 4/2012 | Tran |
| 2012/0095357 A1 | 4/2012 | Tran |
| 2012/0097110 A1 | 4/2012 | Tamaru et al. |
| 2012/0101413 A1 | 4/2012 | Beetel et al. |
| 2012/0103274 A1 | 5/2012 | Curry et al. |
| 2012/0103275 A1 | 5/2012 | Curry et al. |
| 2012/0106869 A1 | 5/2012 | Machitani et al. |
| 2012/0109427 A1 | 5/2012 | Berthier |
| 2012/0113293 A1 | 5/2012 | Silverbrook |
| 2012/0115597 A1 | 5/2012 | Waugaman et al. |
| 2012/0116382 A1 | 5/2012 | Ku et al. |
| 2012/0116383 A1 | 5/2012 | Mauch et al. |
| 2012/0120239 A1 | 5/2012 | Hutzel et al. |
| 2012/0132708 A1 | 5/2012 | White et al. |
| 2012/0133213 A1 | 5/2012 | Borke et al. |
| 2012/0136490 A1 | 5/2012 | Weatherbee et al. |
| 2012/0137567 A1 | 6/2012 | Sammut |
| 2012/0140451 A1 | 6/2012 | Araujo et al. |
| 2012/0142144 A1 | 6/2012 | Taheri |
| 2012/0142235 A1 | 6/2012 | Wobben |
| 2012/0143152 A1 | 6/2012 | Hunter et al. |
| 2012/0143293 A1 | 6/2012 | Mauch et al. |
| 2012/0151816 A1 | 6/2012 | Kleck et al. |
| 2012/0158354 A1 | 6/2012 | Troxler |
| 2012/0160955 A1 | 6/2012 | Seifert |
| 2012/0161447 A1 | 6/2012 | Seifert |
| 2012/0165238 A1 | 6/2012 | Pamula et al. |
| 2012/0166645 A1 | 6/2012 | Boldyrev et al. |
| 2012/0166646 A1 | 6/2012 | Boldyrev et al. |
| 2012/0168240 A1 | 7/2012 | Wilson et al. |
| 2012/0168241 A1 | 7/2012 | Bernstein et al. |
| 2012/0172050 A1 | 7/2012 | Ledlie et al. |
| 2012/0173047 A1 | 7/2012 | Bernstein et al. |
| 2012/0173048 A1 | 7/2012 | Bernstein et al. |
| 2012/0173049 A1 | 7/2012 | Bernstein et al. |
| 2012/0173050 A1 | 7/2012 | Bernstein et al. |
| 2012/0176128 A1 | 7/2012 | Seeger et al. |
| 2012/0176129 A1 | 7/2012 | Seeger et al. |
| 2012/0176237 A1 | 7/2012 | Tabe |
| 2012/0179133 A1 | 7/2012 | Bedingfield et al. |
| 2012/0183099 A1 | 7/2012 | Harrat et al. |
| 2012/0194418 A1 | 8/2012 | Osterhout et al. |
| 2012/0194419 A1 | 8/2012 | Osterhout et al. |
| 2012/0194420 A1 | 8/2012 | Osterhout et al. |
| 2012/0194549 A1 | 8/2012 | Osterhout et al. |
| 2012/0194550 A1 | 8/2012 | Osterhout et al. |
| 2012/0194551 A1 | 8/2012 | Osterhout et al. |
| 2012/0194552 A1 | 8/2012 | Osterhout et al. |
| 2012/0194553 A1 | 8/2012 | Osterhout et al. |
| 2012/0197439 A1 | 8/2012 | Wang et al. |
| 2012/0197464 A1 | 8/2012 | Wang et al. |
| 2012/0198251 A1 | 8/2012 | Boldryev et al. |
| 2012/0200488 A1 | 8/2012 | Osterhout et al. |
| 2012/0200499 A1 | 8/2012 | Osterhout et al. |
| 2012/0200601 A1 | 8/2012 | Osterhout et al. |
| 2012/0203177 A1 | 8/2012 | Lanier, Jr. et al. |
| 2012/0206322 A1 | 8/2012 | Osterhout et al. |
| 2012/0206323 A1 | 8/2012 | Osterhout et al. |
| 2012/0206334 A1 | 8/2012 | Osterhout et al. |
| 2012/0206335 A1 | 8/2012 | Osterhout et al. |
| 2012/0206485 A1 | 8/2012 | Osterhout et al. |
| 2012/0207134 A1 | 8/2012 | Karaoguz et al. |
| 2012/0209405 A1 | 8/2012 | Herr et al. |
| 2012/0209505 A1 | 8/2012 | Breed et al. |
| 2012/0211987 A1 | 8/2012 | Roe et al. |
| 2012/0212398 A1 | 8/2012 | Border et al. |
| 2012/0212399 A1 | 8/2012 | Border et al. |
| 2012/0212400 A1 | 8/2012 | Border et al. |
| 2012/0212406 A1 | 8/2012 | Osterhout et al. |
| 2012/0212414 A1 | 8/2012 | Osterhout et al. |
| 2012/0212484 A1 | 8/2012 | Haddick et al. |
| 2012/0212499 A1 | 8/2012 | Haddick et al. |
| 2012/0217958 A1 | 8/2012 | Oka et al. |
| 2012/0218172 A1 | 8/2012 | Border et al. |
| 2012/0218301 A1 | 8/2012 | Miller |
| 2012/0221290 A1 | 8/2012 | Oka et al. |
| 2012/0221861 A1 | 8/2012 | Boldyrev et al. |
| 2012/0222104 A1 | 8/2012 | Boldyrev et al. |
| 2012/0223480 A1 | 9/2012 | North |
| 2012/0224456 A1 | 9/2012 | Visser et al. |
| 2012/0233838 A1 | 9/2012 | Swist |
| 2012/0235883 A1 | 9/2012 | Border et al. |
| 2012/0235884 A1 | 9/2012 | Miller et al. |
| 2012/0235885 A1 | 9/2012 | Miller et al. |
| 2012/0235886 A1 | 9/2012 | Border et al. |
| 2012/0235887 A1 | 9/2012 | Border et al. |
| 2012/0235900 A1 | 9/2012 | Border et al. |
| 2012/0236025 A1 | 9/2012 | Jacobsen et al. |
| 2012/0236030 A1 | 9/2012 | Border et al. |
| 2012/0236031 A1 | 9/2012 | Haddick et al. |
| 2012/0239231 A1 | 9/2012 | McKeon |
| 2012/0242501 A1 | 9/2012 | Tran et al. |
| 2012/0242678 A1 | 9/2012 | Border et al. |
| 2012/0242697 A1 | 9/2012 | Border et al. |
| 2012/0242698 A1 | 9/2012 | Haddick et al. |
| 2012/0245464 A1 | 9/2012 | Tran |
| 2012/0248195 A1 | 10/2012 | Feng et al. |
| 2012/0248243 A1 | 10/2012 | Greenyer |
| 2012/0249797 A1 | 10/2012 | Haddick et al. |
| 2012/0250517 A1 | 10/2012 | Saarimaki et al. |
| 2012/0253738 A1 | 10/2012 | Nasiri et al. |
| 2012/0254100 A1 | 10/2012 | Grokop et al. |
| 2012/0256042 A1 | 10/2012 | Altmikus et al. |
| 2012/0258804 A1 | 10/2012 | Ahmed |
| 2012/0259578 A1 | 10/2012 | Bevilacqua et al. |
| 2012/0262329 A1 | 10/2012 | Molyneux et al. |
| 2012/0264376 A1 | 10/2012 | Breed |
| 2012/0265716 A1 | 10/2012 | Hunzinger et al. |
| 2012/0265717 A1 | 10/2012 | Narayanan et al. |
| 2012/0268074 A1 | 10/2012 | Cooley et al. |
| 2012/0270564 A1 | 10/2012 | Gum et al. |
| 2012/0287431 A1 | 11/2012 | Matsiev et al. |
| 2012/0291096 A1 | 11/2012 | Boldyrev et al. |
| 2012/0293330 A1 | 11/2012 | Grant et al. |
| 2012/0297441 A1 | 11/2012 | Boldyrev et al. |
| 2012/0299344 A1 | 11/2012 | Breed et al. |
| 2012/0301011 A1 | 11/2012 | Grzechnik |
| 2012/0308354 A1 | 12/2012 | Tafazoli Bilandi et al. |
| 2012/0308443 A1 | 12/2012 | Tropper et al. |
| 2012/0309295 A1 | 12/2012 | Maguire |
| 2012/0309453 A1 | 12/2012 | Maguire |
| 2012/0310714 A1 | 12/2012 | Tropper et al. |

(56) References Cited

U.S. PATENT DOCUMENTS

| | | |
|---|---|---|
| 2012/0316406 A1 | 12/2012 | Rahman et al. |
| 2012/0316455 A1 | 12/2012 | Rahman et al. |
| 2012/0323474 A1 | 12/2012 | Breed et al. |
| 2012/0330109 A1 | 12/2012 | Tran |
| 2013/0000439 A1 | 1/2013 | Wanger et al. |
| 2013/0001244 A1 | 1/2013 | Wegelin et al. |
| 2013/0001878 A1 | 1/2013 | Kody et al. |
| 2013/0002538 A1 | 1/2013 | Mooring et al. |
| 2013/0006572 A1 | 1/2013 | Rayner |
| 2013/0006573 A1 | 1/2013 | Brunner et al. |
| 2013/0007088 A1 | 1/2013 | Alfredo et al. |
| 2013/0008363 A1 | 1/2013 | Winkler |
| 2013/0009783 A1 | 1/2013 | Tran |
| 2013/0010125 A1 | 1/2013 | Silverbrook |
| 2013/0010128 A1 | 1/2013 | Silverbrook |
| 2013/0010129 A1 | 1/2013 | Silverbrook |
| 2013/0010135 A1 | 1/2013 | Silverbrook |
| 2013/0010136 A1 | 1/2013 | Silverbrook |
| 2013/0010150 A1 | 1/2013 | Silverbrook |
| 2013/0010151 A1 | 1/2013 | Silverbrook |
| 2013/0010159 A1 | 1/2013 | Silverbrook |
| 2013/0010167 A1 | 1/2013 | Silverbrook |
| 2013/0013085 A1 | 1/2013 | Smith et al. |
| 2013/0013839 A1 | 1/2013 | Silverbrook |
| 2013/0013893 A1 | 1/2013 | Silverbrook |
| 2013/0014421 A1 | 1/2013 | Sammut et al. |
| 2013/0015239 A1 | 1/2013 | Silverbrook |
| 2013/0016012 A1 | 1/2013 | Beauregard |
| 2013/0016232 A1 | 1/2013 | Silverbrook |
| 2013/0016233 A1 | 1/2013 | Silverbrook |
| 2013/0016235 A1 | 1/2013 | Silverbrook |
| 2013/0016236 A1 | 1/2013 | Silverbrook |
| 2013/0016247 A1 | 1/2013 | Silverbrook |
| 2013/0016248 A1 | 1/2013 | Silverbrook |
| 2013/0016266 A1 | 1/2013 | Silverbrook |
| 2013/0018766 A1 | 1/2013 | Christman |
| 2013/0021443 A1 | 1/2013 | Silverbrook |
| 2013/0021444 A1 | 1/2013 | Silverbrook |
| 2013/0021482 A1 | 1/2013 | Silverbrook |
| 2013/0024029 A1 | 1/2013 | Tran et al. |
| 2013/0024660 A1 | 1/2013 | Silverbrook |
| 2013/0029681 A1 | 1/2013 | Grokop |
| 2013/0030259 A1 | 1/2013 | Thomsen et al. |
| 2013/0032070 A1 | 2/2013 | Winkler |
| 2013/0033381 A1 | 2/2013 | Breed |
| 2013/0033418 A1 | 2/2013 | Bevilacqua et al. |
| 2013/0035893 A1 | 2/2013 | Grokop et al. |
| 2013/0038056 A1 | 2/2013 | Donelan et al. |
| 2013/0042798 A1 | 2/2013 | Holohan et al. |
| 2013/0043974 A1 | 2/2013 | Hyde et al. |
| 2013/0043975 A1 | 2/2013 | Hyde et al. |
| 2013/0043991 A1 | 2/2013 | Hyde et al. |
| 2013/0043993 A1 | 2/2013 | Hyde et al. |
| 2013/0045813 A1 | 2/2013 | Publicover et al. |
| 2013/0046153 A1 | 2/2013 | Hyde et al. |
| 2013/0046477 A1 | 2/2013 | Hyde et al. |
| 2013/0055944 A1 | 3/2013 | Poulsen |
| 2013/0063568 A1 | 3/2013 | Silverbrook |
| 2013/0065604 A1 | 3/2013 | Werner et al. |
| 2013/0069372 A1 | 3/2013 | Ferguson |
| 2013/0069780 A1 | 3/2013 | Tran et al. |
| 2013/0072807 A1 | 3/2013 | Tran |
| 2013/0073387 A1 | 3/2013 | Heath |
| 2013/0073389 A1 | 3/2013 | Heath |
| 2013/0078908 A1 | 3/2013 | Smith |
| 2013/0078909 A1 | 3/2013 | Smith |
| 2013/0079152 A1 | 3/2013 | Hall |
| 2013/0080307 A1 | 3/2013 | Hoffberg |
| 2013/0083941 A1 | 4/2013 | Rogel et al. |
| 2013/0085713 A1 | 4/2013 | Rogel et al. |
| 2013/0092539 A1 | 4/2013 | Pollack et al. |
| 2013/0095459 A1 | 4/2013 | Tran |
| 2013/0096752 A1 | 4/2013 | Severinsky et al. |
| 2013/0096753 A1 | 4/2013 | Severinsky et al. |
| 2013/0096825 A1 | 4/2013 | Mohanty |
| 2013/0102323 A1 | 4/2013 | Czompo |
| 2013/0108040 A1 | 5/2013 | Luukkala et al. |
| 2013/0109265 A1 | 5/2013 | Lang et al. |
| 2013/0110256 A1 | 5/2013 | Herr et al. |
| 2013/0119255 A1 | 5/2013 | Dickinson et al. |
| 2013/0124048 A1 | 5/2013 | Gruener et al. |
| 2013/0124883 A1 | 5/2013 | Addepalli et al. |
| 2013/0127980 A1 | 5/2013 | Haddick et al. |
| 2013/0130843 A1 | 5/2013 | Burroughs et al. |
| 2013/0139073 A1 | 5/2013 | Crames et al. |
| 2013/0141247 A1 | 6/2013 | Ricci |
| 2013/0144402 A1 | 6/2013 | Clausen et al. |
| 2013/0146675 A1 | 6/2013 | Seifert |
| 2013/0151088 A1 | 6/2013 | Ricci |
| 2013/0154553 A1 | 6/2013 | Steele |
| 2013/0157729 A1 | 6/2013 | Tabe |
| 2013/0158821 A1 | 6/2013 | Ricci |
| 2013/0164742 A1 | 6/2013 | Pollack et al. |
| 2013/0169830 A1 | 7/2013 | Silverbrook |
| 2013/0170986 A1 | 7/2013 | Steel |
| 2013/0170990 A1 | 7/2013 | Birkestrand |
| 2013/0172691 A1 | 7/2013 | Tran |
| 2013/0173171 A1 | 7/2013 | Drysdale et al. |
| 2013/0178718 A1 | 7/2013 | Tran et al. |
| 2013/0184787 A1 | 7/2013 | Kilgore et al. |
| 2013/0186953 A1 | 7/2013 | Silverbrook et al. |
| 2013/0194066 A1 | 8/2013 | Rahman et al. |
| 2013/0197322 A1 | 8/2013 | Tran |
| 2013/0201098 A1 | 8/2013 | Schilit et al. |
| 2013/0201316 A1 | 8/2013 | Binder et al. |
| 2013/0204962 A1 | 8/2013 | Estevez et al. |
| 2013/0211291 A1 | 8/2013 | Tran |
| 2013/0212713 A1 | 8/2013 | Boldyrev et al. |
| 2013/0214909 A1 | 8/2013 | Meijers et al. |
| 2013/0217332 A1 | 8/2013 | Altman et al. |
| 2013/0217333 A1 | 8/2013 | Sprigg et al. |
| 2013/0218312 A1 | 8/2013 | Connelly, Jr. |
| 2013/0218505 A1 | 8/2013 | Bhandari et al. |
| 2013/0220191 A1 | 8/2013 | Rohden |
| 2013/0221195 A1 | 8/2013 | Kennedy |
| 2013/0222115 A1 | 8/2013 | Davoodi et al. |
| 2013/0225032 A1 | 8/2013 | Abarzua-Kocking |
| 2013/0226511 A1 | 8/2013 | Troxler |
| 2013/0229522 A1 | 9/2013 | Schofield et al. |
| 2013/0231574 A1 | 9/2013 | Tran |
| 2013/0233223 A1 | 9/2013 | Rohden |
| 2013/0238538 A1 | 9/2013 | Cook et al. |
| 2013/0250112 A1 | 9/2013 | Breed |
| 2013/0250866 A1 | 9/2013 | Hui et al. |
| 2013/0250969 A1 | 9/2013 | Hui et al. |
| 2013/0251054 A1 | 9/2013 | Hui et al. |
| 2013/0252262 A1 | 9/2013 | Srinivasan et al. |
| 2013/0253387 A1 | 9/2013 | Bonutti et al. |
| 2013/0260620 A1 | 10/2013 | Rohden |
| 2013/0265225 A1 | 10/2013 | Nasiri et al. |
| 2013/0267194 A1 | 10/2013 | Breed |
| 2013/0273968 A1 | 10/2013 | Rhoads et al. |
| 2013/0274040 A1 | 10/2013 | Coza et al. |
| 2013/0276832 A1 | 10/2013 | Langner et al. |
| 2013/0278631 A1 | 10/2013 | Border et al. |
| 2013/0281235 A1 | 10/2013 | Stemle |
| 2013/0281974 A1 | 10/2013 | Kamen et al. |
| 2013/0282438 A1 | 10/2013 | Hunter et al. |
| 2013/0285577 A1 | 10/2013 | O'Brien et al. |
| 2013/0285739 A1 | 10/2013 | Blaquiere et al. |
| 2013/0289529 A1 | 10/2013 | Caira et al. |
| 2013/0289678 A1 | 10/2013 | Clark et al. |
| 2013/0291775 A1 | 11/2013 | Wobben |
| 2013/0294443 A1 | 11/2013 | Kahn |
| 2013/0297022 A1 | 11/2013 | Pathak |
| 2013/0297217 A1 | 11/2013 | Bangera et al. |
| 2013/0297422 A1 | 11/2013 | Hunter et al. |
| 2013/0298208 A1 | 11/2013 | Ayed |
| 2013/0302164 A1 | 11/2013 | Rohden et al. |
| 2013/0303225 A1 | 11/2013 | Maguire |
| 2013/0303314 A1 | 11/2013 | Tackett |
| 2013/0309921 A1 | 11/2013 | Dusablon |
| 2013/0314092 A1 | 11/2013 | Shumway et al. |
| 2013/0314303 A1 | 11/2013 | Osterhout et al. |

(56) References Cited

U.S. PATENT DOCUMENTS

| | | |
|---|---|---|
| 2013/0317415 A1 | 11/2013 | Kilgore et al. |
| 2013/0320212 A1 | 12/2013 | Valentino et al. |
| 2013/0324888 A1 | 12/2013 | Solinsky |
| 2013/0325244 A1 | 12/2013 | Wang et al. |
| 2013/0325357 A1 | 12/2013 | Walerow et al. |
| 2013/0328320 A1 | 12/2013 | Seifert |
| 2013/0329522 A1 | 12/2013 | Skinner et al. |
| 2013/0333175 A1 | 12/2013 | Acar et al. |
| 2013/0334816 A1 | 12/2013 | Houis et al. |
| 2013/0334821 A1 | 12/2013 | Reimer et al. |
| 2013/0338267 A1 | 12/2013 | Appleby et al. |
| 2013/0344958 A1 | 12/2013 | Mullen |
| 2013/0345566 A1 | 12/2013 | Weitzel et al. |
| 2014/0001308 A1 | 1/2014 | Costa Duarte Pardal et al. |
| 2014/0012531 A1 | 1/2014 | Bhandari et al. |
| 2014/0013557 A1 | 1/2014 | Acar et al. |
| 2014/0018792 A1 | 1/2014 | Gang et al. |
| 2014/0020964 A1 | 1/2014 | Bernstein et al. |
| 2014/0025330 A1 | 1/2014 | Bhandari |
| 2014/0028539 A1 | 1/2014 | Newham et al. |
| 2014/0031743 A1 | 1/2014 | Kamen et al. |
| 2014/0032034 A1 | 1/2014 | Raptopoulos et al. |
| 2014/0039277 A1 | 2/2014 | Abraham |
| 2014/0041174 A1 | 2/2014 | Acar et al. |
| 2014/0046260 A1 | 2/2014 | Kamen et al. |
| 2014/0046463 A1 | 2/2014 | Molyneux et al. |
| 2014/0048037 A1 | 2/2014 | McAlister |
| 2014/0048174 A1 | 2/2014 | Lanigan et al. |
| 2014/0052275 A1 | 2/2014 | Pathak |
| 2014/0054883 A1 | 2/2014 | Lanigan et al. |
| 2014/0054895 A1 | 2/2014 | Steel |
| 2014/0055268 A1 | 2/2014 | Bangera et al. |
| 2014/0055284 A1 | 2/2014 | Tran et al. |
| 2014/0055588 A1 | 2/2014 | Bangera et al. |
| 2014/0055589 A1 | 2/2014 | Bangera et al. |
| 2014/0059914 A1 | 3/2014 | Sammut et al. |
| 2014/0059915 A1 | 3/2014 | Sammut et al. |
| 2014/0061379 A1 | 3/2014 | Campolo et al. |
| 2014/0063054 A1 | 3/2014 | Osterhout et al. |
| 2014/0063055 A1 | 3/2014 | Osterhout et al. |
| 2014/0063255 A1 | 3/2014 | Breed |
| 2014/0064112 A1 | 3/2014 | Das et al. |
| 2014/0066206 A1 | 3/2014 | Gale |
| 2014/0070493 A1 | 3/2014 | Gonzalez |
| 2014/0071432 A1 | 3/2014 | Dunne |
| 2014/0074180 A1 | 3/2014 | Heldman et al. |
| 2014/0074263 A1 | 3/2014 | Balakrishnan et al. |
| 2014/0076415 A1 | 3/2014 | Dunki-Jacobs et al. |
| 2014/0077946 A1 | 3/2014 | Tran |
| 2014/0081076 A1 | 3/2014 | Schutt et al. |
| 2014/0083402 A1 | 3/2014 | Fridman et al. |
| 2014/0099853 A1 | 4/2014 | Condon et al. |
| 2014/0102344 A1 | 4/2014 | Wobben |
| 2014/0104059 A1 | 4/2014 | Tran |
| 2014/0106908 A1 | 4/2014 | Johnson et al. |
| 2014/0107579 A1 | 4/2014 | Lanigan et al. |
| 2014/0109459 A1 | 4/2014 | Sammut et al. |
| 2014/0111187 A1 | 4/2014 | Harrat et al. |
| 2014/0111594 A1 | 4/2014 | Schuh et al. |
| 2014/0111595 A1 | 4/2014 | Vetterling et al. |
| 2014/0112695 A1 | 4/2014 | van Dijk et al. |
| 2014/0113561 A1 | 4/2014 | Maguire |
| 2014/0113739 A1 | 4/2014 | Jertson et al. |
| 2014/0113828 A1 | 4/2014 | Gilbert et al. |
| 2014/0119567 A1 | 5/2014 | DeLine et al. |
| 2014/0120961 A1 | 5/2014 | Buck |
| 2014/0121476 A1 | 5/2014 | Tran et al. |
| 2014/0123533 A1 | 5/2014 | Sammut et al. |
| 2014/0123534 A1 | 5/2014 | Hodnett |
| 2014/0126431 A1 | 5/2014 | Hui et al. |
| 2014/0128021 A1 | 5/2014 | Walker et al. |
| 2014/0128182 A1 | 5/2014 | Hohteri |
| 2014/0130570 A1 | 5/2014 | Lal et al. |
| 2014/0130748 A1 | 5/2014 | Curry et al. |
| 2014/0131124 A1 | 5/2014 | Severinsky et al. |
| 2014/0133428 A1 | 5/2014 | Kazmi et al. |
| 2014/0133656 A1 | 5/2014 | Wurster et al. |
| 2014/0136414 A1 | 5/2014 | Abhyanker |
| 2014/0137781 A1 | 5/2014 | Rohden |
| 2014/0137840 A1 | 5/2014 | McAlister |
| 2014/0140846 A1 | 5/2014 | Birkestrand |
| 2014/0141865 A1 | 5/2014 | Tropper et al. |
| 2014/0142467 A1 | 5/2014 | Tropper et al. |
| 2014/0142498 A1 | 5/2014 | Lanier, Jr. et al. |
| 2014/0142507 A1 | 5/2014 | Armes |
| 2014/0142733 A1 | 5/2014 | Tropper et al. |
| 2014/0143031 A1 | 5/2014 | Tropper et al. |
| 2014/0143038 A1 | 5/2014 | Tropper et al. |
| 2014/0143064 A1 | 5/2014 | Tran |
| 2014/0144417 A1 | 5/2014 | Evans |
| 2014/0147248 A1 | 5/2014 | Akimoto |
| 2014/0152008 A1 | 6/2014 | Donelan et al. |
| 2014/0152507 A1 | 6/2014 | McAllister |
| 2014/0153773 A1 | 6/2014 | Gupta et al. |
| 2014/0156039 A1 | 6/2014 | Prinzel et al. |
| 2014/0156676 A1 | 6/2014 | Brust et al. |
| 2014/0158704 A1 | 6/2014 | Anderson et al. |
| 2014/0159894 A1 | 6/2014 | Tropper et al. |
| 2014/0159903 A1 | 6/2014 | Tropper et al. |
| 2014/0162779 A1 | 6/2014 | Kawaguchi |
| 2014/0163425 A1 | 6/2014 | Tran |
| 2014/0163428 A1 | 6/2014 | Tropper et al. |
| 2014/0163429 A1 | 6/2014 | Tropper et al. |
| 2014/0163430 A1 | 6/2014 | Trooper et al. |
| 2014/0163664 A1 | 6/2014 | Goldsmith |
| 2014/0163768 A1 | 6/2014 | Purdy et al. |
| 2014/0164049 A1 | 6/2014 | Yakos et al. |
| 2014/0166751 A1 | 6/2014 | Sammut et al. |
| 2014/0168443 A1 | 6/2014 | Aguilar et al. |
| 2014/0171046 A1 | 6/2014 | Mullen |
| 2014/0171749 A1 | 6/2014 | Chin et al. |
| 2014/0172200 A1 | 6/2014 | Miralles |
| 2014/0172310 A1 | 6/2014 | Chin et al. |
| 2014/0180914 A1 | 6/2014 | Abhyanker |
| 2014/0183269 A1 | 7/2014 | Glaser |
| 2014/0184496 A1 | 7/2014 | Gribetz et al. |
| 2014/0187258 A1 | 7/2014 | Khorashadi et al. |
| 2014/0187969 A1 | 7/2014 | Hunter et al. |
| 2014/0194702 A1 | 7/2014 | Tran |
| 2014/0195078 A1 | 7/2014 | Severinsky et al. |
| 2014/0196648 A1 | 7/2014 | Holohan et al. |
| 2014/0197304 A1 | 7/2014 | Feng et al. |
| 2014/0197926 A1 | 7/2014 | Nikitin et al. |
| 2014/0202800 A1 | 7/2014 | Breed |
| 2014/0203797 A1 | 7/2014 | Stivoric et al. |
| 2014/0204984 A1 | 7/2014 | Agee et al. |
| 2014/0207286 A1 | 7/2014 | Wang et al. |
| 2014/0208841 A1 | 7/2014 | Hausot et al. |
| 2014/0212986 A1 | 7/2014 | Angelescu et al. |
| 2014/0214357 A1 | 7/2014 | Oka et al. |
| 2014/0215876 A1 | 8/2014 | Popa-Simil |
| 2014/0220849 A1 | 8/2014 | Kessler |
| 2014/0221732 A1 | 8/2014 | Dayton et al. |
| 2014/0222334 A1 | 8/2014 | Gupta et al. |
| 2014/0228157 A1 | 8/2014 | Johnston |
| 2014/0231259 A1 | 8/2014 | Srinivasan et al. |
| 2014/0232516 A1 | 8/2014 | Stivoric et al. |
| 2014/0235169 A1 | 8/2014 | Parkinson et al. |
| 2014/0236393 A1 | 8/2014 | Bernstein et al. |
| 2014/0240916 A1 | 8/2014 | Daidzic |
| 2014/0243971 A1 | 8/2014 | Pugh et al. |
| 2014/0245161 A1 | 8/2014 | Yuen et al. |
| 2014/0246471 A1 | 9/2014 | Jaworek et al. |
| 2014/0246472 A1 | 9/2014 | Kimsey et al. |
| 2014/0246473 A1 | 9/2014 | Auld |
| 2014/0246474 A1 | 9/2014 | Hall et al. |
| 2014/0246475 A1 | 9/2014 | Hall et al. |
| 2014/0246476 A1 | 9/2014 | Hall et al. |
| 2014/0246477 A1 | 9/2014 | Koch, Jr. et al. |
| 2014/0246478 A1 | 9/2014 | Baber et al. |
| 2014/0246479 A1 | 9/2014 | Baber et al. |
| 2014/0246538 A1 | 9/2014 | Morris et al. |
| 2014/0249429 A1 | 9/2014 | Tran |
| 2014/0249557 A1 | 9/2014 | Koch, Jr. et al. |

(56) References Cited

U.S. PATENT DOCUMENTS

| | | |
|---|---|---|
| 2014/0256479 A1 | 9/2014 | Bynum, Jr. |
| 2014/0257141 A1 | 9/2014 | Giuffrida et al. |
| 2014/0257519 A1 | 9/2014 | Herr et al. |
| 2014/0259549 A1 | 9/2014 | Freeman et al. |
| 2014/0262862 A1 | 9/2014 | Rothschild et al. |
| 2014/0263537 A1 | 9/2014 | Leimbach et al. |
| 2014/0263538 A1 | 9/2014 | Leimbach et al. |
| 2014/0263539 A1 | 9/2014 | Leimbach et al. |
| 2014/0263541 A1 | 9/2014 | Leimbach et al. |
| 2014/0263542 A1 | 9/2014 | Leimbach et al. |
| 2014/0263543 A1 | 9/2014 | Leimbach et al. |
| 2014/0263553 A1 | 9/2014 | Leimbach et al. |
| 2014/0263554 A1 | 9/2014 | Leimbach et al. |
| 2014/0263564 A1 | 9/2014 | Leimbach et al. |
| 2014/0263565 A1 | 9/2014 | Lytle et al. |
| 2014/0263697 A1 | 9/2014 | McAlister |
| 2014/0263989 A1 | 9/2014 | Valentino et al. |
| 2014/0264047 A1 | 9/2014 | Valentino et al. |
| 2014/0266669 A1 | 9/2014 | Fadell et al. |
| 2014/0266773 A1 | 9/2014 | Aguilar et al. |
| 2014/0266780 A1 | 9/2014 | Rahman et al. |
| 2014/0266787 A1 | 9/2014 | Tran |
| 2014/0267586 A1 | 9/2014 | Aguilar et al. |
| 2014/0268601 A1 | 9/2014 | Valentino et al. |
| 2014/0269555 A1 | 9/2014 | Sadasivam et al. |
| 2014/0269658 A1 | 9/2014 | Sadasivam et al. |
| 2014/0273730 A1 | 9/2014 | Brandwijk |
| 2014/0276718 A1 | 9/2014 | Turovskiy et al. |
| 2014/0277017 A1 | 9/2014 | Leimbach et al. |
| 2014/0277739 A1 | 9/2014 | Kornbluh et al. |
| 2014/0279546 A1 | 9/2014 | Poole et al. |
| 2014/0288682 A1 | 9/2014 | Balakrishnan et al. |
| 2014/0288776 A1 | 9/2014 | Anderson et al. |
| 2014/0288873 A1 | 9/2014 | Czompo et al. |
| 2014/0292654 A1 | 10/2014 | Wilson |
| 2014/0297312 A1 | 10/2014 | Bangera et al. |
| 2014/0299783 A1 | 10/2014 | Valentino et al. |
| 2014/0301598 A1 | 10/2014 | Marty et al. |
| 2014/0301600 A1 | 10/2014 | Marty et al. |
| 2014/0301601 A1 | 10/2014 | Marty et al. |
| 2014/0303591 A1 | 10/2014 | Peterfreund et al. |
| 2014/0303900 A1 | 10/2014 | Rahman et al. |
| 2014/0306580 A1 | 10/2014 | Thalmayr et al. |
| 2014/0306799 A1 | 10/2014 | Ricci |
| 2014/0306821 A1 | 10/2014 | Rahman et al. |
| 2014/0306826 A1 | 10/2014 | Ricci |
| 2014/0309805 A1 | 10/2014 | Ricci |
| 2014/0309847 A1 | 10/2014 | Ricci |
| 2014/0309852 A1 | 10/2014 | Ricci |
| 2014/0309853 A1 | 10/2014 | Ricci |
| 2014/0309935 A1 | 10/2014 | Ricci |
| 2014/0310186 A1 | 10/2014 | Ricci |
| 2014/0312242 A1 | 10/2014 | Valentino et al. |
| 2014/0313303 A1 | 10/2014 | Davis et al. |
| 2014/0316235 A1 | 10/2014 | Davis et al. |
| 2014/0319231 A1 | 10/2014 | Matsuoka et al. |
| 2014/0323142 A1 | 10/2014 | Rodriguez et al. |
| 2014/0324348 A1 | 10/2014 | Volfson |
| 2014/0328199 A1 | 11/2014 | Matischek et al. |
| 2014/0328423 A1 | 11/2014 | Agee et al. |
| 2014/0335952 A1 | 11/2014 | Hall |
| 2014/0336561 A1 | 11/2014 | Hyde et al. |
| 2014/0337346 A1 | 11/2014 | Barthel et al. |
| 2014/0337732 A1 | 11/2014 | Bevilacqua et al. |
| 2014/0337733 A1 | 11/2014 | Rodriguez et al. |
| 2014/0339307 A1 | 11/2014 | Sammut et al. |
| 2014/0340300 A1 | 11/2014 | Momin et al. |
| 2014/0342324 A1 | 11/2014 | Ghovanloo et al. |
| 2014/0345563 A1 | 11/2014 | McAlister |
| 2014/0349269 A1 | 11/2014 | Canoy et al. |
| 2014/0350459 A1 | 11/2014 | Lanier, Jr. et al. |
| 2014/0353332 A1 | 12/2014 | Wegelin et al. |
| 2014/0354350 A1 | 12/2014 | Bowers et al. |
| 2014/0358261 A1 | 12/2014 | Molyneux et al. |
| 2014/0360083 A1 | 12/2014 | Sammut |
| 2014/0361079 A1 | 12/2014 | Sammut et al. |
| 2014/0364254 A1 | 12/2014 | Publicover et al. |
| 2014/0376427 A1 | 12/2014 | Hui et al. |
| 2014/0376656 A1 | 12/2014 | Agee et al. |
| 2014/0376657 A1 | 12/2014 | Agee et al. |
| 2014/0378810 A1 | 12/2014 | Davis et al. |
| 2014/0379696 A1 | 12/2014 | Gyongyi et al. |
| 2015/0001335 A1 | 1/2015 | Pettersson |
| 2015/0002336 A1 | 1/2015 | Thubert et al. |
| 2015/0003698 A1 | 1/2015 | Davis et al. |
| 2015/0003699 A1 | 1/2015 | Davis et al. |
| 2015/0005039 A1 | 1/2015 | Liu et al. |
| 2015/0005084 A1 | 1/2015 | Tawwater et al. |
| 2015/0005640 A1 | 1/2015 | Davis et al. |
| 2015/0005644 A1 | 1/2015 | Rhoads |
| 2015/0005912 A1 | 1/2015 | Tropper et al. |
| 2015/0006186 A1 | 1/2015 | Davis et al. |
| 2015/0008260 A1 | 1/2015 | Volfson |
| 2015/0009034 A1 | 1/2015 | Grant et al. |
| 2015/0016712 A1 | 1/2015 | Rhoads et al. |
| 2015/0019266 A1 | 1/2015 | Stempora |
| 2015/0020431 A1 | 1/2015 | Sammut et al. |
| 2015/0025917 A1 | 1/2015 | Stempora |
| 2015/0027125 A1 | 1/2015 | Raj |
| 2015/0031293 A1 | 1/2015 | Holman et al. |
| 2015/0031294 A1 | 1/2015 | Holman et al. |
| 2015/0031480 A1 | 1/2015 | Kidd et al. |
| 2015/0036047 A1 | 2/2015 | Bledsoe |
| 2015/0040243 A1 | 2/2015 | Mittal |
| 2015/0040665 A1 | 2/2015 | Borkholder et al. |
| 2015/0040669 A1 | 2/2015 | Borkholder et al. |
| 2015/0042619 A1 | 2/2015 | Forti et al. |
| 2015/0046582 A1 | 2/2015 | Gelvin et al. |
| 2015/0049487 A1 | 2/2015 | Connor |
| 2015/0051571 A1 | 2/2015 | Lanigan et al. |
| 2015/0053104 A1 | 2/2015 | Schuh et al. |
| 2015/0053562 A1 | 2/2015 | Pollack et al. |
| 2015/0054318 A1 | 2/2015 | Howard |
| 2015/0054633 A1 | 2/2015 | Saddik et al. |
| 2015/0057112 A1 | 2/2015 | Yak et al. |
| 2015/0057808 A1 | 2/2015 | Cook et al. |
| 2015/0058159 A1 | 2/2015 | Balram et al. |
| 2015/0058192 A1 | 2/2015 | Balram et al. |
| 2015/0059002 A1 | 2/2015 | Balram et al. |
| 2015/0061294 A1 | 3/2015 | Kheirandish |
| 2015/0061859 A1 | 3/2015 | Matsuoka et al. |
| 2015/0062959 A1 | 3/2015 | Wilson |
| 2015/0067008 A1 | 3/2015 | Kamath et al. |
| 2015/0068069 A1 | 3/2015 | Tran et al. |
| 2015/0070323 A1 | 3/2015 | Hong et al. |
| 2015/0071648 A1 | 3/2015 | Hong et al. |
| 2015/0075486 A1 | 3/2015 | McAlister |
| 2015/0078680 A1 | 3/2015 | Shakib et al. |
| 2015/0078732 A1 | 3/2015 | Shakib et al. |
| 2015/0079869 A1 | 3/2015 | Neth |
| 2015/0079989 A1 | 3/2015 | Tambaram Kailasam et al. |
| 2015/0081220 A1 | 3/2015 | Matsiev et al. |
| 2015/0081247 A1 | 3/2015 | Tambaram Kailasam et al. |
| 2015/0082172 A1 | 3/2015 | Shakib et al. |
| 2015/0083495 A1 | 3/2015 | Walker |
| 2015/0087257 A1 | 3/2015 | Balram et al. |
| 2015/0088452 A1 | 3/2015 | Troxler |
| 2015/0088546 A1 | 3/2015 | Balram et al. |
| 2015/0088547 A1 | 3/2015 | Balram et al. |
| 2015/0088786 A1 | 3/2015 | Anandhakrishnan |
| 2015/0090237 A1 | 4/2015 | Williams |
| 2015/0091507 A1 | 4/2015 | Hyde et al. |
| 2015/0091531 A1 | 4/2015 | Hyde et al. |
| 2015/0091729 A1 | 4/2015 | Phillips et al. |
| 2015/0094867 A1 | 4/2015 | Hyde et al. |
| 2015/0095789 A1 | 4/2015 | Hyde et al. |
| 2015/0097719 A1 | 4/2015 | Balachandreswaran et al. |
| 2015/0099941 A1 | 4/2015 | Tran |
| 2015/0100107 A1 | 4/2015 | Kiani et al. |
| 2015/0102156 A1 | 4/2015 | Devenyi |
| 2015/0103168 A1 | 4/2015 | Marty et al. |
| 2015/0105631 A1 | 4/2015 | Tran et al. |
| 2015/0108872 A1 | 4/2015 | Pinkerton et al. |
| 2015/0109104 A1 | 4/2015 | Fadell et al. |

(56) References Cited

U.S. PATENT DOCUMENTS

| | | |
|---|---|---|
| 2015/0109112 A1 | 4/2015 | Fadell et al. |
| 2015/0109128 A1 | 4/2015 | Fadell et al. |
| 2015/0111465 A1 | 4/2015 | Lipman et al. |
| 2015/0111591 A1 | 4/2015 | Hoffberg |
| 2015/0112536 A1 | 4/2015 | Severinsky et al. |
| 2015/0112885 A1 | 4/2015 | Fadell et al. |
| 2015/0113417 A1 | 4/2015 | Yuen et al. |
| 2015/0115767 A1 | 4/2015 | Pinkerton et al. |
| 2015/0116106 A1 | 4/2015 | Fadell et al. |
| 2015/0116107 A1 | 4/2015 | Fadell et al. |
| 2015/0116108 A1 | 4/2015 | Fadell et al. |
| 2015/0116109 A1 | 4/2015 | Fadell et al. |
| 2015/0120015 A1 | 4/2015 | Fadell et al. |
| 2015/0120596 A1 | 4/2015 | Fadell et al. |
| 2015/0120598 A1 | 4/2015 | Fadell et al. |
| 2015/0125832 A1 | 5/2015 | Tran |
| 2015/0126997 A1 | 5/2015 | Beetel et al. |
| 2015/0127712 A1 | 5/2015 | Fadell et al. |
| 2015/0128067 A1 | 5/2015 | Wong et al. |
| 2015/0130135 A1 | 5/2015 | Shalhoub |
| 2015/0133855 A1 | 5/2015 | Smith et al. |
| 2015/0134107 A1 | 5/2015 | Hyde et al. |
| 2015/0134345 A1 | 5/2015 | Hyde et al. |
| 2015/0134346 A1 | 5/2015 | Hyde et al. |
| 2015/0137806 A1 | 5/2015 | Wan et al. |
| 2015/0137994 A1 | 5/2015 | Rahman et al. |
| 2015/0140893 A1 | 5/2015 | Lipman et al. |
| 2015/0141140 A1 | 5/2015 | Lampe et al. |
| 2015/0144018 A1 | 5/2015 | Buys |
| 2015/0145643 A1 | 5/2015 | Fadell et al. |
| 2015/0146579 A1 | 5/2015 | Teller et al. |
| 2015/0148238 A1 | 5/2015 | Pamula et al. |
| 2015/0150140 A1 | 5/2015 | Biswas et al. |
| 2015/0150647 A1 | 6/2015 | Chevalier |
| 2015/0151180 A1 | 6/2015 | Gonzalez |
| 2015/0151857 A1 | 6/2015 | Lanigan et al. |
| 2015/0154850 A1 | 6/2015 | Fadell et al. |
| 2015/0156030 A1 | 6/2015 | Fadell et al. |
| 2015/0156031 A1 | 6/2015 | Fadell et al. |
| 2015/0157537 A1 | 6/2015 | Lanigan et al. |
| 2015/0158600 A1 | 6/2015 | Hachtmann et al. |
| 2015/0160791 A1 | 6/2015 | Tarkoma |
| 2015/0165114 A1 | 6/2015 | Grant et al. |
| 2015/0166072 A1 | 6/2015 | Powers et al. |
| 2015/0168105 A1 | 6/2015 | Sammut et al. |
| 2015/0174320 A1 | 6/2015 | Grant et al. |
| 2015/0174577 A1 | 6/2015 | Srinivasan et al. |
| 2015/0178794 A1 | 6/2015 | Sheng et al. |
| 2015/0178998 A1 | 6/2015 | Attard et al. |
| 2015/0180372 A1 | 6/2015 | Pinkerton et al. |
| 2015/0186700 A1 | 7/2015 | Nikitin et al. |
| 2015/0191245 A1 | 7/2015 | Mores et al. |
| 2015/0192416 A1 | 7/2015 | Nasiri et al. |
| 2015/0192682 A1 | 7/2015 | Valentino et al. |
| 2015/0192976 A1 | 7/2015 | Jeganathan et al. |
| 2015/0194165 A1 | 7/2015 | Faaborg et al. |
| 2015/0195145 A1 | 7/2015 | Di Pietro et al. |
| 2015/0197248 A1 | 7/2015 | Breed et al. |
| 2015/0198419 A1 | 7/2015 | Sammut |
| 2015/0200562 A1 | 7/2015 | Kilinc et al. |
| 2015/0200738 A1 | 7/2015 | Wetterwald et al. |
| 2015/0202770 A1 | 7/2015 | Patron et al. |
| 2015/0204305 A1 | 7/2015 | Wasilewski |
| 2015/0205298 A1 | 7/2015 | Stoschek et al. |
| 2015/0215323 A1 | 7/2015 | Grigoriev et al. |
| 2015/0215740 A1 | 7/2015 | Khorashadi et al. |
| 2015/0215858 A1 | 7/2015 | Karaoguz et al. |
| 2015/0218913 A1 | 8/2015 | Cooley et al. |
| 2015/0219425 A1 | 8/2015 | Beckman |
| 2015/0219457 A1 | 8/2015 | Stephanou et al. |
| 2015/0220109 A1 | 8/2015 | von Badinski et al. |
| 2015/0220701 A1 | 8/2015 | Bangera et al. |
| 2015/0224378 A1 | 8/2015 | Ruyssenaars et al. |
| 2015/0224845 A1 | 8/2015 | Anderson et al. |
| 2015/0226522 A1 | 8/2015 | Sammut et al. |
| 2015/0227794 A1 | 8/2015 | Gupta et al. |
| 2015/0229019 A1 | 8/2015 | Osterhout et al. |
| 2015/0231329 A1 | 8/2015 | Murphy et al. |
| 2015/0237424 A1 | 8/2015 | Wilker et al. |
| 2015/0238963 A1 | 8/2015 | Han et al. |
| 2015/0239534 A1 | 8/2015 | Koop et al. |
| 2015/0242120 A1 | 8/2015 | Rodriguez |
| 2015/0243068 A1 | 8/2015 | Solomon |
| 2015/0243085 A1 | 8/2015 | Newhouse et al. |
| 2015/0247702 A1 | 9/2015 | Davidson et al. |
| 2015/0247709 A1 | 9/2015 | Roberts |
| 2015/0247917 A1 | 9/2015 | Gum et al. |
| 2015/0250393 A1 | 9/2015 | Tran |
| 2015/0250682 A1 | 9/2015 | Bangera et al. |
| 2015/0258373 A1 | 9/2015 | Molyneux et al. |
| 2015/0258413 A1 | 9/2015 | Molyneux et al. |
| 2015/0258679 A1 | 9/2015 | Izhikevich et al. |
| 2015/0258682 A1 | 9/2015 | Izikevich et al. |
| 2015/0258683 A1 | 9/2015 | Izhikevich et al. |
| 2015/0260512 A1 | 9/2015 | Greiner et al. |
| 2015/0264626 A1 | 9/2015 | Perdomo |
| 2015/0264627 A1 | 9/2015 | Perdomo |
| 2015/0265458 A1 | 9/2015 | Andersen et al. |
| 2015/0265459 A1 | 9/2015 | Andersen et al. |
| 2015/0266180 A1 | 9/2015 | Kombluh et al. |
| 2015/0266181 A1 | 9/2015 | Kombluh et al. |
| 2015/0268355 A1 | 9/2015 | Valentino et al. |
| 2015/0269825 A1 | 9/2015 | Tran |
| 2015/0271004 A1 | 9/2015 | Agee et al. |
| 2015/0273296 A1 | 10/2015 | Marcin et al. |
| 2015/0273351 A1 | 10/2015 | Condon et al. |
| 2015/0274272 A1 | 10/2015 | Winkler |
| 2015/0283031 A1 | 10/2015 | Lanier, Jr. et al. |
| 2015/0283397 A1 | 10/2015 | Andersen et al. |
| 2015/0283398 A1 | 10/2015 | Andersen et al. |
| 2015/0284058 A1 | 10/2015 | Swain et al. |
| 2015/0290453 A1 | 10/2015 | Tyler et al. |
| 2015/0290454 A1 | 10/2015 | Tyler et al. |
| 2015/0293580 A1 | 10/2015 | Munoz et al. |
| 2015/0294141 A1 | 10/2015 | Molyneux et al. |
| 2015/0294363 A1 | 10/2015 | Bhola et al. |
| 2015/0297951 A1 | 10/2015 | Molyneux et al. |
| 2015/0297964 A1 | 10/2015 | Evans |
| 2015/0298317 A1 | 10/2015 | Wang et al. |
| 2015/0302207 A1 | 10/2015 | Sprenger et al. |
| 2015/0302393 A1 | 10/2015 | Poole et al. |
| 2015/0302777 A1 | 10/2015 | Campolo et al. |
| 2015/0303563 A1 | 10/2015 | Blumberg, Jr. |
| 2015/0303768 A1 | 10/2015 | Henderson et al. |
| 2015/0306455 A1 | 10/2015 | DeCarlo |
| 2015/0307191 A1 | 10/2015 | Samuel et al. |
| 2015/0308782 A1 | 10/2015 | Chia |
| 2015/0309316 A1 | 10/2015 | Osterhout et al. |
| 2015/0309562 A1 | 10/2015 | Shams et al. |
| 2015/0309563 A1 | 10/2015 | Connor |
| 2015/0312764 A1 | 10/2015 | Tuukkanen et al. |
| 2015/0313663 A1 | 11/2015 | Sisken et al. |
| 2015/0314086 A1 | 11/2015 | Curtis et al. |
| 2015/0314449 A1 | 11/2015 | Wang et al. |
| 2015/0319562 A1 | 11/2015 | Martin et al. |
| 2015/0321000 A1 | 11/2015 | Rosenbluth et al. |
| 2015/0326049 A1 | 11/2015 | Cooley et al. |
| 2015/0328516 A1 | 11/2015 | Coza et al. |
| 2015/0330738 A1 | 11/2015 | Tarazon |
| 2015/0330778 A1 | 11/2015 | Sinha et al. |
| 2015/0330943 A1 | 11/2015 | Pollack et al. |
| 2015/0331420 A1 | 11/2015 | Chubb |
| 2015/0335288 A1 | 11/2015 | Toth et al. |
| 2015/0338525 A1 | 11/2015 | Valentino et al. |
| 2015/0339570 A1 | 11/2015 | Scheffler |
| 2015/0344109 A1 | 12/2015 | Davoodi et al. |
| 2015/0346726 A1 | 12/2015 | Davoodi et al. |
| 2015/0347910 A1 | 12/2015 | Fadell et al. |
| 2015/0351690 A1 | 12/2015 | Toth et al. |
| 2015/0352450 A1 | 12/2015 | Burrows et al. |
| 2015/0353206 A1 | 12/2015 | Wang |
| 2015/0356261 A1 | 12/2015 | Brust et al. |
| 2015/0356285 A1 | 12/2015 | Glaser |
| 2015/0356289 A1 | 12/2015 | Brown et al. |

(56) References Cited

U.S. PATENT DOCUMENTS

| | | |
|---|---|---|
| 2015/0356610 A1 | 12/2015 | Ponoth |
| 2015/0359467 A1 | 12/2015 | Tran |
| 2015/0360049 A1 | 12/2015 | Kaplitt et al. |
| 2015/0360050 A1 | 12/2015 | Kaplitt et al. |
| 2015/0360777 A1 | 12/2015 | Mottale |
| 2015/0362287 A1 | 12/2015 | Sammut et al. |
| 2015/0362288 A1 | 12/2015 | Sammut et al. |
| 2015/0362919 A1 | 12/2015 | Bernstein et al. |
| 2015/0367212 A1 | 12/2015 | Marcin et al. |
| 2015/0367243 A1 | 12/2015 | Frost et al. |
| 2015/0370257 A1 | 12/2015 | Bernstein et al. |
| 2015/0372819 A1 | 12/2015 | Luukkala et al. |
| 2015/0373036 A1 | 12/2015 | Patne et al. |
| 2016/0001158 A1 | 1/2016 | Tawwater et al. |
| 2016/0005320 A1 | 1/2016 | deCharms et al. |
| 2016/0008686 A1 | 1/2016 | Jertson et al. |
| 2016/0009364 A1 | 1/2016 | Goel |
| 2016/0010950 A1 | 1/2016 | Sammut et al. |
| 2016/0012707 A1 | 1/2016 | McKinley et al. |
| 2016/0013818 A1 | 1/2016 | Smith |
| 2016/0015004 A1 | 1/2016 | Bonge, Jr. |
| 2016/0015006 A1 | 1/2016 | Bonge, Jr. |
| 2016/0018083 A1 | 1/2016 | Kelly et al. |
| 2016/0020506 A1 | 1/2016 | Mahanfar et al. |
| 2016/0021178 A1 | 1/2016 | Liu et al. |
| 2016/0023762 A1 | 1/2016 | Wang |
| 2016/0025856 A1 | 1/2016 | Volfson |
| 2016/0027399 A1 | 1/2016 | Wilde et al. |
| 2016/0033966 A1 | 2/2016 | Farris et al. |
| 2016/0039542 A1 | 2/2016 | Wang |
| 2016/0048369 A1 | 2/2016 | Zenoff |
| 2016/0048370 A1 | 2/2016 | Zenoff |
| 2016/0052618 A1 | 2/2016 | Norden |
| 2016/0058644 A1 | 3/2016 | Cheatham et al. |
| 2016/0059074 A1 | 3/2016 | Molyneux et al. |
| 2016/0059075 A1 | 3/2016 | Molyneux et al. |
| 2016/0061396 A1 | 3/2016 | Bosua et al. |
| 2016/0082953 A1 | 3/2016 | Teller et al. |
| 2016/0089089 A1 | 3/2016 | Kakkar et al. |
| 2016/0091938 A1 | 3/2016 | Edwards et al. |
| 2016/0096093 A1 | 4/2016 | Evans |
| 2016/0096095 A1 | 4/2016 | Williams |
| 2016/0099602 A1 | 4/2016 | Leabman et al. |
| 2016/0099613 A1 | 4/2016 | Bell et al. |
| 2016/0099614 A1 | 4/2016 | Leabman et al. |
| 2016/0099756 A1 | 4/2016 | Leabman et al. |
| 2016/0099757 A1 | 4/2016 | Leabman et al. |
| 2016/0101516 A1 | 4/2016 | Kombluh et al. |
| 2016/0101517 A1 | 4/2016 | Kombluh et al. |
| 2016/0107309 A1 | 4/2016 | Walsh et al. |
| 2016/0119541 A1 | 4/2016 | Alvarado-Moya et al. |
| 2016/0120733 A1 | 5/2016 | Ishikawa et al. |
| 2016/0120734 A1 | 5/2016 | Ishikawa et al. |
| 2016/0121164 A1 | 5/2016 | Coza et al. |
| 2016/0121986 A1 | 5/2016 | Riski et al. |
| 2016/0123301 A1 | 5/2016 | Mohajer |
| 2016/0135431 A1 | 5/2016 | Sheldon et al. |
| 2016/0136482 A1 | 5/2016 | Askew, Jr. et al. |
| 2016/0136494 A1 | 5/2016 | Johnston |
| 2016/0136525 A1 | 5/2016 | Soni |
| 2016/0136532 A1 | 5/2016 | Tarng et al. |
| 2016/0137208 A1 | 5/2016 | Powers et al. |
| 2016/0147228 A1 | 5/2016 | Riski |
| 2016/0147308 A1 | 5/2016 | Gelman et al. |
| 2016/0150362 A1 | 5/2016 | Shaprio et al. |
| 2016/0153749 A1 | 6/2016 | Sammut et al. |
| 2016/0154170 A1 | 6/2016 | Thompson et al. |
| 2016/0155200 A1 | 6/2016 | Basu et al. |
| 2016/0163204 A1 | 6/2016 | Raptopoulos et al. |
| 2016/0167807 A1 | 6/2016 | Wang |
| 2016/0171744 A1 | 6/2016 | Rhoads et al. |
| 2016/0179096 A1 | 6/2016 | Bradlow et al. |
| 2016/0184720 A1 | 6/2016 | Christiansen |
| 2016/0187654 A1 | 6/2016 | Border et al. |
| 2016/0191121 A1 | 6/2016 | Bell et al. |
| 2016/0199598 A1 | 7/2016 | Curtis et al. |
| 2016/0205500 A1 | 7/2016 | Lee et al. |
| 2016/0209648 A1 | 7/2016 | Haddick et al. |
| 2016/0217327 A1 | 7/2016 | Osterhout et al. |
| 2016/0221683 A1 | 8/2016 | Roberts et al. |
| 2016/0227361 A1 | 8/2016 | Booth et al. |
| 2016/0233912 A1 | 8/2016 | Thomas et al. |
| 2016/0234356 A1 | 8/2016 | Thomas et al. |
| 2016/0236102 A1 | 8/2016 | Shlomot |
| 2016/0243701 A1 | 8/2016 | Gildert et al. |
| 2016/0246326 A1 | 8/2016 | von Badinski et al. |
| 2016/0250516 A1 | 9/2016 | Tropper et al. |
| 2016/0252325 A1 | 9/2016 | Sammut et al. |
| 2016/0257388 A1 | 9/2016 | Holohan et al. |
| 2016/0259979 A1 | 9/2016 | Aguilar et al. |
| 2016/0262608 A1 | 9/2016 | Krueger |
| 2016/0267809 A1 | 9/2016 | deCharms et al. |
| 2016/0269812 A1 | 9/2016 | Wilker et al. |
| 2016/0269819 A1 | 9/2016 | Wilker et al. |
| 2016/0271492 A1 | 9/2016 | Mullen |
| 2016/0273879 A1 | 9/2016 | Volfson |
| 2016/0278652 A1 | 9/2016 | Kaib et al. |
| 2016/0280347 A1 | 9/2016 | Levander et al. |
| 2016/0282956 A1 | 9/2016 | Ouyang et al. |
| 2016/0287937 A1 | 10/2016 | Fitzgerald et al. |
| 2016/0290637 A1 | 10/2016 | Noman et al. |
| 2016/0295978 A1 | 10/2016 | Hyde et al. |
| 2016/0296053 A1 | 10/2016 | Bakhsh |
| 2016/0300508 A1 | 10/2016 | Bakhsh |
| 2016/0302148 A1 | 10/2016 | Buck et al. |
| 2016/0310838 A1 | 10/2016 | Poisner et al. |
| 2016/0313174 A1 | 10/2016 | Lightstone |
| 2016/0327073 A1 | 11/2016 | Amlani et al. |
| 2016/0332060 A1 | 11/2016 | Rogel et al. |
| 2016/0332064 A1 | 11/2016 | Rogel et al. |
| 2016/0332712 A1 | 11/2016 | Holohan et al. |
| 2016/0332748 A1 | 11/2016 | Wang |
| 2016/0338457 A1 | 11/2016 | Gharabegian |
| 2016/0338644 A1 | 11/2016 | Connor |
| 2016/0342767 A1 | 11/2016 | Narasimhan et al. |
| 2016/0346627 A1 | 12/2016 | Le et al. |
| 2016/0353996 A1 | 12/2016 | Fink |
| 2016/0354664 A1 | 12/2016 | DeCarlo |
| 2016/0355257 A1 | 12/2016 | Chappell |
| 2016/0357187 A1 | 12/2016 | Ansari |
| 2016/0357188 A1 | 12/2016 | Ansari |
| 2016/0357262 A1 | 12/2016 | Ansari |
| 2016/0358477 A1 | 12/2016 | Ansari |
| 2016/0368811 A1 | 12/2016 | Eguchi |
| 2016/0371944 A1 | 12/2016 | Phillips et al. |
| 2016/0375333 A1 | 12/2016 | Fryer et al. |
| 2016/0377271 A1 | 12/2016 | Kelly et al. |
| 2016/0377380 A1 | 12/2016 | Sammut |
| 2016/0379141 A1 | 12/2016 | Judge et al. |
| 2016/0381536 A1 | 12/2016 | Li et al. |
| 2016/0381727 A1 | 12/2016 | Dwarakanath et al. |
| 2017/0014625 A1 | 1/2017 | Rosenbluth et al. |
| 2017/0018001 A1 | 1/2017 | Tunnell et al. |
| 2017/0023458 A1 | 1/2017 | Hart et al. |
| 2017/0039336 A1 | 2/2017 | Bitran et al. |
| 2017/0039599 A1 | 2/2017 | Tunnell et al. |
| 2017/0043216 A1 | 2/2017 | Balakrishnan et al. |
| 2017/0045327 A1 | 2/2017 | Arnold |
| 2017/0046979 A1 | 2/2017 | Lehary |
| 2017/0050113 A1 | 2/2017 | Mullen |
| 2017/0050116 A1 | 2/2017 | Shlomot |
| 2017/0055652 A1 | 3/2017 | Hyde et al. |
| 2017/0060646 A1 | 3/2017 | Komulainen |
| 2017/0061404 A1 | 3/2017 | Tunnell et al. |
| 2017/0064058 A1 | 3/2017 | Smith |
| 2017/0071300 A1 | 3/2017 | Gharabegian |
| 2017/0078400 A1 | 3/2017 | Binder et al. |
| 2017/0080332 A1 | 3/2017 | Poisner et al. |
| 2017/0080861 A1 | 3/2017 | Vora et al. |
| 2017/0082749 A1 | 3/2017 | Volfson |
| 2017/0086015 A1 | 3/2017 | Elkehag |

STEERABLE ROTATING PROJECTILE

CROSS REFERENCE TO RELATED APPLICATIONS

The present application is a non-provisional of, and claims benefit of priority under 35 U.S.C. § 119(e) from U.S. Provisional Patent Application No. 62/316,117, filed Mar. 31, 2016, the entirety of which is expressly incorporated herein by reference.

FIELD OF THE INVENTION

The present application relates to a systems and methods for controlling a flight path and/or steering force on a rotating and translating projectile.

BACKGROUND OF THE INVENTION

Each reference cited herein is expressly incorporated by reference in its entirety. These incorporations are intended to provide written description for aspects of the invention already known, to provide enabling teachings, regardless of field of specialization, and to define useful combinations and contexts of use. Reference citation is not intended to admit prior art status, which is determined by 35 USC 102.

Automated flight control guidance systems are well known. Typically, an aircraft has bilateral symmetry, and displays aerodynamic lift and drag, which are controlled by altering positions of aerodynamic surfaces during flight. A main feature of such craft is one or more pairs of wings on either side of the craft.

The "Frisbee®" is a well-known flying disk toy that is typically formed as an integral rigid tough plastic shell, in a dished shape of about 8-12 inches in diameter. It is thrown with an applied torque, such that it acquires spin as it is launched, i.e., has rotational and translational components to its motion vector. An inverted dish shape provides lift, while drag on the exterior surface(s) may also impact aerodynamics. If launched with a non-neutral roll while thrown, dished disks tend to assume a curved flight path, due to the effect of gravitational force and aerodynamics on the flight path. Other anomalies can also disrupt a straight line flight. An "Aerobie" is a toroid-shaped object with a flat profile, open center, and aerodynamic inner and outer edges to provide stability over a range of speeds, and long distance flight. Electronic projectile rotating disks are described in U.S. Pat. Nos. 9,579,552, 8,444,513, 20130303314, 20110250819, 20060199682, U.S. Pat. Nos. 3,960,379; 4,145,839; 4,301, 616; 4,748,366; 4,867,727; 4,869,699; 4,894,038; 4,955, 620; 5,032,098; 5,125,862; 5,145,444; 5,256,099; 5,634, 839; 5,672,086; 5,893,790; 5,895,308; 5,902,166; 5,975, 982; 5,984,753; 6,186,902; 6,206,537; 6,241,362; 6,265, 984; 6,270,391; 6,287,193; 6,292,213; 6,304,665; 6,364, 614; 6,402,342; 6,404,409; 6,524,073; 6,565,243; 6,604, 742; 6,972,659; 7,032,861; 7,082,890; 7,101,293; 7,108, 576; 7,187,295; 7,249,732; 7,285,032; 7,541,995; 7,545, 994; 7,663,629; 7,775,910; 7,789,520; 7,794,341; 7,850, 551; 7,971,823; 8,286,265; 8,322,649; 8,355,410; 8,398, 449; 8,417,481; 8,585,476; 8,608,167; 8,678,873; 8,808, 100; 8,821,293; 8,849,697; 8,880,378; 8,908,922; 8,909, 543; 8,920,287; 8,924,248; 8,924,249; 8,931,144; 8,948, 457; 8,982,105; 9,086,782; 9,089,760; 9,143,392; 9,149, 695; 9,170,074; 9,237,297; 9,272,782; 9,352,209; 9,352, 216; 9,415,263; 9,421,448; 9,464,873; 9,498,689; 9,514, 604; 9,560,725; 9,573,035; 9,579,552; 9,582,072; 20020005614; 20020017759; 20020067990; 20020100040; 20020180154; 20030045200; 20040009063; 20040077255; 20040077975; 20040094662; 20040209712; 20040220001; 20040244034; 20050151941; 20050200079; 20050260918; 20060049304; 20060073758; 20060105838; 20060136498; 20060144211; 20060199682; 20060200314; 20060262120; 20060277466; 20060287137; 20070029272; 20070032318; 20070034738; 20070100666; 20070146325; 20070155263; 20070205553; 20070212973; 20070213126; 20070218988; 20070298913; 20080033581; 20080062677; 20080096654; 20080096657; 20080104422; 20080132361; 20080167535; 20080174281; 20080185785; 20080242415; 20080274844; 20090031438; 20090134580; 20090143175; 20090171788; 20090278317; 20090280931; 20090300551; 20100062847; 20100139738; 20100141609; 20100261526; 20100279776; 20100282918; 20100320333; 20110004975; 20110040879; 20110042901; 20110053716; 20110161254; 20120066883; 20120068927; 20120103274; 20120103275; 20120258804; 20130073387; 20130073389; 20130079152; 20130109265; 20130139073; 20130225032; 20130238538; 20130303314; 20130344958; 20140083402; 20140141865; 20140142467; 20140142733; 20140143031; 20140143038; 20140144417; 20140159894; 20140159903; 20140163428; 20140163429; 20140163430; 20140203797; 20140232516; 20140259549; 20140301598; 20140301600; 20140301601; 20140335952; 20140364254; 20140379696; 20150005912; 20150057808; 20150062959; 20150103168; 20150219425; 20150243068; 20150297964; 20150306455; 20150309563; 20150319562; 20150360777; 20160001158; 20160018083; 20160033966; 20160058644; 20160096093; 20160120733; 20160120734; 20160136525; 20160136532; 20160147308; 20160154170; 20160184720; 20160236102; 20160250516; 20160271492; 20160287937; 20160338644; 20160354664; 20160377271; 20170050113; and 20170050116; expressly incorporated herein by reference.

A ball can have 3D radial symmetry, e.g., a basketball, or 2D radial symmetry, e.g., a football. These typically have no intrinsic net lift during flight, though a topspin or backspin can induce lift or negative lift.

It is known to provide "smart bombs" which are passively steered to a target by a steering mechanism. Typically, such smart bombs are not gyroscopically stabilized, since this stabilization tends to undermine steerability. en.wikipedia.org/wiki/Guided_bomb; http://science.howstuffworks.com/smart-bomb.htm;

It is also known to provide smart bullets which are guided or guidable to a target. See U.S. Pat. No. 5,788,178. In many cases, rotation of the bullet projectile is contraindicated. In other cases, a guidance system is provided that permits steering of the rotating bullet projectile. Such guidance systems may have features and structures useful in accordance with the present invention. See, U.S. Pat. Nos. 8,747, 241; 8,362,408; 8,319,162; 8,288,698; 8,119,958; 7,999, 212; 7,963,442; 7,947,937; 7,891,298; 7,834,301; 7,781, 709; 7,692,127; 7,557,433; 7,557,433; 7,412,930; 7,354, 017; 7,255,304; 6,608,464; 6,474,593, each of which is expressly incorporated herein by reference in their entirety.

Similarly, spinning satellites also have rotational-angle responsive guidance and control systems, though these typically operate in an environment without aerodynamic influences.

As such, it is known in some applications to provide an angularly referenced flight path adjustment/control system of a rotating object. However, these systems are not generic.

One issue in guiding a rotating object is that the rotation gyroscopically stabilizes the projectile, and attempts to steer the projectile with modification of the axis of rotation, and off the gyroscopically stabilized flight path, result in reactive forces. Any control system for guiding the flight path of a rotating object should therefore compensate for, or predict and respond to, the reactive force resulting from a corrective force (unless the reactive force is consistent with the intended flight path), and in most cases, the corrective force or other response should be synchronized with the rotational angle of the projectile. Each of these presents challenges, especially if the control system is to be self-contained within the projectile of reasonable size, weight and cost. In some cases, where real time feedback is available and the actuator provides a small correction force with respect to the gyroscopic stabilization force, a prediction of reactive forces and effect is not required, though this imposes sometimes significant limitations on the control system. Another issue is that in an inertial guidance system, the static G-forces in a rotating sensor platform may make quantitative analysis of small force perturbations more difficult.

Another issue is fragility. In the case of a Frisbee or ball, the intended use subjects the projectile to harsh conditions, such as dirt, water, salt water, mud, impacts, manual launch and grabbing, etc. Therefore, even if the projectile meets a first aim of controlled flight path, unless it is also capable of surviving in harsh conditions, it will not meet a second aim of usability and context-appropriateness.

The field of aerodynamics is well studied. In a fixed wing draft, there are a number of control surfaces that are typically employed to steer and control the craft. A rotating disk aircraft lacks obvious dynamic control opportunities, and the gyroscopic effects may be very significant during many types of control attempts.

When a Frisbee is in flight, there are three main external forces acting on it: weight, lift and drag. In addition, the rotation of the Frisbee induces gyroscopic reactive forces in response to perturbations. See, Hanaa Khalid Moukhtar Khalid, Study of the aerodynamics of translating spinning discs in laminar and turbulent flow, Doctoral dissertation, University of Khartoum (2012); Erynn J. Schroeder, An Aerodynamic Simulation of Disc Flight, Honors Thesis, College of Saint Benedict and Saint John's University (4-2015), expressly incorporated herein by reference in their entirety.

Weight acts along the gravitational vector, generally downward. In a typical Frisbee, the structure is dynamically balanced with the center of mass at the physical center of the disk. Likewise, spherical balls also are typically designed with a center of mass at a physical center of the sphere.

Lift from the airflow along the axis of movement (generally in the y axis direction), opposes the gravitational force, and is what keeps the Frisbee in the air. Lift is caused by differential air pressure and follows what is known as the Bernoulli principle. The curvature of the disc causes the air moving on top of the disc to travel faster and therefore have lower pressure than the air moving on the bottom of the disc. Similar to a plane wing, this difference in pressure above the disc and below the disc results in lift. The center of lift is offset from the center of mass, and thus applies a torque. This, in turn, causes a reaction force when the disk is spinning.

Lift can be calculated using the equation: $L=(½)C_l A\rho V^2$, where A=Area of the cross section; $\rho$=density of air; V=relative velocity between the air and the Frisbee; and $C_l$=Coefficient of lift. This depends on the shape of the disc and angle of attack. The angle of attack is the angle between the horizontal and the direction of air flow. Generally, C increases linearly in relation to an increase of an angle of attack, until a certain point where it drops off.

Drag, the result of air resistance, acts parallel to the flow of the air (x direction), opposite the direction of flight, and is what slows the Frisbee down. Drag can also be calculated by using an equation very similar to lift: $L=(½)C_d A\rho V^2$. The one difference in these equations is that the $C_d$ in this equation is the coefficient of drag. Contrary to lift, the coefficient of drag increases quadratically with an increase in the angle of attack. Because the Frisbee typically has an angle of attack, and the drag acts along the axis of movement, the drag is not normal to the axis of rotation.

A relationship between L and D is formed through the lift-to-drag ratio (L/D). The lift-to-drag ratio varies depending on the angle of attack. An angle of attack of around 15° maximizes the lift-to-drag ratio, resulting in the most efficient flight. That is, for a normal Diskcraft disk, a vertical axis of rotation is less efficient than an inclined axis of rotation. Shereef A. Sadek, Saad A. Ragab, Aerodynamics of Rotating Discs, Tenth International Congress of Fluid Dynamics Dec. 16-19, 2010, Ain Soukhna, Red Sea, Egypt, ICFD10-EG-3901.

Potts and Cowther [2], studied the aerodynamics of Frisbee like discs that had an approximately elliptic cross-section and hollowed out underside cavity. The lift and drag coefficients were found to be independent of Reynolds number for the range of tunnel speeds tested. The upper surface flow is characterized by separation at a line (arc) of constant radius on the leading edge rim, followed by reattachment at a line of similar geometry. Trailing vortices detach from the trailing edge rim. The cavity flow is characterized by separation at the leading edge lip, followed by straight-line reattachment.

Badalamenti and Prince [3], studied the effects of endplates on a rotating cylinder in crossflow for a range of Reynolds number. They found that endplates can enhance the lift/drag ratio and increase lift up to a limiting value.

OVERFLOW, is a three-dimensional flow solver that uses structured overset grids. It solves the Navier-Stokes equations in generalized coordinates. It is capable of obtaining time-accurate as well as steady state solutions: $\partial Q/\partial t+\partial E/\partial \xi+\partial F/\partial \eta+\partial G/\partial \zeta=0$, where Q is the vector of conserved variables in generalized coordinates; $\xi$, $\eta$ and $\zeta$ are the generalized coordinates; and G, F and G are the total flux (convective and viscous) in the direction of generalized coordinates $\xi$, $\eta$ and $\zeta$, respectively.

For a non-rotating disc, the minimum friction velocity occurs at the leading and trailing edges of the disc. At the leading edge, the flow is stagnant and the boundary layer is very thin. At the trailing edge, there is a small separation region where the flow is recirculating at a very low speed. As the rotation speed is increased, $\lambda=0.78$, the contour lines become asymmetric and the location of the minimum value moves counterclockwise along the circumference in the negative x-y plane. The maxima of LIT increases with the increase in $\lambda$, but remains in the positive x-y plane along the circumference near the leading edge. This is due to the fact that the net relative flow velocity to the disc surface increases in the positive x-y plane while it is reduced in the negative x-y plane. As the rotation speed is increased above the free stream speed, $\lambda=1.51$, a double minima is developed on the upper and lower disc surfaces and the location of the minima moves inward towards the center at −90° with the positive x-axis direction. This is due to the fact that the surface speed matches the flow speed at some radial distance less than the disc radius. Finally, at $\lambda=1.89$, a well defined minima is present on the upper and lower surfaces approximately half a radius away from the center. This is a unique feature of this flowfield. On the other hand, the maximum LIT is always located on the disc's circumference since the relative flow velocity is always positive in the positive x-y plane.

For the non-rotating case, the disc behaves like a finite wing with low aspect ratio. Upstream of the disc center on the upper side, the typical leading edge suction, and on the lower side, high pressure region. A common feature of finite wings are the tip vortices, which are present in here as well. Low pressure coefficient can be seen at the disc tips at an approximate angle of 75° from the positive x-direction. These suction peaks are due to the tip vortices formation that is typical of such flowfields. For the rotating-disc, the first noticeable effect due to rotation is the breaking of the flow symmetry. Upstream of the disc center, the pressure coefficient looks similar to the non-rotating case, this might be due to the fact that the boundary layer is very thin and still developing. On the other hand, downstream of the disc center; the rotation effects are more significant. This is evident by the degree of asymmetry in the pressure coefficient contours downstream of the disc center on the upper and lower surfaces. This asymmetry is because the disc rotation affects the surface shear stress distribution along the disc surface as shown above, the surface shear stress being higher in the positive x-y half-plane than in the negative x-y half-plane. This in turn changes the boundary thickness distribution along the disc surface in an asymmetric manner. The asymmetric surface shear stress creates more adverse pressure gradient in the positive x-y half-plane and more favorable pressure gradient in the negative x-y half-plane. Hence, to the incoming inviscid flow the effective disc shape is asymmetric.

As mentioned above, the asymmetric surface shear stress affects the surface pressure distribution, it also affects the shape of the tip vortices and the shed wake. The vortex size is greater for the rotating disc, which also indicates that the separation at the tip occurs earlier than in the non-rotating case. For the rotating disc, the vortex size is reduced and its center is further off the disc surface. For the rotating disc the wake diffuses much faster than the non-rotating case. This suggests that the rotation has the effect of weakening the tip vortices which means that the disc loses lift.

In general, the rotation increases the disc's drag. The side force is directed in the negative y-direction and the moment direction is opposite to the direction of rotation as expected. The increase in drag coefficient is mainly due to increase in the shear stress. For $\alpha=0.0°$, the viscous drag increases by about 40% and by 50% for $\alpha=10.0°$. On the other hand, disc rotation increases the pressure drag at $\alpha=0.0°$ by about 380% for the same rotation speed; but it has insignificant influence at $\alpha=10.0°$. In summary, the drag coefficient increases with disc rotation; however, disc rotation reduces the increase in drag with a. Disc rotation reduces the lift coefficient by about 4% of the non-rotating disc value. In a rotating-disc, the tip vortices are weaker than in the case of nonrotating disc. Disc rotation alters the surface shear stress distribution which in turn changes the boundary layer thickness and structure. The asymmetric surface shear stress creates asymmetric boundary layer thickness, and hence viscous-inviscid interaction leads to asymmetric surface pressure distribution. Disc rotation also affects the tip vortices which leads to weakening of the shed vorticity, this in turn reduces the lift coefficient. Drag coefficient increase significantly due to rotation at zero angle of attack but is reduced significantly at 10.0° angle of attack. See, [1] M. M. Zdravkovich, A. J. Flaherty, M. G. Pahle and I. A. Skellhorne, Some aerodynamic aspects of coin-like cylinders, Journal of Fluid Mechanics, 1998, vol 360, pp 73-84; [2] J. R. Potts and W. J. Crowther, The flow over a rotating disc-wing, RAeS Aerodynamics Research Conference, London, UK, 17-18 Apr. 2000; [3] J. R. Potts and W. J. Crowther, Frisbee Aerodynamics, 20th AIAA Applied Aerodynamics Conference, 24-26 June 2002, St. Louis, Mo., expressly incorporated herein by reference in their entirety.

Aerodynamic drag on sports balls may be measured in wind tunnels or during untethered flight. There is a concern that fixtures needed to support the ball in a wind tunnel may influence its drag. Measurements of projectiles under game conditions have been attempted, but are difficult to interpret from the data scatter and are not controlled. In a laboratory study, drag was observed to depend on the ball speed, rotation, roughness, and orientation. A so-called "drag crisis" was observed for a smooth sphere and was comparable to wind tunnel data. Rough sports balls, such as a baseball, showed evidence of a small drag crisis that was less apparent than the smooth sphere. See, Jeffrey R. Kensrud, Lloyd V. Smith, Ball Aerodynamics, 8th Conference of the International Sports Engineering Association (ISEA) In situ drag measurements of sports balls.

Understanding the flight of a ball involves two aerodynamic properties, lift and drag. Lift can be described as the force, not including gravity, on a ball that is directed perpendicular to the ball's trajectory. Drag is the force, $F_d$, in the direction opposing the ball's flight path [1]. The drag coefficient, $C_d$, is found from [2] $D_d=2F_d/\rho AV^2$, where $\rho$ is the density of air, A is the cross sectional area of the ball, and V is the speed of the ball. Drag is a function of surface roughness, velocity, and orientation of the ball. It is convenient to use a non-dimensional form of velocity, expressed in terms of the Reynolds number, Re, defined by $R_\theta=v_D/v$, where D is diameter of the ball and u is kinematic viscosity of air. The effect of speed on drag can be described by three characteristic ranges. At a low Reynolds number, flow is laminar until separation occurs at roughly 80° from the stagnation point [3]. When the Reynolds number is increased, the separation region becomes turbulent and attaches itself again, carrying the separation point to the backside of the ball to about 120° from the stagnation point. As the separation point moves to the back of the ball, drag is reduced. The reduction in drag can be large and occur over a small change in the Reynolds number. This is referred to as the Drag Crisis, and often occurs at game speeds. As the Reynolds number is increased further, the flow becomes completely turbulent in the boundary layer just after the stagnation point, causing the drag to increase again. The drag crisis has been observed on a smooth sphere for many years. Millikan and Klein [4] explored the drag crisis in their free flight test finding $C_d$ on a smooth sphere as low as 0.08. Achenbach [5] analyzed how surface roughness on a sphere can change behavior in the critical Reynolds region. His data suggested that as surface roughness increased on a sphere, the drag crisis was induced at a lower Reynolds number and was less severe.

Frohlich [6] the effect of surface roughness on the behavior of the drag crisis, and explained that if a baseball acted like a rough sphere, the drag crisis could help explain the behavior of pitched or batted baseballs. Alaways, Mish, and Hubbard [7] analyzed baseball pitches by triangulating ball location from video taken during the 1996 Summer Olympic Games. Their data showed evidence of a drag crisis with a drag coefficient as low as 0.16. An improved video tracking system involving Major League Baseball (PITCHf/x) [8] showed little evidence of a drag crisis, however. The effect of ball rotation has primarily been directed towards lift. Bearman and Harvey rotated dimpled spheres resembling a golf ball in a wind tunnel [9]. They found drag increased with rotation. Mehta attributed the drag increase with lift effects [10]. The drag crisis is apparent for both the golf ball and smooth sphere. A dimpled surface of the golf ball causes a drag crisis at a lower Reynolds number than the smooth sphere. The optimized dimple pattern of the golf ball helps maintain a relatively large magnitude of its drag crisis. While the stitched balls (baseballs, softballs, and cricket balls) show $C_d$ decreasing with increasing speed, the magnitude of their "drag crisis" is significantly smaller than the smooth sphere and golf ball. Scatter in drag is larger for the balls with raised seams (NCAA baseball and 89 mm softball). The arrangement of the stitches likely plays a role in the drag crisis. The drag crisis is a result of turbulence developing in the boundary layer of the ball. The stitches trip the boundary layer earlier than a smooth sphere, inducing turbulence and moving the flow separation point to the backside of the ball. In the normal orientation, the stitches are close to the flow separation point, which is apparently fixed to the stitch location for balls with raised seams. For smooth spheres, the separation point (and drag) depends on the air speed. For balls with raised seams, the separation point (and drag) depends on variation in ball orientation and air speed. The parallel orientation of the cricket ball exhibited the largest drag crisis; as the stitches are removed from the separation point in this orientation, providing a relatively smooth flow surface. Balls with raised seams (NCAA baseball and 89 mm softball) exhibit a higher relative $C_d$ and a drag crisis at a lower relative Reynolds number. Both trends are consistent for balls of higher relative roughness. Similar to rotating dimpled spheres [9], drag on a baseball increases with spin but with less magnitude. While the effect is small, it is measurable and affects the ball flight. Pitched balls (including knuckleballs) usually have some rotation and therefore do not achieve the low $C_d$. Thus, in play, one should expect pitched balls to have a drag coefficient between 0.3 and 0.4. However for pitchers like Tim Wakefield, who can deliver a ball with no rotation, a pronounced drag crisis is more likely to occur, where the $C_d$ could be as low as 0.26. Smooth spheres, golf balls, and balls with flat seams show a strong drag crisis, while raised seam balls show a weak drag crisis. Rotation had an effect on drag, increasing the average $C_d$ on a baseball by 20%. It is difficult to pitch baseballs with no rotation. Hence, most baseball pitches will have a $C_d$ of 0.35 (the average drag observed for rotating balls). See, [1] R. K. Adair, The Physics of Baseball. 3rd ed. (HarperCollins Publishers, New York, 2002), pp. 5-40; [2] C. T. Crowe, F. D. Elger, J. A. Roberson. Engineering Fluid Mechanics. 8th ed. (John Wiley & Sons, Hoboken, 2005) pp 440; [3] R. L. Panton. Incompressible Flow. 3rd ed. (John Wiley, Hoboken, 2005) pp 324-34; [4] C. B. Millikan, A. L. Klein. "The effect of turbulence. An investigation of maximum lift coefficient and turbulence in wind tunnels and in flight," Aircraft Engineering, Vol 5, 169-74, 1933; [5] E. Achenbach. "The effects of surface roughness and tunnel blockage on flow past spheres," Journal of Fluid Mechanics, Vol. 65, 113-25 (1974); [6] C. Frohlich. "Aerodynamic drag crisis and its possible effect on the flight of baseballs," American Journal of Physics, 52, 325-34 (1984); [7] L. W. Alaways, S. P. Mish, M. Hubbard. "Identification of Release Conditions and Aerodynamic Forces in Pitched-Baseball Trajectories," Journal of Applied Biomechanics, Vol. 17, 63-76 (2001); [8] A. M. Nathan. "Analysis of PITCHf/x Pitched Baseball Trajectories," 2007. University of Illinois, 8 Jul. 2009 webusers.npl.illinois.edu/~a-nathan/pob; [9] P. W. Bearman, and J. K. Harvey. "Golf ball aerodynamics," Aeronautical Quarterly, Vol. 27, 112-22 (1976); [10] R. Mehta. "Aerodynamics of Sports Balls," Ann. Rev. Fluid Mechanics, 1985. 17, 151-75 (1985); [11] R. D. Knight. Physics for Scientists and Engineers. Vol. 1 (Pearson Education, Boston, 2007); [12] A. M. Nathan. "The effect of spin on the flight of a baseball," American Journal of Physics, 76 (2), 119-24 (2008), expressly incorporated herein by reference in their entirety.

For spinning balls, the Magnus effect is responsible for producing the side or lift force. A negative or reverse Magnus effect can be created. Surface roughness, can be used to generate an asymmetric flow, assisting in the Magnus effect. See, Rabindra D. Mehta and Jani Macari Pallis, "Sports Ball Aerodynamics: Effects of Velocity, Spin and Surface Roughness", Materials And Science In Sports, Edited by: E H. (Sam) Froes and S. J. Haake, Pgs. 185-197.

Aerodynamics plays a prominent role in defining the flight of a ball that is struck or thrown through the air in almost all ball sports. The main interest is in the fact that the ball can be made to deviate from its initial straight path, resulting in a curved, or sometimes an unpredictable, flight path. Lateral deflection in flight, commonly known as swing, swerve or curve, is well recognized in baseball, cricket, golf, tennis, volleyball and soccer. In most of these sports, the lateral deflection is produced by spinning the ball about an axis perpendicular to the line of flight which generates the Magnus effect. Aerodynamics and hydrodynamics in sports, J. M. Pallis Cislunar Aerospace, Inc., San Francisco, Calif., USA R. D. Mehta Sports Aerodynamics Consultant, Mountain View, Calif., USA. A side force, which makes a ball swing through the air, can also be generated in the absence of the Magnus effect. In one of the cricket deliveries, the ball is released with the seam angled, which creates the boundary layer asymmetry necessary to produce swing. In baseball, volleyball and soccer there is an interesting variation whereby the ball is released without any spin imparted to it. In this case, depending on the seam or stitch orientation, an asymmetric, and sometimes time-varying, flow field can be generated, thus resulting in an unpredictable flight path. Almost all ball games are played in the Reynolds Number range of between about 40,000 to 400,000. The Reynolds number is defined as, Re=Ud/v, where U is the ball velocity, d is the ball diameter and v is the air kinematic viscosity. It is particularly fascinating that, purely through historical accidents, small disturbances on the ball surface, such as the stitching on baseballs and cricket balls, the felt cover on tennis balls and patch-seams on volleyballs and soccer balls, are about the right size to affect boundary layer transition and development in this Re range. See Mehta and Pallis (2001a).

First consider the flight of a smooth sphere through an ideal or inviscid fluid. As the flow accelerates around the front of the sphere, the surface pressure decreases (Bernoulli equation) until a maximum velocity and minimum pressure are achieved half way around the sphere. The reverse occurs over the back part of the sphere so that the velocity decreases and the pressure increases (adverse pressure gradient). In a real viscous fluid such as air, a boundary layer, defined as a thin region of air near the surface, which the sphere carries with it, is formed around the sphere. The boundary layer cannot typically negotiate the adverse pressure gradient over the back part of the sphere and it will tend to peel away or "separate" from the surface. The pressure becomes constant once the boundary layer has separated and the pressure difference between the front and back of the sphere results in a drag force that slows down the sphere. The boundary layer can have two distinct states: "laminar", with smooth tiers of air passing one on top of the other, or "turbulent", with the air moving chaotically throughout the layer. The turbulent boundary layer has higher momentum near the wall, compared to the laminar layer, and it is continually replenished by turbulent mixing and transport. It is therefore better able to withstand the adverse pressure gradient over the back part of the sphere and, as a result, separates relatively late compared to a laminar boundary layer. This results in a smaller separated region or "wake" behind the ball and thus less drag. (Note that the turbulent process itself is dissipative, and therefore a mathematical model is complex or inaccurate).

The "transition" from a laminar to a turbulent boundary layer occurs when a critical sphere Reynolds number is achieved. The flow over a sphere can be divided into four distinct regimes (2). The drag coefficient is defined as, $C_D=D/(0.5pU^2A)$, where D is the drag force, p is the air density and A is the cross-sectional area of the sphere. In the subcritical regime, laminar boundary layer separation occurs at an angle from the front stagnation point of about 80° and the $C_D$ is nearly independent of Re. In the critical regime, the $C_D$ drops rapidly and reaches a minimum at the critical Re. The initial drop in $C_D$ is due to the laminar boundary layer separation location moving downstream (0S=95°). At the critical Re, a separation bubble is established at this location whereby the laminar boundary layer separates, transition occurs in the free-shear layer and the layer reattaches to the sphere surface in a turbulent state. The turbulent boundary layer is better able to withstand the adverse pressure gradient over the back part of the ball and separation is delayed to 0S=120°. In the supercritical regime, transition occurs in the attached boundary layer and the CD increases gradually as the transition and the separation locations creep upstream with increasing Re. A limit is reached in the transcritical regime when the transition location moves all the way upstream, very close to the front stagnation point. The turbulent boundary layer development and separation is then determined solely by the sphere surface roughness, and the $C_D$ becomes independent of Re since the transition location cannot be further affected by increasing Re.

Earlier transition of the boundary layer can be induced by "tripping" the laminar boundary layer using a protuberance (e.g. seam on a baseball or cricket ball) or surface roughness (e.g. dimples on a golf ball or fabric cover on a tennis ball). For the smooth sphere, the $C_D$ in the subcritical regime is about 0.5 and at the critical Re of about 400,000 the $C_D$ drops to a minimum of about 0.07, before increasing again in the supercritical regime. The critical Re, and amount by which the $C_D$ drops, both decrease as the surface roughness increases on the sports balls.

In a viscous flow such as air, a sphere that is spinning at a relatively high rate can generate a flow field that is very similar to that of a sphere in an inviscid flow with added circulation. That is because the boundary layer is forced to spin with the ball due to viscous friction, which produces a circulation around the ball, and hence a side force. At more nominal spin rates, such as those encountered on sports balls, the boundary layers cannot negotiate the adverse pressure gradient on the back part of the ball and they tend to separate, somewhere in the vicinity of the sphere apex. The extra momentum applied to the boundary layer on the retreating side of the ball allows it to negotiate a higher pressure rise before separating and so the separation point moves downstream. The reverse occurs on the advancing side and so the separation point moves upstream, thus generating an asymmetric separation and an upward deflected wake.

Following Newton's Third Law of Motion, the upward deflected wake implies a downward (Magnus) force acting on the ball. The dependence of the boundary layer transition and separation locations on Re can either enhance or oppose (even overwhelm) this effect. Since the effective Re on the advancing side of the ball is higher than that on the retreating side, in the subcritical or (especially) supercritical regimes, the separation location on the advancing side will tend to be more upstream compared to that on the retreating side. This is because the $C_D$ increases with Re in these regions, thus indicating an upstream moving separation location. However, in the region of the critical Re, a situation can develop whereby the advancing side winds up in the supercritical regime with turbulent boundary layer separation, whereas the retreating side is still in the subcritical regime with laminar separation. This would result in a negative Magnus force, since the turbulent boundary layer on the advancing side will now separate later compared to the laminar layer on the retreating side. Therefore, a sphere with topspin for example, would experience an upward aerodynamic force. So in order to maximize the amount of (positive) Magnus force, it helps to be in the supercritical regime and this can be ensured by lowering the critical Re by adding surface roughness (e.g. dimples on a golf ball).

Two basic aerodynamic principles are used to make a baseball curve in flight: spin about an axis perpendicular to the line of flight and asymmetric boundary-layer separation due to seam location on non-spinning baseballs. Consider a pitch, such as the curveball, where spin is imparted to the baseball in an attempt to alter its flight just enough to fool the batter. The baseball for this particular pitch is released such that it acquires topspin about the horizontal axis. As discussed above, under the right conditions, this results in a (downward) Magnus force that makes the ball curve faster towards the ground than it would under the action of gravity alone. The spin parameter (S) is defined as the ratio of the equatorial velocity at the edge of the ball (V) to its translation velocity (U), hence S=V/U. At such a low Re, the flow over the baseball is expected to be subcritical, but the asymmetric separation and deflected wake flow are clearly evident, thus implying an upward Magnus force. At higher Re, the rotating seam would produce an effective roughness capable of causing transition of the laminar boundary layer. Spin rates of up to 35 revs/sec and speeds of up to 45 m/s (100 mph) are achieved by pitchers in baseball. Alaways (3) analyzed high-speed video data of pitched baseballs (by humans and a machine) and used a parameter estimation technique to determine the lift and drag forces on spinning baseballs. For a nominal pitching velocity range of 17 to 35 m/s (38 to 78 mph) and spin rates of 15 to 70 revs/sec, Alaways (3) gave a $C_D$ range of 0.3 to 0.4. This suggests that the flow over a spinning baseball in this parameter range is in the supercritical regime with turbulent boundary layer separation. As discussed above, an asymmetric separation and a positive Magnus force would therefore be obtained in this operating range.

In some wind tunnel measurements of the lateral or lift force (L) on spinning baseballs, Watts and Ferrer (4) concluded that the lift force coefficient, $C_L[=L/(0.5pU^2A)]$ was a function of the spin parameter only, for S=0.5 to 1.5, and at most only a weak function of Re, for Re=30,000 to 80,000. Their trends agreed well with Bearman and Harvey's (5) golf ball data obtained at higher Re (up to 240,000) and lower spin parameter range (S=0 to 0.3). Based on these correlations, Watts and Bahill (6) suggested that for spin rates typically encountered in baseball (S<0.4), a straight line relation between $C_L$ and S with a slope of unity is a good approximation. Alaways' lift measurements on spinning baseballs obtained for Re=100,000 to 180,000 and S=0.1 to 0.5, were in general agreement with the extrapolated trends of the data due to Watts and Ferrer. However, one main difference was that Alaways found a dependence of seam orientation (2-seam versus 4-seam) on the measured lift coefficient. The $C_L$ was higher for the 4-seam case compared to the 2-seam for a given value of S. Watts and Ferrer (4) had also looked for seam orientation effects, but did not find any. Alaways concluded that the seam orientation effects were only significant for S<0.5, and that at higher values of S, the data for the two orientations would collapse, as found by Watts and Ferrer (4). The main difference between these seam orientations is the effective roughness that the flow sees for a given rotation rate. As discussed above, added effective roughness puts the ball deeper into the supercritical regime, thus helping to generate the Magnus force. It is possible that at the higher spin rates (higher values of S), the difference in apparent roughness between the two seam orientations becomes less important.

The main significance of the seam orientation is realized when pitching the fastball. Fastball pitchers wrap their fingers around the ball and release it with backspin so that there is an upward (lift) force on the ball opposing gravity. The fastball would thus drop slower than a ball without spin and since there is a difference between the 2-seam and 4-seam $C_L$, the 4-seam pitch will drop even slower. The maximum measured lift in Alaways' (3) study was equivalent to 48% of the ball's weight.

In golf ball aerodynamics, apart from the lift force (which is generated by the backspin imparted to the ball), the drag and gravitational forces are also important, since the main objective is to "tailor" the flight path of the ball. The lift force is generated due to the Magnus effect and the role of the dimples is to lower the critical Re. The asymmetric separation and downward deflected wake are both apparent and result in an upward lift force on the spinning golf ball. The effect of the dimples is to lower the critical Re. Also, once transition has occurred, the $C_D$ for the golf ball does not increase sharply in the supercritical regime, like that for the baseball, for example. This demonstrates that while the dimples are very effective at tripping the laminar boundary layer, they do not cause the thickening of the turbulent boundary layer associated with positive roughness. Bearman and Harvey (5) conducted a comprehensive study of golf ball aerodynamics using a large spinning model mounted in a wind tunnel over a wide range of Re (40,000 to 240,000) and S (0.02 to 0.3). They found that $C_L$ increased monotonically with S (from about 0.08 to 0.25), as one would expect, and that the $C_D$ also started to increase for S>0.1 (from about 0.27 to 0.32) due to induced drag effects. The trends were found to be independent of Reynolds number for 126,000<Re<238,000. Smits and Smith (8) made wind tunnel measurements on spinning golf balls over the range, 40,000<Re<250,000 and 0.04<S<1.4, covering the range of conditions experienced by the ball when using the full set of clubs. Based on their detailed measurements, which included measurements of the spin decay rate, they proposed a new aerodynamic model of a golf ball in flight. Their measurements were in broad agreement with the observations of Bearman and Harvey, although the new $C_L$ measurements were slightly higher (~0.04) and a stronger dependence of $C_D$ on the spin parameter was exhibited over the entire S range. A new observation was that for Re>200,000, a second decrease in $C_D$ was observed, the first being that due to transition of the boundary layer. Smits and Smith proposed that this could be due to compressibility effects since the local Mach number over the ball reached values of up to 0.5. Note that Bearman and Harvey (5) used a 2.5 times larger model, and so their Mach number was correspondingly lower. Smits and Smith (8) proposed the following model for driver shots in the operating range, 70,000<Re<210,000, 0.08<S<0.2: 192, $C_D = C_{D1} + C_{D2} S + C_{D3} \sin\{\pi(\text{Re}-A_1)/A_2\}$, $C_L = C_{L1} S^{0.4}$, Spin Rate Decay=$\delta\omega/\delta t$ [$d^2/(4U^2)$]=$R_1 S$. Suggested values for the constants are: $C_{D1}$=0.24, $C_{D2}$=0.18, $C_{D3}$=0.06, $C_{L1}$=0.54, $R_1$=0.00002, $A_1$=90,000 and $A_2$=200,000.

Over the years, several dimple designs and layouts have been tried to improve the golf ball aerodynamics. Bearman and Harvey (5) found that hexagonal dimples, instead of the conventional round ones, improved the performance of the ball since the $C_L$ was slightly higher and the $C_D$ lower. It was concluded that the hexagonal dimples were perhaps more efficient boundary layer trips by shedding discrete horseshoe vortices from their straight edges. In seeking to minimize the amount of sideways deflection on an inadvertently sliced drive, a ball was designed (marketed under the name: "Polara") with regular dimples along a "seam" around the ball and shallower dimples on the sides. The ball is placed on the tee with the seam pointing down the fairway, and if only backspin about the horizontal axis is imparted to it, it will generate roughly the same amount of lift as a conventional ball. However, if the ball is heavily sliced, so that it rotates about a near-vertical axis, the reduced overall roughness increases the critical Re, and hence the sideways (undesirable) deflection is reduced. In an extreme version of this design, where the sides are completely bald, a reverse Magnus effect can occur towards the end of the flight which makes a sliced shot end up to the left of the fairway.

Smits and Smith (3) have reported wind-tunnel measurements of the lift and drag coefficients and the spindown rate on a golf ball (mass=0.04593 kg, radius=0.02134 m). Their data demonstrate that the parameter $\omega R^2/v^2$ is an approximately linear function of S, and independent of Reynold's number (for fixed S) in the range (1.0–2.5)×10$^5$. Numerically, the spin-down rate is given by golf ball (Smits): $d\omega/dt = -4.0 \times 10^{-6} v^2/R^2 S$, (5) with v in mph. For v=100 mph, $\dot\omega = \omega/23.8$, implying a spin-down time constant of 23.8 s. Note that $\omega$ scales with $v^2 S/R^2$ in the Smits model and with $v^2 RCL/M$ in the model described above. The two models would therefore appear to be different. However, it should be noted that M scales with R (3) and $C_L$ scales with S, so the scaling of $\omega$ with R, v, and S is essentially identical. In effect, the Smits model provides empirical evidence for the more physically based model described above. It is useful to apply the latter model to the golf ball, then use the Smits data to fix the torque parameter k. Putting in the mass and radius appropriate to a golf ball and assuming that $C_L \approx S$ for a golf ball, an expression identical to Eq. 4 can be derived with the numerical factor equal to 0.0215. This means that for comparable v and k, the time constant for spin decay for a baseball will about 8% larger than that of a golf ball. Using the golf data, we fix the value k=0.020, a factor of 5 smaller than that hypothesized by Adair, corresponding to a factor of 4 larger spin decay time constant.

Tavares et al. have proposed a model for spin decay in which the torque responsible for the spin decay is parametrized as $I d\omega/dt = -R\rho A C_M v^2$, (6) where $C_M$ is the so-called coefficient of moment. The spin decay measurements of Tavares, which utilizes a novel radar gun to measure the time-dependent spin, show that CM≈0.012 S. Using I=0.4MR$^2$ and the values of M and R appropriate to a golf ball, Tavares' result can be expressed as golf ball (Tavares): $d\omega/dt = -5.0 \times 10^{-6} v^2/R^2 S$, (7), with v in mph. This equation is identical in form to Eq. 5 with a numerical factor 25% larger. For example, the spin-down time constant for v=100 mph will be 18.9 sec. More generally, if $I=\alpha M/R^2$ and if $CM=\beta S$, (6) then one rearrange Eq. 6 to derive an expression for the spin decay time constant $\tau$, $\tau \equiv \omega/\dot{\omega}=M/R^2 \, \alpha/\pi\rho\beta v$. (8) Therefore for a given v and fixed values of $\alpha$ and $\beta$, the spin decay time constant scales with $M/R^2$, allowing a comparison among different spherical balls. For example, a golf ball and baseball have $M/R^2=101.2$ kg/m$^2$ and 109.4 kg/m$^2$, respectively, so that the time constant for a baseball will be about 8% larger than for a golf ball.

See, 1 R. K. Adair, The Physics of Baseball (HarperCollins, New York, 2002) 3rd ed., pp 25-26; 2 G. S. Sawicki, M. Hubbard, and W. Stronge, "How to hit home runs: Optimum baseball bat swing parameters for maximum range trajectories," Am. J. Phys. 71, 1152-1162 (2003); 3 A. J. Smits and D. R. Smith, "A new aerodynamic model of a golf ball in flight," Science and Golf II, Proceedings of the 1994 World Scientific Congress on Golf, edited by A. J. Cochran and M. R. Farraly (E&FN Spon., London, 1994), pp. 340-347; 4 G. Tavares, K. Shannon, and T. Melvin, "Golf ball spin decay model based on radar measurements," Science and Golf III, Proceedings of the 1998 World Scientific Congress on Golf, edited by M. R. Farraly and A. J. Cochran (Human Kinetics, Champaign Ill., 1999), pp. 464-472, expressly incorporated by reference in their entirety.

1. R. D. Mehta, "Aerodynamics of Sports Balls," Annual Review of Fluid Mechanics, 17 (1985), 151-189; 2. E. Achenbach, "Experiments on the Flow Past Spheres at Very High Reynolds Number," Journal of Fluid Mechanics, 54 (1972), 565-575; 3. L. W. Alaways, "Aerodynamics of the Curve-Ball: An Investigation of the Effects of Angular Velocity on Baseball Trajectories" (Ph.D. dissertation, University of California, Davis, 1998); 4. R. G. Watts and R. Ferrer, "The Lateral Force on a Spinning Sphere: Aerodynamics of a Curveball," American Journal of Physics, 55 (1987), 40-44; 5. P. W. Bearman and J. K. Harvey, "Golf Ball Aerodynamics," Aeronautical Quarterly, 27 (1976), 112-122; 6. R. G. Watts and A. T. Bahill, Keep your eye on the ball: Curve balls, Knuckleballs, and Fallacies of Baseball (New York, N.Y.: W. H. Freeman, 2000); 7. R. G. Watts and E. Sawyer, "Aerodynamics of a Knuckleball," American Journal of Physics, 43 (1975), 960-963; 8. A J. Smits, A. J. D. R. Smith, "A New Aerodynamic Model of a Golf Ball in Flight," Science and Golf n, ed. A. J. Cochran (London, UK: E. & F.N. Spon, 1994), 341-347; 9. S. J. Haake, S. G. Chadwick, R. J. Dignall, S. Goodwill, and P. Rose, P. "Engineering Tennis Slowing the Game Down," Sports Engineering, 3 (2) (2000), 131-143; 10. A. J. Cooke, "An Overview of Tennis Ball Aerodynamics," Sports Engineering, 3 (2) (2000), 123-129; 11. R. D. Mehta and J. M. Pallis, "The Aerodynamics of a Tennis Ball," submitted to Sports Engineering, January 2001; 12. R. D. Mehta, "Cricket Ball Aerodynamics: Myth Versus Science," The Engineering of Sport. Research, Development and Innovation, ed. A. J. Subic and S. J. Haake (Oxford, UK: Blackwell Science, 2000), pp. 153-167; 13. T. Asai, T. Akatsuka, and S. Haake "The Physics of Football," Physics World, 11-6 (1998), 25-27; 14. Q. Wei, R. Lin, and Z. Liu, "Vortex-Induced Dynamic Loads on a Non-Spinning Volleyball," Fluid Dynamics Research, 3 (1988), 231-237, expressly incorporated herein by reference in their entirety. J. M. Pallis, Aerodynamics and hydrodynamics in sports, Cislunar Aerospace, Inc., San Francisco, Calif., USA Maglischo E. (1982) Swimming Faster: A Comprehensive Guide to the Science of Swimming, Mayfield Publishing Co; Marchaj C (1979) Aero-hydrodynamics Of Sailing. Dodd, Mead & Company, New York; Mehta R. D. (2000) Cricket Ball Aerodynamics: Myth Versus Science. In: The Engineering of Sport. Research, Development and Innovation [eds. A. J. Subic and S. J. Haake], pp. 153-167. Blackwell Science Ltd, Oxford; Mehta R. D. & Pallis J. M. (2001a) Sports Ball Aerodynamics: Effects of Velocity, Spin and Surface roughness. In: Materials and Science in Sports. [eds. F. H. Froes and S. J. Haake], pp. 185-197. The Minerals, Metals and Materials Society [TMS], Warrendale, USA; Mehta R. D. & Pallis J. M. (2001b) The Aerodynamics of a Tennis Ball. Sports Engineering, 4, 177-189; Pallis J., Banks D. & Okamoto K. (2000) 3D Computational Fluid Dynamics in Competitive Sail, Yacht and Windsurf Design. In: The Engineering of Sport. Research, Development and Innovation [eds. A. J. Subic and S. J. Haake], pp. 153167. Blackwell Science Ltd, Oxford; Smits A. J. & Smith D. R. (1994) A New Aerodynamic Model of a Golf Ball in Flight. In: Science and Golf II (ed. A. J. Cochran), pp. 341-347. E. & F.N. Spon, London; Watts R. G. & Sawyer E. (1975) Aerodynamics of a Knuckleball. American Journal of Physics, 43, 960-963; Watts R. G. & Ferrer R. (1987) The Lateral Force on a Spinning Sphere: Aerodynamics of a Curveball. American Journal of Physics, 55, 40-44; Whidden T. & Levitt M. (1990) The Art and Science of Sails. St. Martin's Press, New York, each of which is expressly incorporated herein by reference in their entirety.

Aerodynamics of Winged Craft

Aerodynamic force are well studied. (see en.wikipedia.org/wiki/Flight_dynamics_(fixed-wing_aircraft), expressly incorporated herein by reference. Refer to FIG. 1 for axis definitions.

Components of the Aerodynamic Force

The expression to calculate the aerodynamic force is: $F_A = \int_E (-\Delta p n + f) d\sigma$, where:

$\Delta p$ Difference between static pressure and free current pressure n=outer normal vector of the element of area f=tangential stress vector of the air on the body $\Sigma$=adequate reference surface projected on wind axes, obtaining:

$$F_A = -(i_w D + j_w Q + k_w L)$$

where: D=Drag; Q=Lateral force; and L=Lift

Aerodynamic Coefficients $$\text{Dynamic pressure of the free current} \equiv q = \frac{1}{2}\rho V^2$$

Proper reference surface (wing surface, in case of planes) $\equiv S$ $$\text{Pressure coefficient} \equiv C_p = \frac{p - p_\infty}{q}$$

$$\text{Friction coefficient} \equiv C_f = \frac{f}{q}$$

$$\text{Drag coefficient} \equiv C_d = \frac{D}{qS} = -\frac{1}{S}\int_\Sigma [(-C_p)n \cdot i_w + C_f t \cdot i_w] d\sigma$$

$$\text{Lateral force coefficient} \equiv C_Q = \frac{Q}{qS} = -\frac{1}{S}\int_\Sigma [(-C_p)n \cdot j_w + C_f t \cdot j_w]d\sigma$$

$$\text{Lift coefficient} \equiv C_{LO} = \frac{L}{qS} = -\frac{1}{S}\int_\Sigma [(-C_p)n \cdot k_w + C_f t \cdot k_w]d\sigma$$

It is necessary to know $C_p$ and $C_f$ in every point on the considered surface.

Dimensionless Parameters and Aerodynamic Regimes

In absence of thermal effects, there are three remarkable dimensionless numbers:

$$\text{Compressibility of the flow: Mach number} \equiv M = \frac{V}{a}$$

$$\text{Viscosity of the flow: Reynolds number} \equiv Re = \frac{\rho V l}{\mu}$$

$$\text{Rarefaction of the flow: Knudsen number} \equiv Kn = \frac{\lambda}{l}$$

where: $\alpha = \sqrt{kR\theta}$ speed of sound;

R≡gas constant by mass unity; θ≡absolute temperature, and $$\lambda = \frac{\mu}{\rho}\sqrt{\frac{\pi}{2R\theta}} = \frac{M}{Re}\sqrt{\frac{k\pi}{2}} \equiv \text{mean free path.}$$

According to λ there are three possible rarefaction grades and their corresponding motions are called:

Continuum current (negligible rarefaction):

$$\frac{M}{Re} \ll 1$$

Transition current (moderate rarefaction):

$$\frac{M}{Re} \approx 1$$

Free molecular current (high rarefaction):

$$\frac{M}{Re} \gg 1$$

The motion of a body through a flow is considered, in flight dynamics, as continuum current. In the outer layer of the space that surrounds the body viscosity will be negligible. However viscosity effects will have to be considered when analyzing the flow in the nearness of the boundary layer.

Depending on the compressibility of the flow, different kinds of currents can be considered: Incompressible subsonic current: 0<M<0.3; Compressible subsonic current: 0.3<M 0.8; Transonic current: 0.8<Mm<1.2; Supersonic current: 1.2<M<5; and Hypersonic current: 5<M In most cases, the human-powered embodiments according to the present technology fall into the incompressible subsonic current regime, though in a baseball embodiment, the bottom end of the compressible subsonic range may be approached on some surfaces due to spin.

In an embodiment with mechanism-powered rotation, higher rotational speeds can be achieved, and thus parts of the system can reach the compressible subsonic range or above.

Drag Coefficient Equation and Aerodynamic Efficiency

If the geometry of the body is fixed and in case of symmetric flight (β=0 and Q=0), pressure and friction coefficients are functions depending on: $C_p = C_p(\alpha, M, Re, P)$; $C_f = C_f(\alpha, M, Re, P)$, where: α≡angle of attack, and P≡considered point of the surface.

Under these conditions, drag and lift coefficient are functions depending exclusively on the angle of attack of the body and Mach and Reynolds numbers. Aerodynamic efficiency, defined as the relation between lift and drag coefficients, will depend on those parameters as well.

$$\begin{cases} C_D = C_D(\alpha, M, Re) \\ C_L = C_L(\alpha, M, Re) \\ E = E(\alpha, M, Re) = \frac{C_L}{C_D} \end{cases}$$

It is also possible to get the dependency of the drag coefficient respect to the lift coefficient. This relation is known as the drag coefficient equation: $C_D = C_D(C_L, M\,Re)$ drag coefficient equation.

The aerodynamic efficiency has a maximum value, $E_{max}$, respect to $C_L$ where the tangent line from the coordinate origin touches the drag coefficient equation plot.

The drag coefficient, $C_D$, can be decomposed in two ways. First typical decomposition separates pressure and friction effects:

$$C_D = C_{Df} + C_{Dp} \begin{cases} C_{Df} = \frac{D}{sS} = -\frac{1}{S}\int_\Sigma C_f t \cdot i_w d\sigma \\ C_{Dp} = \frac{D}{sS} = -\frac{1}{S}\int_\Sigma (-C_p)n \cdot i_w d\sigma \end{cases}$$

There's a second typical decomposition taking into account the definition of the drag coefficient equation. This decomposition separates the effect of the lift coefficient in the equation, obtaining two terms $C_{D0}$ and $C_{D1}$. $C_{D0}$ is known as the parasitic drag coefficient and it is the base drag coefficient at zero lift. $C_{Di}$ is known as the induced drag coefficient and it is produced by the body lift:

$$C_D = C_{D0} + C_{Di} \begin{cases} C_{D0} = (C_D)_{C_L} \\ C_{Di} \end{cases}$$

Parabolic and Generic Drag Coefficient

A good attempt for the induced drag coefficient is to assume a parabolic dependency of the lift $C_{Di} = kC_L^2 \Rightarrow C_D = C_{D0} + kC_L^2$ Aerodynamic efficiency is now calculated as:

$$E = \frac{C_L}{C_{D0} + kC_L^2} \Rightarrow \begin{cases} E_{max} = \frac{1}{2\sqrt{kC_{D0}}} \\ (C_L)_{E_{max}} = \sqrt{\frac{C_{D0}}{k}} \\ (C_{Di})_{E_{max}} = C_{D0} \end{cases}$$

If the configuration of a plane is symmetrical respect to the XY plane, minimum drag coefficient equals to the parasitic drag of the plane: $C_{Dmin}=(C_D)_{C_L=0}=C_{D0}$ In case the configuration is asymmetrical respect to the XY plane, however, minimum drag differs from the parasitic drag. On these cases, a new approximate parabolic drag equation can be traced leaving the minimum drag value at zero lift value.

$C_{Dmin}=C_{DM}\neq(C_D)_{C_L=0};\ C_D=C_{DM}+k(C_L-C_{Lm})^2$

Variation of Parameters with the Mach Number

The Coefficient of pressure varies with Mach number by the relation:

$$C_p = \frac{C_{p0}}{\sqrt{|1-M_\infty^2|}},$$

where
  $C_p$ is the compressible pressure coefficient
  $C_{90}$ is the incompressible pressure coefficient
  $M_\infty$ is the freestream Mach number.

This relation is reasonably accurate for 0.3<M<0.7 and when M=1 it becomes ∞ which is impossible physical situation and is called Prandtl-Glauert singularity.

Dynamic Stability and Control

Longitudinal Modes

It is common practice to derive a fourth order characteristic equation to describe the longitudinal motion, and then factorize it approximately into a high frequency mode and a low frequency mode. The approach adopted here is using qualitative knowledge of aircraft behavior to simplify the equations from the outset, reaching the result by a more accessible route.

The two longitudinal motions (modes) are called the short period pitch oscillation (SPPO), and the phugoid.

Short-Period Pitch Oscillation

A short input (in control systems terminology an impulse) in pitch (generally via the elevator in a standard configuration fixed-wing aircraft) will generally lead to overshoots about the trimmed condition. The transition is characterized by a damped simple harmonic motion about the new trim. There is very little change in the trajectory over the time it takes for the oscillation to damp out.

Generally this oscillation is high frequency (hence short period) and is damped over a period of a few seconds. A real-world example would involve a pilot selecting a new climb attitude, for example 5° nose up from the original attitude. A short, sharp pull back on the control column may be used, and will generally lead to oscillations about the new trim condition. If the oscillations are poorly damped the aircraft will take a long period of time to settle at the new condition, potentially leading to Pilot-induced oscillation. If the short period mode is unstable it will generally be impossible for the pilot to safely control the aircraft for any period of time.

This damped harmonic motion is called the short period pitch oscillation, it arises from the tendency of a stable aircraft to point in the general direction of flight. It is very similar in nature to the weathercock mode of missile or rocket configurations. The motion involves mainly the pitch attitude θ (theta) and incidence α (alpha). The direction of the velocity vector, relative to inertial axes is θ−α. The velocity vector is: $u_f=U\cos(\theta-\alpha)$; $w_f=U\sin(\theta-\alpha)$, where $u_f$, $w_f$ are the inertial axes components of velocity. According to Newton's Second Law, the accelerations are proportional to the forces, so the forces in inertial axes are:

$$X_f = m\frac{du_f}{dt} = m\frac{dU}{dt}\cos(\theta-\alpha) - mU\frac{d(\theta-\alpha)}{dt}\sin(\theta-\alpha)$$

$$Z_f = m\frac{dw_f}{dt} = m\frac{dU}{dt}\sin(\theta-\alpha) - mU\frac{d(\theta-\alpha)}{dt}\cos(\theta-\alpha)$$

where m is the mass. By the nature of the motion, the speed variation $$m\frac{dU}{dt}$$

is negligible over the period of the oscillation, so:

$$X_f = -mU\frac{d(\theta-\alpha)}{dt}\sin(\theta-\alpha);\ Z_f = -mU\frac{d(\theta-\alpha)}{dt}\cos(\theta-\alpha)$$

But the forces are generated by the pressure distribution on the body, and are referred to the velocity vector. But the velocity (wind) axes set is not an inertial frame so we must resolve the fixed axis forces into wind axes. Also, for fixed wing craft, we are generally only concerned with the force along the z-axis:

$$Z = -Z_f\cos(\theta-\alpha) + X_f\sin(\theta-\alpha),\ \text{or}\ Z = -mU\frac{d(\theta-\alpha)}{dt}.$$

In words, the wind axis force is equal to the centripetal acceleration.

The moment equation is the time derivative of the angular momentum:

$$M = B\frac{d^2\theta}{dt^2},$$

where M is the pitching moment, and B is the moment of inertia about the pitch axis. Let:

$$\frac{d\theta}{dt} = q,$$

the pitch rate. The equations of motion, with all forces and moments referred to wind axes are, therefore:

$$\frac{d\alpha}{dt} = q + \frac{Z}{mU}, \frac{dq}{dt} = \frac{M}{B}.$$

In the typical fixed wing craft example, we are only concerned with perturbations in forces and moments, due to perturbations in the states $\alpha$ and $q$, and their time derivatives. These are characterized by stability derivatives determined from the flight condition. The possible stability derivatives are:

$Z_\alpha$ Lift due to incidence, this is negative because the z-axis is downwards whilst positive incidence causes an upwards force.

$Z_q$ Lift due to pitch rate, arises from the increase in tail incidence, hence is also negative, but small compared with $Z_\alpha$.

$M_\alpha$ Pitching moment due to incidence—the static stability term. Static stability requires this to be negative.

$M_q$ Pitching moment due to pitch rate—the pitch damping term, this is always negative.

Since the trailing portion of the craft is operating in the flowfield of the leading portion, changes in the leading portion incidence cause changes in the downwash, but there is a delay for the change in flowfield to affect the trailing portion lift, this is represented as a moment proportional to the rate of change of incidence: $M_{\dot\alpha}$ Increasing the leading portion incidence without increasing the trailing portion incidence produces a nose up moment, so $M_{\dot\alpha}$ is expected to be positive.

The equations of motion, with small perturbation forces and moments become:

$$\frac{d\alpha}{dt} = \left(1 + \frac{Z_q}{mU}\right)q + \frac{Z_\alpha}{mU}\alpha; \frac{dq}{dt} = \frac{M_q}{B}q + \frac{M_\alpha}{B}\alpha + \frac{M_{\dot\alpha}}{B}\dot\alpha$$

These may be manipulated to yield as second order linear differential equation in $\alpha$:

$$\frac{d^2\alpha}{dt^2} - \left(\frac{Z_\alpha}{mU} + \frac{M_q}{B} + \left(1 + \frac{Z_q}{mU}\right)\frac{M_{\dot\alpha}}{B}\right)\frac{d\alpha}{dt} + \left(\frac{Z_\alpha}{mU}\frac{M_q}{B} - \frac{M_\alpha}{B}\left(1 + \frac{Z_q}{mU}\right)\right)\alpha = 0$$

This represents a damped simple harmonic motion.
We should expect $$\frac{Z_q}{mU}$$

to be small compared with unity, so the coefficient of $\alpha$ (the 'stiffness' term) will be positive, provided $$M_\alpha < \frac{Z_\alpha}{mU}M_q.$$

This expression is dominated by $M_\alpha$, which defines the longitudinal static stability of the aircraft, it must be negative for stability. The damping term is reduced by the downwash effect, and it is difficult to design an aircraft with both rapid natural response and heavy damping. Usually, the response is underdamped but stable.

Phugoid

If the control is held fixed, the aircraft will not maintain straight and level flight, but will start to dive, level out and climb again. It will repeat this cycle until the pilot intervenes. This long period oscillation in speed and height is called the phugoid mode. This is analyzed by assuming that the SSPO performs its proper function and maintains the angle of attack near its nominal value. The two states which are mainly affected are the climb angle $\gamma$ (gamma) and speed. The small perturbation equations of motion are:

$$mU\frac{d\gamma}{dt} = -Z,$$

which means the centripetal force is equal to the perturbation in lift force.

For the speed, resolving along the trajectory:

$$m\frac{du}{dt} = X - mg\gamma,$$

where g is the acceleration due to gravity at the earth's surface. The acceleration along the trajectory is equal to the net x-wise force minus the component of weight. We should not expect significant aerodynamic derivatives to depend on the climb angle, so only $X_u$ and $Z_u$ need be considered. $X_u$ is the drag increment with increased speed, it is negative, likewise $Z_u$ is the lift increment due to speed increment, it is also negative because lift acts in the opposite sense to the z-axis.

The equations of motion become:

$$mU\frac{d\gamma}{dt} = -Z_u u; m\frac{du}{dt} = X_u u = mg\gamma.$$

These may be expressed as a second order equation in climb angle or speed perturbation:

$$\frac{d^2 u}{dt^2} - \frac{X_u}{m}\frac{du}{dt} - \frac{Z_u g}{mU}u = 0$$

Now lift is very nearly equal to weight:

$$Z = \frac{1}{2}\rho U_{C_L}^2 S_w = W,$$

where $\rho$ is the air density, $S_w$ is the wing area, W the weight and $C_L$ is the lift coefficient (assumed constant because the incidence is constant), we have, approximately:

$$Z_u = \frac{2W}{U} = \frac{2\,mg}{U}.$$

The period of the phugoid, T, is obtained from the coefficient of u:

$$\frac{2\pi}{T} = \sqrt{\frac{2g^2}{U^2}}, \text{ or: } T = \frac{2\pi U}{\sqrt{2}\,g}.$$

Since the lift is very much greater than the drag, the phugoid is at best lightly damped. Heavy damping of the pitch rotation or a large rotational inertia increase the coupling between short period and phugoid modes, so that these will modify the phugoid.

Equations of Motion

Dutch Roll is induced in a fixed wing aircraft by an impulse input to the rudder. The yaw plane translational equation, as in the pitch plane, equates the centripetal acceleration to the side force:

$$\frac{d\beta}{dt} = \frac{Y}{mU} - r,$$

where β (beta) is as before sideslip angle, γ the side force and r the yaw rate.

The moment equations are a bit trickier. The trim condition is with the aircraft at an angle of attack with respect to the airflow, the body x-axis does not align with the velocity vector, which is the reference direction for wind axes. In other words, wind axes are not principal axes (the mass is not distributed symmetrically about the yaw and roll axes). Consider the motion of an element of mass in position −z,x in the direction of the y-axis, i.e. into the plane of the paper.

If the roll rate is p, the velocity of the particle is: v=−pz+xr.

Made up of two terms, the force on this particle is first the proportional to rate of v change, the second is due to the change in direction of this component of velocity as the body moves. The latter terms gives rise to cross products of small quantities (pq,pr,qr), which are later discarded. In this analysis, they are discarded from the outset for the sake of clarity. In effect, we assume that the direction of the velocity of the particle due to the simultaneous roll and yaw rates does not change significantly throughout the motion. With this simplifying assumption, the acceleration of the particle becomes:

$$\frac{dv}{dt} = -\frac{dp}{dt}z + \frac{dr}{dt}x$$

The yawing moment is given by:

$$\delta m x \frac{dv}{dt} = -\frac{dp}{dt} x z \delta m + \frac{dr}{dt} x^2 \delta m$$

There is an additional yawing moment due to the offset of the particle in the y direction:

$$\frac{dr}{dt} y^2 \delta m.$$

The yawing moment is found by summing over all particles of the body:

$$N = -\frac{dp}{dt}\int xz\,dm + \frac{dr}{dt}\int x^2 + y^2\,dm = -E\frac{dp}{dt} + C\frac{dr}{dt}$$

where N is the yawing moment, E is a product of inertia, and C is the moment of inertia about the yaw axis. A similar reasoning yields the roll equation:

$$L = A\frac{dp}{dt} - E\frac{dr}{dt},$$

where L is the rolling moment and A the roll moment of inertia.

As noted above, in a rotating disk craft, the base yaw is not zero, but remains relatively constant. Due to gyroscopic effect, any change in yaw axis with respect to an inertial reference will create forces along the other axes, thus modifying the behavior with respect to fixed wing aircraft.

Lateral and Longitudinal Stability Derivatives

The states are β (sideslip), r (yaw rate), and p (roll rate), with moments N (yaw) and L (roll), and force Y (sideways). There are nine stability derivatives relevant to this motion, the following explains how they originate.

$Y_\beta$ Side force due to side slip (in absence of yaw). Sideslip generates a sideforce (from the fin and the fuselage of a fixed wing aircraft). In addition, if the wing has dihedral, side slip at a positive roll angle increases incidence on the starboard wing and reduces it on the port side, resulting in a net force component directly opposite to the sideslip direction. Sweep back of the wings has the same effect on incidence, but since the wings are not inclined in the vertical plane, backsweep alone does not affect $Y_\beta$. However, anhedral may be used with high backsweep angles in high performance aircraft to offset the wing incidence effects of sideslip. This does not reverse the sign of the wing configuration's contribution to $Y_\beta$ (compared to the dihedral case).

$Y_p$ Side force due to roll rate. Roll rate causes incidence at the fin, which generates a corresponding side force. Also, positive roll (starboard wing down) increases the lift on the starboard wing and reduces it on the port. If the wing has dihedral, this will result in a side force momentarily opposing the resultant sideslip tendency. Anhedral wing and or stabilizer configurations can cause the sign of the side force to invert if the fin effect is swamped.

$Y_r$ Side force due to yaw rate. Yawing generates side forces due to incidence at the rudder, fin and fuselage.

$N_\beta$ Yawing moment due to sideslip forces. Sideslip in the absence of rudder input causes incidence on the fuselage and empennage, thus creating a yawing moment counteracted only by the directional stiffness which would tend to point the aircraft's nose back into the wind in horizontal flight conditions. Under sideslip conditions at a given roll angle $N_\beta$ will tend to point the nose into the sideslip direction even without rudder input, causing a downward spiraling flight.

$N_p$ Yawing moment due to roll rate. Roll rate generates fin lift causing a yawing moment and also differentially alters the lift on the wings, thus affecting the induced drag contribution of each wing, causing a (small) yawing moment contribution. Positive roll generally causes positive $N_p$ values unless the empennage is anhedral or fin is below the roll axis. Lateral force components resulting from dihedral or anhedral wing lift differences has little effect on $N_p$ because the wing axis is normally closely aligned with the center of gravity.

$N_r$ Yawing moment due to yaw rate. Yaw rate input at any roll angle generates rudder, fin and fuselage force vectors which dominate the resultant yawing moment. Yawing also increases the speed of the outboard wing whilst slowing down the inboard wing, with corresponding changes in drag causing a (small) opposing yaw moment. $N_r$ opposes the inherent directional stiffness which tends to point the aircraft's nose back into the wind and always matches the sign of the yaw rate input.

$L_\beta$ Rolling moment due to sideslip. A positive sideslip angle generates empennage incidence which can cause positive or negative roll moment depending on its configuration. For any non-zero sideslip angle dihedral wings causes a rolling moment which tends to return the aircraft to the horizontal, as does back swept wings. With highly swept wings the resultant rolling moment may be excessive for all stability requirements and anhedral could be used to offset the effect of wing sweep induced rolling moment.

$L_r$ Rolling moment due to yaw rate. Yaw increases the speed of the outboard wing whilst reducing speed of the inboard one, causing a rolling moment to the inboard side. The contribution of the fin normally supports this inward rolling effect unless offset by anhedral stabilizer above the roll axis (or dihedral below the roll axis).

$L_p$ Rolling moment due to roll rate. Roll creates counter rotational forces on both starboard and port wings whilst also generating such forces at the empennage. These opposing rolling moment effects have to be overcome by the aileron input in order to sustain the roll rate. If the roll is stopped at a non-zero roll angle the upward $L_\beta$ rolling moment induced by the ensuing sideslip should return the aircraft to the horizontal unless exceeded in turn by the downward $L_r$ rolling moment resulting from sideslip induced yaw rate. Longitudinal stability could be ensured or improved by minimizing the latter effect.

Lateral Modes

With a symmetrical rocket or missile, the directional stability in yaw is the same as the pitch stability; it resembles the short period pitch oscillation, with yaw plane equivalents to the pitch plane stability derivatives. For this reason pitch and yaw directional stability are collectively known as the 'weathercock' stability of the missile.

Fixed wing aircraft lack the symmetry between pitch and yaw, so that directional stability in yaw is derived from a different set of stability derivatives, the yaw plane equivalent to the short period pitch oscillation, which describes yaw plane directional stability is called Dutch roll. Unlike pitch plane motions, the lateral modes involve both roll and yaw motion.

Dutch Roll. Since Dutch roll is a handling mode, analogous to the short period pitch oscillation, any effect it might have on the trajectory may be ignored. The body rate r is made up of the rate of change of sideslip angle and the rate of turn. Taking the latter as zero, assuming no effect on the trajectory, for the limited purpose of studying the Dutch roll:

$$\frac{d\beta}{dt} = -r.$$

The yaw and roll equations, with the stability derivatives become:

$$C\frac{dr}{dt} - E\frac{dp}{dt} = N_\beta \beta - N_r \frac{d\beta}{dt} + N_p p \text{ (yaw);}$$

$$A\frac{dp}{dt} - E\frac{dr}{dt} = L_\beta \beta - L_r \frac{d\beta}{dt} + L_p p \text{ (roll)}$$

The inertial moment due to the roll acceleration is considered small compared with the aerodynamic terms, so the equations become:

$$-C\frac{d^2\beta}{dt^2} = N_\beta \beta - N_r \frac{d\beta}{dt} + N_p p; \quad E\frac{d^2\beta}{dt^2} = L_\beta \beta - L_r \frac{d\beta}{dt} + L_p p$$

This becomes a second order equation governing either roll rate or sideslip:

$$\left(\frac{N_p}{C}\frac{E}{A} - \frac{L_p}{A}\right)\frac{d^2\beta}{dt^2} + \left(\frac{L_p}{A}\frac{N_r}{C} - \frac{N_p}{C}\frac{L_r}{A}\right)\frac{d\beta}{dt} - \left(\frac{L_p}{A}\frac{N_\beta}{C} - \frac{L_\beta}{A}\frac{N_p}{C}\right)\beta = 0$$

The equation for roll rate is identical. But the roll angle, φ (phi) is given by:

$$\frac{d\phi}{dt} = p.$$

If p is a damped simple harmonic motion, so is φ, but the roll must be in quadrature with the roll rate, and hence also with the sideslip. The motion consists of oscillations in roll and yaw, with the roll motion lagging 90 degrees behind the yaw. The wing tips trace out elliptical paths. Note that in a rotating disk, yaw is continuous, and governed by the initial spin, rotational drag, and then slightly perturbed by other factors.

Stability

Stability requires the "stiffness" and "damping" terms to be positive. These are:

$$\frac{\frac{L_p}{A}\frac{N_r}{C} - \frac{N_p}{C}\frac{L_r}{A}}{\frac{N_p}{C}\frac{E}{A} - \frac{L_p}{A}} \text{ (damping);} \quad \frac{\frac{L_\beta}{A}\frac{N_p}{C} - \frac{L_p}{A}\frac{N_\beta}{C}}{\frac{N_p}{C}\frac{E}{A} - \frac{L_p}{A}} \text{ (stiffness)}$$

The denominator is dominated by $L_p$, the roll damping derivative, which is always negative, so the denominators of these two expressions will be positive.

Considering the "stiffness" term: $-L_p N_\beta$ will be positive because $L_p$ is always negative and $N_\beta$ is positive by design. $L_\beta$ is usually negative, whilst $N_p$ is positive. Excessive dihedral can destabilize the Dutch roll, so configurations with highly swept wings require anhedral to offset the wing sweep contribution to $Y_\beta$.

The damping term is dominated by the product of the roll damping and the yaw damping derivatives, these are both negative, so their product is positive. The Dutch roll should therefore be damped.

The motion is accompanied by slight lateral motion of the center of gravity and a more "exact" analysis will introduce terms in $Y_\beta$ etc. In view of the accuracy with which stability derivatives can be calculated, this is unnecessary.

Roll subsidence. Generating a control signal that causes an increase in roll rate and then ceasing the signal causes a net change in roll orientation. The roll motion with respect to aerodynamic factors is characterized by an absence of natural stability, there are no stability derivatives which generate moments in response to the inertial roll angle. A roll disturbance induces a roll rate which is only canceled by pilot or autopilot intervention. In a rotating disk, the gyroscopic action stabilizes roll angle independent of aerodynamics. This takes place with insignificant changes in sideslip or yaw rate, so the equation of motion reduces to:

$$A\frac{dp}{dt} = L_p p$$

$L_p$ is negative, so the roll rate will decay with time. The roll rate reduces to zero, but there is no direct control over the roll angle.

Spiral mode. Simply holding the stick still, when starting with the wings near level, an aircraft will usually have a tendency to gradually veer off to one side of the straight flightpath. This is the (slightly unstable) spiral mode.

Spiral Mode Trajectory.

In studying the trajectory, it is the direction of the velocity vector, rather than that of the body, which is of interest. The direction of the velocity vector when projected on to the horizontal will be called the track, denoted μ (mu). The body orientation is called the heading, denoted ψ (psi). The force equation of motion includes a component of weight:

$$\frac{d\mu}{dt} = \frac{Y}{mU} + \frac{g}{U}\phi$$

where g is the gravitational acceleration, and U is the speed.

Including the stability derivatives:

$$\frac{d\mu}{dt} = \frac{Y_\beta}{mU}\beta + \frac{Y_r}{mU}r + \frac{Y_p}{mU}p + \frac{g}{U}\phi$$

Roll rates and yaw rates (in a rotating disk, the change in yaw rate is expected to be small) are expected to be small, so the contributions of $Y_r$ and $Y_p$ will be ignored.

The sideslip and roll rate vary gradually, so their time derivatives are ignored. The yaw and roll equations reduce to:

$$N_\beta\beta + N_r\frac{d\mu}{dt} + N_p p = 0 \text{ (yaw)}; L_\beta\beta + L_r\frac{d\mu}{dt} + L_p p = 0 \text{ (roll)}.$$

Solving for β and p:

$$\beta = \frac{(L_r N_p - L_p N_r)}{(L_p N_\beta - N_p L_\beta)}\frac{d\mu}{dt}; p = \frac{(L_\beta N_r - L_r N_\beta)}{(L_p N_\beta - N_p L_\beta)}\frac{d\mu}{dt}$$

Substituting for sideslip and roll rate in the force equation results in a first order equation in roll angle:

$$\frac{d\phi}{dt} = mg\frac{(L_\beta N_r - N_\beta L_r)}{mU(L_p N_\beta - N_p L_\beta) - Y_\beta(L_r N_p - L_p N_r)}\phi$$

This is an exponential growth or decay, depending on whether the coefficient of φ is positive or negative. The denominator is usually negative, which requires $L_\beta N_r > N_\beta L_r$ (both products are positive). This is in direct conflict with the Dutch roll stability requirement, and it is difficult to design a fixed wing aircraft for which both the Dutch roll and spiral mode are inherently stable.

Since the spiral mode has a long time constant, the pilot can intervene to effectively stabilize it, but an aircraft with an unstable Dutch roll would be difficult to fly. It is usual to design the fixed wing aircraft with a stable Dutch roll mode, but slightly unstable spiral mode.

Thus, for fixed wing aircraft, there is a well-developed mathematical model of flight dynamics. Other than the gyroscopic effects, the flight dynamics of a rotating disk will generally be less complex than a fixed wing aircraft, since yaw and change in yaw is largely irrelevant to the dynamics.

ROTATING AERODYNAMIC STRUCTURES. FIG. 1B defines various parameters of a spinning disk aerodynamic projectile. See, Scdary, A, "The Aerodynamics and Stability of Flying Discs", Oct. 30, 2007, large.stanford.edu/courses/2007/ph210/scodary1/. To first approximation, a flying disc is simply an axi-symmetric wing with an elliptical cross-section. Of course, most ordinary wings would be unstable if simply thrown through the air, but the essential mechanics of its lift are mostly ordinary. The lift on a body is described by the lift equation, $L=0.5 C_L A\rho V^2$, Where A is the cross-sectional area, ρ is the density, V is the free-stream velocity, and $C_L$ is the coefficient of lift, a semi-empirical constant that is a function of the shape of the object and its angle of attack with respect to the free-stream velocity of the fluid. Typically $C_L$ increases linearly with the angle of attack, a, until some critical angle where the lift drops off steeply. If a typical commercial flying disc were a perfectly flat disc, $C_L$ would be zero at an angle of attack of zero. Although, the camber or shape of the disc allows for non-zero lift at an angle of attack zero. The coefficient of lift at zero angle of attack is often denoted $C_{L0}$, and the increase of $C_L$ with a is denoted $C_{L\alpha}$. Hence, $C_L = C_{L0} + C_{L\&alpha}\alpha$. Empirically, $C_{L0}$ is roughly 0.188 and $C_{L\alpha}$ is 2.37 for a typical flying disc. [1] This means an angle of attack of 15 degrees would have a coefficient of lift of roughly 0.62. While this value varies from disc to disc, it is to be expected that this quantity will be of order unity. The drag on the flying disc is defined in a fashion similar to that of the disk. The equation is now $D = 0.5 C_D A\rho V^2$. The only difference from the lift is that the coefficient of lift has been replaced by the analogous coefficient of drag. Unlike lift, drag typically depends on the angle of attack quadratically. So now, $C_D = C_{D0} + C_{D\alpha}\alpha^2$, and the empirical values have been found to be approximately $C_{D0} = 0.15$ and $C_{D\alpha} = 1.24$. [1] The maximum ratio of lift to drag occurs around 15 degrees. For a wing with an elliptical cross-section, the center of pressure due to lift is offset ahead of the center of gravity. Therefore, if one were to simply throw a flying disc, the lift would also cause a moment on the disc and cause it to flip over backwards. The key to the stability of the flying disc is its spin. The spin of the disc results in gyroscopic stability or pitch stiffness, and the greater the speed, the greater the stability. Typically the moment due to lift and drag pressure on the disc is nearly perpendicular to the angular momentum of the spinning disc, and thus the disc experiences gyroscopic precession. The frequency of precession is $\Omega = M/I\omega$, where M is the moment, I is the moment of inertia of the disc about its axis of symmetry, and w is the angular frequency of the disc's spin. This precession causes the disc to wobble as a gyroscope wobbles when its axis of spin is perturbed from the direction of gravity. Likewise, by spinning the disc, one trades roll stability for pitch stiffness. The equations of motion of the system, accounting for the external forces and moments is found to be [2] $m(dv/dt+\Omega \times v)=F=mg$ and $I\, d\omega/dt+\Omega \times I\omega=M$. The details of F and M depend on the aerodynamics of the disc. The typical mass of a flying disc is between 90 g and 175 g. The lighter discs maximize duration of flight, and the heavier discs will maximize distance thrown and minimize the effects of wind and stray currents. It is also apparent from the equations of motion that a greater moment of inertia I would also increase stability. The viscous no-slip condition at the boundary of the spinning disc causes the disc to generate some degree of vorticity. The circulation about the disc and the free-stream flow of air past the disc causes a force in the direction of the cross product of V with the angular momentum of the disc. This is attributed to the Magnus Effect, which is caused by one side of the disc having a higher free-stream velocity than the other, causing a pressure gradient. This causes a flying disc thrown clockwise to veer to the left, which is particularly noticeable as the viscous effects become more pronounced at the end of the flight.

Note that the center of pressure and the center of gravity are displaced. According to the present technology the center of gravity may be repositioned.

The disk rim at the edge of flying disc serves multiple important purposes. First and foremost, the thick rim eases gripping and tossing the disc. Without the thick rim, throwing a flying disc would be significantly more difficult. Additionally, the thick rim significantly increases the moment of inertia of the disc about the axis of symmetry, enhancing the stability of the disc. A flat plate without a thick rim, such as a dinner plate, has much less stability than a typical flying disc. Finally, the cupped region on the bottom of the disc substantially increases the coefficient of drag from the vertical profile, while the horizontal profile is still somewhat streamlined. As a result, as the disc begins to fall, the cupped profile behaves like a parachute, and the horizontal component of drag dwarfs the vertical component. This allows the flying disc to be thrown much further than a ball of equivalent velocity.

The top surface of a typical flying has several concentric grooves, which serve to trigger turbulence at the leading edge, which helps to keep the boundary layer of the flow over the top of the disc attached to the disc, substantially increasing lift. This effect also allows the disc to be thrown at a higher angle of attack before it stalls. A stall occurs when the flow separates from an object, causing a catastrophic decrease in lift and increase in drag. One can cause a Frisbee to stall by simply throwing it at a very high angle of attack. The disc will quickly destabilize and fall to the ground. This permits an option of modulating the height of the ridges above the upper surface of the disk, to steer the disk. [1] S. Hummel and M. Hubbard, "Identification of Frisbee Aerodynamic Coefficients using Flight Data," The International Conference on the Engineering of Sport, (Kyoto, Japan, September 2002). [2] R. D. Lorenz, "Flight Dynamics Measurements on an Instrumented Frisbee," *Measurement Science and Technology*, (2005) [3] J. R. Potts and W. J. Crowther, "Visualisation of the Flow Over a Disc-wing," 9th Intl. Symp. on Flow Visualization, (2000). [3] J. R. Potts and W. J. Crowther, "Frisbee™ Aerodynamics," 20th AIAA Applied Aerodynamics Conference and Exhibit, (St. Louis, Mo., 2002).

See, Lorenz, Ralph D. Spinning flight: dynamics of Frisbees, boomerangs, samaras, and skipping stones. Springer Science & Business Media, 2007, expressly incorporated herein by reference in its entirety. The spin axis of a rotating body precesses in a direction apparently orthogonal to the applied torque. The angular momentum of a rotating body is equal to the product of its moment of inertia (integral of mass times distance from axis of rotation) and its angular velocity. On the other hand, the rotational kinetic energy is equal to half of the product of the moment of inertia and the square of the angular velocity. Unless external moments are applied, the angular momentum of a system must remain constant. In general the mechanics of rotation can be described by a set of expressions known as the Euler equations. The inertia properties can be represented by a tensor (a matrix of 9 numbers), but for most applications only three numbers (and often only two) are needed: Only the three diagonal terms in the tensor are nonzero. These are the moments of inertia about three orthogonal axes, the so-called principal axes. The principal axes are the axis of maximum moment of inertia, the axis of minimum moment of inertia, and the axis orthogonal to the other two. It can be shown that stable rotation only occurs about the minimum or maximum axis. Although it is possible to spin an object about its long axis, this motion is not necessarily stable in the long term. Specifically, internal energy losses force the object to ultimately rotate about the axis of maximum moment of inertia. However, internal energy dissipation (for example, flexing of imperfectly elastic elements or flow of viscous fluids) can absorb energy. If an object is spinning about an axis other than that of maximum moment of inertia, and energy is dissipated, the system must compensate for a drop in angular velocity by increasing the moment of inertia. In other words, it rotates such that the (constant) angular momentum vector becomes aligned with the maximum moment of inertia—the only way of reducing energy while keeping the angular momentum constant is to increase I as w decreases. The rotation about the axis of maximum moment of inertia, the stable end state, is sometimes called a "flat spin," since the object sweeps out a flat plane as it rotates.

Precession is the movement of an angular momentum vector by the application of an external moment. Nutation is a conical motion due to the misalignment of the axis of maximum moment of inertia and the angular momentum vector. The maximum moment axis of the vehicle essentially rolls around in a cone around the angular momentum vector. Nutation is usually a very transient motion, since it is eliminated by energy dissipation. Coning refers to the apparent conical motion indicated by a sensor which is not aligned with a principal axis. Even in a perfectly steady rotation, a misaligned sensor will appear to indicate motion in another axis. A torque can be impulsive, i.e., of short duration. In such a case, the torque-time product yields an angular momentum increment which changes the direction of the vehicle's angular momentum before the body itself has had time to move accordingly. In this situation, the body spin axis (usually the axis of maximum moment of inertia) will be misaligned with the angular momentum vector. The vehicle will appear to wobble, due to the nutation motion. The amplitude of this wobble will decrease with time as energy dissipation realigns the spin axis with the new angular momentum vector. The rate of the wobble depends on the moments of inertia of the object: for a flat disk, where the axial moment of inertia is exactly double the transverse moments of inertia, the wobble period is half of the spin period.

Angular dynamics of aircraft are usually described by three motions: roll, pitch, and yaw. Roll denotes motion about a forward direction. Yaw is motion about a vertical axis, while pitch is motion in a plane containing the vertical and forward directions.

Aerodynamic forces and moments can be considered in several ways. Ultimately, all forces must be expressed through pressure normal to, and friction along, the surfaces of the vehicle. For most common flows, viscous forces are modest and only the pressures are significant. For a body to generate lift, pressures on its upper surfaces must in general be lower than those on its lower surface.

Another perspective is that the exertion of force on the flying object must manifest itself as an equal and opposite rate of change of momentum in the airstream. If an object is developing lift, it must therefore push the air down. Streamlines must therefore be tilted downwards by the object.

The distribution of pressures on the flying object will yield a resultant force that appears to act at an arbitrary position, the center of pressure. No torques about this point are generated. The weight (mg) of the vehicle acts at the center of mass (COM) (actually, the center of gravity, but since the flying object is typically exposed to a spatially uniform gravitational field, there is no meaningful difference) whereas the aerodynamic force acts at the center of pressure (COP) and is usually defined by a lift and drag, orthogonal and parallel to the velocity of the vehicle relative to the air. Because the COM and COP are not in the same place, there is a resultant pitch torque. The airflow hits the vehicle at an angle of attack.

The force is calculated as if it acted at the geometric center of the vehicle. Usually this force is expressed in three directions, referred to the direction of flight. Drag is along the negative direction of flight; lift is orthogonal to drag in the vehicle-referenced plane that is nominally upwards. The orthogonal triad is completed by a side-force. The forces are supplemented by a set of moments (roll, pitch, and yaw). These determine the stability of a vehicle in flight. Both forces and moments are normalized by dimensions to allow ready comparison of different sizes and shapes of vehicles. The normalization for forces is by the dynamic pressure (0.5 pV) and a reference area (usually the wing planform area). Dividing the force by these quantities, the residual is a force coefficient. These coefficients; dimensionless numbers usually with values of 0.001 to 2.0, are typically functions of Mach and Reynolds number (which are generally small and constant enough, respectively, to be considered invariant in the models) and of attitude.

The attitude (the orientation of the body axes in an external frame, e.g., up, north, east) may be compared with the velocity vector in that same frame to yield, in still air, the relative wind, i.e., the velocity of the air relative to the vehicle. In cases where there is a nonzero wind relative to the ground, an ambient wind vector may be added to the relative wind. In addition to changing the speed of the air relative to the vehicle, wind may be instrumental in changing the angle of the airflow relative to the body datum.

The most significant angle is that between the freestream and the body datum in the pitch plane. This is termed the angle of attack, and it is upon this parameter that most aerodynamic properties such as lift and moment coefficients display their most significant sensitivity. A second angle is relevant for conventional aircraft, and this is the angle of the freestream relative to body datum in the yaw plane: this is the sideslip angle. If a sideslip angle were to be defined relative to a body datum, it would vary rapidly owing to the body spin. The spin rate is usually not itself of intrinsic aerodynamic interest. However, when multiplied by a body length scale (the span of a boomerang, or the radius of a Frisbee) it corresponds to a tip or rim speed. This speed can be significant compared with the translational speed of the body's center of mass, and thus a measure of the relative speed is used, referred to as the advance ratio (cor/V).

Several parameters describe flight conditions: the density and viscosity of the fluid, the size and speed of the object, etc. These properties may be expressed as dimensionless numbers to indicate the ratio of different forces or scales. Because flow behaviors can be reproduced under different conditions but with the same dimensionless numbers, these numbers are often termed similarity parameters. The Mach number, for example, is simply the ratio of the flight speed to the speed of sound in the medium. Since the sound speed is the rate of propagation of pressure disturbances (=information), a Mach number in excess of 1 indicates a supersonic situation where the upstream fluid is unaware of the imminent arrival of the flying object, and the flow characteristics are very different from subsonic conditions. In particular, a shock wave forms across which there is a discontinuous jump in pressure and temperature as the flow is decelerated. This shock wave typically forms a triangle or (Mach) cone around the vehicle, with a half angle equal to the arctangent of the Mach number. The objects considered herein remain within a subsonic regime, and Mach number variations ($<<1$) are not of concern. Much more important is the Reynolds number, the ratio of viscous to inertial (dynamic pressure) forces. This may be written $Re=vl\rho/\mu$, where v is the flight speed, l a characteristic dimension (usually diameter, or perhaps a wing chord), $\mu$ the (dynamic) viscosity of the fluid, and $\rho$ the density of the fluid. The dynamic viscosity is the ratio of the shear stress to the velocity gradient in a fluid. This is a constant for a given fluid, and is what is measured directly. The symbol for this property is usually Greek mu, and the units are those given by stress/velocity gradient=Newtons per meter squared, divided by meters per second per meter, thus Newtons per meter squared, times second, or Pascal-seconds (Pa-s) in SI units, or the Poise (P). 1 P=10 Pa-s.

The effects of Reynolds number cause variation of drag coefficient. At very low values of Re ($<1$), viscous forces dominate, and the drag coefficient for a sphere is equal to 24/Re, which may be very large. Since the drag coefficient Ca is defined with respect to the fluid density, which directly relates to the (insignificant) inertial forces, this relation for Ca is equivalent to substituting a formula for drag that ignores density and instead relates the drag only to viscosity. This substitution leads to Stokes' law for the fall velocity of spheres in a viscous fluid. As the Reynolds number increases (the flow becomes "faster"), the inertial forces due to the mass density of the fluid play a bigger and bigger role. The flow becomes unable to stick to the back of the sphere, and separates. At first (Re of a few tens) the flow separates from alternate sides, forming two lines of contrarotating vortices. This is sometimes called a von Karman vortex street. This alternating vortex shedding is responsible for some periodic flow-driven phenomena such as the singing of telephone wires. Control of drag is essentially equivalent to controlling the wake—whatever momentum is abstracted from the flow onto the object (or vice versa) is manifested in the velocity difference between the wake and the undisturbed fluid. If the wake is made more narrow, then the momentum dumped into it, and thus the drag, will be kept small One way of doing this is by streamlining. Another circumstance is to make the boundary layer (the flow immediately adjacent to the object) turbulent, which allows it to "stick" better to the object and thus make the wake more narrow.

Symmetric control of the boundary layer is of course known in golf, whereby the dimples on the ball increase the surface roughness so as to make the boundary layer everywhere turbulent. The turbulent boundary layer is better able to resist the adverse pressure gradient on the lee (downstream) side of the ball and remains attached longer than would the laminar layer on a smooth ball. The result is that the wake is narrower and so drag is lessened.

Similar boundary layer control is sometimes encountered on other (usually cylindrical) structures that encounter flow at similar Reynolds numbers. An example is the bottom bar on a hang glider. This bar can be faired with an aerofoil, but such a shape is harder to grip with the hands, and a cylindrical tube is rather cheaper. However, a smooth cylinder has a high drag coefficient, so a "turbulating" wire is often attached at the leading side to trip the boundary layer into turbulence and so reduce drag.

It is often said that the airflow across the curved top of a wing is faster than across the bottom, and since Bernoulli's theorem states that the sum of the static pressure and dynamic pressure in a flow are constant, then the faster-flowing (higher dynamic pressure) air on the upper surface must "suck" the wing upwards. This is sometimes true in a sense, but it is a rather misleading description—it fails utterly, for example, to explain why a flat or cambered plate can develop lift. In these cases in particular, the air travels the same distance over top and bottom, and so faster flowing air is not required on the upper surface, at least not from geometric considerations alone. Conservation of momentum dictates that if the airflow is to exert a lift force on the wing, then the wing must exert a downward force on the air. The flow of air past the wing must be diverted downwards. Whatever causes the lift, a result will be a downwards component of velocity imparted to the air. In an idealized sense, one can imagine the downward diversion of the airflow as a rotation of the streamlines, and consideration of the wing as a circulation-inducing device is a powerful idea in fluid mechanics.

As for pressure, which is force per unit area, there will indeed be on average a lower pressure on the upper surface of a lifting wing than on the lower surface. The net force is simply the integral of the pressure over the wing. Indeed, since both of these aspects of the flow will depend on the shape of the wing, its orientation (a flat plate inclined slightly upwards to the flow will obviously divert the flow downwards), and on how the flow stays attached to the wing, one might consider both the flowfield and the pressure field to be effects. But it is not always true that the air flows faster across the upper surface. The attachment of the flow is crucial. Once the flow has passed the suction peak, the area on the upper surface of the wing where pressure is least, the boundary layer may struggle to remain attached. If the layer separates, the drag will increase (as for a smooth sphere) and the lift will be reduced. This condition is known as the "stall."

The Magnus effect (or Robbins-Magnus effect) provides that, even a perfectly symmetric sphere can be made to veer in flight by causing it to spin. The airflow over the side of a ball (or cylinder) that is spinning against the direction of fluid flow will cause the flow to separate earlier, while the flow running with the rotating surface will stick longer. The result is that the wake is diverted sideways. Because the flow is diverted sideways, there must be a reaction on the spinning object, a side-force. This side-force causes spinning objects to veer in flight, a ball "rolling forward" (i.e., with topspin) will tend to swing down, while a ball with backspin will tend to be lofted upwards, a key effect in golf. In essence the ball "follows its nose." If the spin axis is vertical, then the ball is diverted sideways. The Magnus force is explained just as lift and drag—momentum dumped into the wake via control of flow separation.

See, Magnus, G., Ann. Phys. Chem. 88, 1-14, 1953; Rizzo, F. The Flettner rotor ship in the light of the Kutta-Joukowski theory and of experimental results, NACA TN 228, October 1925; Robins, B., New Principles of Gunnery Containing the Determination of the Force of Gunpowder and Investigation of the Difference in the ResLiting Power of the Air to Swift and Slow Motion, 1742; Talay, T., Introduction to the aerodynamics of flight, NASA SP-367, 1975. Tapan K. Sengupta and Srikanth B. Talla, Robins-Magnus effect: A continuing saga, Current Science Vol. 86, No. 7, 10 Apr. 2004; Tokaty, G. A., A History and Philosophy of Fluid Mechanics, Dover, 1994, expressly incorporated herein by reference.

Some balls have peculiar dynamics owing to nonspherical shape, whereas others are round but exploit various aspects of boundary layer control. These aspects include overall surface roughness, such as the dimples of a golf ball, and asymmetric roughness, such as the seam of a cricket ball or baseball. Still other complications are introduced by spin, which may generate lift via the Robins-Magnus effect.

For the most part, the size range of balls used in sports is limited to the range that can be conveniently manipulated and thrown with a single hand. This spans the range from a couple of centimeters diameter (squash balls, golf balls, etc.), where the ball is placed or thrown into play single-handedly, to larger balls (~25 cm) such as footballs and basketballs which can, with skill, be thrown from a single open hand, but are often thrown with two. The speed range is in general that which can be achieved by the unaided human arm; a few tens of meters per second, with the peak speed falling with ball mass once the ball adds significant inertia to the arm-ball system. Particular fast-movers are cricket balls and baseballs, which at ~150 g are perhaps an optimum mass for throwing. Golf balls fly particularly fast because of the large moment arm of the club used to strike them, and the elastic properties of club and ball. Footballs (soccer balls) generally fly faster than other balls of the same size (such as basketballs) because they are kicked, the long moment arm of leg, and the large mass of the foot, make an efficient club. The key property affecting a ball's general flight is its mass:area ratio. Squash balls and table-tennis balls have the same size, but the latter has a much lower mass. In principle, one could throw a table-tennis ball a little faster than a squash ball, but one would be unlikely to throw it further, since air drag has a much stronger effect on the table-tennis ball. At a given speed, the drag force on the two balls is the same, but the change in flight speed (i.e., the acceleration, equaling force/mass) is much higher for the table-tennis ball.

The other aspect affecting a ball's drag (without spin or asymmetric boundary layer control, a ball has no lift) is the flight Reynolds number. The drag coefficient of spheres is somewhat constant over a wide range of Reynolds number, but falls appreciably at a critical Reynolds number which ranges between about $4 \times 10^4$ to $4 \times 10^5$, depending on surface roughness. It can be seen that the golf ball, which has a relatively high surface roughness, has a drag coefficient that drops at a low Reynolds number. The somewhat smoother soccer ball has a drop at a higher Reynolds number, but because the ball itself has a larger diameter, this critical Reynolds number corresponds to a lower flight speed than the golf ball. A perfectly smooth sphere has the highest critical Reynolds number.

The texture of a tennis racquet is such that the effective coefficient of friction between the racquet and ball is quite large, permitting very large spin rates to be induced; indeed, regulations exist on the stringing style of a racquet to restrict the amount of spin. The spin permits large side-forces (i.e., "lift") to be developed by the Magnus force. A tennis ball flies at speeds well above the critical Reynolds number, and thus the boundary layer is tripped into turbulence with a spin-dependent location. The usual application is in the "topspin lob" whereby a topspin causes the ball to dive downwards, permitting a fast shot that still hits the court within the permitted boundary.

The game of golf involves some of the highest speed motion in ball sport—a small ball is struck with a massive club, which provides the largest possible moment arm, the length of the lever (arm+club) being dictated by the distance between the shoulder and the ground. The shape of a gold club is designed not only to provide a translational velocity impulse, but also to impart a backspin to provide lift. The angle of the club head, its shape, and the presence of grooves to increase friction all play a role. Wind tunnel tests by Bearman and Harvey in 1949 using a motorized assembly to spin the ball show that the classic golf ball, at a Reynolds number of 105, has a lift coefficient that varies from 0 with zero spin rate to about 0.3 when the advance ratio (the circumferential speed divided by the flight speed) reaches about 0.4, corresponding to about 6000 rpm. The drag coefficient rises from about 0.27 to 0.34 over the same range of advance ratio. The lift coefficient for a given spin rate is highest at low speeds, since the advance ratio is correspondingly high, although the variation is small above speeds of 55 m/s. Populating the surface of a sphere with a regular pattern without a preferred orientation is not a trivial problem, and thus not only the number or density of the dimples, but also their arrangement on the ball surface influences the ball's performance in play.

The patches of a soccer ball are stitched together to form a truncated icosahedron (i.e., one of the perfect solid shapes known to the ancient Greeks, made only of 20 isosceles triangles, but with some corners chopped off). The resultant shape is one with 60 corners, 12 pentagonal faces (often painted black), 20 hexagonal ones (white), and 90 edges. Carre et al. (2002) used video measurements (240 frames per second) of the trajectory of a kicked football (A Mitre Ultimax, diameter 215 mm, mass 415 g) to infer lift and drag coefficients. Their drag coefficient for nonspinning balls is a surprisingly strong function of kick speed, varying from about 0.05 at 20 m/s to 0.35 at 30 m/s, increasing rather than decreasing with Reynolds number. Perhaps some deformation of the ball occurs in hard kicks. The lift coefficient was close to zero for a nonspinning ball (as the broadly symmetric pattern of seams would suggest); however, as the spin rate increased to 50-100 radians per second, the lift coefficient rose to about 0.25, and was more or less constant for higher spin rates. Here, of course, the lift is due to the Robins-Magnus effect. Based on these data, they note that a football kicked at 18 m/s at an angle of 24 degrees from horizontal could fly at a range of 10 m anywhere between 1.2 and 3.2 m from the ground, purely by varying the spin rate at launch; topspin of course leading to lower altitude and backspin providing lift upwards. The most common deliberate application of this side-force is in the corner kick, and in a free kick when a player attempts to bend the ball around a wall of defenders.

A cricket ball has an equatorial plane with a set of stitching along it. This stitching acts as a boundary layer control structure; if the equator is held (by spin) at an angle to the airflow, then the flow on one half will encounter the stitches (and thereby have its boundary layer tripped into turbulence) on the leading hemisphere, while the other half will not encounter it until later. The side that encounters the stitching may transition into turbulence, and thus is able to "stick" to the ball surface better through the adverse pressure gradient on the trailing side. In the absence of spin, the seam would slowly rotate around and average the side-force down to nothing. Thus, spin is applied to maintain a constant orientation of the seam, rather than to develop aerodynamic forces per se through the Magnus-Robins effect. The optimum side-force (side-force coefficient CF ~0.3) is achieved when the seam equator makes an angle of about 20 degrees with the oncoming airflow. Similar results can be obtained with the seam at zero degrees if one hemisphere of the ball is smooth and the other rough. During play, bowlers allow one side of the ball to become rough, while rubbing (sometimes augmented with sweat or saliva) keeps one side smooth. Overt roughening is forbidden. An interesting change of behavior occurs at high speed. While a "swing" that amounts to almost 1 m in the "pitch" length of 20 m is possible at moderate speeds, such trajectories are only possible for a narrow range of throw speeds. The generation of a side-force depends on the differential separation of the boundary layer one side must separate before the other. If the boundary layer on both sides were strongly turbulent, such that both separate at more or less the same place, then the seam would make little difference. This situation occurs in fast bowls; the ball can be thrown at up to 40 m/s (Re $\sim 1.9 \times 10^5$). Because the boundary layer becomes naturally turbulent even in the absence of the seam at Re $\sim 1.5 \times 10^5$, the side-force coefficient begins to fall off at this speed (~30 m/s).

A baseball's seam of over 200 stitches joins together two hourglass-shaped strips of leather. Although the ball is of a broadly similar size (9-9¼ inches, circumference) and mass (5-5¼ ounces avoirdupois) as a cricket ball, its motions are more complex since the stitching is not so simply arranged. There are two principal pitches in baseball of aerodynamic interest, the curveball and the knuckleball. (Certain other pitches are named, such as the screwball, which is essentially a curveball with the spin axis reversed, and the slider, a fast pitch with the spin axis vertical. All are, in essence, just variants of a curveball; no different aerodynamic effects are invoked.) A less common pitch, perhaps, is the knuckleball, which is somewhat related to the swing bowl in cricket, in that the seam is used to trip turbulence asymmetrically. However, here the configuration of the seam does not permit a constant orientation by spinning. Instead, the pitcher attempts to throw with as little spin as possible. There is inevitably some rotation, which has the effect of causing the seam to be presented at a range of angles to the flow and thus cause a varying, and therefore hard for the batter to anticipate, side-force direction. It is estimated that a knuckleball may deviate by 27 cm from its initial trajectory before returning.

A softball is somewhat larger than a baseball and will typically be thrown more slowly (underhand pitch). Its size relative to the hand makes it much harder to impart spin to the ball. Thus, although slower pitches give longer times for side-forces to act, and low flight speeds give higher advance ratios for a given spin, in general spin effects on softballs are rather modest.

The table-tennis ball is the light and smooth. Aerodynamically it resembles a squash ball in size and smoothness, but has a mass/area ratio 10 times lower. It thus decelerates rapidly due to air. It is also more responsive to other aerodynamic forces such as the Robins-Magnus effect. Like a table-tennis ball, a squash ball is smooth. However, a squash ball has a much higher mass/area ratio, and thus its trajectory is less affected by aerodynamic forces, and is in fact nearly ballistic. The art of the game derives mostly from the kinematics of the bounce from the walls; use of multiple bounces rapidly eliminates the ball's kinetic energy. Topspin is used to cause a ball to bounce steeply downwards, making it hard to intercept and return in time, while backspin is used in the serve, to cause an upward bounce making for a steep descent at the back of the court. Squash is notable in that the game's thermal component is very obvious; the coefficient of restitution of the ball is highly dependent upon the ball's temperature. Two effects are at work: the elasticity of the rubber, and the pressure of the air inside. A remarkable feature of a sliced (i.e., highly spun) ball in squash is that the ball becomes visibly distorted.

The stretched prolate shape of balls used in American football and in rugby introduce complications. The projected area of the ball is almost halved when the ball is end-on compared to when it is flying broadside. Thus, as is well known, the ball can be thrown further if thrown longwise. The ball is not statically stable (at least not appreciably so) and thus a spin must be imparted to the ball in order to keep its long axis pointed in the direction of motion. Thus most good passes are "spiral" in nature. Video and flight data recorder measurements suggest 600 rpm is a typical spin rate for a thrown football. Because of the tendency for aerodynamic moments to precess the ball, and the intrinsic instability of rotation around the axis of minimum moment of inertia, the ball tends to begin nutating, if not tumbling, towards the end of the throw. Some of the ball's angular momentum is shed into the wake, which would ultimately cause the spin to decrease. The axial acceleration of a football is somewhat constant, declining as the ball slows in flight (and perhaps also because the axis begins to cone around the direction of flight). The transverse acceleration is modulated by the spin (~6 revolutions per second, slowing towards the end of flight). The moments of inertia of a football are such that this tumbling, as measured by in-flight accelerometer measurements (Nowak et al., 2003), has a period 1.8 times the initial spin period. The tumbling (or rather, nutation) period is longer than the spin period for long objects; for flat discs the nutation period is close to half of the spin period.

Many balls operate at or near a critical Reynolds number, such that drag coefficient can be a strong function of flight speed. Substantial side- or lift-forces are developed by many balls via seam-triggered boundary layer transition and thus delayed separation; in other cases Robins-Magnus lift plays the dominant role.

See, Adair, R., The Physics of Baseball, 3rd Ed. HarperCollins, 2002; Bahill, A. T., D. G. Baldwin, and J. Venkateswaran, Predicting a baseball's path, American Scientist, 93(3), 218-225, May-June 2005; Barkla, H., and A. Auchterlonie, The Magnus or Robins effect on rotating spheres, Journal of Fluid Mechanics, 47, 437-447, 1971; Bearman, P. W., and J. K. Harvey, Golf ball aerodynamics, Aeronauts Quarterly, 27, 112, 1976; Carre, M. J., T. Asaum, T. Akatsuka, and S. J. Haake, The curve kick of a football II: Flight through the air, Sports Engineering 5, 193-200, 2002. Cooke, Alison J., An overview of tennis ball aerodynamics, Sports Engineering, 3, 123-129, 2000; Mehta, R. D., Aerodynamics of sports balls, Annual Reviews of Fluid Mechanics, 17, 151-189, 1985; Nowak, Chris J., Venkat Krovi, William J. Rae, Flight data recorder for an American football, Proceedings of the 5th International Conference on the Engineering of Sport, Davis, Calif., Sep. 13-16, 2004; Rae, W. J., and R. J. Streit, Wind tunnel measurements of the aerodynamic loads on an American football, Sports Engineering, 5, 165-172, 2002. Rae, W. J., Flight dynamics of an American football in a forward pass, Sports Engineering, 6, 149-164, 2003; Lord Rayleigh, On the irregular flight of the tennis ball, Mathematical Messenger 7, 14-16, 1878; Stepanek, Antonin, The aerodynamics of tennis balls: The topspin lob, American Journal of Physics 56, 138-142, 1988; Tait, P. G., Some points in the physics of golf, Nature 42, 420-423, 1890. Continued in 44, 497-498, 1891 and 48, 202-204, 1893; Thomson, J. J., The dynamics of a golf ball, Nature 85, 251-257, 1910 Volume 3, Issue 2, 123, May 2000; Watts, R. G., and G. Moore, The drag force on an American football, Am. J. Phys, 71, 791-793, 2003; Watts, R. G., and A. T. Bahill, Keep Your Eye on the Ball, Freeman, New York, 2000; www.hq.nasa.gov/alsj/a14/a14.html; news.bbc.co.uk/sportacademy/hi/sa/tennis/features/newsid_2997000/2997504.stm, expressly incorporated herein by reference.

A flat plate tends to pitch up in flight, and this tendency must be suppressed in order to have sustained flight. The basics are outlined in Schuurman (1990) and Lorenz (2004). This suppression is achieved by some combination of aerodynamic tuning to reduce the pitch-up moment and the application of spin to give gyroscopic stiffness. These are, however, only palliative measures that extend the duration of level flight—simple adjustment of shape and flight parameters cannot keep an object flying forever for the following reason: Spin stabilization only slows the destabilizing precession due to the pitch-up moment—the useful flight time is only a transient interval whose duration is proportional to the spin rate divided by the pitch moment. Of course, if the pitch moment could be made zero, then the spin axis precession would take an infinitely long time. However, a static design disk flying shape does not have a zero pitch moment at all angles of attack, and since the angle of attack will change in flight due to the changing flight speed and flight path angle (due to the actions of gravity, lift, and drag), then sooner or later the pitch moment must be dealt with. The "Professional Model Frisbee Disc" received the U.S. Pat. No. 3,359,678 in 1964.

Several s sports have developed using the Frisbee®, notably Guts, Freestyle, Ultimate, and Disc Golf.

Guts is a game in which two opposing teams take turns throwing the disc at each other, the goal being to have the disc hit the ground in a designated zone without being caught. Freestyle is more of a demonstration sport like gymnastics, with exotic and contorted throws, catches, and juggles evaluated for difficulty, precision, and artistic impression.

Ultimate is a team passing game with similarities to basketball and American football. Teammates work the Frisbee forward across a 70-yard long field, 40 yards across, by passing from one team member to the other. If possession is lost, either by the disc going out of bounds, falling to the ground without being caught, or being caught by a member of the opposing team, the opposing team takes possession. A point is scored when the disc is caught in the end-zone.

A thrower in Ultimate must toss to a teammate while avoiding interception, and therefore curved flights are essential. Sometimes the thrower may be blocked by an opposing player and thus must use an exotic throw, such as the overhead "hammer", where the disc is thrown over the shoulder in a vertical orientation, to roll onto its back and fly at near −90 degrees angle of attack. The catcher must anticipate how long the disc may hang in the air, and especially any turns it may make towards the end of its flight.

The Frisbee may also be used as a target sport. In one variant, a golf-like game, the aim is to hit the targets in as few throws as possible. Headrick patented a Disc Pole Hole, which could catch a Frisbee. The device consists of a frame supported by a pole: ten chains hang down from the frame, forming a paraboloid of revolution. This paraboloid sits above a wide basket. The chains absorb the momentum of a correctly thrown disc and allow it to fall into the basket (without the chains, a disc would typically bounce off the pole, making scoring near-impossible).

"Hot Zone," is a competition sport where a player throws a Frisbee to be caught in a specified zone by a dog (often a sheepdog breed).

A Frisbee is a low-aspect ratio wing—in that sense its lift and drag can be considered conventionally. In common with many low-aspect ratio shapes, its behavior may be predictable. The key is the pitch moment and how to mitigate its effects. The conventional Frisbee does this in two ways. First, the deep lip reduces the pitch moment to manageable values. Secondly, the thickness of the plastic in a Frisbee is adjusted across the disc, such that much of the disc's mass is concentrated at the edge, to make a thick lip. This has the effect of maximizing the moment of inertia, making the Frisbee like a flywheel. The precession rate is equal to the pitch moment divided by the moment of inertia and spin angular velocity. Keeping the precession down to a few degrees over the flight duration of a couple of seconds is important to stable flight. (According to one aspect of the technology, the pitch moment may be varied, for example by altering a radial displacement of a set of balanced masses or fluidic mass. The aerodynamics may also be controlled during flight to alter the pitch moment).

Nakamura and Fukamachi (1991) performed smoke flow-visualization experiments on a Frisbee at low flow velocity in a wind tunnel (1 m/s). The disc (a conventional, although small, Frisbee) was spun with a motor at up to 3 times per second, yielding an advance ratio of up to 2.26. The smoke indicated the presence of a pair of downstream longitudinal vortices (just like those behind a conventional aircraft) which create a downwash and thus a lift force. These investigators also perceived an asymmetry in the vortex pattern due to the disc's spin, and also suggested that the disc spin increased the intensity of the downwash (implying that the lift force may be augmented by spin). The low flow velocity (20 times smaller than typical flights) used in these experiments may have given a disproportionate effect of rotation.

Yasuda (1999) measured lift and drag coefficients of a flying disc for various flow speeds and spin rates. He additionally performed a few free-flight measurements on the disc (with the disc flying a short distance indoors in the field of view of a camera) and wind tunnel measurements on a flat disc. His free-flight measurements on a conventional disc show that typical flight speeds are 8-13 m/s and rotation rates of 300-600 rpm (5-10 revolutions per second) and the angle of attack was typically 5-20 degrees. The most common values for these parameters were about 10.5 m/s, 400 rpm, and 10 degrees, respectively. The flat disc had a zero lift coefficient at zero angle of attack, and a lift curve slope between 0 and 25 degrees of 0.8/25. The Frisbee had a slight lift (CL –0.1) at zero angle of attack, and a lift curve slope of –1/25. The Frisbee paid a price for its higher lift: its drag was commensurately higher. The flat plate had a drag coefficient at zero angle of attack of 0.03 and at 25 degrees of 0.4; the corresponding figures for the Frisbee were 0.1 and 0.55. (The drag curves are parabolic, as might be expected for a fixed skin friction drag to which an induced drag proportional to the square of the lift coefficient is added.) Yasuda notes that the lift: drag ratio of a flat plate is superior to that of the Frisbee. No significant dependence of these coefficients on rotation rate between 300 and 600 rpm was noted.

Higuchi et al. (2000) performed smoke wire flow visualization and PIV (particle image velocimetry) measurements, together with oil flow measurements of flow attachment on the disc surface. They used a cambered golf disc, with and without rotation and (for the most part) a representative flight speed of 8 m/s, and studied the downstream vortex structure and flow attachment in some detail.

To date, the most comprehensive series of experiments have been conducted by Jonathan Potts and William Crowther at Manchester University in the UK, as part of the Ph.D. research of the former. One aim of the research was to explore the possibilities of control surfaces on a disc wing. In addition to measuring lift, drag, and pitch moment at zero spin for the classic Frisbee shape, a flat plate, and an intermediate shape, these workers measured these coefficients as well as side-force and roll moment coefficients for the Frisbee shape at a range of angles of attack and spin rates. These coefficients will be discussed in a later section. Additionally, Potts and Crowther performed pressure distribution measurements on a nonspinning disc, smoke wire flow visualization, and oil flow surface stress visualizations. (They performed these on the regular Frisbee shape, and one with candidate control surfaces.)

Potts states, "The simulation is also used to demonstrate that with control moments from suitable control effectors, it is possible to generate a number of proscribed flight manoeuvres"; also "Finally, it has been shown that with appropriate initial conditions and appropriate control moment input, it is feasible to explore hypothetical disc-wing manoeuvres such as a spiral turn and a spiral roll." The model of flight is developed in Section 7.3.4 of the Potts dissertation. Potts, Jonathan R., and William J. Crowther. "Flight control of a spin stabilised axi-symmetric disc-wing." 39th Aerospace Sciences Meeting, Reno, Nev., USA. 2001, discloses various flight control methods, none of which are spin-angle synchronized. ("The control forces generated by a disc-wing with installed turbulence strips are capable of producing a banked turn manoeuvre of around a 100 m radius for the rotating case. If this degree of aerodynamic control could be gained from active on/off turbulence strips or some other method of control then that would offer practical possibilities for aerodynamic control of a disc-wing UAV").

A useful and instructive comparison can be made between a flat plate and a Frisbee. Let us first consider drag. The drag coefficient is the drag force normalized with respect to dynamic pressure ($0.5\rho V^2$) and the planform area of the disc. Since at low incidence angles the area of the disc projected into the direction of flow is very small (they used a plate with a thickness:chord ratio of 0.01), it follows that a flat plate will have a very low drag coefficient, ~0.02. On the other hand, the Frisbee, with its deep lip (thickness:chord ratio of 0.14) has a much larger area projected into the flow, and its drag coefficient at zero angle of attack is therefore considerably larger (~0.1). The Frisbee maintains a more or less constant offset of 0.1 above the value for a flat plate. This in turn has a parabolic form with respect to angle of attack, owing to the combination of a more or less constant skin friction drag term and the induced drag term, which is proportional to the square of lift coefficient. While a flat plate has zero lift at zero angle of attack, and a lift coefficient that increases with a slope of ~0.05/degree, the Frisbee, having a cambered shape, develops appreciable lift at zero angle of attack ($C_{L0}$ ~0.3), its lift curve slope is similar.

The major difference between the Frisbee and flat plate is in the pitch moment coefficient. While this is zero for a flat plate at zero angle of attack (which is not a useful flying condition, since a flat plat develops no lift at this angle), it rises steeply to ~0.12 at 10 degrees. Because the Frisbee's trailing lip "catches" the underside airflow and tries to flip the disk forward, the pitch-up tendency of the lift-producing suction on the leading half of the upper surface is largely compensated. Its pitch moment coefficient is slightly negative at low incidence and is zero (i.e., the disc flies in a trimmed condition) at an angle of attack of about 8 degrees. Over the large range of angle of attack of −10 to +15 degrees, the coefficient varies only between −0.02 and +0.02.

The existence of a trimmed position (pitch moment coefficient $C_M=0$) permits the possibility of a stable glide. If the disc is flying downwards at a speed (dictated by the lift coefficient at the trimmed condition) such that drag is balanced by the forward component of weight, then the speed will remain constant. However, although the zero pitch moment means the disc will not roll, the roll moment is not zero, and so the spin axis will be slowly precessed forward or back, changing the angle of attack.

Hummel has pointed out the role of the sign change in pitch moment in causing the sometimes serpentine (S-shaped) flight of Frisbees. When thrown fast at low angle of attack, the pitch moment is slightly negative and causes the Frisbee to very slowly veer to the right. However, as the disc's speed falls off, its lift no longer balances weight, and it falls faster downwards, increasing the angle of attack. When the angle of attack has increased beyond 9 degrees, the pitch moment becomes positive and increases rapidly. This leads to the often-observed left curve at the end of a flight.

Potts and Crowther also study the side-force coefficient (which might be thought of as due to the Robins-Magnus force, although in reality it is rather more complicated, since most of the boundary layer develops over the flat surface of the disk, rather than its somewhat cylindrical lip) and the roll moment. The side-force coefficient is not strongly variable over the range of angles of attack studied (−5 to 15 degrees). It does vary with spin rate. For low values of advance ratio AR (<0.5, at an airspeed of 20 m/s) the coefficient is just slightly positive (0.02). However, for more rapid spin, the coefficient increases, at AR=0.69, Cs=0.04-0.05, and for AR=1.04, Cs ~0.8. To first order, then, these data show that the side-force coefficient is proportional to advance ratio; a reasonable expectation is that the coefficient is in fact directly proportional to the tip speed, although this parameter was not varied independently in these tests. Although the lift and drag coefficients were not appreciably affected by spin, the pitch moment did become more negative (by 0.01, almost a doubling) at 0-10 degrees angle of attack as the spin rate was increased from AR=0 to 1. The roll moment coefficient was also determined, and was almost zero (within 0.002 of zero) for low spin rates and more or less constant with angle of attack over the range −5 to 15 degrees. However, the higher aspect ratio data showed a significant roll moment Cm ~−0.006 for advance ratio AR=0.7 and CM ~−0.012 for AR=1: in both cases the moment coefficient increased in value with a slope of about 0.0006/degree.

Studies have revealed the prominent existence of nutation in the early part of the throw. A good throw will avoid exciting nutation, which seems to substantially increase drag. It can be seen in some photographs of hard Frisbee throws that the disc becomes visibly deformed by inertial loads. The disc is held only at one edge, and to reach flight speeds of ~20 m/s in a stroke of only a meter or so requires ~20 g of acceleration, which for the half disc (90 grams) being accelerated at this rate corresponding to a force of 20 N; equivalent to hanging a ~2 kg weight at the edge of the disc, and causing a transient deformation that might excite nutation.

In-flight measurements offer the prospect of measuring flow properties such as pressure on the rotating disc. Pressure distribution measurements are confounded by radial forces of the rotating disk, while microphones show how as the angle of attack increases, the pressure fluctuations on the disc become larger even as the flight speed decreases towards the end of the flight.

Lorenz (Lorenz, Ralph D. Spinning flight: dynamics of frisbees, boomerangs, samaras, and skipping stones. Springer Science & Business Media, 2007, P. 189) states: "A control surface, such as a flap, would have little useful effect on a Frisbee's flight were it to be simply fixed onto the disc. As the disc spins around, the control effect would vary or even reverse, and the spin-averaged effect would be small. However, if on-board sensors were used to trigger a fast-acting flap at a particular phase of rotation, the prospect of a maneuverable Frisbee can be envisaged. This might simply involve some stability augmentation, say to suppress the hook at the end of the flight. But much more appealing ideas become possible, a Frisbee with a heat sensor to detect a player, such that the disc tries to avoid being caught!"

The challenge in the Frisbee throw is that the overall flight is very sensitive to the initial parameters; small variations in angle of attack can lead to very different flights.

See, Higuchi, H., Goto, Y., Hiramoto, R., & Meisel, I., Rotating flying disks and formation of trailing vortices, AMA 2000-4001, 18th AIAA Applied Aero. Conf., Denver, Colo., August 2000; Hubbard, M., Hummel, S. A., 2000. Simulation of Frisbee flight. In Proceedings of the 5th Conference on Mathematics and Computers in Sports, University of Technology, Sydney, Australia; Hummel, S., Frisbee Flight Simulation and Throw Bionwchanics, M.Sc. thesis, UC Davis, 2003; Johnson, S., Frisbee—A Practitioner's Manual and Definitive Treatise, Workman Publishing, 1975; Lorenz, R. D., Flight and attitude dynamics of an instrumented Frisbee, Measurement Science and Technology 16, 738-748, 2005; Lorenz, R. D., Flight of the Frisbee, Engine, April 2005b; Lorenz, R. D., Flying saucers, New Scientist, 40-41, 19 Jun. 2004; Malafronte, V., The Complete Book of Frisbee: The History of the Sport and the First Official Price Guide, American Trends Publishing, 1998; Nakamura Y. & Fukamachi N., Visualisation of flow past a Frisbee, Fluid Dyn. Res., V7, pp. 31-35, 1991; Potts, J. R., & Crowther, W. J., Visualisation of the flow over a disc-wing. Proc. of the Ninth International Symposium on Flow Visualization, Edinburgh, Scotland, UK, August 2000; Potts, J. R., Crowther, W. J., 2002. Frisbee aerodynamics AIAA paper 2002-3150. In Proceedings of the 20th AMA Applied Aerodynamics Conference, St. Louis, Mo.; Rohde, A. A., Computational Study of Flow around a Rotating Disc in Flight, Aerospace Engineering Ph.D. dissertation, Florida Institute of Technology, Melbourne, Fla., December 2000; Schuurmans, M., Flight of the Frisbee, New Scientist, July 28, 127 (1727) (1990), 37-40; Stilley, G. D., & Carstens, D. L., adaptation of Frisbee flight principle to delivery of special ordnance, AIAA 72-982, AIAA 2nd Atmospheric Flight Mechanics Conference, Palo Alto, Calif., USA, September 1972; Yasuda, K., Flight- and aerodynamic characteristics of a flying disk, Japanese Soc. Aero. Space Sci., Vol. 47, No. 547, pp. 16 22, 1999 (in Japanese); wwvv.discgolfassoc.com/history.html www.freestyle.org; www.whatisultimate.com/; www.ultimatehandbook.com/Webpages/History/histdisc.html; Frisbee Dynamics: www.disc-wing.com www.lpl.arizona.edut-rlorenzmae.engrucdavis.edut-biosport/frisbee/frisbee.html, expressly incorporated herein by reference in their entirety.

Although the modern Frisbee is perhaps the most familiar and popular flying spinning disc, there are a range of variants on the theme. Aerobie produces the "Epic," which has a conventional-looking upper surface. However, the cylindrical cavity inside the disc is smaller than most discs, and is offset from the center. The offset permits a suitably narrow region for gripping the disc, but the offset displaces the disc center of mass further from the fingers, and in effect lengthens the arm of the thrower, allowing for a faster launch. Aerobie also produces the Superdisk, a disc with a rather flat spoiler rim (made of a comfortable rubber). This disc is allegedly easier to throw than a conventional Frisbee, but does not go as far. If the claim of easy throwing is true, it is presumably a result of the spoiler aerofoil having a pitch moment coefficient that is small over a wider range of angle of attack.

Because of the thickness of the disc required to suppress the pitch moment, the draggy Frisbee does not permit flights of extreme length. A throwing toy that achieves longer distance was developed by Alan Adler, founder of Aerobie, Inc., (formerly Superflight, Inc.) in Palo Alto, Calif., in the 1970s. The flying ring, most commonly encountered in modern times as the Aerobie, is an attempt to circumvent the flying disc's most salient problem, namely the forward center lift and its resultant pitch-up moment. Almost all aerofoil sections have their center of pressure at the quarter chord point, while the center of mass is at the half chord. A ring-wing gets around this problem in part by pure geometry: it can be considered by crude longitudinal section as two separated wings. While the lift on each wing will act forward of the center of each, if the two wings have a sufficiently short chord, this lift offset will be small compared with the overall diameter of the vehicle. For recreational applications, the diameter of the vehicle relates to ergonomics (size of human hand).

A 30 cm diameter provides a large chord, which makes the trailing wing shorter than the leading wing. The trailing wing is also immersed in the downwash from the leading wing. This has the effect of reducing its effective angle of attack and throwing the ring out of balance by reducing the lift on the trailing wing. One approach that was tried initially in the "Skyro" (the first flying ring sold by Aerobie) was to use a rather symmetric aerofoil, but to have it angled such that the wing formed a cone. The trailing wing therefore was mounted at a higher angle of attack to the freestream flow than was the leading wing, and thus when downwash was taken into account the two were at a comparable angle of attack. The two wings thence had the same lift coefficient and the ring flew in a trimmed condition. However, this tuning (a cone angle of only about 1.5 degrees was necessary) was only strictly correct at one flight speed, and thus a perfectly trimmed condition was only found during a portion of a typical flight. Tuning the vehicle over a range of flight conditions instead needed a carefully selected aerofoil section, which had a lift curve slope higher for outwards (trailing) flow than for inwards (leading wing) flow. The higher lift curve slope therefore compensated for the lower angle of attack, such that the resultant lift coefficients were similar. The aerofoil with this characteristic had a rather severe reflex, almost as if it had to spoilers on its trailing edge. This flying ring is rather thin (~3 mm) compared with a Frisbee, and thus has much lower drag. As a result, the range achievable with a flying ring is much further—the present record is some 1400 ft. This flight was made by throwing along a ridge (so it may have gained from some updraft lift) although it was terminated prematurely, ending about 1.5 m above the ground by striking a bush. This flight lasted only 7 seconds—much shorter than many boomerang flights; although the lift:drag ratio is very good, the actual lift coefficient is small and thus the flight speed must be fairly high.

As with boomerangs and Frisbees, material selection is important. The ring must be adequately weighted to efficiently extract energy from the throw, and to provide sufficient moment of inertia to remain spinning. An additional consideration in this sort of application is compliance, as a metal Aerobie would be rather unpleasant to catch.

The flying ring (and its boomerang counterpart) are constructed with a polycarbonate "backbone" which is placed in a mold into which a lower-density rubber is injected. This combination yields the desired density, as well as the desired compliance and "memory" (the ring can be "tuned" slightly by flexing it-were it perfectly elastic, such adjustments would be impossible).

See, Adler, A., The Evolution & Aerodynamics of the Aerobie Flying Ring, note available at www.aerobie.com; Egerton, (The Honourable Wilbraham, M. A., M.P.), An Illustrated Handbook of Indian Arms, 1880; Frohlich, C., Aerodynamic effects on discus flight, Am. J. Phys. 49(12), 1125-1132, 1981; Zdravkovich, M., A. J. Flaherty, M. G. Pahle, and I. A. Skelhorne, Some aerodynamic aspects of coin-like cylinders, J. Fluid Mechanics, 360, 73-84, 1998; www.aerobie.com; www.discwing.com; flyingproducts.com/; www.innovadiscs.com; www.xzylo.com, expressly incorporated herein by reference.

Boomerangs are conventionally divided, by aerodynamicists, at least-into two classes: returning and straight-flying. The former class are largely recreational, while straight-flying boomerangs (the word is derived from "bumarin," from an aboriginal tribe in New South Wales) were early hunting weapons, perhaps occasionally used in warfare. These straight-flying boomerangs, sometimes called "kylies" or killing-sticks, are every bit as sophisticated as their returning cousins; they develop appreciable lift in flight, without the moments that lead to a curved trajectory which would be undesirable in a hunting weapon. A key feature to note about boomerangs is the basic shape. In essence the boomerang acts as a propeller—the two (or more) arms act as rotor blades as they spin to force air through the disc described by their rotation. For this to happen there must either be a twist in the boomerang or it must be shaped such that the same side of both arms develops lift.

The essence of boomerang flight is its operation as a propeller, combined with gyroscopic precession to yield circular flight. This results in a combination of forward motion and spin, which gives a vertically asymmetric lift distribution (i.e., the roll moment), to produce a horizontal asymmetry (i.e., the pitch moment) by having an eccentric wing. Naturally the forces are greatest at the wingtip that is moving into the flow; at parts of the rotation where the circular motion cancels out the forward motion, the forces are zero. Although there will be some lift produced where the flow is backwards (depending on the twist or camber of the aerofoil), this will typically be rather low compared with the advancing blade. The advancing side clearly gives an asymmetry about the direction of motion, leading to a roll moment which precesses the boomerang around to make its circular path. This asymmetry decreases with advance ratio: a sufficiently fast-spinning wing will essentially feel no effect of Forward motion. The combination of forward flight plus the forward rotational motion of the upper arm gives more lift on the upper arm than the lower. The net lift therefore acts above the axis, leading to a rolling torque. This rolling torque causes the boomerang to precess its spin axis in the horizontal plane. In addition to an upper/lower pressure asymmetry, there is a left-right asymmetry—this produces a pitch torque which causes the boomerang to "lie down" into a horizontal plane. If it is assumed that the component of relative air velocity along the length of the wing does not contribute to lift (i.e., the spanwise flow), then it can be seen that an eccentric wing develops an asymmetry about the orthogonal axis, and thus a pitch moment. Hess presents a boomerang with 8 radial arms (and thus no eccentricity) which nonetheless still "lies down." In this instance, the blades are close enough together that the pitch moment is produced by wake effects.

The canonical boomerang is angular or crescent-shaped in planform. In most recreational boomerangs, the two wings are of approximately equal length. For the boomerang to be effective, the two wings must both develop lift, as if the boomerang were a propeller, when it spins in one direction, the direction determining the "handedness" of the boomerang. "Right-handed" boomerangs are thrown with the "upper" surface of the boomerang pointing left—the upper surface points towards the thrower's head, and to the center of the circular flight path.

For both wings to develop lift, their aerodynamic surfaces must be shaped accordingly. In the (rather bad) case where the wings are perfectly flat or at least uncambered, the boomerang must have twist, such that both wings encounter a positive angle of attack and thus generate lift in the same direction. If a thicker aerofoil is used with, e.g., a flat base and a curved upper surface, then lift is positive at zero incidence, and this will apply to both wings. A similar result pertains if the airfoil is cambered in the same direction on both wings. The classic type of boomerang is simply angled, or perhaps has a slightly reflexive "Omega" planform, the shape displacing the center of pressure from the center of mass to yield the desired moments during flight. Some other designs are more radially symmetric, forming a three or more pointed "star" shape (the four-armed cross designs come under this category). Several other permutations are possible, many resembling letters of the alphabet (N, T, W, etc.). A final variant is the Aerobie Orbiter, which has an open triangular planform, allowing it to be caught by placing a hand (or foot) in the "hole." In this example, there is a twist applied to the tip to manipulate the lift distribution along the span.

Some boomerangs have one arm substantially longer than the other. This is particularly the case with MTA (Maximum Time Aloft) boomerangs, and is also characteristic of many Australian aboriginal examples. The long wing gives a large effective moment arm (much like a slingshot or spearthrower) to permit a higher launch velocity. Also, providing the stability concerns mentioned earlier can be addressed, the moment of inertia of an asymmetric straightish boomerang will be maximized for a given mass; the rotational kinetic energy is what maintains the hover, which is the most important phase for maximizing flight time. A further point is that a long wing gives a higher aspect ratio, which Newman (1985) points out is a key parameter for maximizing the number of turns made by the rotor before motion stops.

Mass distribution is a critical factor for boomerangs, to adjust the center of mass and to change both the mass and the moment of inertia. Large moments of inertia are generally favorable for longer flights (see below), and for this reason masses are often added to the wing tips.

In a classic boomerang flight, the article is thrown with its principal plane inclined outwards by about 20 degrees from vertical. The projection onto the horizontal plane of its flight is approximately circular, with a diameter of typically 30 m; its flight path is initially inclined such that it climbs perhaps 10 or 20 meters into the air. At the end of its circular arc, its forward motion has decayed and the boomerang falls to the ground. The rising and curved path follows simply from the development of lift: most of the lift is projected onto the horizontal plane, causing the article to veer inwards (i.e., to the left, for a right-handed throw). With the initially high forward velocity, the vertical component of lift exceeds the weight of the boomerang, and causes it to accelerate upwards. The clever part of boomerang design derives from the aerodynamic moments. A circular flight path requires that the spin axis be precessed anticlockwise, as seen from above. This is accomplished by a roll moment which is due to the upper wing experiencing a higher airspeed due to the spin; its circumferential velocity adds to the forward velocity of the boomerang, while the lower wing's circumferential speed subtracts from it. This causes an inwards roll; this incremental angular momentum vector points backwards along the direction of flight. Adding this to the spin angular momentum causes the rotation of the latter in the horizontal plane. Any rotor will experience the same sort of effect—a purely linear wing, for example. A common model for this behavior is a cross-shaped boomerang. The radius of the circular flight depends only on three fixed parameters: the lift coefficient, moment of inertia, and span (Hunt, 1999): $RF=(4I)/\rho C_L \pi a4)$, where RF is the radius of the circular flight, a is the span of the boomerang, $C_L$ the lift coefficient, and I the moment of inertia about the spin axis. This result relies on $C_L$ being invariant, whereas in reality it will depend upon the angle of attack of the throw (although this is not an easy parameter for a thrower to adjust—generally boomerangs are launched at zero angle of attack).

Classical boomerangs have a tendency to "lie down", the spin plane is initially inclined 20 degrees from vertical, but over the course of the flight it rotates outwards such that the boomerang is more or less horizontal at the end of the flight. This rotation of the angular momentum vector from near-horizontal to vertical requires a pitch-up moment, in essence due to the lift acting forward of the center of mass. Usually this behavior requires the characteristic angled shape of a boomerang. With such a shape, the apex is forward of the center of mass, and the wings are no longer radial to it, but are eccentric. A simple calculation of the square of net velocity (forward plus spin-induced) shows how the center of pressure moves forward as a result.

Note, however, that not all boomerangs can be explained this way. Hess (1968) shows a radially symmetric 8-bladed boomerang (in essence, a throwing star) which also "lies down". In this case, the forward displacement of the lift must be due to the trailing side of the boomerang operating in the wake or downwash of the leading side. As with the Chakram or Aerobie flying ring, this downwash reduces the effective angle of attack of the trailing side, and thus the lift force from it. The reduced lift on the trailing side therefore displaces the center of pressure forwards and thus precesses the spin axis towards the vertical. A very crude calculation shows the relative roll and pitch moments as being roughly in the ratio of 2 to 1 (Walker 1897): the spin plane is precessed horizontally through something over 180 degrees, while its precession to near vertical involves around 90 degrees. Since the spin rate decreases through the flight, and the horizontal precession may be as much as 360 degrees or more. Note that the horizontal precession (i.e., the roll moment) is a function of the spin rate and flight speed, which determine the airspeeds over the upper and lower wing, while the pitch moment that precesses the angular momentum vector vertical is largely a geometric property.

As is often observed in a conventional boomerang throw, the first (usually upwards) loop is anticlockwise (as seen from above, for a right-handed boomerang), and then the forward flight slows and the boomerang reverses its flight direction, usually to hit the ground soon thereafter. Without the ground, this reversal completes itself and the boomerang begins a clockwise spiral. Like a coil spring, this spiral maintains a constant radius and "pitch" (i.e., vertical interval between successive loops). Increasing the flight path angle (the angle made by the velocity vector with the horizontal) causes a boomerang to reach its maximum altitude more quickly, yet surprisingly it tends to fall down more quickly too. Increasing the angle of attack increases the lift coefficient, and thus (following the simple model above) makes the radius of the flight path smaller, making a tighter loop. One way of increasing the angle of attack fairly early in the flight is to add weights to the inboard part of the boomerang, i.e., to increase the boomerang mass, without increasing the moment of inertia substantially. This retains the same yaw rate (i.e., the spin axis precesses anticlockwise as before), but the velocity vector is rotated anticlockwise more slowly, since the lift now has to accelerate a larger mass. The difference between the two rates yields a rapidly increasing angle of attack. Increasing the roll angle (i.e., launching the boomerang in a more horizontal plane) causes the lift generated by the boomerang to have a stronger vertical component, accelerating the boomerang into the sky. Increasing the spin rate has only a modest effect. This increases the pitch moment (since the advancing and receding wings of the boomerang have a larger speed difference), but at the same time increases the angular momentum. To first order, then, the effects are the same magnitude and cancel out, although for very high spin rates this will not be the case, and the pitch moment will grow faster.

The aerodynamic properties of boomerangs are of course dictated by the aerofoil shape and the planform as constructed. However, the flight characteristics can be modified significantly by small deformations (twisting and bending) done in the field ("tuning").

Anhedral and dihedral refer to the angle made by the span of a wing with the horizontal: dihedral wings point upwards from root to tip, forming a "V" shape and typically give an aircraft better stability in roll. Anhedral wings form a "A" and tend to have the opposite effect. Anhedral is used on fighter aircraft which need manoeuvrability rather than stability and on high-winged transport aircraft which already have substantial "pendulum" stability. Applying dihedral (by flexing the wingtips upwards) on a boomerang tends to have the effect of inducing high, hovering flight. This requires the boomerang to "lay over" more quickly—in other words the pitch-up moment is enhanced. This is probably via the airflow hitting the underside of the wingtip at a steeper angle when the tip is pointing forwards. Conversely, applying anhedral yields a lower flight, with later lay-over. Another adjustment is blade twist, to increase the angle of attack of the blades throughout their revolution. This of course increases the lift coefficient and thereby leads to flight in a tighter circle.

A straight-flying boomerang provides an advancing wing which experiences a higher airspeed, and thus a stronger lift than the receding one, and thus a killing stick thrown in a horizontal plane will flip over. Suppressing this tendency requires nulling the roll moment via tuning of the lift distribution, which is accomplished by twisting the blades such that the outboard part of the span produces negative lift. The majority of the lift force developed by a returning boomerang is expended in providing centripetal acceleration to create the circular trajectory. To first order, the ratio of the horizontal component of lift to the vertical component required to balance its weight is the tangent of the boomerang's inclination to the horizontal, or for 70 degrees, around 2.7. Thus, a boomerang that does not need to make a circular flight can afford to generate three times less lift (and correspondingly three times less drag). The blade twist (perhaps combined with a change in section along the span) yields a net positive lift—the inboard positive lift outweighs the outboard negative. However, the roll moment can be made very small, since this is the integral of the lift at each part of the span multiplied by its distance from the center of gravity, such that the outboard negative lift has greater leverage.

See, Azuma, A., G. Beppu, H. Ishikawa, K. Yasuda, Flight dynamics of the boomerang, part I: Fundamental analysis, Journal of Guidance, Control and Dynamics 27, 545-554, July-August 2004; Bahn, P. G., Flight into pre-history, Nature 373, 562, 1987; Bahn, P. G., Return of the Euroboomerang, Nature 329, 388, 1987. Battipede, M., Boomerang flight mechanics: Unsteady effects on motion characteristics, Journal of Aircraft 36 No. 4, 689-696, 1990; Beppu, G., H. Ishikawa, A. Azuma, K. Yasuda, Flight dynamics of the boomerang, part II: Effects of initial conditions and geometrical configuration, Journal of Guidance, Control and Dynamics 27, 555-562, July-August 2004; Hall, S., Boom in'rangs launches old toy into new orbit, Smithsonian vol. 15, pp. 118-124, 1984; Hess, F., The aerodynamics of boomerangs, Scientific American 219, 124-136, 1968; Hess, F., A returning boomerang from the Iron Age, Antiquity 47, 303-306, 1973; Hunt, H., Bang up a Boomerang, Millennium Mathematics Project, University of Cambridge (pss-.maths.org.uldissue7/features/boomhowto/index.html) January 1999; King, A. L., Project boomerang, Am. J. Phys. 43, No. 9, 770-773, 1975. Luebbers, R. A., Ancient boomerangs discovered in South Australia, Nature 253, 39, 1975; Musgrove, P., Many happy returns, New Scientist 61, 186-189, 24 Jan. 1974; Newman, B. G., Boomerangs, Aerospace, 13-18, December 1985; Sharpe, J. W., The boomerang, Philosophical Magazine vol. 10, 60-67, 1905. Thomas, J., Why boomerangs boomerang (and killing-sticks don't), New Scientist, 838-843, 22 Sep. 1983; Valde-Nowak, P., A. Nadachowski, and M. Wolsan, Upper Paleolithic boomerang made of a mammoth tusk, Nature 329, 436-438, 1987; Walker, G. T., On boomerangs, Phil. Trans. Roy. Soc. London Series A, 190, 23-41, 1897; Ruhe, B., and E. Darnell, Boomerang: How to Make and Catch It, Workman Publishing, New York, 1985; Jones, P., Boomerang: Behind an Australian Icon, Ten Speed Press, 1997, expressly incorporated herein by reference.

SUMMARY OF THE INVENTION

The present invention provides a system and method for automatic control of a rotating and translating aerodynamic projectile, having an internal automated control system that controls and/or selectively alters a flight path of the projectile. Because such craft are nominally radially symmetric about the axis of rotation, forces tend to be balanced over a period of rotation, and the rotation leads to a gyroscopically stabilized flight path. In order to provide lateral control, the control force or influence must generally be effected in an angle-of-rotation responsive manner, i.e. a non-rotating frame of reference.

As discussed above, there are many different parameters that can influence the flightpath of a projectile or craft. The surface configuration/shape, spin, and speed all exert independent influences, and each represents an opportunity for control under various circumstances. While the prior art, e.g., as discussed above, considers static projectiles, the present technology seeks to add a dynamic change in configuration/shape/surface/mass distribution/forces, in some cases surface rotation speed, and linear airspeed, which can have the effect of generating forces on the object during flight.

It is noted that the front and rear edges of a disk craft have asymmetric effects, and further that the direction of rotation also imposes an asymmetry. Therefore, it is also possible to provide some steering dependent on these intrinsic asymmetries, and without an angularly responsive control system per se. Thus, if a control system were to alter the profile of the outer edge of the rotating disk, the flight path could be controlled to some extent; typically with interactivity between control over pitch and roll.

While the Aerobie provides static shaped aerodynamic inner and outer edges to provide stability over a range of speeds, and long distance flight, the profile of these edges is a compromise, and therefore an adaptive mechanism for altering the shape of the edge profile(s) would provide enhanced performance and additional control possibilities, in a manner that need not be referenced to a non-rotating frame. The changes fall into two categories: first, since the edge profile can change as a function of rotational angle, the leading outer edge of the disk (or leading out and inner edges of the toroid) need not be of the same profile, and can change during rotation. Second, the edges need not be symmetric, that is may have multiple profiles (more than two) over the course of rotation, such as leading front edge, trailing front edge, leading rear edge and ailing rear edge. While larger numbers of variations are possible, unless these are continuous changes from the preceding state, this may tax the control system for marginal benefits.

In a rotational angle responsive control system, if a force is synchronized to be eccentric with respect to an external observer, the craft could be steered with greater independence of pitch and roll. The control may provide a force acting normal to the gyroscopic axis, or act to alter the gyroscopic axis. In the typical case, the gyroscopic stabilization is advantageous, and therefore is maintained in the controlled projectile as compared with the uncontrolled projectile. In order to effect a cumulative control effect, the force should act eccentrically to the craft, responsive to an angle of the rotation (e.g., rotational angle with respect to a fixed reference) of the object, such that the flight path is intentionally altered from the unmodified outcome.

At least three different main embodiments are provided: a disk, such as a Frisbee or Aerobie, with a gyroscopic axis vertical normal to the flight path (and generally aligned with the gravitational axis), a ball, such as a football, in which the gyroscopic axis is aligned with the flight path, and a ball with another axis of rotation, such as a golf ball, which is launched with topspin. Other projectiles are possible with defined or arbitrary rotational axes.

The object is preferably a reusable (e.g., non-single use, non-self-destructive) non-lethal projectile. However, the technologies may be deployed in single use craft, and/or weaponry. In a single-use craft, a primary battery may be provided with active propulsion, and thus many of the passive control paradigms proposed herein are not required. An example of a weapon than may be controlled is a boomerang or rotating arrow. The projectile may thus be configured as a boomerang, with actuators effecting alteration of aerodynamic control surfaces during flight, preferably as a function of orientation in space.

Further, the projectile is preferably manually graspable and catchable in flight without permanent damage to control surfaces or significant risk of such damage. Therefore, the control system preferably does not employ extending wings, rudders or ailerons, or fragile shutters, though in particular cases, such types of controls might be suitable. Further, the projectile preferably has smooth exterior surfaces to avoid injury to a person interacting with the projectile. Because dirt and mud may be environmental issues, small functional gaps in which dirt or debris might become trapped are preferably avoided.

Further, the projectile preferably has a "passive" propulsion and control paradigm, in which the projectile is launched and inertia and aerodynamic forces are employed to alter the flight path without any active forward thrusters that employ power stored before the flight commences. The control system typically is an electrically powered electronic system, which may include a microprocessor, battery, memory, sensors, wireless communications, and actuator drivers, for example. Typically, the battery has sufficient capacity to operate the projectile over a suitable period without requiring intervening recharge or battery replacement. The projectile is preferably water resistant, e.g., 5 feet underwater for 30 minutes; in some cases, the projectile may have affirmative under, in, or on-water capabilities, such as to effect a self-retrieval. Because the object may be used in wet environments, exposed elements are preferably non-corroding and non-moisture sensitive. It is noted that one embodiment encompasses quadrotor or hexrotor drone technology, and therefore the preference for passive vs. active is not a mandatory feature or limitation. Because the object has limited weight and size, and due to operating cost concerns, the flight control is preferably not active (i.e., thrusters, propellers). However, in some embodiments, an active propulsion mechanism is provided. Therefore, the energy for both flight and flight control are provided during the launch.

Because the disk or ring may be rotated clockwise or counterclockwise during launch, the control system preferably provides a symmetrical or bidirectional control paradigm (or self-aligning with required control rotation-handedness).

Each of these preferences may be violated in particular embodiments, with the concomitant and expected advantages and disadvantages.

Steering of the projectile may be effected by control over any one or more of aerodynamic lift, aerodynamic drag, mass distribution, moment of inertia, thrusters/fan(s), turbulence and laminar flow patterns, shunting of pressure differentials, rudders, ailerons, etc. Other control systems include sonic or ultrasonic transducers to alter the boundary layer on the surface, texture or surface configuration control.

Steering or other control may be provided according to the "rules of the game", and may be preprogrammed or the system may receive commands while in flight. The automated control system may be autonomous externally defined, and for example, may autonomously steer around obstacles and toward a moving or stationary target.

The projectile may be under-actuated, optimally-actuated, or over-actuated. The projectile typically has 6+ degrees of freedom of movement, for example, x, y, z, phi/α, theta/β, psi/γ. In a rotating disk, there is minimal control over psi/γ, though by altering the moment of inertia, the speed of rotation can be altered, and through drag, the speed of rotation can be reduced. Similarly, in the absence of active propulsion, changes in y are typically limited to forward drag retardation. Changes in z are effected by lift, and may typically be controlled without an external angular frame of reference. X-axis shifting requires a side force, which may be generated by modulating the Magnus effect, such as by providing a rotating ring about the peripheral edge, controlled to rotate somewhat independently of the projectile as a whole. There are other possible means for providing x-axis deflection of the projectile. This leaves phi/α and theta/β, each of which is stabilized by gyroscopic action about the psi/γ axis. One way to alter these angles is to provide an eccentric torque on the projectile, which may be produced aerodynamically or gravitationally. In the gravitational case, a mass offset from the center or rotation (in a balanced system) is counter-rotated with respect to the hull, to maintain a stationary external angular reference. The offset mass induces a torque with respect to the external reference, and this changes in phi/α and/or theta/β. Note that the gyroscopic stabilization will result in a reaction force, and therefore the control system must predict or compensate for this. In the aerodynamic case, aerodynamic elements are deployed or employed, synchronized with the angle of rotation. Rotation may be up to 40 rotations per second, and therefore 2,400 RPM. Assuming that the disk is divided into quadrants, the control system must be able to fully deploy and cease within about 6 ms, or about 160 Hz. This speed of deployment in order to obtain useful control imposes significant constraints. Another option is to provide an aerodynamic feature that is mounted on a counter-rotating subframe, which then is non-rotating stationary with respect to the external reference.

Focusing on phi/α and theta/β, control over these parameters would provide directional control over the flight path, and with an additional z-axis control (lift), together would provide three dimensional under-actuated control over the flight path. As discussed above, lift may be controlled without angular responsivity, such as by symmetric ridges, a vent, a fan, or the like.

One advantageous aerodynamic feature which is consistent with various motivations expressed above is the use of a piezoelectric bender, electronically actuated based on angle of rotation, which alters the surface boundary layer, for example by expelling air (creating pressure) or inspiring air (creating vacuum) over a selected region of the disk surface. This piezoelectric bender may also operate resonantly over a modulated period of time, and for example may interact with a surface pattern on the disk to create constructive or destructive interference with an air flow pattern, to alter the surface boundary layer. In this case, the transducer may be feedback operated to optimize frequency and phase.

For example, the upper surface of the Frisbee may have a set of undulations, spaced at π/80 radians, which corresponds to 1600 Hz at 20 rotations per second. For a 10 inch diameter disk, the circumference is 31.5 inches, corresponding to an undulation spacing at the outer edge of 0.19", about 4.85 mm. At the nadir of each indulation, a slit is provided, which is pneumatically connected to a chamber with a piezoelectric bender on one wall. The chamber may be a Helmholz resonator or a broadband tuned chamber. The piezoelectric bender is oscillated at a phase and frequency to control separation of the boundary layer. The separation may be controlled to be bound to the surface on one side, and separated on the other, to apply a differential force about the rotational axis, i.e., a torque. The disk may have two or more benders, and the benders may be connected on opposed sides to different chambers, connected to opposite sides of the disk.

Another option is to provide a set of electric motors, driving disks that have apertures, driven with respect to an aperture plate structure. When the hole in the disk aligns with the hole in the aperture plate, the pressure between the top and bottom of the disk is locally equalized. When the holes to not align, a pressure differential is maintained. Therefore, the lift profile across the surface may be controlled, to product a torque. Other types of actuators may be employed to open and close vents. Another option is to provide a centrifugal fan which creates a pressure in a plenum, which is then blocked, vented upwards, or vented downwards, depending on angular rotation of the disk.

According to another embodiment, a set of motors are driven to rotate airflow disruptors located at the top of the disk. If the disruptor rotates with the rotation of the disk, it will promote laminar flow, while if rotated against the air flow, it will promote turbulent flow. Since different regions of the disk can have different flow, a differential effect is possible.

The actuator suite may be a single flap on the surface, or a set of flaps, which act to push air up or down with respect to the surface. Since these will generally be located off of the gyroscope axis, they provide phi, and theta control, i.e., a torque about psi. Further, if a plurality of flaps are operated symmetrically, they can provide z control (lift). Typically speed (dx/dt) is not independently controllable (unless there is active propulsion), and is dependent on tradeoffs with between potential energy and kinetic energy. y is independently controllable using the Magnus effect, but is a controlled variable only if there is a peripheral actuator, and then, provides one-sided operation. Therefore, the control may provide an opposing bias using phi and theta, to permit bidirectional control.

If a single active propulsion device is provided, this will typically be concentrically aligned with the gyroscopic axis (z), and provide continuous lift or air pressure, with possible interaction with other passive actuators. Therefore, the control can be effected with lesser effect on kinetic energy.

According to one embodiment, a centrifugal blower is provided within the projectile, which pressurizes a plenum. Actuators may therefore act to both alter the aerodynamic surfaces and vent the pressure. In a Frisbee, the intake is typically on top, to provide lift, while in a football, the intake is in front. For symmetric balls, a set of mutually orthogonal intakes may be provided to provide neutral effect.

According to another embodiment, a single axis of control is provided. A counter-rotating mass is driven by a motor, such that the speed of the motor matches the rotational speed of the disk. The mass is controlled to adjust the center of mass with respect to the center of pressure, with respect to a stationary angular frame of reference. As a result, the disk can be steered laterally and vertically. In addition, the same motor may be driven to generate additional lift by pressurizing the lower region, and may generate additional gyroscopic stabilization, especially if the fan causes rotational drag to permit increases in moment of inertia. A clutch may be provided to selectively drive the peripheral edge in the same direction as the disk rotation, an opposite direction, or no rotation, and therefore provide lateral steering independent of pitch.

The motor is provided concentric with the axis of rotation, and is bidirectionally driven, so it always rotates with the rotation of the disk, regardless of launch rotation direction. A gear train, e.g., a planetary gear set, is provided to drive a pair of masses which are independently positionable, so that they may be balanced or imbalanced. The movement may by controlled by a magnetic clutch, e.g., using a ferrofluid whose viscosity is modulated by an electric field.

One advantage of a planetary gear is that the outer ring gear can be the efficiently driven separately from the planet gears, which in this case (along with their cage) may represent the gyroscopic mass. The sun gear is driven by a motor, which may bidirectionally drive the ring, which has an aerodynamic surface, to generate the Magnus effect.

On launch, the masses are balanced, and the motor is quickly spun up so that the masses are non-rotating with respect to a stationary frame of reference. The system may be biased to a dynamically balanced (neutral) state with a spring. A steering input causes one of the masses to precess or advance with respect to the other, by a controlled drag on the rotating shell or other rotating element, leading to an imbalance. In this case, it is advantageous if each mass has an associated clutch, facilitating bilateral mass redistribution. If, for example, one mass is forward and the other rear, and the shell is rotating clockwise, a drag of the front mass with respect to the shell will cause the mass to move to the right, and a drag of the rear mass with respect to the shell will cause the mass to move to the left. A continued drag can align the masses together, with arbitrary angular orientation. After the steering maneuver is executed, the drag is released, and the bias spring permitted to rebalance the masses.

Alternately, a pair of motors may be provided, each independently controlling the masses. The masses may be, for example, batteries for operating the motor(s).

In the case of dual motors, the motor for each mass may be located within the mass, and be driven with respect to the rotating shell independently, with coordinated control. In this case, wireless battery charging is preferred, since there are two batteries to charge.

According to another embodiment, the gyroscopic stabilization of the disk is produced by an internal mass, and the external shell may be stationary. As such, the shell may provide non-rotating aerodynamic steering effects.

It is noted that the eccentric masses need not be non-rotating, and may in fact themselves be driven in rotation to assist in gyroscopic stabilization. Thus, a light subframe may be provided to keep position the rotating masses with respect to the rotating shell.

According to one embodiment, a disk is provided with a planetary gearset, with the sun gear in the center, planet gears outside, and the ring gear housed within the disk shell. In this case, the planet gears rotate in a direction opposite the sun and ring, and advance around the sun gear. The sun gear is driven by a motor with respect to the ring. The planet gears are low mass, and therefore do not significantly detract from the rotational inertia.

A control system is provided for the planetary gearset as follows, to permit the following modes: Brake between planet cage and shell; Brake between ring gear and shell: highest ratio between motor speed and shell; and Brake between sun gear and planet cage. During normal operation, the sun gear spins faster than shell, ring and shell spins slower. Assuming a mass concentration in the sun gear, this leads to high gyroscopic stabilization, and reduction of Magnus effect (steering). A brake between the ring and shell is engaged during spin up mode.

While the moment of inertia is conserved, the spin of the shell can be modulated (and even reversed), if the moment may be transferred to another rotating mass. Therefore, the rotational moment may be controlled to permit steering.

In the case of a shell that rotates independently of the launch, the rotation of the shell may be bidirectionally controlled to employ the Magnus effect. Further, a fan or centrifugal blower may be provided within the disk, to generate a pressure in a plenum. A valve manifold arrangement may be provided to vent the air to enhance or reduce the Magnus effect. For example, one side of the disk may be the intake, and the other side the exhaust, with the manifold counter-rotating to maintain orientation. In this case, the fan may run continuously, with a front-to-rear flow in the neutral state, and a back-to-front flow to brake the movement. This provides a true y-axis steering. If the fan assembly has an eccentric mass, then the air flow may be supplemented by a torque on the z-axis. The intake and outlet may be unitary, or split, with a pair of checkvalves distinguishing flow direction. Thus, the outlet me be directed down, and the inlet up, for example.

If a counter-rotating substructure is provided, it is preferred that accelerometers, gyroscopes, an compasses be mounted on the stationary reference substructure. If the inertial guidance elements are provided on the spinning elements of the disk, then it is preferred that the devices be capable of handling 50+ rotations per second.

The counter-rotating elements may be driven by a permanent magnet motor, brushless DC motor, servo motor, stepper motor, ultrasonic motor, or other type of motor.

In an eccentric mass embodiment, the mass is provided on a counter-rotating substructure driven by a motor to match the speed of the gyroscopic mass. The eccentricity of the mass is also controlled, permitting a null position and at least one eccentricity position. A clutch or solenoid may be used to permit use of a single motor for both counter-rotation and eccentricity control. The eccentricity mechanism may employ a linear stepper motor, rack and pinion, pulley and/or band, in order to move the mass inward and outward. A mechanical or opto-encoder, variable resistor, or LDVT may be used to provide feedback for intermediate states of eccentricity. The distance may be continuously or direcretely encoded, e.g., 2-32 positions.

In order to minimize aggregate mass, the eccentric mass may be the motor and/or batteries, which may move with respect to a low mass structure. The motor may be on end of an arm, with a band/belt/gear drive to counter-rotate the arm with respect to the shell, thus leaving the arm stationary when the shell spins. A clutch can then engage or disengage to move the motor inward and outward. A key feature is to permit the motor to assume a balanced position, so that active steering ceases, and the counter-rotation drive may be stopped. Alternately, a second motor may be used to reposition the mass.

Of course, the mass may be passive, with the rotational motor concentric with the axis of rotation.

The control system has the main function of stabilizing flight against perturbations or incorrect current/launch conditions, and to steer/direct the projectile according to a steering signal or rule. The various references cited herein (incorporated by reference) define various options for the rules, flightpaths, or goals, which need not be repeated herein. For example, a Frisbee initially launched at in incorrect angle may be corrected in flight. As the Frisbee slows its forward velocity, and the lift suffers, compensating control inputs may assist in the last portion of the flight. As the disk nears its target or goal, the control system may destabilize flight. In a game, the disk may have a predetermined control pattern, a program which is controlled at launch, or may receive external control signals in flight. The complexity of the control system typically increases cost, and therefore in a commercial design, tradeoffs are required to achieve a target cost, weight, size, durability, and other characteristics. However, where cost is not an overriding design constraint, the various other considerations permit a rich and sophisticated system, which can server various purposes. While a preferred design flies under power provide at launch, a "drone" embodiment may employ active propulsion as a primary or supplemental feature.

It is therefore an object to provide a flying projectile which rotates during flight, comprising: an inertial mass configured to spin during flight; an aerodynamic surface configured to rotate and interact with surrounding air during flight, to produce aerodynamic forces having a center of pressure; a sensor configured to determine an angular rotation of the spin during flight; a control system, responsive to the sensor, configured to produce at least one control signal in dependence on the determined angular rotation during flight; and at least one actuator, configured to selectively alter an aerodynamic characteristic of the aerodynamic surface with respect to an axis of rotation of the flying projectile in response to the at least one control signal.

It is a further object to provide a rotating aerodynamic flying object, comprising: an aerodynamic surface, configured to produce an aerodynamic lift force with respect to air moving over the rotating aerodynamic flying object during flight; an orientation sensor configured to generate a sensor signal responsive to a rotational angle of the rotating aerodynamic flying object with respect to an external reference, the sensor signal having a periodic variation dependent on rotation of the rotating aerodynamic flying object during flight; a control system responsive to at least the sensor signal having a periodic variation dependent on rotation of the rotating aerodynamic flying object during flight, to produce a control signal; and an actuator responsive to the control signal, configured to alter a flight path of the rotating aerodynamic flying object, comprising at least one of: a aerodynamic element, configured to alter an aerodynamic parameter of the aerodynamic surface which varies responsive to the rotational angle of the rotating aerodynamic flying object with respect to an external reference; and a repositionable mass, which counter-rotates with respect to a rotation of the rotating aerodynamic flying object, configured to alter a relation of a center of mass and an aerodynamic force distribution, dependent on the rotational angle. The control may also receive a control command from an interface, e.g., a manual (hand) or wireless interface, and further control a flightpath of the rotating aerodynamic flying object dependent on the control command.

It is another object to provide a method for controlling a flying projectile which rotates during flight, comprising: determining an angle of rotation of an inertial mass spinning about an axis during flight; and controlling at least one actuator for altering at least a portion of an aerodynamic structure with respect to an axis or rotation of an aerodynamic surface, selectively in dependence on the determined angle of rotation, to control aerodynamic forces during flight.

The at least one actuator may be configured to control an aerodynamic property of at least a portion of a peripheral edge of the flying projectile with respect to an axis of rotation. The at least one actuator may comprise at least two actuators, configured to independently control an aerodynamic property of at least two different portions of a peripheral edge of the flying projectile with respect to an axis of rotation. The at least one actuator may comprise at least three actuators, configured to independently control an aerodynamic property of at least three different portions of a peripheral edge of the flying projectile with respect to an axis of rotation spaced evenly about the peripheral edge.

The at least one actuator may comprise a selectively controlled baffle.

The control system may be further configured to be responsive to a guidance signal to selectively alter a flightpath of the flying projectile from an uncontrolled flightpath.

The control system may be responsive to a guidance signal to selectively maintain a predetermined flightpath of the projectile against an external aerodynamic perturbation during flight.

The at least one actuator may be configured to alter at least the portion of the aerodynamic surface during flight to generate a Magnus effect force synchronized with angular rotation of the flying projectile. A Magnus effect force may be generated to shift a flight path of the flying projectile in a horizontal plane or vertical plane (height) during flight. The at least one actuator may be configured to alter at least the portion of the aerodynamic surface during flight to selectively generate lift eccentric to an axis of rotation, wherein the generated lift is synchronized with angular rotation of the flying projectile. The at least one actuator may be configured to selectively alter an angle of an axis of rotation of the flying projectile with respect to a gravitational vector. The at least one actuator may be configured to selectively alter a flightpath of the flying projectile substantially without altering an angle of an axis of rotation of the flying projectile with respect to a gravitational vector. The at least one actuator may be configured to selectively alter a turbulence of air flowing over the flying projectile during flight at the at least the portion synchronized with angular rotation of the flying projectile. The at least one actuator may be configured to selectively alter a texture of the at least the portion of the aerodynamic surface synchronized with angular rotation of the flying projectile. The at least one actuator may comprise at least two actuators, and the control system may be further configured to control each of the at least two actuators to selectively produce different aerodynamic forces as a function of the angular rotation of the flying projectile. The at least one actuator may comprise a rotating motor, linear motor, bimetallic element, piezoelectric element, fluid pump, pneumatic actuator, hydraulic actuator, MEMS device, magnetorheological fluid, etc. For example, the at least one actuator may be configured to respond to a pneumatic pressure in a plenum, the pneumatic pressure being controlled by the control system as a function of the angular rotation of the flying projectile. The at least one actuator may be configured to respond to a movement of a hydraulic fluid, controlled by the control system as a function of the angular rotation of the flying projectile. The at least one actuator may comprise a set of controllable shutters which selectively block and permit air flow. The at least one actuator may comprise a set of controllable intake valves. The actuator may comprise a set of vector-thrust conduits, whose angle with respect to a radial chord is variable under control of the control signal; the variation may be laterally or vertically, or both. The at least one actuator may comprise an elastic membrane disposed on the aerodynamic surface, wherein an aerodynamic force is dependent on a pressure beneath the elastic membrane controlled as a function of angular rotation. The at least one actuator may comprise at least one rib which selectively protrudes into and interacts with the air surrounding the flying projectile during flight. The at least one actuator may comprise a source of compressed gas. The at least one actuator may comprise a valve configured to selectively permit flow of a gas or liquid. The at least one actuator may comprise vent configured to exhaust a flow of a gas to the atmosphere surrounding the flying projectile. The flying projectile may comprise a thruster and/or a rotating propeller.

The system may further comprise a directional receiver configured to determine a direction to a moving object, wherein the control system is further responsive to the determined direction to the moving object. The system may further comprise a geolocation system producing a geolocation signal, wherein the control system is further responsive to the geolocation signal. The system may further comprise a memory configured to store at least one planned maneuver, wherein the control system is further configured to read the at least one planned maneuver from the memory and to control the at least one actuator to execute the at least one planned maneuver during flight. The sensor may comprise a magnetometer.

The control system may be further configured to execute flight control logic, dependent on at least two competing goals, and to control the at least one actuator to execute the flight logic to optimize between the at least two competing goals.

The inertial mass configured to spin during flight is disk-shaped, for example, the system may be a Frisbee or Aerobie type craft. Alternately, it may be a boomerang, or a ball.

The flying projectile further may comprise a rotating inertial mass, distinct from the inertial mass configured to spin during flight, which has a portion of its surface isolated from interaction with the surrounding air. That is, the rotating inertial mass is isolated from, the environment, and typically is rotated to be nearly stationary with respect to an external frame of reference. The inertial mass configured to spin during flight may be integral with the aerodynamic surface.

The flying projectile may further comprise an electronic camera, wherein images from the electronic camera are synchronized based on at least the determined angular rotation.

The flying projectile may further comprise a rechargeable battery power source and/or an energy harvesting power source.

The control signal may be responsive to a guidance signal to selectively alter a flightpath of the flying projectile from an uncontrolled flightpath. The control signal may be responsive to a guidance signal to selectively maintain a predetermined flightpath of the projectile against an external aerodynamic perturbation during flight.

It is another object to provide a method for controlling a flightpath of a rotating aerodynamic object, comprising: providing an aerodynamic surface at a peripheral region of the rotating aerodynamic object; providing an angular rotation signal responsive to an angle of rotation of the rotating aerodynamic object; providing a control signal responsive to at least the angular rotation signal from a control system; and an providing an actuator comprising at least one of: (a) an array of apertures, each aperture having a structure to selectively modulate air flow through the aperture under control of the control signal; (b) an array of aerodynamic structures, each aerodynamic structure being configured to alter at least one of a lift, a drag, and a turbulence around the rotating aerodynamic object under control of the control signal; (c) an aerodynamic structure at a periphery of the rotating aerodynamic object, configured to modulate a Magnus effect influencing a flightpath of the rotating aerodynamic object under control of the control signal; and (d) an array of inertial masses, each having a range of radial movement, having a respective radial movement under control of the control signal. The rotating aerodynamic object may comprise a disk having a shell, an upper surface of the shell being configured to generate aerodynamic lift as a result of translational movement of the rotating disk through air normal to its axis of rotation. The aerodynamic object may comprise a ball, wherein the control signal causes a modulation of air turbulence as a result of translational movement of the rotating ball through air. The aerodynamic object may comprise a boomerang, a surface of the boomerang being configured to generate aerodynamic lift normal to its axis of rotation as a result of translational movement of the boomerang rotating through air.

The rotating aerodynamic object may comprise a mechanical energy storage structure configured to release energy under control of the control signal during flight, the mechanical energy storage structure having mechanical energy replenished prior to flight. The mechanical energy storage structure may be a spring or elastic membrane, for example.

The actuator may comprise at least one element which rotates (e.g., counter-rotates) with respect to the rotating aerodynamic object at approximately the same rate of rotation as the rotating aerodynamic object.

The control signal may implement a dynamic computer-implemented mathematical model of flight dynamics of the rotating aerodynamic object. The dynamic computer-implemented mathematical model of flight dynamics of the rotating aerodynamic object may calculate a coefficient of lift and a coefficient of drag for the rotating aerodynamic object, and may predict a precession and/or nutation of an axis of rotation of the rotating aerodynamic object.

It is an object to provide a flying projectile which rotates during flight, having a center of mass, comprising: an inertial mass, configured to spin during flight, about an axis of rotation; a rotatable aerodynamic surface configured to interact with surrounding air during flight, to produce aerodynamic forces having a center of pressure; a sensor configured to determine an angular rotation of the spin during flight; a control system, responsive to the sensor, configured to produce at least one control signal in dependence on at least an angle of the determined angular rotation during flight; and at least one actuator, configured to selectively alter at least one of: a relationship between a center of gravity and the center of pressure, and an aerodynamic characteristic of the aerodynamic surface with respect to the axis of rotation, in response to the at least one control signal.

The at least one actuator may comprise an actuator configured to a selectively create a Magnus effect synchronized with angular rotation of the flying projectile, e.g., applied to shift a flight path of the flying projectile in a horizontal plane. The at least one actuator may comprise a reconfigurable aerodynamic surface, a vibrating transducer, e.g., configured to control a boundary layer separation from the aerodynamic surface, a rotating motor, a linear actuator, a vane (e.g., a valve, shutter, aleron, etc.) controlled selectively block and permit an air flow. The at least one actuator may comprise at least three actuators, configured to independently control an aerodynamic property of at least three different portions of the flying projectile with respect to an axis of rotation. The control system may be further responsive to a guidance signal to selectively alter a flightpath of the flying projectile. The control system may be further configured to stabilize an instability of a flightpath of the flying projectile, e.g., a wobble of a Frisbee. The at least one actuator may be configured to alter at least the portion of the aerodynamic surface during flight to selectively generate lift eccentric to an axis of rotation, wherein the generated lift is synchronized with angular rotation of the flying projectile. The at least one actuator may also be configured to selectively alter an angle of an axis of rotation of the flying projectile with respect to a gravitational vector. The at least one actuator may be configured to selectively alter a turbulence of air flowing over the flying projectile during flight. The control system may be further configured to control each of the at least two actuators to selectively produce different aerodynamic forces as a function of an angle of rotation of the flying projectile. The at least one actuator may be configured to selectively a relationship between a center of mass with respect to an axis of rotation of the flying projectile in response to the at least one control signal. The control system may be further configured to execute flight control logic, dependent on at least two competing goals, and to control the at least one actuator to execute the flight logic to optimize between the at least two competing goals.

It is another object to provide a method for controlling a flying projectile which rotates during flight, comprising: determining an angle of rotation of an inertial mass spinning about an axis of rotation during flight; and controlling at least one actuator, which selectively alters at least one of a relationship between a center of mass with respect to an aerodynamic force acting on the flying projectile, and an aerodynamic characteristic of an aerodynamic surface with respect to the axis of rotation, in response to at least one control signal and the determined angle of rotation.

It is a further object to provide an aerodynamic object, comprising: an aerodynamic surface subject to rotation during flight configured to produce an aerodynamic force; an angular rotation sensor configured to generate a signal responsive to an angle of rotation with respect to an external reference; a control system responsive to at least the angular rotation signal; and an actuator comprising at least one of: a aerodynamic element, responsive to the control system, configured to alter an aerodynamic parameter of the aerodynamic surface dependent on the determined angle of rotation; a repositionable mass, responsive to the control system, configured to alter a relation of a center of mass and an aerodynamic force dependent on the determined angle of rotation.

It is another object to provide a method for controlling a flying projectile which rotates during flight, comprising: determining an angle of rotation of an inertial mass spinning about an axis during flight; and controlling at least one actuator, which selectively alters at least one of a relationship between a center of mass, and an aerodynamic characteristic of an aerodynamic surface, with respect to the axis of rotation, in response to at least one control signal and the determined angle of rotation.

It is a further object to provide an aerodynamic object, comprising: a rotatable aerodynamic surface; an angular rotation sensor configured to generate a signal responsive to an angle of rotation of the aerodynamic object; a control system responsive to at least the angular rotation signal; and an actuator comprising at least one of: a aerodynamic element, responsive to the control system, configured to alter at least one of an aerodynamic parameter of the aerodynamic surface; and a repositionable mass, responsive to the control system, configured to alter a center of mass of the aerodynamic object with respect to an axis of rotation of the aerodynamic object.

The control system may comprise a transceiver that operates according to a IEEE-802 protocol, such as IEEE-802.11x (WiFi local area network) or IEEE-802.15.4 (Bluetooth personal area network).

The control system may receive a flight plan prior to launch or during flight launch of the rotating aerodynamic object The control system may autonomously generate a homing signal to home on an external moving target or an evasion signal to evade an external moving target during flight, or both.

The control system may determine an external wind speed, a geolocation with a geolocation navigation system (GPS/GNSS/triangulation-trilateralization), and/or a terrain height with a height sensor.

The rotating aerodynamic object may comprise a fan configured to move air from a first part of the rotating aerodynamic object to the second part of the rotating aerodynamic object. The rotating aerodynamic object may comprise a duct and an air flow modulating baffle under control of the control signal, configured to control a flow of air from a first part of the rotating aerodynamic object to the second part of the rotating aerodynamic object. The duct may comprise a plurality of radially-oriented ducts pressurized by centrifugal forces.

The rotating aerodynamic object may comprise a first mass rotatable about an axis of rotation, and a second mass actively driven to counter-rotate about the axis of rotation with respect to the first mass, wherein a relative speed of counter-rotation is controlled in accordance with the control signal.

The flow of air over the exterior surfaces may be modulated by vibration that is advantageously induced by a piezoelectric transducer, or electromagnetic transducer (speaker). The mechanical configuration of the surface is typically fixed, and therefore the acoustic emission by the transducer controlled to selectively alter the aerodynamic properties, such that a differential lift and/or drag is created on the surface, to steer or otherwise control a flight path of the disk.

In analogous manner, a ball may also be controlled. Because the axis of rotation is not always vertical, the guidance system may be provided on a fully gimballed stage. The steering may be by the Magnus effect, and/or by an off-center torque to create a reaction force. The gimbals may be motorized, to actively control the relative position of the stage and the shell. Further, a gyroscopic mass may be provided in the ball, so that changes in the rotation can be accomplished while maintaining gyroscopic stabilization.

Alternately, the ball may have sets of ultrasonic transducers to control aerodynamic properties. In this case, an inertial guidance system is provided which is capable of operating over a full range of motion parameters of the ball. Since balls may be subject to rapid accelerations and high spin rates, this may be challenging. However, such 9-axis sensor modules are available.

DETAILED DESCRIPTION OF THE PREFERRED EMBODIMENTS

Figure 1A:
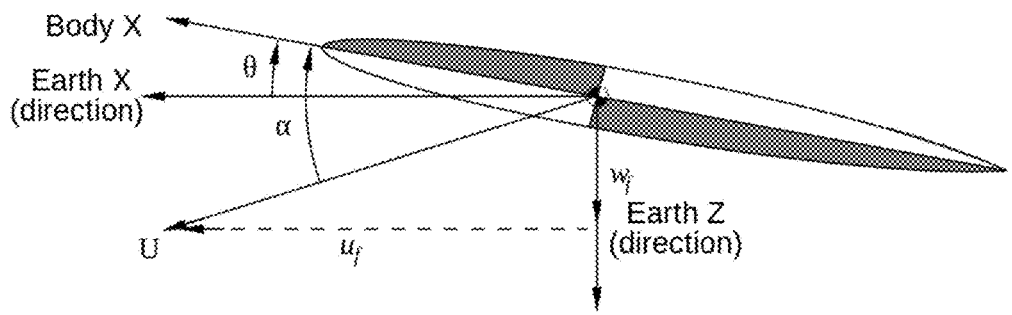
FIGS. 1A and 1B show a schematic representation of the various aerodynamic parameters of a generic craft and a spinning disk.
Figure 1B:
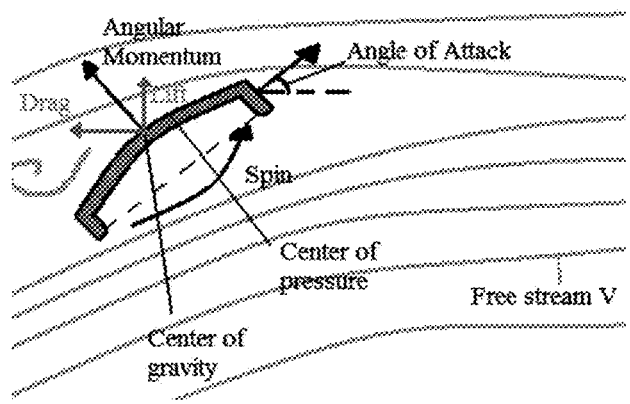

POWER. Since the actuator(s) are necessarily local within the disk, the actuator(s) and their controls should be located within the disk and powered by a self-contained power supply within the disk which may be an electrical (e.g., battery and/or supercapacitor) or chemical storage system (e.g., combustion, expansion, etc.), or power may be parasitically derived from the height, translation and/or rotation of the disk. Operative power may be added to a short term power storage system upon launch, for example, as a pneumatic pressure, spring tension, supercapacitor, etc. Preferably, an auxiliary power source remains available even after exhaustion of a short term power source.

A rechargeable lithium ion battery or alkaline primary battery may be used as the power source. Likewise, a supercapacitor may be employed with energy harvesting, e.g., solar or inertial energy. The energy harvesting preferably avoids significant parasitic losses during flight, but may be charged before flight or after landing/catching.

Typically, the disk is used outdoors in daylight, and therefore a solar cell array may be provided on the upper surface to power the system. Typically, the output of a solar array will be insufficient to supply peak power required for the actuators, and therefore the solar cell array, if provided, generally acts to recharge a battery or supercapacitor.

The projectile tends to have a maximum flight time of less than 1 minute, and more typically less than 30 seconds. During that time, the control and actuators may have a power draw of 500 mA @ 3.3V, or <1700 mW. Each 30 second play therefore requires <5 mAh. Assuming 50% play duty cycle for two hours, this implies a battery with a capacity of ~500 mAh. Indeed, such rechargeable lithium polymer batteries are inexpensive and available, and would not exceed the weight limit for the device. Indeed, a pair of batteries may be provided to achieve equal weight balance with a symmetric layout. Alternately, a larger cell-phone type battery may be employed, having a capacity of 900-3000 mAh @ 3.3V.

Because of the extended recharge time for such batteries, it is preferable that they are replaceable, rather than permanently mounted. A micro USB charger/communications port may be provided, and/or an inductive charging system. It is typically preferred that as much cellphone technology as possible be employed to achieve economies of scale. Typically, a touchscreen will not be required, though this may provide a means for local user input. Likewise, 3G, 4G, 5G radios may not be required.

SENSOR SYSTEM. Because sensor packages are available, it is typically efficient to provide a sensor system that includes 3-axis magnetometer, 3-axis accelerometer, 3-axis gyro, air pressure/barometer, thermometer, etc.

A rotational orientation sensor is preferably provided within the disk or projectile, though technically the rotational orientation sensor can be remote. Other sensors are optional. If only the rotational angle sensor is provided, then the object will typically assume a flight path which is either predetermined or externally provided. For example, the guidance system may be provided to impose a straight flight path, i.e., to increase the stability of flight.

In the case of a Frisbee, the system requires a rotational frame of reference, which may be provided, for example, by a magnetometer (e.g., fluxgate compass). Of course, more complex guidance or different systems are possible. In the case of a football, a ground reference (gravitational axis) is preferred, which may be provided by an accelerometer (e.g., z-axis). A rotating disk may be controlled in at least pitch, roll, yaw, x, y and z axis, passively (without expenditure of stored energy to effect these changes, though the control system requires power) with some interactivity between these axes. The disk is gyroscopically stabilized along its rotational axis, and stable flight generally requires level flight. Therefore, any steering input that alters the gyroscopic axis should restore level flight (or the desired static perturbation) after the maneuver is complete. The disk therefore preferably has a sensitive "gravitometer", to determine with high precision the gravitational axis. This sensor may be separate or different from that provided in a sensor package. Note that the "gravitometer" should be immune to the rotation of the disk, even at high speeds.

A rotating ball may be controlled in at least pitch, roll, and yaw. Distinct from the disk, in general, a ball can gave an arbitrary relation between an axis of rotation and a flight path. Therefore, the spatial reference should be generally symmetric along all three axes.

Available sensor modules provide measurement of 3-axis magnetometer (x, y and z heading), 3-axis gyroscope (pitch, roll, yaw), 3-axis accelerometer (x, y and z), air pressure, temperature, and GPS/GNSS (position and time). A humidity sensor may be provided in the same sensor package or separately. A radar, LIDAR or sonar sensor can provide height/altitude and in some cases, distances from other objects. A pilot tube (or a plurality of such sensors) may be provided to sense airspeed, and likewise, a differential barometer may be used to detect lift as an air pressure difference between upper and lower surfaces of the disk. Wind conditions and turbulence may in some cases be detected by LIDAR/Doppler sensing.

It is noted that a formal compass is not required; since the disk rotates during flight, a solenoid will generate a sinusoidal signal from the earth's magnetic field, and the peaks and troughs may be used to determine the disk's rotational speed. From the speed, the flight control can be synchronized to produce the eccentric force. Once the rotational speed is determined, a feedback signal may be used to determine the phase relationship of the desired steering signal with the rotation. That is, it is not required in all cases that the disk know its actual forward propagation vector, only the rotational speed and the relationship between its current direction and the desired direction.

A less comprehensive sensor package may be provided. For example, if a horizon sensor is provided for detecting axis of rotation, the z-axis accelerometer may be of limited value (though it is useful for detecting updrafts, downdrafts, and precession of the disk rotational axis for example). Likewise, the z-axis magnetometer may have limited value. Air properties may be determined empirically, and thus barometer, thermometer and hygrometer may be dispensed with. In some cases, a simplified control system with only a rotational axis determination, such as a magnetometer, may be employed.

Height is difficult to measure with a purely inertial guidance system, and use of barometer or GPS/GNSS would typically result in unacceptable errors. Therefore, a sonar or radar sensor may be provided on the bottom of the disk, which measures height (compensated for sin x/x distortion by pitch and roll estimates). If this is not provided, a heuristic may be employed which assumes that the launch height is 1 meter and the ground is level, which obviously has limitations. Of course, these presumptions may be modified by providing a statistical launch height for the thrower, and/or a terrain map. More generally, the GPS/GNSS system may be used to provide velocity (Doppler), an absolute position on a map, and changes in position and height over time.

See, U.S. Pat. Nos. 6,315,062; 6,405,132; 6,484,818; 6,526,352; 6,719,069; 6,720,920; 6,768,944; 6,833,795; 6,868,314; 6,885,968; 6,922,632; 6,982,697; 6,990,639; 7,085,637; 7,110,880; 7,143,844; 7,202,776; 7,209,221; 7,219,033; 7,250,936; 7,295,925; 7,307,617; 7,359,782; 7,418,346; 7,426,437; 7,552,403; 7,596,767; 7,607,494; 7,610,146; 7,629,899; 7,630,806; 7,647,180; 7,672,781; 7,689,378; 7,716,008; 7,716,013; 7,719,416; 7,721,231; 7,725,253; 7,774,155; 7,783,403; 7,791,503; 7,796,081; 7,823,089; 7,840,342; 7,840,355; 7,848,905; 7,852,462; 7,877,224; 7,899,616; 7,899,621; 7,907,838; 7,912,645; 7,927,216; 7,931,535; 7,942,745; 7,962,285; 7,979,172; 7,979,173; 7,983,802; 7,983,836; 7,990,283; 8,000,897; 8,032,324; 8,041,483; 8,041,536; 8,060,308; 8,068,979; 8,089,458; 8,124,921; 8,126,680; 8,132,126; 8,140,259; 8,157,651; 8,164,567; 8,169,406; 8,184,097; 8,209,120; 8,209,147; 8,226,493; 8,231,506; 8,248,367; 8,250,921; 8,255,144; 8,260,537; 8,260,883; 8,267,786; 8,289,162; 8,308,563; 8,310,368; 8,313,379; 8,344,998; 8,351,773; 8,368,648; 8,373,659; 8,384,538; 8,384,668; 8,409,003; 8,428,913; 8,430,753; 8,447,474; 8,456,159; 8,456,419; 8,462,109; 8,467,133; 8,472,120; 8,472,986; 8,473,245; 8,475,275; 8,477,425; 8,482,859; 8,488,246; 8,491,389; 8,500,604; 8,504,008; 8,509,827; 8,516,886; 8,516,887; 8,541,745; 8,562,487; 8,569,090; 8,571,781; 8,576,073; 8,584,522; 8,593,331; 8,608,535; 8,620,239; 8,626,472; 8,628,453; 8,629,836; 8,630,795; 8,638,217; 8,655,307; 8,686,579; 8,688,403; 8,689,426; 8,702,515; 8,707,216; 8,708,821; 8,708,824; 8,711,094; 8,750,897; 8,751,063; 8,756,010; 8,756,173; 8,758,136; 8,768,865; 8,771,148; 8,781,669; 8,784,268; 8,790,180; 8,814,688; 8,814,691; 8,827,810; 8,834,271; 8,843,279; 8,845,557; 8,847,137; 8,855,838; 8,860,409; 8,870,655; 8,874,129; 8,878,528; 8,878,673; 8,888,576; 8,892,271; 8,893,785; 8,896,301; 8,912,892; 8,913,011; 8,915,785; 8,930,300; 8,938,612; 8,947,081; 8,954,290; 8,954,292; 8,957,783; 8,961,260; 8,961,312; 8,963,845; 8,964,298; 8,965,677; 8,969,101; 8,977,494; 8,997,564; 9,004,973; 9,011,248; 9,020,191; 9,021,880; 9,030,321; 9,031,573; 9,032,796; 9,033,116; 9,037,455; 9,039,533; 9,044,671; 9,053,516; 9,056,676; 9,070,101; 9,090,339; 9,095,072; 9,097,890; 9,097,891; 9,107,586; 9,114,838; 9,122,307; 9,127,908; 9,128,281; 9,129,295; 9,134,534; 9,140,444; 9,146,147; 9,149,717; 9,150,263; 9,155,168; 9,157,736; 9,162,148; 9,174,733; 9,176,500; 9,177,476; 9,182,596; 9,186,096; 9,186,567; 9,186,585; 9,187,099; 9,192,815; 9,193,404; 9,197,736; 9,205,921; 9,208,676; 9,209,888; 9,211,947; 9,223,134; 9,227,138; 9,229,227; 9,235,241; 9,238,142; 9,248,343; 9,254,759; 9,261,978; 9,265,991; 9,266,178; 9,266,233; 9,269,022; 9,272,206; 9,273,981; 9,284,062; 9,285,241; 9,285,589; 9,286,726; 9,290,220; 9,292,102; 9,298,282; 9,301,085; 9,302,783; 9,329,597; 9,329,689; 9,341,843; 9,351,060; 9,366,862; 9,373,149; 9,383,208; 9,384,668; 9,403,060; 9,403,272; 9,408,143; 9,408,477; 9,426,430; 9,427,624; 9,427,864; 9,437,088; 9,451,020; 9,452,287; 9,452,319; 9,452,685; 9,457,915; 9,468,272; 9,478,063; 9,479,697; 9,511,260; 9,519,750; 9,525,438; 9,550,582; 9,552,708; 9,576,475; 9,582,034; 9,589,446; 9,591,902; 9,600,645; RE45905; 20020005297; 20020198632; 20030111268; 20030149803; 20030191568; 20030193572; 20040073360; 20040148057; 20040190374; 20050060069; 20050110751; 20050134440; 20050137786; 20050156883; 20050173153; 20050195383; 20050257173; 20050257174; 20050278098; 20060027404; 20060184336; 20070005609; 20070021915; 20070073482; 20070109111; 20070152804; 20070182528; 20070219744; 20070240903; 20070296571; 20080004798; 20080015771; 20080036617; 20080040004; 20080040023; 20080040029; 20080042815; 20080046150; 20080047329; 20080106436; 20080119993; 20080133136; 20080140318; 20080142060; 20080147253; 20080150786; 20080154495; 20080154629; 20080161986; 20080161987; 20080162036; 20080165018; 20080167819; 20080167821; 20080192007; 20080192070; 20080204410; 20080204411; 20080215202; 20080215231; 20080250869; 20080259055; 20080282817; 20080313575; 20090007661; 20090012741; 20090029754; 20090030605; 20090033540; 20090043506; 20090046750; 20090140887; 20090143923; 20090164952; 20090195497; 20090198354; 20090228157; 20090262074; 20090303204; 20100052945; 20100057305; 20100088532; 20100123605; 20100156676; 20100164711; 20100169009; 20100194573; 20100198514; 20100204615; 20100214216; 20100253624; 20100257251; 20100280751; 20100299102; 20100323730; 20110001696; 20110004329; 20110014933; 20110066398; 20110087431; 20110092337; 20110161076; 20110163955; 20110208444; 20110213664; 20110214044; 20110214082; 20110221656; 20110221657; 20110221658; 20110221659; 20110221668; 20110221669; 20110221670; 20110221671; 20110221672; 20110221793; 20110221896; 20110221897; 20110222745; 20110225536; 20110227812; 20110227813; 20110227820; 20110231757; 20110250819; 20110265564; 20110265565; 20110265566; 20110265568; 20110270569; 20110273061; 20110273378; 20110285527; 20110304497; 20110306304; 20110312279; 20120018567; 20120062445; 20120075168; 20120109427; 20120140451; 20120142144; 20120158354; 20120168240; 20120168241; 20120173047; 20120173048; 20120173049; 20120173050; 20120176128; 20120176129; 20120183099; 20120194418; 20120194419; 20120194420; 20120194549; 20120194550; 20120194551; 20120194552; 20120194553; 20120200488; 20120200499; 20120200601; 20120206322; 20120206323; 20120206334; 20120206335; 20120206485; 20120209505; 20120212398; 20120212399; 20120212400; 20120212406; 20120212414; 20120212484; 20120212499; 20120217958; 20120218172; 20120218301; 20120221290; 20120235883; 20120235884; 20120235885; 20120235886; 20120235887; 20120235900; 20120236025; 20120236030; 20120236031; 20120242678; 20120242697; 20120242698; 20120249797; 20120253738; 20120254100; 20120259578; 20120262329; 20120264376; 20120265716; 20120265717; 20120270564; 20120293330; 20120301011; 20120308354; 20120316406; 20120316455; 20120323474; 20130002538; 20130006572; 20130006573; 20130016012; 20130018766; 20130029681; 20130033381; 20130033418; 20130035893; 20130065604; 20130078908; 20130078909; 20130083941; 20130085713; 20130096825; 20130102323; 20130119255; 20130127980; 20130130843; 20130173171; 20130194066; 20130201098; 20130201316; 20130204962; 20130214909; 20130217332; 20130217333; 20130218505; 20130221195; 20130222115; 20130226511; 20130265225; 20130278631; 20130282438; 20130297422; 20130298208; 20130314092; 20130314303;

20130324888; 20130329522; 20130333175; 20140012531; 20140013557; 20140020964; 20140025330; 20140028539; 20140032034; 20140039277; 20140041174; 20140046463; 20140063054; 20140063055; 20140064112; 20140071432; 20140074180; 20140074263; 20140099853; 20140111187; 20140120961; 20140128021; 20140128182; 20140130570; 20140133656; 20140136414; 20140152507; 20140153773; 20140163768; 20140168443; 20140172200; 20140180914; 20140187258; 20140202800; 20140208841; 20140212986; 20140214357; 20140222334; 20140235169; 20140236393; 20140245161; 20140257141; 20140266669; 20140266773; 20140266780; 20140267586; 20140277739; 20140288682; 20140288873; 20140292654; 20140303900; 20140306580; 20140306821; 20140313303; 20140316235; 20140323142; 20140337732; 20140337733; 20140342324; 20140349269; 20140358261; 20140378810; 20150003698; 20150003699; 20150005640; 20150005644; 20150006186; 20150009034; 20150016712; 20150019266; 20150025917; 20150040243; 20150049487; 20150057112; 20150058159; 20150058192; 20150059002; 20150061859; 20150070323; 20150071648; 20150083495; 20150087257; 20150088452; 20150088546; 20150088547; 20150091507; 20150091531; 20150091729; 20150094867; 20150095789; 20150097719; 20150100107; 20150108872; 20150109104; 20150109112; 20150109128; 20150112885; 20150113417; 20150115767; 20150116106; 20150116107; 20150116108; 20150116109; 20150120015; 20150120596; 20150120598; 20150127712; 20150137806; 20150137994; 20150145643; 20150154850; 20150156030; 20150156031; 20150158600; 20150166072; 20150180372; 20150192416; 20150192976; 20150194165; 20150197248; 20150202770; 20150205298; 20150215740; 20150219457; 20150220109; 20150227794; 20150229019; 20150237424; 20150242120; 20150243085; 20150247917; 20150258373; 20150258413; 20150266180; 20150266181; 20150273351; 20150293580; 20150294141; 20150294363; 20150297951; 20150302207; 20150303768; 20150309316; 20150309562; 20150321000; 20150330778; 20150331420; 20150344109; 20150346726; 20150347910; 20150353206; 20150356289; 20150356610; 20150362919; 20150370257; 20150373036; 20160005320; 20160012707; 20160013818; 20160015004; 20160015006; 20160020506; 20160021178; 20160023762; 20160027399; 20160039542; 20160048369; 20160048370; 20160059074; 20160059075; 20160061396; 20160082953; 20160089089; 20160091938; 20160099602; 20160099613; 20160099614; 20160099756; 20160099757; 20160101516; 20160101517; 20160107309; 20160119541; 20160135431; 20160136482; 20160137208; 20160150362; 20160155200; 20160163204; 20160167807; 20160171744; 20160179096; 20160187654; 20160191121; 20160205500; 20160209648; 20160217327; 20160221683; 20160227361; 20160233912; 20160234356; 20160243701; 20160246326; 20160259979; 20160262608; 20160267809; 20160269812; 20160269819; 20160278652; 20160282956; 20160295978; 20160296053; 20160300508; 20160302148; 20160310838; 20160313174; 20160332060; 20160332064; 20160332748; 20160338457; 20160342767; 20160353996; 20160355257; 20160357187; 20160357188; 20160357262; 20160358477; 20160371944; 20160379141; 20160381536; 20160381727; 20170014625; 20170018001; 20170023458; 20170039336; 20170039599; 20170043216; 20170046979; 20170055652; 20170060646; 20170061404; 20170064058; 20170071300; 20170078400; 20170080332; 20170080861; 20170086015, each of which is expressly incorporated herein by reference in its entirety.

AUTOMATED CONTROL. Typically, the control system is an electronic, microprocessor controlled control system, which alters a flight control surface synchronized with the rotation. Typically, the flight control surface is a plurality of surfaces which are dynamically balanced to minimize dynamic imbalance, which causes vibration and instability. The rotational rate of the projectile may be, for example, 600 RPM, and therefore the control system should have a deterministic response time of less than about 5 mS to deploy and retract the flight control surface. Faster spin rates require correspondingly lower response times. While solenoid actuation is possible, because of the cyclic actuation, a rotating motor may be employed, for example with a rotating speed and phase matching the rotational speed of rotation of the projectile, and a cam to provide the flight control surface actuation profile. Because of the small size and power, it is preferred that the motors, which may be "pager" motor type, have a gear reduction transmission, which may also include a clutch mechanism (e.g., magnetic clutch or friction clutch). Alternately, the motor(s) may be of a stepper motor design. In one case, a single motor may provide for actuation of multiple flight control surfaces, while in another case, each surface has its own actuator.

The system may provide a complex guidance system, which can target a stationary or moving target, avoid obstacles in the flight path, and execute evasive maneuvers. The sensor package may include a multiaxis (e.g., 2+ axes) magnetometer (compass), accelerometer, gyroscope, as well as, GPS, camera(s), microphone(s) or a microphone array, radio frequency direction-finding, altimeter/barometer, light sensor, etc. Some or all of these sensors are found in common smartphones, and therefore one embodiment provides all or portions of a smartphone within the projectile; another embodiment permits attachment of a user's smartphone to the projectile, with control of the projectile effected through a USB, Bluetooth, Apple® proprietary bus, or other interface. However, the weight and fragility of a smartphone tend to make this option less appealing.

The dynamics of the disk are known during flight based on a model of the disk, with external parameters relating to air density, humidity, temperature, wind, updraft/downdraft, turbulence and vortices as all being further influences. Bulk air conditions, such as air pressure, humidity, and temperature are readily measured in real time. Further, an adaptive control may estimate these parameters or their effect on flight control in real time or at the commencement of each flight.

At the commencement of each flight, the disk is launched with a linear velocity, angular velocity, pitch, roll, and height. The linear and angular velocities may be measured by the sensor package using the accelerometers and magnetometers, for example, though over a longer time span, linear velocity can be estimated using GPS/GNSS. Pitch and roll may be extracted from the accelerometer readings with reference to the gravitational vector.

An RFID subsystem is preferably provided, configured to have a range of 100 m. The antenna on the disk is highly directional (high gain), and thus longer range is available than for an omnidirectional reader. The microcontroller receives a navigational signal, such as a fluxgate compass or other magnetometer, and may also include pitch, roll yaw rate gyros, x, y, z accelerometers, altimeter (e.g., radar ranging or sonar), temperature, pressure, humidity, etc. These later sensors are useful for determining or predicting the flight dynamics of the Frisbee. Pressure sensors may be useful for determining wind and updraft/downdraft. Standard sensor packages may be employed, that may contain extra sensors. A light sensor directed radially may also be provided. A GPS sensor may also be provided. A lithium ion prismatic battery may be employed, or cylindrical cells advantageously arranged about the periphery of the disk to provide suitable weighting to provide a high moment of rotational inertia.

In some embodiments, the projectile is controlled by a remote control system, and provides a stream of sensor data to an off-board control system and receives flight control commands from the control system. In other embodiments, the control system is internal or distributed (on and off board).

However, aspects of smartphone technology appear in android appliances and smart-TV fobs, Raspberry Pi and other SBC solutions, smartwatch technology, etc., and therefore a smartphone per se is not required. In order to provide a low cost system, a PIC microcontroller or other low-cost microcontroller may be employed, which may include various peripheral devices.

According to a third aspect of the technology, a remote control is employed. For example, the disk may have Bluetooth 4.0 communication capability, providing >100 meter range, which approximates the maximum distance the disk can normally be thrown during normal use. This permits an automated device, such as a smartphone or tablet computing device, to control the disk dynamically. Sensors on the disk may telemeter back to the remote control device. Advantageously, the remote control is implemented as a software application ("app") on a programmable control device (e.g., smartphone), and therefore the rules of the game to be played are not static or embedded within the disk when manufactured. The control device may also be a smartwatch or other wearable technology.

Preferably, the controller of the system supports communications using TCP/IPv4 and IPv6, and ZigBee, and thus qualifies as a node of the "Internet of Things" (IoT). Further, the controller preferably supports mobile ad hoc/mesh network protocol communications. The system may employ a SIMD processor (e.g., GPU technology) to facilitate mathematical modeling and flight dynamics control. For example, when the disk is steered, there will often be a transient response different than the desired end response. Preferably, this transient response is modeled and predicted before execution, to ensure that the device remains within a desired flight envelope.

The controller preferably comprises a microcontroller, such as a low power Arduino, with infrared receiver and Bluetooth 4.0 (or above) interface, e.g., IEEE-802.15.1. The microcontroller performs at least two functions: determination of rotational angle and synchronization of the steering mechanism with the rotational angle, and logical control of the flightpath. Other suitable protocols may include Zigbee IEEE-802.11.4, IEEE-802.11.6, Zwave, IEEE-802.15.3a (UWB), mesh network IEEE-802.15.5, WiMedia, etc.

The processor that operates the device may be a system-on-a-chip device, similar to that employed in WiFi routers, and indeed components of a WiFi radio may be repurposed for the radio functions of the disk. Advantageously, the WiFi radio remains operational and compliant with 802.11b/g/n/s/ac/ad/x/etc., or other IEEE-802.11 protocols, and therefore permits communication with a base station controller or nodes of an ad hoc network. The base station may be used to control higher levels of the game play, such as team management, scoring, rules implementation, timing, etc. The base station may be, for example, a smartphone that accepts downloadable applications, and the game itself may be controlled by such an "app". The disk may also be controlled by a remote server, through a cloud-based system, or the like, either through direct communications with the disk, or relayed through the base station/smartphone.

The projectile and the associated infrastructure preferably has sufficient sensors to operate as an automated referee, with respect to the major rules of the game. That is, such issues as possession, in or out of bounds, scoring, and delay are automatically determined, and a user interface provided to enunciate the findings. Some aspects require use of internal sensors in the projectile, but others may employ smartphone cameras surrounding the game play.

According to another embodiment, the disk is subject to distributed control by a plurality of agents, which may be smartphones. In this case, the control logic is negotiated between, or as a compromise or result, of the logic in the plurality of controllers.

The control system for the disk generally includes a microprocessor, which may be a low power 8 or 16 bit microcontroller, though more capable processors can also be employed, such as 32 or 64 bit ARM processors or IA-x64 processors. For programmability, battery charging, etc., a USB port may be provided. While USB 3.0 and 3.1 are available, USB 2.0 is lower power, and provides sufficient data rates for most uses. A radio is typically provided, which is preferably a Bluetooth 3.0 or 4 (long range), and may also include 802.11a/b/g/n/ac/ad, etc.

The radio transceiver may also include radar functionality, either intrinsic to the communications emissions and receptions, or as an additional transceiver. See, U.S. Pat. Nos. 8,961,312; 8,962,308; 8,964,298; 8,965,587; 8,968,195; 8,972,053; 8,974,386; 8,980,198; 8,982,856; 8,996,320; 8,997,725; 8,998,894; 9,002,583; 9,007,178; 9,011,329; 9,011,331; 9,011,332; 9,013,144; 9,014,773; 9,028,405; 9,030,321; 9,030,437; 9,033,116; 9,035,777; 9,037,087; 9,039,533; 9,042,953; 9,046,455; 9,052,276; 9,057,361; 9,060,683; 9,066,694; 9,066,695; 9,066,697; 9,072,477; 9,078,607; 9,081,885; 9,097,662; 9,097,890; 9,097,891; 9,102,220; 9,105,025; 9,105,281; 9,107,586; 9,108,060; 9,117,447; 9,122,966; 9,128,281; 9,129,295; 9,130,651; 9,134,464; 9,134,534; 9,134,552; 9,137,397; 9,139,865; 9,140,715; 9,148,530; 9,149,717; 9,161,303; 9,162,027; 9,162,148; 9,170,288; 9,173,600; 9,173,837; 9,174,508; 9,179,020; 9,182,596; 9,185,246; 9,186,098; 9,187,173; 9,198,563; 9,204,796; 9,211,201; 9,215,980; 9,215,992; 9,216,249; 9,217,376; 9,219,832; 9,221,356; 9,223,134; 9,229,227; 9,233,623; 9,233,645; 9,237,211; 9,237,244; 9,237,411; 9,242,572; 9,243,282; 9,245,569; 9,246,554; 9,261,289; 9,265,453; 9,268,344; 9,271,851; 9,272,206; 9,274,132; 9,280,205; 9,285,382; 9,285,589; 9,290,146; 20100315516; 20110035491; 20110042476; 20110048374; 20110063114; 20110074850; 20110077758; 20110079453; 20110090338; 20110100823; 20110115624; 20110122261; 20110125063; 20110144574; 20110173988; 20110180654; 20110181422; 20110186177; 20110190694; 20110211080; 20110213664; 20110214082; 20110221656; 20110221657; 20110221658; 20110221659; 20110221668; 20110221669; 20110221670; 20110221671; 20110221672; 20110221793; 20110221896; 20110221897; 20110222745; 20110224498; 20110224499; 20110224500; 20110224506; 20110224507; 20110224508; 20110224556; 20110224557; 20110224564; 20110225536; 20110227812; 20110227813; 20110227820; 20110231757; 20110264230; 20110265958; 20110278355; 20110300001; 20110310209; 20120001463; 20120006282; 20120016492; 20120032876; 20120034954; 20120062445; 20120062744; 20120075168; 20120078170; 20120078181; 20120078182; 20120078183; 20120078184; 20120078185; 20120078216; 20120078217; 20120078222; 20120091259; 20120092156; 20120092157; 20120095352; 20120095357; 20120101413; 20120113293; 20120116382; 20120116383; 20120120239; 20120136490; 20120143152;

20120143293; 20120151816; 20120165238; 20120176237; 20120194418; 20120194419; 20120194420; 20120194549; 20120194550; 20120194551; 20120194552; 20120194553; 20120200488; 20120200499; 20120200601; 20120203177; 20120206322; 20120206323; 20120206334; 20120206335; 20120206485; 20120209405; 20120212398; 20120212399; 20120212400; 20120212406; 20120212414; 20120212484; 20120212499; 20120218172; 20120218301; 20120224456; 20120235883; 20120235884; 20120235885; 20120235886; 20120235887; 20120235900; 20120236030; 20120236031; 20120239231; 20120242501; 20120242678; 20120242697; 20120242698; 20120245464; 20120248195; 20120249797; 20120268074; 20120287431; 20120299344; 20120309295; 20120309453; 20120330109; 20130000439; 20130009783; 20130010125; 20130010128; 20130010129; 20130010135; 20130010136; 20130010150; 20130010151; 20130010159; 20130010167; 20130013085; 20130013839; 20130013893; 20130015239; 20130016232; 20130016233; 20130016235; 20130016236; 20130016247; 20130016248; 20130016266; 20130021443; 20130021444; 20130021482; 20130024029; 20130024660; 20130030259; 20130033381; 20130038056; 20130043974; 20130043975; 20130043991; 20130043993; 20130046153; 20130046477; 20130063568; 20130069780; 20130072807; 20130092539; 20130095459; 20130110256; 20130124048; 20130127980; 20130144402; 20130154553; 20130157729; 20130164742; 20130169830; 20130172691; 20130178718; 20130184787; 20130186953; 20130197322; 20130201316; 20130211291; 20130229522; 20130231574; 20130252262; 20130253387; 20130273968; 20130278631; 20130281974; 20130285577; 20130285739; 20130289678; 20130297022; 20130297217; 20130303225; 20130314303; 20130317415; 20130345566; 20140018792; 20140031743; 20140046260; 20140048037; 20140048174; 20140052275; 20140054883; 20140055268; 20140055284; 20140055588; 20140055589; 20140063054; 20140063055; 20140076415; 20140077946; 20140104059; 20140107579; 20140111594; 20140111595; 20140112695; 20140113561; 20140113828; 20140119567; 20140121476; 20140137840; 20140142498; 20140142507; 20140143064; 20140152008; 20140163425; 20140163664; 20140171749; 20140172310; 20140183269; 20140184496; 20140187969; 20140194702; 20140197304; 20140197926; 20140202800; 20140231259; 20140240916; 20140243971; 20140246471; 20140246472; 20140246473; 20140246474; 20140246475; 20140246476; 20140246477; 20140246478; 20140246479; 20140246538; 20140249429; 20140249557; 20140257519; 20140263537; 20140263538; 20140263539; 20140263541; 20140263542; 20140263543; 20140263553; 20140263554; 20140263564; 20140263565; 20140263697; 20140266787; 20140276718; 20140277017; 20140279546; 20140288776; 20140297312; 20140303591; 20140319231; 20140328199; 20140345563; 20140350459; 20140354350; 20150005039; 20150031293; 20150031294; 20150036047; 20150040665; 20150040669; 20150046582; 20150051571; 20150053104; 20150053562; 20150054633; 20150067008; 20150068069; 20150075486; 20150081220; 20150088786; 20150099941; 20150105631; 20150125832; 20150126997; 20150133855; 20150134107; 20150134345; 20150134346; 20150148238; 20150150647; 20150151857; 20150157537; 20150165114; 20150174320; 20150174577; 20150178998; 20150186700; 20150218913; 20150220701; 20150224845; 20150231329; 20150250393; 20150250682; 20150269825; 20150283031; 20150290453; 20150290454; 20150302393; 20150302777; 20150303563; 20150309316; 20150326049; 20150330943; 20150339570; 20150356285; 20150359467, expressly incorporated herein by reference in their entirety.

ACTUATOR. Flight control may be effected by changes in the gyroscopically stabilized axis, or changes that do not alter the gyroscopically stabilized axis. In general, the difference is whether the force supplied is associated with a torque against the axis, or is orthogonal to the axis. When the gyroscopic axis is dynamically altered from a stable flight axis, it should be restored after intended effect of the alteration is achieved. This requires extended control inputs, and during dynamic changes, the projectile may be in an unstable flight mode. On the other hand, the range of orthogonal forces is limited to a plane normal to the axis of rotation, a line corresponding to the axis of rotation, and the speed of rotation.

The types of actuators available include fans, compressed/combustible gas thrusters, aerodynamic lift surfaces, drag surfaces, pressure differential shunts, inertial masses redistributors, and the like. In each case, these should be synchronized with the rotation of the projectile, and thus require high speed actuation and deactuation.

In one embodiment, rotation of the disk is induced by a fan; e.g., the disk rotates in response to a force against the relatively stationary surrounding air. Therefore, absent dissipation, the rotational speed of the disk will increase over time (or with opposite spin, decrease). This consumes power, which must be supplied by batteries or another self-contained power source. However, this permits a higher degree of dynamic control over the disk flight path.

One embodiment provides an actuator which deploys an aerodynamic feature in rotation-angle-responsive manner. For example, the outer edge of the Frisbee may have a reinforced band, covering a set of plungers. At any given time, one plunger is extended, and all plungers may be connected to a single mechanical control (to provide a constant effective circumference). Under neutral steering control, the extended plunger may be maintained at the rear or a mode provided in which none is extended. Left and right steering result from advancing or retarding the extended plunger. Since the plunger extension is generally synchronized with the rotational speed, a rotational servo motor or stepping motor may be provided to control the plunger. The plunger power need not be high, and an internal frictional, hydrodynamic or magnetohydrodynamic clutch, for example, can isolate a low power motor, such as a pager-type motor, from external stresses.

Instead of a plunger, a set of inflatable or fillable bladders may be provided. Further, the outer edge of the disk may be rotationally separated from the center, with either center or periphery having a steering element. During launch, the two may be rotationally fixed, or the center actively maintained without significant spin. The net result of the plunger acting inside the band will be to debalance and de-symmetricize the disk, thus resulting in a steering force.

In other cases, a manual pump may compress a reservoir prior to flight to provide compressed air for a subsequent flight. This type of control system is suitable, for example, in a game wherein prior to propelling the projectile, the player squeezes or pumps the device to provide power for that respective play of the game. Indeed, the amount of pumping or squeezing may be a relevant strategic parameter of the game (e.g., pumping delay vs. stored power, loss of power possibly unexpected by opponent). A player can also hold a compressed gas ($CO_2$) cylinder, or this may be provided within the disk. The disk may have a hollow space which acts as a reservoir, or a set of expandable bladders to store the compressed gas.

While product safety is an issue, a combustible gas, such as hydrogen or propane or butane, can produce a jet, or better, run a micro-turbine or internal combustion engine. For example, a butane cigarette lighter may be provided with 10-25 ml of liquid butane. The butane is combusted in a ceramic cylinder, causing a piston to extend. The piston is coupled to a plunger, to move a quantity of air through an orifice. After combustion and exhaust, a spring returns the piston to home position, and readies a charge of air for the next cycle. The system may provide e.g., 3 cylinders directed at 120 degree angles. According to another embodiment, the internal combustion system (e.g., a single piston, or dual acting piston with two combustion spaces on either side of the piston) is used to pressurize an air reservoir, which is then controlled by a manifold system, or may provide a single cylinder, with a controlled manifold to direct the air flow in the desired direction. A thermal sensor may be provided to limit high temperatures, e.g., to a maximum surface temperature of 140 F. A turbine system may also be employed, though such devices tent to require high operating temperatures for thermodynamic efficiency, and such temperatures are difficult to achieve within the form factor and constraints of the projectile.

A pulse jet arrangement may be employed, though this may increase the risk of human contact with hot exhaust gasses. In order to effect such a system, an air intake is provided at the rim or outer edge of the projectile, which may be closed when not needed. The air is mixed with a metered amount of butane from a reservoir localized near an igniter, in a combustion region of the jet. An electronically generated spark ignites the butane, and causes a pressure in the jet to increase, and the combusted gas to expand. This expansion causes a pulse, which forcefully ejects the combusted gas and the remaining air in the jet. The spark is synchronized such that the ejected bypass portion is emitted at the correct angle of rotation, and is therefore initiated prior to the projectile reaching the desired angle. The ejected bypass portion may be directed upward, downward, or radially. Preferably, three jet devices are provided at 120 degree angles to each other about the axis of rotation. A three-position flap or exhaust nozzle may be provided to control exhaust direction. Typically, the speed of control for the flap or nozzle is much slower than the rotational speed, e.g., five times slower.

According to another embodiment, a set of control orifices are provided to direct passive air flow, and which have a mode in which a compressed gas is exhausted to clear the orifices of debris before use. In this case, the orifices should be small enough that the available compressed gas can generate sufficient force under partial blockage conditions to effectively clear the passage.

According to a further embodiment, the flight control surface on a Frisbee (rotating disk) is an aerodynamic bulge which controllably extends from the upper surface, and the Frisbee has three such bulges spaced at 120 degrees. Each bulge has an elastomer surface, and an underlying actuator that raises the surface with a timing controlled by the controller. In a more sophisticated embodiment, the bulge is asymmetric, with alternate actuations depending on the direction of rotation. This may require a pair of actuators for each bulge, or an inertial mechanical switch or other master mode set, to set the directional mode. In general, when the bulges are raised, where will be lift at the bulge. When the bulges are asymmetrically raised (and synchronized with rotation), there will be a differential force applied to the disk, resulting in a steering torque (which acts to alter the gyroscopically stabilized axis). When the bulges are symmetrically raised, there will be uniform lift, which will result in elevation of the disk, and an increase in drag which causes a reduction in forward momentum. Note that the forward movement of the disk in air influences the aerodynamics, and therefore it is also desirable to be able to control disk inclination.

In an alternate embodiment, the disk has a set of slots between the upper and lower surfaces. Each slot has a controllable lip, which in a first state blocks air flow through the slot, and in a second state captures air by extending the lip to act as an air ram, which then passes through the slot. The lip may be formed by a curved wire at the edge of a film. The curved wire is axially rotated over a range of about 90 degrees such that it extends upward in one state and flat in another. The actuator for the wire may be a solenoid or rotating motor with a cam. Other actuator types may also be employed, such as memory metal (nitinol, actuated by heating by passing a current through the wire), compressed gas with a controllable valve, etc. Note that the film may also be passively raised by aerodynamic forces, with the closed state achieved by a tension on the wire, which in this case is a cable type actuator. A tension actuator lends itself to a central control system, with the cables extending from a control hub peripherally.

It is noted that the above extensive discussion reveals a significant number of parameters that may be used to alter a flightpath of a respective rotating craft object. It is intended that any such parameter as may provide a significant effect in a given application be a possible control variable. It is further noted that while many control variables require angular orientation synchronization, in some cases, control may be effected without angular synchronization of the actuator; for example, a Magnus effect may be modulated in some cases without angular orientation synchronization with the modulating influence.

See, U.S. Pat. Nos. 3,976,265; 3,982,126; 4,047,832; 4,048,947; 4,052,927; 4,072,049; 4,111,594; 4,222,242; 4,225,286; 4,243,190; 4,266,773; 4,311,342; 4,366,386; 4,366,936; 4,398,895; 4,401,284; 4,403,565; 4,438,924; 4,446,379; 4,452,007; 4,502,724; 4,576,581; 4,602,584; 4,630,997; 4,635,474; 4,661,052; 4,732,384; 4,741,109; 4,759,146; 4,832,569; 4,850,939; 4,863,317; 4,903,917; 4,911,020; 4,952,196; 4,974,633; 4,976,155; 4,979,746; 5,026,067; 5,033,750; 5,050,439; 5,082,205; 5,103,646; 5,104,126; 5,133,637; 5,159,407; 5,180,119; 5,181,724; 5,287,004; 5,395,071; 5,446,599; 5,584,901; 5,645,248; 5,660,542; 5,687,387; 5,757,181; 5,781,399; 5,786,984; 5,793,606; 5,854,736; 5,871,397; 5,872,205; 5,875,627; 5,882,107; 5,899,288; 5,901,633; 5,909,859; 5,916,179; 5,920,995; 5,934,997; 5,935,023; 5,941,920; 5,977,778; 5,977,913; 5,996,933; 6,000,703; 6,005,395; 6,029,764; 6,032,374; 6,045,095; 6,049,448; 6,097,104; 6,126,332; 6,142,059; 6,148,271; 6,151,563; 6,157,898; 6,172,429; 6,198,275; 6,202,198; 6,208,247; 6,227,992; 6,234,102; 6,254,832; 6,261,142; 6,267,070; 6,293,680; 6,308,787; 6,315,062; 6,317,049; 6,340,884; 6,348,010; 6,357,158; 6,375,424; 6,402,090; 6,405,132; 6,414,955; 6,442,336; 6,453,595; 6,464,167; 6,470,976; 6,484,818; 6,484,971; 6,513,345; 6,516,699; 6,524,368; 6,526,352; 6,527,223; 6,563,130; 6,570,487; 6,591,537; 6,602,045; 6,622,973; 6,651,511; 6,666,650; 6,677,257; 6,681,512; 6,703,827; 6,719,069; 6,719,653; 6,720,920; 6,735,630; 6,749,218; 6,755,263; 6,755,273; 6,768,944; 6,776,825; 6,826,607; 6,832,251; 6,857,079; 6,859,831; 6,880,722; 6,898,501; 6,918,459; 6,978,728; 6,981,499; 6,988,026; 6,991,565; 7,018,308; 7,020,701; 7,029,406; 7,034,660; 7,069,684; 7,081,693; 7,083,533; 7,085,637; 7,089,099; 7,096,727; 7,103,460; 7,108,615; 7,143,844; 7,147,246; 7,164,117; 7,170,201; 7,175,542; 7,194,838; 7,201,671; 7,209,221;

7,213,786; 7,222,452; 7,231,920; 7,237,355; 7,238,121; 7,243,945; 7,270,614; 7,300,363; 7,300,584; 7,309,967; 7,313,467; 7,322,355; 7,329,099; 7,330,784; 7,335,000; 7,343,707; 7,347,200; 7,357,732; 7,359,527; 7,359,782; 7,365,455; 7,367,901; 7,379,800; 7,385,443; 7,386,372; 7,391,257; 7,407,029; 7,421,321; 7,427,047; 7,429,801; 7,435,089; 7,444,210; 7,467,629; 7,476,865; 7,504,740; 7,523,803; 7,527,288; 7,538,473; 7,555,370; 7,563,180; 7,568,986; 7,570,785; 7,575,248; 7,582,981; 7,584,570; 7,596,242; 7,597,099; 7,602,077; 7,603,998; 7,607,494; 7,620,521; 7,621,484; 7,622,988; 7,623,053; 7,630,806; 7,641,528; 7,650,212; 7,663,502; 7,672,756; 7,676,062; 7,709,973; 7,712,225; 7,712,777; 7,714,757; 7,719,416; 7,723,861; 7,734,061; 7,738,678; 7,746,620; 7,762,582; 7,766,383; 7,769,513; 7,770,920; 7,772,960; 7,775,761; 7,779,956; 7,782,590; 7,783,277; 7,783,403; 7,788,008; 7,797,367; 7,798,875; 7,819,003; 7,821,149; 7,830,033; 7,832,137; 7,837,648; 7,844,687; 7,847,628; 7,852,462; 7,856,750; 7,859,126; 7,860,481; 7,887,089; 7,896,609; 7,900,736; 7,918,605; 7,920,102; 7,935,013; 7,937,878; 7,946,048; 7,976,060; 7,986,054; 7,986,218; 7,988,190; 7,989,973; 8,000,314; 8,002,652; 8,013,569; 8,027,572; 8,041,483; 8,054,203; 8,086,318; 8,109,029; 8,140,658; 8,148,838; 8,152,198; 8,160,433; 8,161,968; 8,171,849; 8,174,135; 8,182,231; 8,186,784; 8,196,540; 8,215,255; 8,225,458; 8,230,635; 8,233,471; 8,235,416; 8,240,508; 8,247,912; 8,253,264; 8,256,826; 8,261,681; 8,265,769; 8,327,803; 8,335,304; 8,348,618; 8,353,454; 8,354,881; 8,362,631; 8,384,538; 8,406,906; 8,432,084; 8,447,474; 8,452,575; 8,452,577; 8,467,133; 8,472,120; 8,477,425; 8,482,859; 8,488,246; 8,495,879; 8,511,304; 8,528,855; 8,539,894; 8,554,325; 8,578,646; 8,579,734; 8,583,329; 8,584,944; 8,594,779; 8,601,964; 8,602,718; 8,618,690; 8,625,496; 8,638,217; 8,644,692; 8,656,630; 8,668,604; 8,707,608; 8,727,265; 8,746,162; 8,776,705; 8,781,595; 8,787,246; 8,795,022; 8,797,167; 8,801,359; 8,812,654; 8,814,691; 8,816,536; 8,820,782; 8,827,761; 8,832,244; 8,833,607; 8,836,503; 8,875,643; 8,880,296; 8,884,455; 8,892,185; 8,893,971; 8,905,307; 8,924,587; 8,924,588; 8,930,571; 8,932,092; 8,939,708; 8,946,923; 8,948,442; 8,959,824; 8,960,113; 8,964,298; 8,966,806; 8,982,856; 8,991,702; 9,010,002; 9,027,490; 9,030,321; 9,032,890; 9,033,116; 9,035,777; 9,045,927; 9,068,794; 9,069,067; 9,081,885; 9,090,339; 9,097,890; 9,097,891; 9,102,220; 9,121,217; 9,127,910; 9,128,281; 9,129,295; 9,134,534; 9,162,120; 9,182,596; 9,197,173; 9,223,134; 9,229,227; 9,248,288; 9,250,038; 9,255,771; 9,257,054; 9,273,666; 9,285,589; 9,290,146; 9,297,358; 9,309,861; 9,335,123; 9,346,527; 9,371,661; 9,376,168; 9,394,043; 9,409,643; 9,429,653; 9,448,043; 9,459,077; 9,500,444; 9,512,816; 9,527,557; 9,540,087; 9,574,850; 20010000170; 20010020665; 20010021617; 20010033790; 20010044685; 20020005297; 20020020561; 20020049096; 20020079405; 20020092693; 20020093180; 20020116652; 20020124452; 20020139030; 20020154029; 20020166710; 20020179777; 20020189612; 20020190230; 20020194988; 20020198632; 20030000524; 20030005926; 20030010190; 20030056983; 20030079744; 20030096663; 20030111268; 20030145724; 20030190968; 20030191568; 20040025871; 20040078662; 20040094152; 20040099676; 20040113431; 20040129478; 20040130442; 20040190374; 20040192473; 20040211250; 20040231667; 20040256159; 20050005495; 20050005934; 20050017488; 20050021282; 20050022806; 20050043674; 20050046584; 20050060069; 20050066961; 20050076904; 20050091903; 20050110277; 20050126997; 20050140212; 20050145151; 20050154491; 20050161467; 20050173153; 20050192727; 20050195383; 20050210727; 20050210728; 20050215210; 20050247312; 20050248136; 20050251289; 20050273218; 20050274378; 20050278098; 20060005449; 20060010757; 20060022083; 20060025897; 20060035726; 20060116221; 20060124800; 20060128504; 20060167595; 20060170535; 20060178231; 20060180371; 20060185899; 20060196504; 20060208169; 20060212193; 20060212194; 20060217864; 20060229143; 20060251505; 20060255281; 20060284839; 20070010342; 20070017498; 20070044364; 20070046029; 20070046143; 20070048137; 20070057781; 20070060416; 20070069064; 20070075919; 20070085697; 20070086624; 20070096445; 20070096446; 20070116327; 20070120347; 20070123952; 20070125351; 20070132219; 20070132220; 20070135982; 20070144052; 20070154063; 20070155541; 20070155549; 20070160472; 20070180751; 20070182528; 20070193811; 20070232412; 20070240903; 20070251749; 20070262574; 20070280505; 20070282506; 20080008588; 20080017193; 20080036185; 20080036252; 20080036580; 20080036617; 20080040004; 20080042408; 20080042409; 20080046150; 20080046200; 20080047329; 20080047770; 20080051957; 20080065182; 20080069403; 20080086240; 20080098640; 20080110388; 20080114502; 20080116692; 20080119993; 20080129475; 20080143085; 20080145224; 20080148723; 20080157940; 20080176676; 20080181773; 20080189053; 20080195261; 20080214068; 20080234899; 20080236275; 20080248449; 20080282817; 20080296157; 20080296905; 20090020649; 20090036235; 20090058091; 20090066065; 20090068018; 20090082144; 20090082691; 20090092284; 20090121484; 20090134966; 20090143923; 20090169388; 20090170639; 20090174192; 20090183417; 20090213519; 20090213520; 20090213521; 20090217851; 20090235570; 20090265974; 20090278353; 20090311924; 20100013238; 20100032963; 20100033142; 20100038915; 20100057305; 20100066093; 20100066095; 20100117363; 20100129193; 20100142868; 20100148940; 20100163573; 20100164711; 20100175575; 20100186648; 20100187829; 20100201516; 20100225266; 20100226775; 20100259050; 20100279639; 20100281874; 20100298958; 20100321449; 20110003653; 20110017114; 20110027087; 20110035491; 20110040535; 20110089238; 20110101692; 20110109097; 20110121578; 20110132983; 20110143631; 20110198857; 20110213664; 20110214082; 20110215586; 20110219634; 20110221656; 20110221657; 20110221658; 20110221659; 20110221668; 20110221669; 20110221670; 20110221671; 20110221672; 20110221793; 20110221896; 20110221897; 20110222745; 20110225536; 20110227812; 20110227813; 20110227820; 20110231757; 20110232555; 20110236207; 20110256944; 20110257701; 20110257945; 20110276123; 20110285527; 20110288480; 20110309624; 20120000408; 20120001463; 20120011853; 20120015734; 20120038185; 20120062445; 20120070294; 20120075168; 20120091717; 20120097110; 20120132708; 20120133213; 20120137567; 20120142235; 20120160955; 20120161447; 20120179133; 20120194418; 20120194419; 20120194420; 20120194549; 20120194550; 20120194551; 20120194552; 20120194553; 20120200488; 20120200499; 20120200601; 20120206322; 20120206323; 20120206334; 20120206335; 20120206485; 20120211987; 20120212398; 20120212399; 20120212400; 20120212406; 20120212414; 20120212484; 20120212499; 20120218172; 20120218301; 20120224456; 20120233838; 20120235883; 20120235884; 20120235885; 20120235886; 20120235887; 20120235900; 20120236030; 20120236031; 20120242678; 20120242697; 20120242698; 20120249797; 20120256042; 20120299344; 20130001244; 20130018363; 20130014421; 20130032070; 20130033381; 20130042798; 20130055944; 20130069372; 20130127980; 20130146675; 20130170986; 20130170990; 20130218312; 20130220191; 20130233223; 20130250112; 20130260620;

20130274040; 20130276832; 20130278631; 20130281235; 20130291775; 20130297217; 20130302164; 20130314303; 20130328320; 20130334816; 20130334821; 20140001308; 20140054895; 20140055268; 20140055588; 20140055589; 20140059914; 20140059915; 20140063054; 20140063055; 20140063255; 20140102344; 20140109459; 20140113739; 20140123533; 20140123534; 20140137781; 20140140846; 20140147248; 20140158704; 20140166751; 20140196648; 20140202800; 20140215876; 20140228157; 20140297312; 20140324348; 20140336561; 20140339307; 20140353332; 20140360083; 20140361079; 20150001335; 20150008260; 20150020431; 20150027125; 20150046582; 20150061294; 20150090237; 20150102156; 20150111465; 20150134107; 20150134345; 20150134346; 20150140893; 20150144018; 20150168105; 20150191245; 20150198419; 20150200562; 20150204305; 20150220701; 20150226522; 20150238963; 20150239534; 20150247702; 20150247709; 20150250682; 20150260512; 20150264626; 20150264627; 20150265458; 20150265459; 20150274272; 20150283397; 20150283398; 20150284058; 20150309316; 20150313663; 20150314086; 20150328516; 20150330738; 20150360049; 20150360050; 20150362287; 20150362288; 20160008686; 20160009364; 20160010050; 20160025856; 20160052618; 20160096095; 20160121164; 20160121986; 20160123301; 20160136494; 20160136532; 20160147228; 20160153749; 20160199598; 20160252325; 20160257388; 20160273879; 20160280347; 20160290637; 20160327073; 20160332712; 20160346627; 20160368811; 20160375333; 20160377380; 20170045327; 20170082749; expressly incorporated herein by reference in their entirety.

CONTROL PARADIGM. In a rotating disk (Frisbee), the projectile is launched with kinetic energy (forward motion ½ mv$^2$), rotational energy (½Iω$^2$), and potential energy (height mgh). The greatest opportunity to harness energy is often at the outer edge, which has the highest linear velocity.

The Aerobie® is a disk craft which has advantages over the Frisbee®. The Aerobie has a central aperture, a thin vertical cross section, and aerodynamically optimized edges. As a result, for the same mass, it has a higher moment of inertia, less drag, and more stable flight path. According to one embodiment of the present technology, the edges of the disk craft have a nominal cross section similar to an Aerobie, or have similar functional design principles, but also include control features. Preferably, the control features are actuated to modify the aerodynamic edges as a function of rotational angle, but in some cases, the angular sensitivity is not required.

Typically, one does not wish to modify the leading or trailing edges of the craft, except to adjust pitch or lift. However, lateral to the flightpath, the aerodynamics may be controlled to alter roll of the craft, which will cause the disk to turn toward the side which is depressed. Thus, one seeks to imbalance the lift or drag of the lateral edges synchronized with the rotational angle with respect to an external reference. This can be achieved by increasing or decreasing the height of the ridges or shape of the edge profile which are provided at the outer and inner edges of the Aerobie ring. For robustness, it is preferred that the control surfaces operate at the inner edge of the ring, though higher efficiency might be obtained at the outer edge. For example, the ring may be segmented into twelve 30 degree segments. Each segment has an actuator, though opposite segments may be paired and controlled in opposition by a common actuator. Each actuator causes a ridge to selectively protrude upward from the disk, or retract (or even protrude downwardly from the disk). The actuators may be covered by a membrane, or a common membrane about the full set of actuators. A feather-style aerodynamic feature may also be selectively deployed.

The weight or buoyancy of the Frisbee is typically not an available control parameter, though the disk could shed mass during flight, or provide a structure that changes the effective density of the disk, and therefore buoyancy of the disk. These changes are difficult to achieve in a small, hand-launchable, reusable disk for repeated game play, but may be available for other intended applications.

Changes in mass distribution may be achieved by providing a counter-rotating element within the disk that moves synchronized with rotation, e.g., remains stationary with respect to the ground, and thus can servo the mass asymmetry to a desired angular position. Preferably, there are a plurality of eccentric masses that can balance, to achieve neutral mass asymmetry, or imbalance, to provide a net mass asymmetry. In an electronic system, the mass may be the battery and/or circuit board, thus minimizing the penalty for these additional components beyond a passive system.

Control of direction of flight can be achieved by changing the inclination angle, left-right lift asymmetry, left-right drag asymmetry, or left-right mass asymmetry, for example. Changes in the angle of attack during flight can generally come from changes in the lift, drag or weight distributions, though it may be possible to effectively change the angle of attack with some independence, such as by an active thruster (rotationally synchronized puff of compressed gas). Note that the angle of attack is represented in two dimensions, x and y, with respect to z, especially where the disk is being steered.

Steering of the projectile requires an asymmetric force, either to translate the disk movement or to induce a torque on the disk to alter the gyroscopically stabilized axis. Two distinct mechanisms are available. First, a drag on one lateral edge of the disk will cause the disk to steer toward that edge. Second, a force that alters the axis of rotation of the disk will induce a torque. For example, as the angle of attack (pitch) of the rotating disk changes, it will tend to veer left or right. A disturbance that alters the roll of the disk changes, the angle of attack will change. Since the disk is rotating, the yaw is not a fruitful flight path control parameter, except to the extent one wishes to control the gyroscopic effects by altering yaw rate.

For a ball which does not rotate about a vertical axis, yaw control may be useful.

The control system may also be incorporated into a Wiffle Ball, i.e., a ball that has a high ratio of aerodynamic forces to inertial forces. Such balls typically have a hollow center and a perforated surface. The control in such a case would selectively deploy or undeploy aerodynamic features, but in this case responsive to pitch, roll and yaw angles. For example, six actuators are provided on cubic axes of the ball, which open or close apertures.

The system may employ minimalistic aerodynamic control, or independent or partially redundant controls to effect different types of maneuvers.

The flight control may be effected in various ways. In one embodiment, a set of ailerons are provided on the upper surface of the Frisbee. As the Frisbee rotates, the ailerons are sequentially activated either unidirectionally (up or flat) or bi-directionally (up, flat, down). By controlling lift synchronized with rotation, a force is applied that steers the Disk.

In another embodiment, a set of holes are provided about the periphery of the Disk, e.g., 16 holes, and a disk overlying or underlying the 16 holes, with e.g., 15 holes, is rotated in synchrony with the rotation of the Disk. This provides an air leakage path through one side of the Disk during flight. This disk may also create a mass imbalance.

In a further embodiment, a compressed gas is released through jets on the projectile, e.g., top and peripheral edges of the disk. Microvalves may be used to control the release. A chemical or combustion process may also be used to generate the gas flows or pressure.

A protrusion from the top of the disk may change position as the disk rotates. An eccentrically weighted ring at the edge of the disk may be rotated to produce a torque on the disk during flight.

Guidance may be based on two general types of inputs—command and control, and landmarks. Landmarks may be located visually, using a camera and pattern recognition software, or through radio-frequency identification/direction finding, with emitters, receivers, and/or retroreflectors of a high frequency RF signal, e.g., >1 GHz, preferably 2-6 GHz, which permit efficient direction-finding or ranging.

While GPS technology might also be employed, it is not necessary, is generally power hungry, and may have long latency to positional fix. The spinning disk may include antennas which angularly direction-find with respect to the landmarks. In a simple embodiment, the disk is steered toward the landmark while maintaining level flight or a set altitude (relative or absolute). The inclination of the disk may be determined with an accelerometer, level gage, angle sensor, radar height gage, or the like. Signals from two or more antennas located eccentrically from the center of the disk are compared or differenced to determine the maximum and/or minimum values, representing alignment and quadrature to an emissive source of the signal. According to one embodiment, the signal is reflected from an RFID tag, and the source of the signal is within the disk. This permits measurement of range as well, and an encoded identification of the RFID tag. The Xcyte acoustic wave RFID technology might be used for this purpose.

For example, the disk emits an omnidirectional radio frequency signal at 900-2.5 GHz, which is modulated with a pseudorandom modulation sequence which is unique over its length. The time delay for the modulated emission to return is indicative of distance, while the antenna orientation indicates angular displacement. The direction of flight may be determined by triangulating from two or more tags, which may be presumed to be quasi-motionless with respect to the rotational speed of the disk. Therefore, as the disk translates through space, the distance to the tags will change, and the relative motion to each computed. Since the disk has a single translational vector, the sequential triangulation will yield a direction of movement. The same omnidirectional radio frequency signal can be used to detect a distance from ground, though indoors, a floor-ceiling and possibly wall ambiguity will exist. However, since the floor and ceiling are typically parallel, the ambiguity will have limited effect on the maintenance of level flight.

The disk is launched by translating and twisting the disk along its axis of symmetry. This imparts significant angular momentum to the disk. Advantageously, thus angular momentum may be converted to altitude by aerodynamically drawing energy from the spin and converting it to lift. More complex conversion converts angular momentum into translational velocity. For example, if the edge of the disk is shaped to draw air into the disk, that air can be selectively vented above or below the disk by louvers. Similarly, if the disk is formed with one or more "thrusters", the compressed air from the edge can be vented through the thruster when it is facing the correct direction. This will result in a pulsatile increase or decrease in translational velocity. If angled to coincide with the edge surface, then the rotation rate may be altered. More thrusters will lead to less pulsatile operation, but greater device complexity.

The translational velocity can also be converted to angular momentum, but this is relatively less interesting, except as a braking mechanism, since the angular momentum represents useful stored energy, while the translational energy is typically part of the functional utility and is less readily modulated.

As the disk rotates, the outer rim sweeps past the air at a high speed. This speed may be translated to a pressure within a conduit by an asymmetric aperture. This provides a simple translation the rotational energy of the disk into energy for altering the flight path. Further, the apertures may be modulated in dependence on rotational angle, and thus provide a direct influence on the flight path.

For example, the disk is provided with at least one port situated about its periphery. Preferably, a plurality of ports are provided, and the forces applied are dynamically balanced. The ports are designed to pressurize when the disk rotates, and feed into a common plenum. The plenum, in turn, feeds at least one duct, through a valve or control structure. The valve or control structure is synchronized with the rotation of the disk, for example by a magnetometer, and vents to an eccentrically located port on a top surface of the disk. As the compressed air vents through the top, it selectively alters the aerodynamics of the disk, synchronized with the rotation, which will tend to steer the disk. While the drag on the disk will tend to slow rotation, the drag may be relatively small. Further, if no steering force is required, the plenum may remain pressurized without bleed, which will reduce the drag as compared to the drag when the plenum is bled through the control orifice.

For example, six inlet ports are provided, three designed to operate in each direction of rotation. An inertial switch determines which set of ports is active at any given time, based on the initial torque in a given flight. A plenum is provided about the periphery of the disk, connected to the inlet ports and through a set of valves to the outlet ports. The valves may be micropower magnetically operated blades disposed in the air path. A parasitic electrical generator may be provided which generates a current based on a difference in rotation between an inertial mass (which may be a magnet), and the spinning disk (which may have pickup coils). Alternately, a battery or supercapacitor, for example, supplies power.

According to another embodiment, the disk has a set of radial channels (preferably closed conduits, but may be open), and the spinning of the disk causes a centrifugal pressurization of the channels. One or more control structures, e.g., vanes, selectively control the flow through the channels synchronized with the rotation of the disk. The channels may be tapered inwardly, resulting in a narrowing of the flow path toward the periphery. For example, the disk is divided into thirds or quadrants, with the vane located near the peripheral edge, internal to the disk, which minimizes its size.

Alternately, a pneumatic positioning system is possible, drawing air from either a fan/blower, or from peripheral ports which pressurize during disk spinning. In this case, the microcontroller modulates flow or flow path, and can be effectuated by electromagnetic, piezoelectric, memory metal, or other actuators.

A further method of steering is to provide one or more selectively aerodynamic regions on the disk, which activate and deactivate as the disk spins. For example, an independently rotatable steering disk may be provided on a top surface of the main disk. As the main disk rotates, the steering disk remains relatively stable in absolute rotational position. The steering disk may have a center position which provides no steering force, and may deviate left and right from the center position to impart a force. For example, a tail fin can extend upward from the steering disk. In general, this steering mechanism does not incline the main disk, but maintaining a desired rotational position on the main disk will require either braking the main disk rotation or actively speeding up the rotation. Further, where the disk is provided as part of a game, the tailfin may represent a fragile structure. Alternately, the steering disk may have an asymmetric bulge or ridge, which when passing through air generates lift. The bulge, ridge, or tailfin is maintained by a motor on the lateral side of the rotating disk away from the direction of the desired turn, or centrally (e.g., in the rear) for neutral steering. The bulge would be less fragile than the tailfin, which requires continuous energy input during operation, including neutral steering; however, the bulge may also have a retracted position, in which case the steering motor can be deactivated, and the steering disk spin up to the rotting disk speed by friction during neutral steering periods.

The rotating disk may also be provided with a fan or blower, for example centrally mounted within the disk, and generally drawing air from one or more apertures on top of the rotating disk, although air may also be drawn from the space beneath the disk or from a set of selectively controllable inlet ports. A fan is typically unidirectional, though a centrifugal blower might have alternative direction operation in either spin direction, e.g., with a pair of exhaust ports. The air drawn from above will tend to generate lift for the rotating disk, by increasing the pressure differential above and below, and thus would tend to increase altitude. Further, the fan or blower could also be controlled to reduce lift, and thus provide bidirectional altitude control. The exhaust from the fan or blower is used to steer the rotating disk by directing the exhaust synchronized with rotational angle of the rotating disk.

For example, the exhaust could be provided through one or more controlled ports on top, peripherally, or below the rotating disk. According to one embodiment, the rotating risk has a set of radial channels, leading to ports on the bottom edge of the rotating disk/Frisbee. A rotating valve structure within the central mechanism that includes the fan/blower controls which subset, e.g., a quadrant, third, half, two-third, or all, receives the air flow. (In another embodiment, the fan/blower may receive inlet air from the remaining ports, instead of from above the disk). The exhaust air tends to lift the lip of the rotating disk, and this provides a steering input by deflecting the attitude of the rotating disk.

For example, if the disk spins at up to 10 times per second (600 RPM), and the desired precision of control is 30 degrees ($2\pi/12$), then the controller would be required to adjust the steering at up to 120 times per second. If a counter-rotating mechanism within the rotating disk is desired, the counter-rotation speed would range from 1-12 Hz, making a stepper motor architecture feasible. For example, the rotating disk may have a series of alternating pole magnets which rotate with the disk. A pair of coils controlled by the microcontroller define an advance or retard torque, allowing the stator to change position with respect to the rotor. Alternately, a gearmotor may be provided to control the relative positions. An ungeared electric motor is also possible.

See, U.S. Pat. Nos. 4,919,637; 4,964,837; 5,195,920; 5,404,868; 6,288,633; 6,338,391; 6,346,025; 6,395,955; 6,402,584; 6,404,409; 6,554,088; 6,647,328; 6,857,770; 6,872,105; 6,892,666; 7,032,861; 7,064,472; 7,104,347; 7,204,453; 7,204,455; 7,207,701; 7,237,634; 7,249,732; 7,259,357; 7,264,534; 7,331,838; 7,347,758; 7,352,339; 7,362,032; 7,392,871; 7,394,182; 7,455,134; 7,520,353; 7,559,388; 7,597,164; 7,607,610; 7,662,013; 7,766,274; 7,785,098; 7,845,508; 7,854,087; 7,866,717; 7,876,010; 7,893,413; 7,946,526; 7,971,824; 8,002,604; 8,049,193; 8,052,500; 8,167,344; 8,205,822; 8,214,097; 8,257,157; 8,357,023; 8,467,133; 8,472,120; 8,477,425; 8,482,859; 8,488,246; 8,574,146; 8,579,671; 8,630,761; 8,714,389; 8,721,520; 8,899,513; 8,905,800; 8,964,298; 9,044,209; 9,050,972; 9,097,890; 9,097,891; 9,102,407; 9,128,281; 9,129,295; 9,134,534; 9,182,596; 9,199,734; 9,206,309; 9,223,134; 9,229,227; 9,285,589; 20010039230; 20010049249; 20010051488; 20010056544; 20020005614; 20030194924; 20030217876; 20040008853; 20040022070; 20040049324; 20040094662; 20040195436; 20040245376; 20050048918; 20050090177; 20050215764; 20050233672; 20050249667; 20060049304; 20060092630; 20060100057; 20060147371; 20060148377; 20060158065; 20060160457; 20060166589; 20060169691; 20060231304; 20060231305; 20060231306; 20060231677; 20060237246; 20060237247; 20070027129; 20070034738; 20070092549; 20070149496; 20070164150; 20070164641; 20080091309; 20080119421; 20080125002; 20080252162; 20090004628; 20090013983; 20090017714; 20090039207; 20090047861; 20090104836; 20090163110; 20090177345; 20090197658; 20100022157; 20100130093; 20100222802; 20100283273; 20110004363; 20110011856; 20110053440; 20110184602; 20110187136; 20110189440; 20110190971; 20120056799; 20120075168; 20120194418; 20120194419; 20120194420; 20120194549; 20120194550; 20120194551; 20120194552; 20120194553; 20120200488; 20120200499; 20120200601; 20120206322; 20120206323; 20120206334; 20120206335; 20120206485; 20120212398; 20120212399; 20120212400; 20120212406; 20120212414; 20120212484; 20120212499; 20120218172; 20120218301; 20120235883; 20120235884; 20120235885; 20120235886; 20120235887; 20120235900; 20120236030; 20120236031; 20120242678; 20120242697; 20120242698; 20120248243; 20120249797; 20130096752; 20130096753; 20130127980; 20130201316; 20130278631; 20130289529; 20130309921; 20130314303; 20130338267; 20140061379; 20140063054; 20140063055; 20140081076; 20140131124; 20140163664; 20140195078; 20140221732; 20140262862; 20140273730; 20150042619; 20150112536; 20150258679; 20150258682; 20150258683; 20150307191; 20150308782; 20150309316; 20150335288; 20150351690; 20150367243, expressly incorporated herein by reference in their entirety.

SHUTOFF. The control system preferably has inputs for one or more sensors to detect human contact or end of play, and to shut down any active guidance system activity. This saves power, and also reduces risk of injury from any moving parts.

The sensor may be, for example, an accelerometer, physical contact sensor, proximity sensor, feedback from actuator (e.g., stall current), etc. The sensors may be provided and/or used for other purposes within the system.

COMMUNICATION NETWORK. The disk may include local intelligence, be part of a distributed intelligent system, or act as a slave to a remote intelligent controller. The tradeoff is typically to minimize the power drain in the disk, including actuator, telecommunications, and intelligent processing, though the minimization need not be strict.

In some cases, a plurality of disks may simultaneously be present, and communicate with each other, for example using a mobile ad hoc networking (MANET) technology.

Alternately, all communications may pass through a base station or other infrastructure.

See, U.S. Pat. Nos. 7,590,589; 7,606,570; 7,962,164; 8,009,608; 8,135,413; 8,144,619; 8,185,119; 8,315,326; 8,315,327; 8,325,030; 8,341,289; 8,363,744; 8,451,928; 8,451,929; 8,494,530; 8,514,825; 8,565,747; 8,600,830; 8,644,165; 8,661,500; 8,718,837; 8,738,944; 8,756,173; 8,768,865; 8,803,089; 8,822,924; 8,874,477; 8,874,747; 8,923,186; 8,942,301; 8,965,579; 8,966,377; 8,971,274; 9,009,810; 9,031,568; 9,038,197; 9,063,165; 9,075,146; 9,079,311; 9,103,920; 9,106,286; 9,115,989; 9,117,318; 9,166,845; 9,166,953; 9,168,656; 9,170,070; 9,176,924; 9,197,297; 9,209,871; 9,211,811; 9,218,698; 9,225,782; 9,240,018; 9,240,913; 9,300,481; RE45775; RE45807; 20050232186; 20050233749; 20060025149; 20060167784; 20070038743; 20070087756; 20080262893; 20100040025; 20100142447; 20100235285; 20100254312; 20100269069; 20100317420; 20110004513; 20110004851; 20110078461; 20110085530; 20110130114; 20110142025; 20110142108; 20110188597; 20110194591; 20110255513; 20110255577; 20110296006; 20110296517; 20120028680; 20120047443; 20120069799; 20120166645; 20120166646; 20120172050; 20120197439; 20120197464; 20120198251; 20120207134; 20120221861; 20120222104; 20120250517; 20120291096; 20120297441; 20130007088; 20130080307; 20130108040; 20130124883; 20130141247; 20130151088; 20130158821; 20130212713; 20130250866; 20130250969; 20130251054; 20130267194; 20130320212; 20130325244; 20130325357; 20140126431; 20140133428; 20140204984; 20140207286; 20140263989; 20140264047; 20140268601; 20140269555; 20140269658; 20140299783; 20140306799; 20140306826; 20140309805; 20140309847; 20140309852; 20140309853; 20140309935; 20140310186; 20140312242; 20140328423; 20140376427; 20140376656; 20140376657; 20150002336; 20150079989; 20150081247; 20150111591; 20150146579; 20150150140; 20150160791; 20150192682; 20150195145; 20150200738; 20150215323; 20150215858; 20150264626; 20150264627; 20150268355; 20150271004; 20150298317; 20150312764; 20150314449; 20150338525; 20150372819, expressly incorporated herein by reference in their entirety.

FAN. According to one embodiment, a centrifugal fan (e.g., run by a brushless DC electrical motor) is provided coaxial with the center of the disk. The fan acts with reference to the disk body, and thus rotates with or against the rotation of the disk. The intake (inner side of fan) may be fed by upper and lower inlets, which are controlled by electronically controllable louvers. When the upper louver is open the disk will tend to rise, while when the lower louver is open, it will tend to fall. Both can be open, for generally neutral flight and decreased air flow resistance.

The fan produces a pressure differential between the inside of a rotating drum and the outside. The outside of the drum is within a chamber, with the exhaust to the external environment controlled by a set of flaps, or directed by rotating shell around the periphery of the fan, that select the direction of exhaust with respect to angular rotation of the disk. The rotating cylindrical shell is rotated to selectively block and open exhaust ports about the periphery of the disk, which may be directed laterally or downward. Indeed, in another embodiment, the intake and exhaust are both directed by the shell, the shell having upper and lower apertures, to draw intake from one eccentric location and push exhaust from an opposite eccentric location, to provide a translational force or torque on the rotational axis. Typically, the intake is from above, and the exhaust to below, in order to provide lift and increase flight time.

The fan may be coupled to an actuatable air drag element, which when deployed, permits the fan to control the rotational speed of the disk during flight.

Typically, the body of the disk will have a set of apertures, and the cylinder has a single exhaust aperture which is rotated within the body, to obscure or open an air flow path. In such an embodiment, the shell is controlled to generally counter-rotate with respect to the disk, and thus remain relatively stationary.

The cylinder is driven by a servomotor arrangement. In operation, the rotating cylinder will have a counter-rotation with respect to the disk, and thus the active outlet directions will be relatively unchanging. As the cylinder speed is increased or decreased, the active conduit direction will progress or regress, changing the direction of the torque or translation on the disk. Typically, steering is maximized by having the exhaust directed outward at the left and/or right edges of the disk. Altitude can be controlled by applying the torque at the front and/or rear of the disk, to change the angle of attack (pitch) and permitting aerodynamic effects to generate or reduce lift.

In some cases, it may be desired to have a system that electrically spins the Disk, in addition to steering it. In this case, a reaction wheel is provided under or within the Disk, which causes the upper shell to spin in an opposite direction. This can be configured to generate lift, and thus maintain the Disk aloft for an extended period. Likewise, if properly controlled, this allows the Disk to hover, though in a typical scenario, the player imparts a forward momentum to the Disk.

If the outer shell of the disk has sufficient rotational drag, it will remain nearly stationary with respect to ground, and thus may assume a non-radially symmetric profile, i.e., a gyroscopically stabilized craft. Such a craft may have traditional airplane aerodynamic controls.

If it is desired to have a disk which has a fan, but does not have a counter-rotating mass, a pair (or other even number) of counter-rotating fan wheels may be provided diametrically opposed. A variant of this design is a pair of meshed gears or wheels, which form a gear-pump, that moves air from one side of the pair to the other. In a pneumatic application, the unmeshed portions of the gear have slats which seal against an outer shell, to provide increased air flow with respect to a gear per se. The pair of gears are provided on an independently rotatable platform within the disk, and served to position such that the inlet and outlet are directed in desired directions to impart a force on the disk. An arrangement without the rotating platform is possible. In that case, the rotation of the gears is controlled to occur only when the disk is aligned with the direction of the desired force. If the pump is bidirectional, it may be operated twice per rotation.

A plurality of sets of gears may be provided. For example, four pairs. In that case, a central intake may be provided, with the pumps controlled to push air synchronized with the angular rotation. In such a system, simple fans or centrifugal blowers may also be employed, preferably with diametrically opposed fans counter-rotating with respect to each other.

One advantage of a gear pump is that relatively higher pressures may be created as compared to a fan, facilitating an accumulator which is maintained in a pressurized state, and the venting from the accumulator is controlled in synchronization with rotational angle. One or more exhaust ports may be provided. The accumulator may be, for example, an elastic wall balloon structure beneath the disk.

AERODYNAMIC CONTROL. PITCH. Pitch control requires a change in the gyroscopically stabilized axis. However, unlike lateral steering, after the pitch is adjusted, the changed state may be maintained; no later correction is required to ensure stability, unless the pitch itself is controlled to be outside of the stable flight envelope. The various ways to change pitch include an eccentric mass, an eccentric upward or downward force, asymmetric lift (front versus rear; on a rotating disk, this needs to be synchronized for angle of rotation), and, to a lesser extent, interactive effects from other control maneuvers.

ROLL. Roll is one of the main effects desired for steering the craft. As with pitch, the various ways to change pitch include an eccentric mass, an eccentric upward or downward force, asymmetric lift (left versus right, controlled for angle of rotation), and, to a lesser extent, interactive effects from other control maneuvers. Typically, steering is a transient effect, and after a steering correction, it would be desired to return to straight flight. Once a roll maneuver is executed (unless itself a correction), it is generally appropriate to exert an opposite maneuver to return to level flight.

ACTUATOR FOR PITCH AND ROLL CONTROL. In order to facilitate passive operation, the actuator may be a pair of controlled flaps that selectively opens to catch air into a membrane which then inflates, and is then allowed it to exhaust. In this case, the flaps are synchronized with rotational angle, and have relatively low pressure differential with respect to the upper surface. Because the air pressure is higher beneath the disk than above it, the air may be drawn from below and exhausted above. This produces negative lift, and therefore the aerodynamics of the craft should be adjusted to provide a greater nominal lift than required for a neutral flight path, since the lift may be reduced under control to achieve stability. If the flap is on the upper side, and directs flow downward, this creates lift. The flap may draw significant rotational energy, and thus adversely affect fight time. Alternately, an aileron may be deployed, with a vent through the surface.

A further alternate provides a slat which is controlled to move with respect to the surface of the disk to open or obscure an aperture. A flap over the aperture is provided having a pair of holes. If the aperture is open, the leading hole captures a flow of air, and inflates and directs air through the aperture. The trailing hole remains obscured. On the opposite side of the disk, the flap on the bottom side of the disk captures are on the leading side, and vents to the top. The result is a conversion of rotating energy into a change in rotational axis, i.e., rill or pitch. The slat may be moved by a solenoid, though a rotating motor may turn a cam disk to synchronize the slats.

According to one embodiment, a center of gravity of the projectile is controllable by the control system. This relocatable center of gravity can be controlled at the rotation rate, and therefore provide a stable torque acting on the axis of rotation with respect to the external frame of reference. This, torque, for example, may be used to alter the roll and pitch of the craft. In general, a screw-type or gear-type actuator with a servo or stepping motor is preferred, since this provides friction which would tend to keep the masses in a set location, and helps isolate the centrifugal forces from the actuator by a reduction gear ratio. Further, the screws or gears for the various masses may be mechanically linked, so that only a single actuator is required. In this case, the effect of the actuator is often to make the mass offset appear stationary or slowly moving. However, it is also possible to rapidly shift the external envelope of the object as a result of the repositioning of the radially repositionable masses.

An alternate implementation provides a fluid which is pumped between radially positioned reservoirs, to change the mass distribution. In some cases, a low viscosity fluid, such as methanol, is employed to increase time responsivity of the pump or other fluid redistribution system. In this case, it is possible to alter the center of gravity without altering the moment of inertia.

In one case, each reservoir is pre-pressurized before launch, and the actuator sequentially bleeds contents and pressure from the peripheral reservoirs to a central accumulator. In another case, the centrifugal force on the fluid is employed to pressurize the reservoirs, and which reservoir bleeds, under control of the control signal, to a more peripheral accumulator or set of accumulators. In each case, the moment of inertia is changed, in addition to its distribution. The fluids/pressures may be reset before the next launch. The valve structure may be a single rotating valve body that controls all fluid flows together, or individual valves may be provided. Alternate to fluids (which will have damping effects on the rotational dynamics), a set of masses may be connected to pretensioned springs, that are released by electronically or mechanically controlled elements (catches or ratchets, typically) as control energy is required. The springs are reset before flight.

In another embodiment, the inertial mass is a motor (and/or battery), which repositions itself on a rack or worm gear. This efficiently makes use of mass. Note that the movement need not be radial, and can also be circumferential. In the circumferential case, one or more motors drive mass(es) (which may be the motor itself) about a track within the projectile, e.g., flying disk. If there are two masses, they can be diametrically opposed (and stationary or non-stationary), and thus balanced, or near each other (and both moving to establish the desired dynamically controlled center of gravity), to create an imbalance. If the masses were imbalanced and stationary, the disk would wobble. In this case, the masses may be both radially and circumferentially repositionable.

YAW/ANGULAR MOMENTUM. It is also possible to speed up the rotation of the disk during flight, by converting potential energy (height) or kinetic energy into rotational energy to increase spin rate by dropping, one might employ rotating wings. To convert kinetic energy into rotational energy, one could provide eccentric drag on the upper surface of the disk at a radial location where the forward velocity is greater than the rotational velocity. Typically, the lateral edges have a rotational velocity greater than the forward velocity, so the radial position will be relatively inboard. This type of control would generally have to measure or estimate rotational velocity (and not merely angular position). Or, a motor may use chemical energy (battery or internal combustion) into rotation.

In addition, the moment of inertia may be controlled and altered, generally by a radially symmetric change in a radial offset of set of rotating inertial masses. By changing the moment of inertial, the angular speed may be controlled. In this case, the radial offset does not need to be controlled at the rate of rotation, though the moment of inertia and center of gravity controls may be integrated, which would require that speed of operation.

AERODYNAMIC LIFT CONTROL. Lift can also be achieved by "active" means, e.g., rotating wing. That is, the rotational energy of the disk may be converted to lift by modifying the amount of air pushed down by the disk during flight. In a disk without apertures, this might require deployable/modifiable structures at the peripheral edge, while in a disk with apertures, the flow of air through these apertures may be controlled. Lift may also be controlled by altering the aerodynamic profile of the disk along the axis of flight, i.e., converting forward kinetic energy into lift. Typically, since lift operates along the axis of movement of the disk, asymmetry according to angle of rotation is not required; however, there may be advantage to selectively dynamically modifying the leading or trailing edge synchronized with rotational angle.

Lift is generally created by the flow of air over the upper and lower surfaces of the disk. An elongated path over the upper surface with respect to the lower leads to a greater flow velocity, and lower effective pressure above than below, via the Bernoulli principle. Lift can also be created by a rotating wing, e.g., rotating aerodynamic wings on the disk that generate lift from rotation. Lift can further be generated by a directed centrifugal fan effect, wherein radial air flow is directed downward for lift or upward for drop. A Magnus effect rotating drum, etc. on a horizontally disposed surface may be used to control lift.

AERODYNAMIC DRAG CONTROL. Drag is readily increased by extending an apron down from the leading (and trailing) edge of the disk. Further, a roughened upper surface that increases turbulence can increase drag as well. Note that these modifications might have interaction with lift dynamics. While reduction in angular momentum is generally not desired, the peripheral surface may also be modified to provide laminar flow or turbulent flow, especially on the surface counter-rotating with respect to the flight forward axis. Depending on how this is implemented, a steering torque may also be imposed.

Typically, manipulation of drag as a main control parameter is ill-advised, unless the goal is to limit the flight distance. On the other hand, increasing drag can be accomplished in many ways, such as extending the height (y-axis) of the disk to displace more air, and changing the smoothness of the surface. The drag is influenced by turbulent flow around the disk, which is interrelated with aerodynamic lift, and thus changes in drag are often a necessary consequence of control parameters motivated for other purposes.

GAME/PURPOSE When the projectile is used as part of a game, one mode of operation may provide a user with the ability to program a strategy into the projectile. The programming may be through an on-board user interface, or through a user smartphone or tablet, laptop or other computer, or a smartwatch. In the course of playing a physical game, use of computers, laptops, smartphones and tablets is cumbersome and difficult, while a local user interface within the projectile would add weight and complexity to a device which may suffer damage during use. Therefore, a smartwatch programming system is preferred as a virtual/remote interface for the projectile. Further, this allows multiple players to interact with the projectile, and thus effect "interception" (change of control) logic and game play. In some cases, the projectile is programmed with a game strategy before launch, while in others it can be controlled in flight.

The disk may have various uses. For example, a camera on the disk may be used to capture images over a terrain, and indeed to map the terrain. The images may be automatically rotated based on the angular position of the disk, to provide a normalized image stream. A camera or camera array which rotates with the disk may also be employed, with angle-based normalization. Other non-amusement applications may also be implemented.

According to one embodiment, the controller is employed to direct the disk toward a homing signal, or to steer away from a homing signal. In a game, the two teams may have players who emit different signals, or each player can emit a unique RFID, sonic or optical signal. The disk may have a directional antenna or sensor to detect the heading to a respective emitter. The disk can track multiple emitters, and plot a desired path. As part of the game, the limited steerability of the disk permits opposing players to intercept the disk in some cases.

According to a second aspect of the technology, the disk follows a flight path, which may be absolute or relative. For example, in a game, the thrower may wish to avoid an obstacle or opposing player.

In a game device, durability under shock, submersion, manipulation, and compression is generally desirable. Therefore, exposed portions of the disk need to be tough and non-injurious, while internal components need to be shock resistant. One preferred actuator technology is air flow, with passages provided within the disk that vent air from, for example, the center of the bottom of the disk, though modulated passages, to openings near the periphery in locations that result in generation of a torque about an axis other that the axis of rotation. The passages may have a flexible wall, which is modulated by an actuator outside the passage, thus providing immunity to moisture. The actuators are typically normally closed, and are periodically opened as the disk swings through a rotational sector. Another embodiment provides a counter-rotating element within the disk that drives the actuators, and which is controlled to spin near (but not necessarily at) the rotational speed of the disk. This later embodiment has the advantage of continuous rotational inertia and absence of reciprocation, and may therefore yield a lower power drive, than the pulsatile actuators of the former embodiment. The passages may be passively fed, or a fan/compressor may be provided to actively pump air from the top and/or bottom, or edge of the disk, to another portion to provide a steering torque.

The disk will therefore steer by controlling a perturbing torque on the disk until the target is aligned with the direction of translation of the disk. The altitude/pitch sensors will also guide the disk to avoid landing before the target is reached.

A translational force may also be provided to redirect the disk, without altering the axis of rotation.

In a more complex scheme, the disk is steered to avoid an obstacle/opponent. In this case, the obstacle/opponent is also detected by the radio frequency emission. In the case of an obstacle, a scanning radar may be implemented by a radial emission of RF waves from the disk, and a representation of distance from nearest object maintained. Any object in the path of the disk that is not the target may be deemed an obstacle. The disk, upon detection of the obstacle, effects an evasive maneuver, such as an arced path around the obstacle. Assuming the disk is involved in game play, and each player has an RFID tag, the disk can distinguish between teammates and opponents, and selectively avoid opponents. In the case of an opponent, one strategy involves flying over the opponent instead of around him, or other three dimensional maneuvers. The disk, if involved in game play, may also adopt a chaotic flight path, in order to increase the difficulty of the game.

One mode of operation of the control system is to optimize straight flight, rather than control a curved flight path. Thus, an errant launch may be compensated by the projectile.

In a Bluetooth communication network environment for game play, players may each have a Bluetooth headset/device, and thus control the game play using voice commands, e.g., relayed through a speech recognition device such as a smartphone or cloud computing resource. In a team environment, the network may distinguish between players on different teams.

In a remote control environment, local control system of the disk will determine rotational angle and receive control commands remotely to alter the forces applied to the disk synchronized to angle of rotation with respect to a reference. The reference may be fixed or mobile. The disk may also telemeter its own location, such as by GPS, assisted GPS, RF or sound triangulation (TDOA, etc.) or by other means. For example, if the control device is a smartphone, a camera in the phone may be used to provide positional feedback.

Players in the game may also have coded (e.g., RFID) bracelets, which are read by the control device directly or by an antenna on the disk, which allows feedback on positioning errors. For example, a player may wear a bracelet which indicates that the disk is intended for that player. The disk has an RFID transceiver (reader), that reads both the codes of the various RFID devices in the environment, as well the range and orientation of the Frisbee and its flight path from the target. The disk can then home in to the target. In the remote control case, the remote controller can retarget the disk in flight as desired. The players in that case become positional references, though their movement is within an order of magnitude of the movement speed of the disk itself, and must be taken into account.

According to one embodiment, magnetic field emissions/modulation in a near-field pattern is employed, which tends to have a shorter range and may provide additional information (e.g., orientation), with respect to far field pattern electromagnetic wave propagation.

In one embodiment, the projectile homes toward a beacon, which may change during flight.

In another embodiment, the projectile avoids or evades a beacon or object, which may change during flight.

In a further embodiment, the projectile follows a random or chaotic flight path.

In a still further embodiment, a remote control system transmits steering control commands to the projectile.

In another embodiment, a set of rules is programmed into a controller, and the projectile autonomously flies, according to the predetermined rules.

In a still further embodiment, the projectile corrects a flight pattern of the human launcher; that is, the control exerted during flight is to attain and maintain a desired trajectory in view of perturbations and errors in launch conditions, and not to alter the trajectory from that path defined at launch. Other flight paradigms are also possible.

In another mode of operation, the projectile assumes an unstable and/or unpredictable path. In such a case, the control system senses atmospheric disturbances, such as updrafts, turbulence, wind, and the like, and exploits opportunities for rapid steering corrections as a result. In order to detect atmospheric conditions, a highly sensitive barometer/pitot tube or array, a short range laser sensor, a microphone, or other sensor of air movement or energy dissipation may be provided. For example, a gust of wind may be exploited to rapidly gain height or speed.

The projectile may use various types of known guidance systems, including terrain following (e.g., as used in cruise missiles), GPS and/or triangulation or trilateralization, homing beacons, inertial guidance, magnetometers, etc. In a game played on an athletic field, often a set of line boundaries and zones are established by lines. A downward-looking camera (rotationally adjusted) can be used to guide the projectile with respect to the lines, for example to stay in-bounds, to drop at the goal line, or to aim at the goal. The camera can also spot players and distinguish between teams. The projectile may be programmed with a generic program, i.e., home in on closest player on controlling team, or specific programs such as fly to the 50-yard line, turn left, and home in on a particular player, while avoiding defensive players on other team. The play logic and/or control may be internal to the projectile, or provided through wireless communications, e.g., Bluetooth, Zigbee, Z-wave or WiFi.

In some cases, the projectile may become lost, such as in brush, a tree, on a roof or in a water hazard. The projectile may have a sound alert to help find it (both in air and on ground), and may further have actuators to help in retrieval. For example, when landed on a roof, the projectile may assume a shape that helps it roll off, and avoid becoming trapped in gutter. The projectile in some cases may have and deploy an active lift system. In a tree, the projectile may assume a shape that avoids convex surfaces, and provides a force to help free it from branches. In water, the projectile may deploy a float or balloon, and have an active propulsion system (e.g., air or water propeller) to return to shore. These features may be automatically sense the condition and deploy the countermeasure, or be remotely controlled by a human player.

In some cases, the disk may be launched by a mechanized launcher, rather than by human. For example, the launcher may recharge the battery, and then launch the projectile with an optimal velocity, angle, and spin, as well as create or relay the play to the control within the projectile.

See, U.S. Pat. Nos. 3,960,379; 4,112,612; 4,166,618; 4,222,361; 4,223,473; 4,253,673; 4,262,911; 4,274,639; 4,315,629; 4,330,130; 4,334,385; 4,355,813; 4,373,734; 4,378,944; 4,386,779; 4,456,265; 4,461,485; 4,516,776; 4,529,390; 4,600,398; 4,635,943; 4,709,928; 4,718,677; 4,805,583; 4,809,988; 4,819,947; 4,852,543; 4,894,038; 4,919,083; 4,955,620; 5,014,990; 5,050,575; 5,078,637; 5,083,799; 5,092,608; 5,108,108; 5,125,862; 5,195,745; 5,209,490; 5,232,226; 5,234,367; 5,256,099; 5,263,819; 5,303,931; 5,366,219; 5,367,503; 5,397,130; 5,411,265; 5,480,334; 5,531,624; 5,569,131; 5,620,351; 5,636,844; 5,655,777; 5,695,420; 5,697,617; 5,776,021; 5,799,616; 5,865,690; 5,873,570; 5,902,166; 5,934,966; 5,951,353; 5,984,753; 6,083,128; 6,106,355; 6,135,455; 6,193,620; 6,231,414; 6,247,989; 6,265,984; 6,287,193; 6,304,665; 6,312,349; 6,386,997; 6,404,409; 6,503,085; 6,554,285; 6,604,742; 6,659,466; 6,705,654; 6,723,013; 6,726,265; 6,887,119; 6,910,977; 7,090,596; 7,101,293; 7,187,295; 7,340,765; 7,540,814; 7,662,012; 7,663,629; 7,665,453; 7,665,454; 7,670,204; 7,682,214; 7,708,658; 7,775,910; 7,789,520; 7,794,341; 7,850,551; 7,857,718; 7,873,841; 7,878,929; 7,935,013; 7,997,595; 8,018,933; 8,033,253; 8,051,079; 8,062,087; 8,099,375; 8,177,260; 8,202,180; 8,205,578; 8,267,693; 8,282,498; 8,287,406; 8,322,308; 8,355,410; 8,417,481; 8,454,459; 8,469,815; 8,585,476; 8,608,167; 8,612,617; 8,628,333; 8,657,351; 8,683,065; 8,693,653; 8,770,586; 8,808,100; 8,808,119; 8,821,293; 8,827,845; 8,849,697; 8,880,378; 8,885,979; 8,908,922; 8,909,543; 8,920,287; 8,924,248; 8,924,249; 8,948,457; 8,951,123; 8,982,105; 9,005,055; 9,037,578; 9,037,600; 9,089,760; 9,149,695; 9,172,551; 9,218,364; 9,227,122; 9,237,297; 9,264,552; 9,283,468; 20010033057; 20020005614; 20020017759; 20020077906; 20020100040; 20020115508; 20020118147; 20020163132; 20020180154; 20030045200; 20030096554; 20030122390; 20030184013; 20030199343; 20030234914; 20040007818; 20040061347; 20040077255; 20040077975; 20040157687; 20040163289; 20040185972; 20040209712; 20040214666; 20040220001; 20040235388; 20040244034; 20050049055; 20050061707;

20050076387; 20050082762; 20050151941; 20050192852; 20050200079; 20050260548; 20060023117; 20060027482; 20060057549; 20060105838; 20060105865; 20060144211; 20060199682; 20060200314; 20060234596; 20060262120; 20060277466; 20060287137; 20070029272; 20070032318; 20070035059; 20070077857; 20070100666; 20070135247; 20070146325; 20070174163; 20070187897; 20070197318; 20070205553; 20070212973; 20070213126; 20070218988; 20070219426; 20070298913; 20080033581; 20080062677; 20080093838; 20080096654; 20080096657; 20080104422; 20080111312; 20080116644; 20080125001; 20080132361; 20080154898; 20080167535; 20080174281; 20080242415; 20080290650; 20080293523; 20090033034; 20090061727; 20090082144; 20090088266; 20090115211; 20090119543; 20090134580; 20090143175; 20090171788; 20090275262; 20090278317; 20090280931; 20090291614; 20090300551; 20100013160; 20100034466; 20100062847; 20100063774; 20100064983; 20100072190; 20100140873; 20100141609; 20100153175; 20100153215; 20100261526; 20100267492; 20100279776; 20100299738; 20110040879; 20110042901; 20110053716; 20110074109; 20110092319; 20110124442; 20110161254; 20110190056; 20110221219; 20110226191; 20110283438; 20120015766; 20120040758; 20120042835; 20120067294; 20120068927; 20120091158; 20120103274; 20120103275; 20120106869; 20120115597; 20120223480; 20120258804; 20120308443; 20120310714; 20130001878; 20130045813; 20130073387; 20130073389; 20130079152; 20130139073; 20130238538; 20130294443; 20130303314; 20130344958; 20140066206; 20140070493; 20140106908; 20140130748; 20140141865; 20140142467; 20140142733; 20140143031; 20140143038; 20140144417; 20140156039; 20140156676; 20140159894; 20140159903; 20140162779; 20140163428; 20140163429; 20140163430; 20140164049; 20140171046; 20140184496; 20140203797; 20140220849; 20140232516; 20140256479; 20140301598; 20140301600; 20140301601; 20140335952; 20140337346; 20140340300; 20140364254; 20150005084; 20150005912; 20150031480; 20150054318; 20150057808; 20150062959; 20150078680; 20150078732; 20150079869; 20150082172; 20150103168; 20150128067; 20150130135; 20150141140; 20150151180; 20150178794; 20150224378; 20150273296; 20150297964; 20150306455; 20150309563; 20150319562; 20150352450; 20150356261; 20150367212, expressly incorporated herein by reference in their entirety.

BALL. In a controllable ball system, the inertial frame may be independent of the axis of travel. For example, baseballs, golf balls, tennis balls, soccer balls, lacrosse balls, etc., have no predefined axis. In contrast, footballs do have a predefined axis.

In the case of 3-axis radially symmetric balls, control may require three or more actuators, to ensure that an actuator is deployed at or near an optimal control position when needed. This may mean, for example, that three pairs of aerodynamic elements may be provided on orthogonal axes. In some cases, a ball may be launched without spin, or with inappropriate spin, which should be addressed in the control system.

In the case of a ball, the spin axis, if any, is not rigidly defined. Therefore, a more generic control system should be employed. That is, actuators should be provided along all three orthogonal axes. These may be of similar types to those discussed above.

One additional consideration is that a ball may be launched with low spin or without spin, and a change in the spin axis during flight may have "interesting" flight dynamics/aerodynamic effects on the flight path.

Thus, a set of thrusters may be provided to control spin on the ball during flight. While a set of aerodynamic features can be used to spin the ball along the axis of its flight path, this is not a generic solution, since for a radially symmetric ball, such features cannot be guaranteed to be properly disposed.

Another difference between the disk and ball is that a spinning ball typically has a much higher velocity to spin ratio, and a radially symmetric ball will typically have a different set of governing considerations with respect of lift and drag. As well known for golf balls, when the topspin is in the same direction as air flow, and the bottom against it, the result is lift, since the effect is to increase pressure below the ball and decrease it above. Therefore, control over the axis of spin and direction of spin are important, especially for balls that have aerodynamic surface features. In contrast, for a disk launched with a spin, typically the system will not seek to significantly alter the spin parameters during flight.

For a football-type projectile, the axis of spin is defined by the radial asymmetry, and the angle would generally be aligned with flight path, except under perturbation, mislaunch, or unusual circumstances. In this case, the control system can rely on the defined axis of rotation, and need not have a complete set of actuators for all 3 orthogonal axes.

Another type of object morphs during flight. For example, an object may be launched with a ball shape, and after a period of time, flattens to a disk. Typically, the disk is symmetric about the flat plane, since the orientation of the ball when the transition occurs is unknown. This projectile may have both a 3D radially symmetric actuator system for the initial phase of flight, and a 1D radially symmetric actuator system for the later phase of flight. Further, a control may be provided to induce the transitions between states, and therefore, the object may be launched as a disk, convert to a ball, and return to a disk, for example.

This morphing feature may also be provided in a device without the other dynamic control features, or with a very limited subset.

One control option is to provide an internal rotating mass to permit separate control over gyroscopic stabilization and aerodynamic effects. To provide these independently, a full set of gimbals with servo-control are required, in addition to a motor to in the inertial mass and/or shell. Thus, at least four controls are required. Further, it may be most efficient to provide a distinct shell drive in addition to a gyroscopic rotor drive, and at least three gimbal drives. Such an arrangement may be fragile, especially in low-friction bearings and shell support. Further, the mechanisms may result in a ball that has a distinct feel with respect to typical recreational balls.

In the case of a ball with a shell having controlled spin, no other aerodynamic controls may be required. In other cases, the ball acts as a single inertial mass, with no significant independently rotating masses within it. In that case, the gyroscopic axis will be identical to the aerodynamic spin axis, and since the device is fully symmetric, the deployment of any single aerodynamic feature with respect to the flight path is not guaranteed.

In contrast, a football is 2D radially symmetric with a defined axis of rotation aligned generally with the flight path, during "normal" play. This permits useful control with a single axis controlled, and is in that way similar to a Frisbee, though the relationship between the spin axis and flightpath is different.'

In a football, it is possible to provide an internal spinning inertial mass, for example, suspended internally from a pair of cables from the leading and training tips of the ball. A motor spins the mass with respect to the shell, and since the ball is launched with the shell motionless, the rotor will start with a defined spin. As the ball is thrown, a spin is imparted, but this hardly disturbs the rotating mass inside, which should generally be counter-rotating with respect to the shell. The air drag in the shell will tend to permit the rotating mass to gain relative rotational inertia, and thus avoid a net offset of gyroscopic forces. If the ball is launched with the mass rotating in the same direction as the shell, the motor will at first slow the rotation, and then reverse it, causing a mid-flight change in aerodynamic effect.

The various actuators and controls discussed above for use with disks may also be used with balls, though for balls which are launched with spin, dimples may also be selectively deployed as aerodynamic control surfaces.

MUNITION. In some cases, the projectile itself is not a toy, but rather a useful article, such as a munition. For example, instead of a simple tossed grenade, a steerable disk or ball may be provided which aims for a target, and fires when the target is reached. Typically, the payload for a munition will make aerodynamics a minor consideration in guidance, while inertia will be major. However, in some cases, the disk or ball itself may be formed of a plastic explosive, with a detonator as part of the control system. Indeed, the large mass may assist in permitting vertical drop of the projectile or its payload, overcoming walls as obstacles. Such munitions may be preprogrammed, autonomous, laser guided, or remotely controlled, for example. The trigger may have various safety rules, to avoid harm to friendly forces, and the identify friend or foe (IFF) functionality may be based on RFID, visual identification, or other known technologies. The projectile may be emitter-targeting, and as such may seek radio, radar or laser emitters, heat, or other emitted signals. In the case of a deployable payload, the projectile may have multiple payload capabilities, and thus drop two or more munitions from the targetable craft. The projectile may also be a decoy, to attract enemy attention, and as such may intentionally emit radio, laser, radar or heat signatures, for example. To emit heat, advantageously, the disk may be formed of a flammable material and be ignited before or during flight. A slower and more controlled heating may be achieved by catalytic combustion or chemical reaction.

Figure 2:
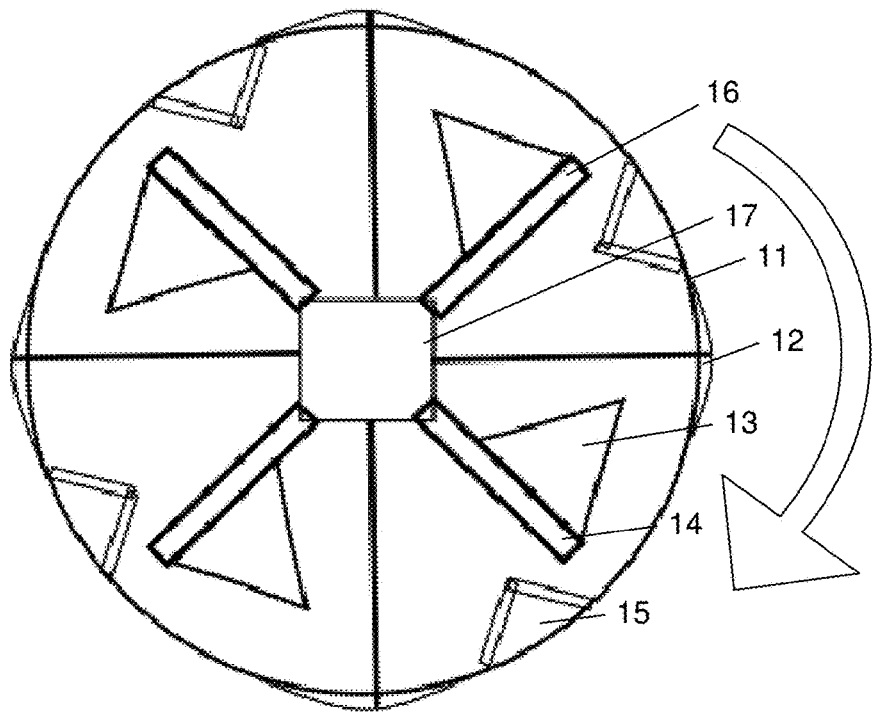
FIG. 2 shows schematic representation of a top view of a Frisbee® type disk having three sets of actuators, in quadrature. A first set operates at a peripheral edge of the rotating craft, and typically induces a Magnus force; a second set provided a set of flaps that can protrude from or into the plane of the upper surface of the disk; and a third set provides a set of apertures at or near the edge of the craft, with a set of baffles or valves to control flow through the passages.

FIG. 2 shows an embodiment of the invention which provides a flying disk 11, with a set of flaps 13 (e.g., two pairs of opposed flaps 13) which may be raised above the top surface of the disk 11, or returned to a flush position. A central control 17 actuates the flaps through axles 16, though an electronic device may be provided for each flap 13 peripherally. As a separate control scheme, as set of protrusions 12 may be provided at the outer edge of the disk 11, which selectively extend or retract to provide or modulate a Magnus effect. This embodiment also shows a controlled portal 15, which may be open or closed to air flow. In each case, the path may be from the top or edge of the disk, to the bottom space or one of the other portals 15. Therefore, there different and independent aerodynamic effects are available.

Figure 3A:
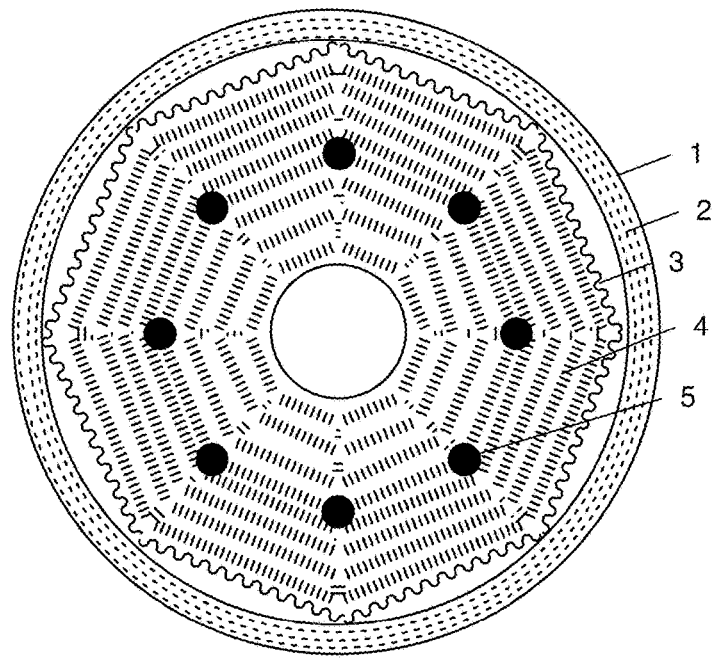
FIGS. 3A and 3B show the top and bottom views of an acoustically-actuated steerable disk.
Figure 3B:
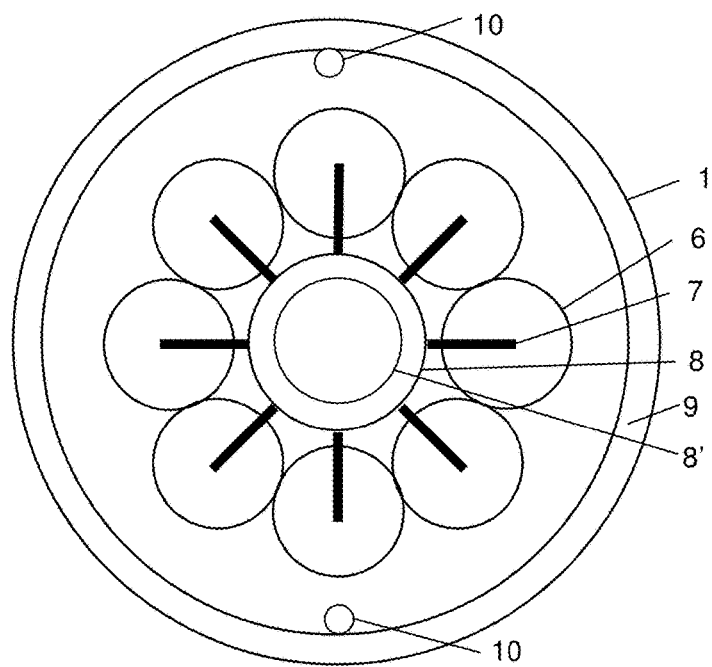

FIGS. 3A and 3B show a top view and bottom view respectively of an acoustically/sonically steered embodiment of a flying disk 1. A peripheral rim 9 is provided which is rotatable with respect to the inner portion of the risk, under power of bidirectional motors 10, which provide a controlled Magnus effect. The upper surface of the rim 9 is textured 2, to enhance this effect. A set of Helmholz resonators 6 (each having a piezoelectric bender and resonant chamber) provided under the top surface, with ports 5 on the top surface. Surrounding the ports 5 are ridges 4 that have a spacing corresponding to a resonant frequency of the Helmholz resonator 6 at a nominal rotation rate of e.g., 10 Hz. Thus, at a resonant frequency of 2 kHz, the spacing of the ridges would be e.g., 0.03 radians, or about 200 ridges 4. At a distance of 5 inches from the center, this corresponds to a spacing of 0.157", or slightly over 1/8". During flight, each resonator 6 may be sensed to determine coupling to the air flow above the aperture 5 by an analog-to-digital converter in the control 8, connected through wiring 7, and then driven to either reinforce the air vibration or suppress it, in dependence on the angular rotation of the disk 1. This requires control over the phase, frequency, and amplitude of the oscillations, and as the disk 1 turns, may require abrupt changes in state. An inertial guidance sensor may optionally be provided on a counter-rotating sub-platform 8', which is driven to provide a non-rotating frame of reference. This reduces the static load on the sensors, and allows use of less expensive devices.

Figure 4A:
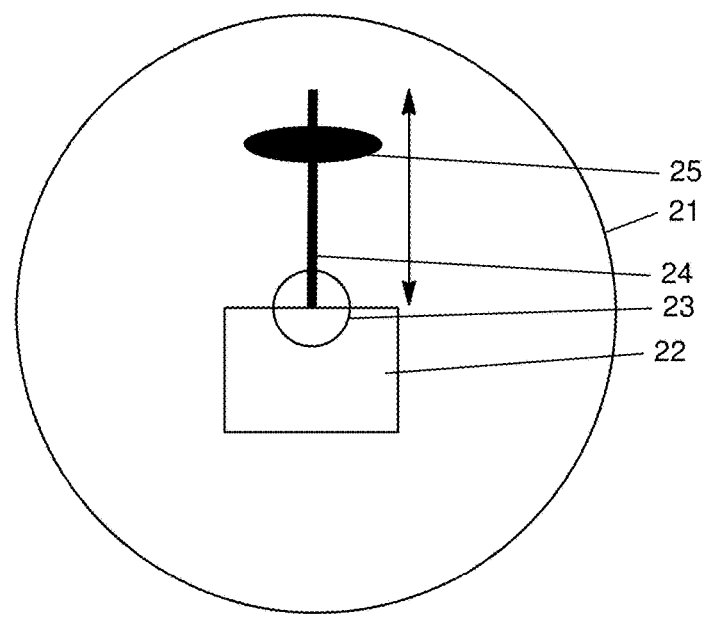
FIGS. 4A and 4B show two alternate bottom views of offset-mass steering embodiments.
Figure 4B:
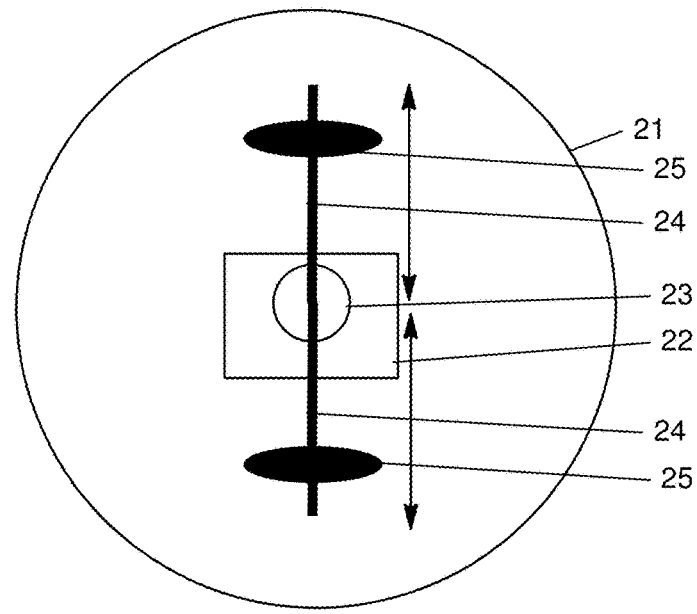

FIGS. 4A and 4B show two embodiments where the center of mass (or center of gravity, the difference being whether a spatially-varying gravity field is present) of the disk 21 may be modified in flight, to control the angle of the disk 21 with respect to gravity, which, in turn permits steering through air. In FIG. 4A, a single actuator is provided, which is, for example, a mass 25 riding on a radially-oriented worm gear 24. The worm gear 24 and mass 25 are counter-rotated with respect to the shell of the disk 21, to remain largely non-rotating with respect to an external frame of reference, by motor 23. Control 22 drives the motor 23 to maintain the non-rotating state, and perturb that state to provide steering inputs. The eccentricity of the mass 25 is also controllable by rotating the worm gear 24 (which can be substituted with a band or other mechanical device), and preferably is able to assume a dynamically balanced state in which the center of gravity coincides with the axis of rotation, and therefore permitting the motor 23 to be turned off, which saves power. This state is also useful for launch of the disk 21, since the motor may not have the torque required to maintain counter-rotation during startup. FIG. 4B differs in that it has two controlled masses 25, which in turn permits a symmetric design. Having two masses permits control over the moment of inertia, and therefore can vary the spin rate of the disk in flight, to some extent.

EXPRESS DISCLAIMER: The claims in this application are to be interpreted to encompass only patentable subject matter, pursuant to 35 U.S.C. § 101 and Judicially created interpretations, and no interpretation of the claims as encompassing subject matter which is patent ineligible, shall be deemed reasonable or correct. To the extent that a claim encompasses a system, apparatus or composition, that claim shall be interpreted to encompass a physical manifestation of such system, apparatus or composition, and not a virtual or abstract representation of such system, apparatus or composition.

The present application arises in the fields of electrical, mechanical, and materials engineering, and aerodynamics, and any interpretation of words used shall be in accordance the usage afforded by persons skilled in such arts. Lay dictionaries shall not be employed to interpret the language to the extent that they convey an inconsistent, tautological, vague or incomplete definition of any word or phrase which is distinct from contextually appropriate usage found in the scholarly engineering literature. The person of ordinary skill in the art to which this disclosure is directed has skills corresponding to an education through a masters degree in engineering and three years of experience as an engineer, building products.

The word "comprising" in a claim means open to inclusion of additional elements consistent with the enumerated elements of the claim, but excluding elements which defeat express or inherent functional constraints for the ordered combination as claimed.

Each of the references cited in this disclosure are incorporated herein by reference in their entirety, to provide written description for claims, and shall be deemed within the knowledge of persons or ordinary skill in the art for purposes of enablement. The language in the express disclosure hereof shall be considered to modify the language of the cited references to resolve any inconsistencies.

The various teachings, elements, embodiments, and sub-embodiments are intended to be employed in any available combination, subcombinations and permutations, and no language herein shall be considered a requirement for presence or absence of any feature.

It is intended that the systems encompassed by this disclosure incorporate command, control, and communication systems that have arbitrary levels of complexity to meet the minimum functional criteria for the respective system, and may include further complexity, and perform additional functions. In some cases, the command, control, and communication systems are disclosed and described in the incorporated references.

What is claimed is:

1. A flying projectile, comprising:
an inertial mass, configured to spin during flight, about an axis of rotation to gyroscopically stabilize the flying projectile;
an aerodynamic surface having a circular periphery, configured to interact and generate lift from forward movement of the flying projectile with respect to surrounding air during flight, to produce aerodynamic forces having an aerodynamic force profile having a center of pressure;
a control system, configured to produce at least one control signal varying selectively in dependence on at least a rotation of the inertial mass about the axis of rotation; and
at least two actuators, responsive to the control signal varying selectively in dependence on, and synchronized with, at least the rotation of the inertial mass about the axis of rotation, configured to selectively alter the aerodynamic forces produced by the aerodynamic surface by independently controlling an aerodynamic property of at least two different portions of the aerodynamic surface, to change a relationship between the axis of rotation and the center of pressure, to selectively generate a torque about the axis of rotation and steer the flying projectile.

2. The flying projectile according to claim 1, further comprising at least one second actuator configured to alter a relationship between a center of gravity of the flying projectile and the axis of rotation, to selectively generate a torque about the axis of rotation and steer the flying projectile synchronized with angular rotation of the flying projectile.

3. The flying projectile according to claim 1 further comprising at least one third actuator, selectively controllable to provide a Magnus effect force to shift a flight path of the flying projectile in a horizontal plane normal to the vertical axis of rotation.

4. The flying projectile according to claim 1, wherein the at least two actuators comprise a reconfigurable aerodynamic surface.

5. The flying projectile according to claim 1, wherein the at least two actuators comprise a vibrating transducer.

6. The flying projectile according to claim 5, wherein the vibrating transducer is configured to control a boundary layer separation from the aerodynamic surface.

7. The flying projectile according to claim 1, wherein the at least two actuators comprise a rotating motor.

8. The flying projectile according to claim 1, wherein the at least two actuators comprise a linear actuator.

9. The flying projectile according to claim 1, wherein the at least two actuators comprise a vane controlled selectively block and permit an airflow.

10. The flying projectile according to claim 1, wherein the at least two actuators comprise at least three actuators, configured to independently control an aerodynamic property of at least three different portions of the aerodynamic surface synchronized with respect to rotation about the axis of rotation.

11. The flying projectile according to claim 1, wherein the control system is further configured to be responsive to a guidance signal to selectively alter a flightpath of the flying projectile.

12. The flying projectile according to claim 1, wherein the control system is further configured to stabilize an instability of a flightpath of the flying projectile.

13. The flying projectile according to claim 1, wherein the at least two actuators are configured to alter at least the at least two portions of the aerodynamic surface during flight to selectively generate lift eccentric to an axis of rotation, wherein the generated lift is synchronized with angular rotation of the portion of the aerodynamic surface.

14. The flying projectile according to claim 1, wherein the at least two actuators are configured to control a radial movement of a mass with respect to the axis of rotation.

15. The flying projectile according to claim 1, wherein the at least two actuators are configured to selectively alter a turbulence of air flowing over the flying projectile during flight.

16. The flying projectile according to claim 1, wherein the control system is further configured to control each of the at least two actuators to selectively produce different aerodynamic forces as a function of an angle of rotation about the axis of rotation.

17. The flying projectile according to claim 1, wherein the control system further produces a servo control signal for a servo motor having a rotational speed corresponding to a rotational speed of the inertial mass about the axis of rotation modified by a steering perturbation.

18. The flying projectile according to claim 1, wherein the control system is further configured to execute flight control logic, dependent on at least two competing goals, and to control the at least two actuators to execute the flight logic to optimize between the at least two competing goals.

19. A method for controlling a gyroscopically-stabilized flying projectile having an inertial mass and a smooth peripheral edge which rotates about an axis of rotation during flight, comprising:
determining an angle of rotation of the inertial mass spinning about the axis of rotation during flight; and
controlling at least two actuators, to selectively alter a relationship between a center of gravity of the flying projectile with respect to a center of pressure of an aerodynamic force acting on the flying projectile, by independently controlling an aerodynamic characteristic of at least two different portions of an aerodynamic surface of the flying projectile, in response to at least one control signal which is synchronized to vary with a rotation of the inertial mass about the axis of rotation.

20. A rotating aerodynamic flying object, comprising:

an aerodynamic surface having a circular peripheral edge, configured to produce an aerodynamic lift force with respect to air moving over the rotating aerodynamic flying object during flight;

an orientation sensor configured to generate a sensor signal responsive to a rotational angle of the rotating aerodynamic flying object with respect to an external reference, the sensor signal having a periodic variation dependent on rotation of the rotating aerodynamic flying object during flight;

a control system responsive to at least the sensor signal having a periodic variation dependent on rotation of the rotating aerodynamic flying object during flight and a control algorithm, to produce a control signal; and at least two actuators responsive to the control signal, configured to alter a flight path of the rotating aerodynamic flying object, by at least varying an aerodynamic property of each of at least two independently controllable aerodynamic surfaces, which varies in a manner synchronized to the rotational angle of the rotating aerodynamic flying object with respect to an external reference, to alter a relation of a center of gravity of the rotating aerodynamic flying object and an aerodynamic force distribution, dependent on the rotational angle.

\* \* \* \* \*